US008463658B2

(12) United States Patent
Racco

(10) Patent No.: US 8,463,658 B2
(45) Date of Patent: Jun. 11, 2013

(54) SYSTEM AND METHOD FOR LISTING ITEMS ONLINE

(75) Inventor: Michael Racco, Thunder Bay (CA)

(73) Assignee: Just Parts Online Inc., Thunder Bay (CA)

( * ) Notice: Subject to any disclaimer, the term of this patent is extended or adjusted under 35 U.S.C. 154(b) by 0 days.

(21) Appl. No.: 12/957,851

(22) Filed: Dec. 1, 2010

(65) Prior Publication Data

US 2011/0161182 A1 Jun. 30, 2011

Related U.S. Application Data

(63) Continuation of application No. PCT/CA2009/000740, filed on Jun. 2, 2009.

(60) Provisional application No. 61/058,475, filed on Jun. 3, 2008, provisional application No. 61/101,029, filed on Sep. 29, 2008.

(51) Int. Cl.
*G06Q 30/00* (2012.01)

(52) U.S. Cl.
USPC .......................................................... 705/26.1

(58) Field of Classification Search
USPC ...................................................... 705/26–27
See application file for complete search history.

(56) References Cited

U.S. PATENT DOCUMENTS

| | | | | |
|---|---|---|---|---|
| 6,751,600 | B1 | 6/2004 | Wolin | |
| 6,904,410 | B1 | 6/2005 | Weiss et al. | |
| 7,165,068 | B2 | 1/2007 | Dedhia et al. | |
| 2001/0034656 | A1 | 10/2001 | Lucas et al. | |
| 2002/0062265 | A1 | 5/2002 | Poon | |
| 2002/0120506 | A1 | 8/2002 | Hagen | |
| 2003/0233350 | A1* | 12/2003 | Dedhia et al. | 707/3 |
| 2004/0034566 | A1* | 2/2004 | Nagata | 705/22 |
| 2004/0117294 | A1 | 6/2004 | Ferraro et al. | |
| 2004/0249723 | A1* | 12/2004 | Mayer | 705/26 |

FOREIGN PATENT DOCUMENTS

CA 2291964 A1 6/2001

OTHER PUBLICATIONS www.chessbaseusa.com web site (Apr. 9, 2007, 9 selected pages).*
Mougeot, C.; Search Report from corresponding PCT Application No. PCT/CA2009/000740; search completed Aug. 17, 2009.

* cited by examiner

*Primary Examiner* — Jeffrey A Smith
*Assistant Examiner* — Ethan D Civan

(57) ABSTRACT

A system and method are provided for listing an item online. The system provides a user interface comprising a first pane for entering information pertaining to the item and a second pane for viewing said information while it is being entered. The user is provided, in the second pane, an upload tool for uploading one or more photos of the item to assist in describing the item during the listing process. Upon entering one or more characters in a field in the first pane for identifying the item, the system searches a database of items being either parts or components and displays possible choices for said item such that the user can simply type in what their item is and the system provides possible category choices to facilitate and speed up the listing process.

24 Claims, 101 Drawing Sheets

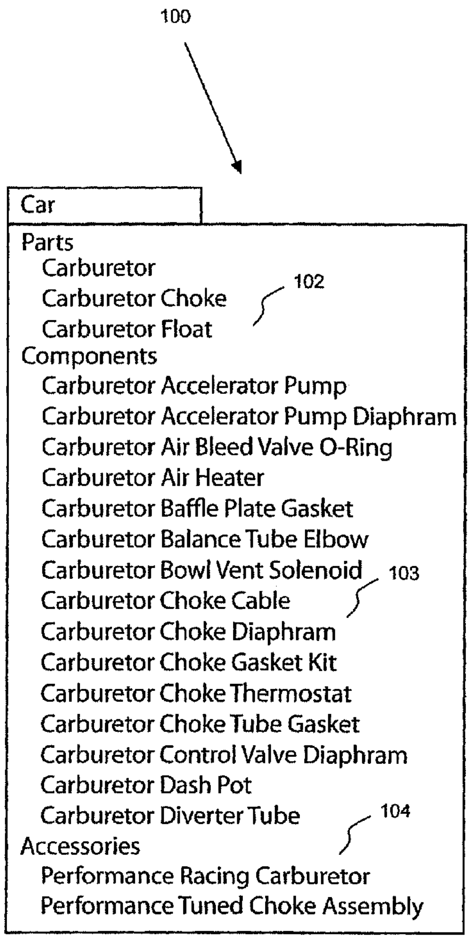

Figure 5A

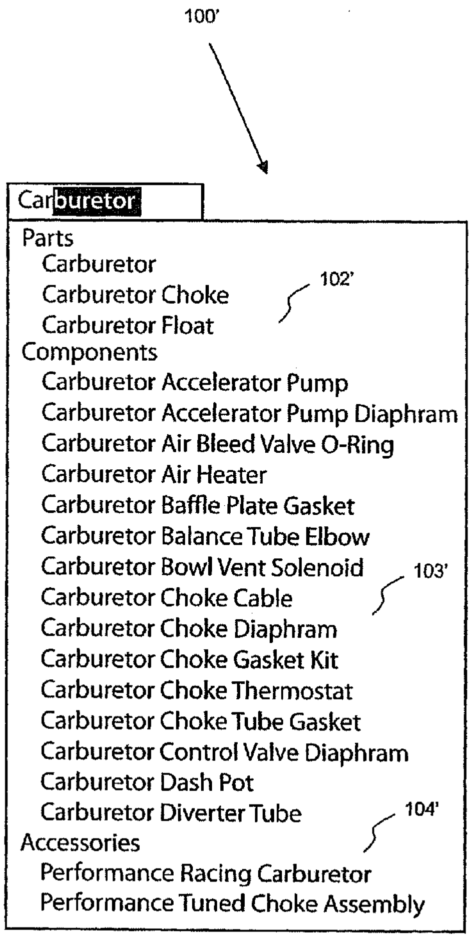

| Car |
|---|

Parts
   Carburetor
   Carburetor Choke    ⌐ 102
   Carburetor Float
Components
   Carburetor Accelerator Pump
   Carburetor Accelerator Pump Diaphram
   Carburetor Air Bleed Valve O-Ring
   Carburetor Air Heater
   Carburetor Baffle Plate Gasket
   Carburetor Balance Tube Elbow
   Carburetor Bowl Vent Solenoid ⌐ 103
   Carburetor Choke Cable
   Carburetor Choke Diaphram
   Carburetor Choke Gasket Kit
   Carburetor Choke Thermostat
   Carburetor Choke Tube Gasket
   Carburetor Control Valve Diaphram
   Carburetor Dash Pot
   Carburetor Diverter Tube ⌐ 104
Accessories
   Performance Racing Carburetor
   Performance Tuned Choke Assembly

| Car**buretor** |
|---|

Parts
   Carburetor
   Carburetor Choke    ⌐ 102'
   Carburetor Float
Components
   Carburetor Accelerator Pump
   Carburetor Accelerator Pump Diaphram
   Carburetor Air Bleed Valve O-Ring
   Carburetor Air Heater
   Carburetor Baffle Plate Gasket
   Carburetor Balance Tube Elbow
   Carburetor Bowl Vent Solenoid ⌐ 103'
   Carburetor Choke Cable
   Carburetor Choke Diaphram
   Carburetor Choke Gasket Kit
   Carburetor Choke Thermostat
   Carburetor Choke Tube Gasket
   Carburetor Control Valve Diaphram
   Carburetor Dash Pot
   Carburetor Diverter Tube ⌐ 104'
Accessories
   Performance Racing Carburetor
   Performance Tuned Choke Assembly

| Parts | Components | Accessories |
|---|---|---|
| Carburetor<br>Carburetor Choke<br>Carburetor Float | Carburetor Accelerator Pump<br>Carburetor Accelerator Pump Diaphram<br>Carburetor Air Bleed Valve O-Ring<br>Carburetor Air Heater<br>Carburetor Baffle Plate Gasket<br>Carburetor Balance Tube Elbow<br>Carburetor Bowl Vent Solenoid<br>Carburetor Choke Cable<br>Carburetor Choke Diaphram<br>Carburetor Choke Gasket Kit<br>Carburetor Choke Thermostat<br>Carburetor Choke Tube Gasket<br>Carburetor Control Valve Diaphram<br>Carburetor Dash Pot<br>Carburetor Diverter Tube<br>Carburetor Electric Assist Choke Control<br>Carburetor Fast Idle Unloader Diaphram<br>Carburetor Flange Gasket | Performance Racing Carburetor<br>Performance Tuned Choke Assembly |

Carburetor

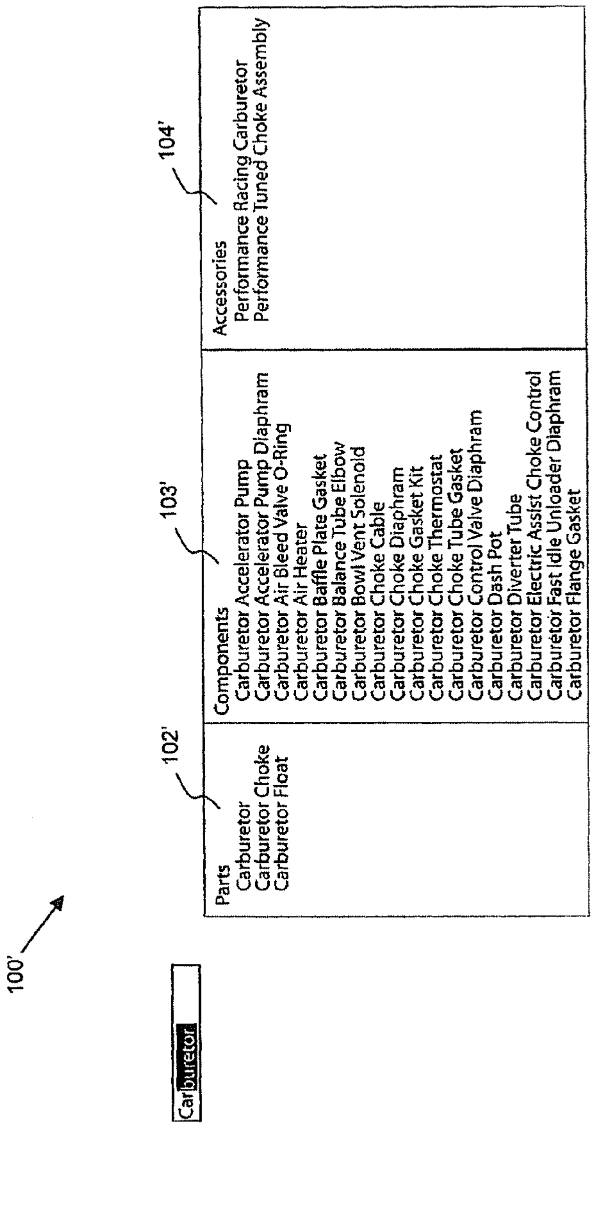

Figure 5C

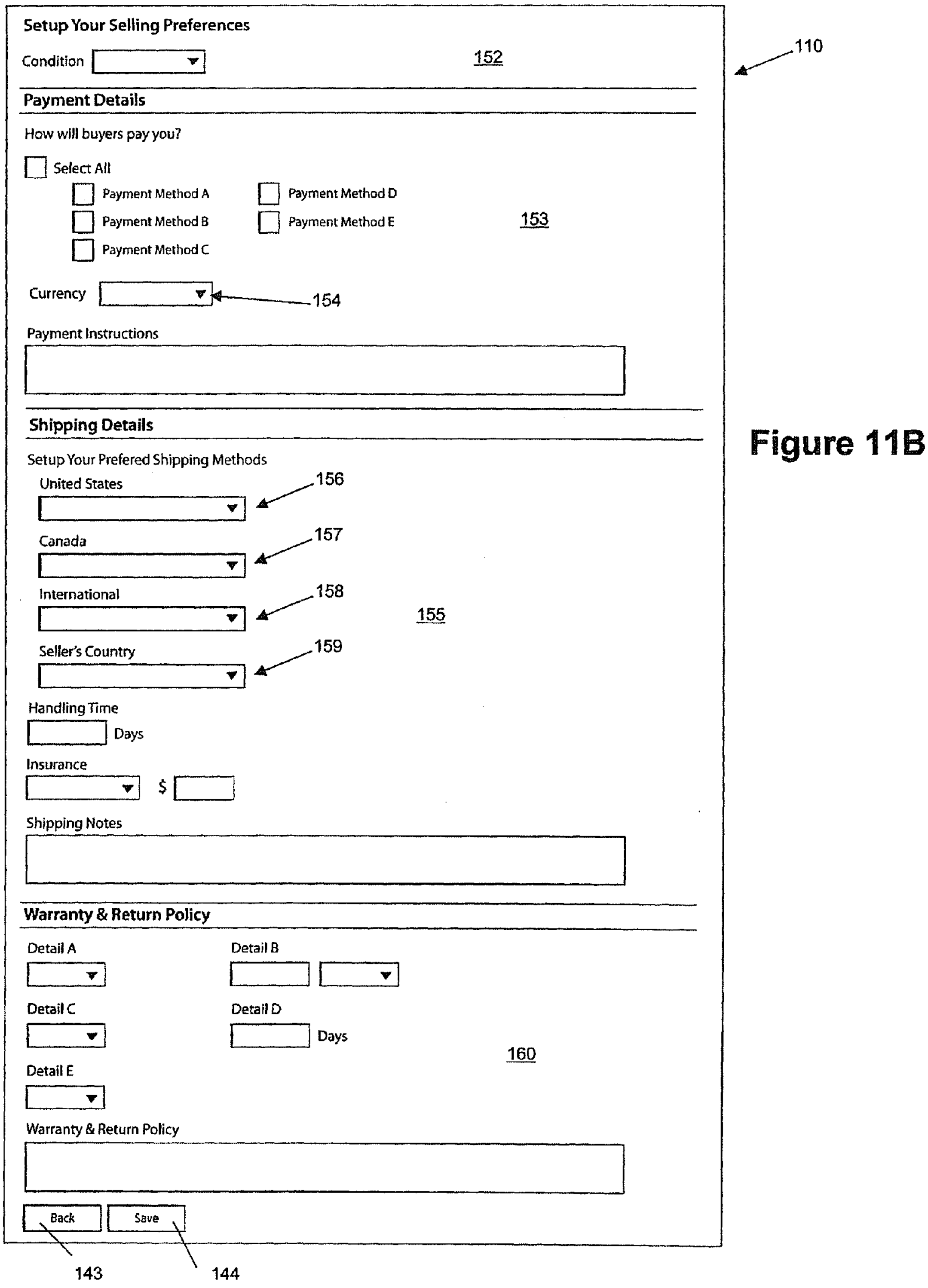

Figure 11B

Setup Your Selling Preferences

Condition [ ▼ ]  _152_

Payment Details

How will buyers pay you?

☐ Select All
  ☐ Payment Method A    ☐ Payment Method D
  ☐ Payment Method B    ☐ Payment Method E    _153_
  ☐ Payment Method C Currency [ ▼ ] ◄— 154

Payment Instructions
[                                        ]

Shipping Details

Setup Your Prefered Shipping Methods

United States ／156
[ ▼ ]

Canada ／157
[ ▼ ]

International ／158    _155_
[ ▼ ]

Seller's Country ／159
[ ▼ ]

Handling Time
[      ] Days

Insurance
[ ▼ ] $ [      ]

Shipping Notes
[                                        ]

Warranty & Return Policy

Detail A         Detail B
[ ▼ ]            [      ] [ ▼ ]

Detail C         Detail D
[ ▼ ]            [      ] Days
                                _160_
Detail E
[ ▼ ]

Warranty & Return Policy
[                                        ]

[ Back ]  [ Save ]
   143      144

— 110

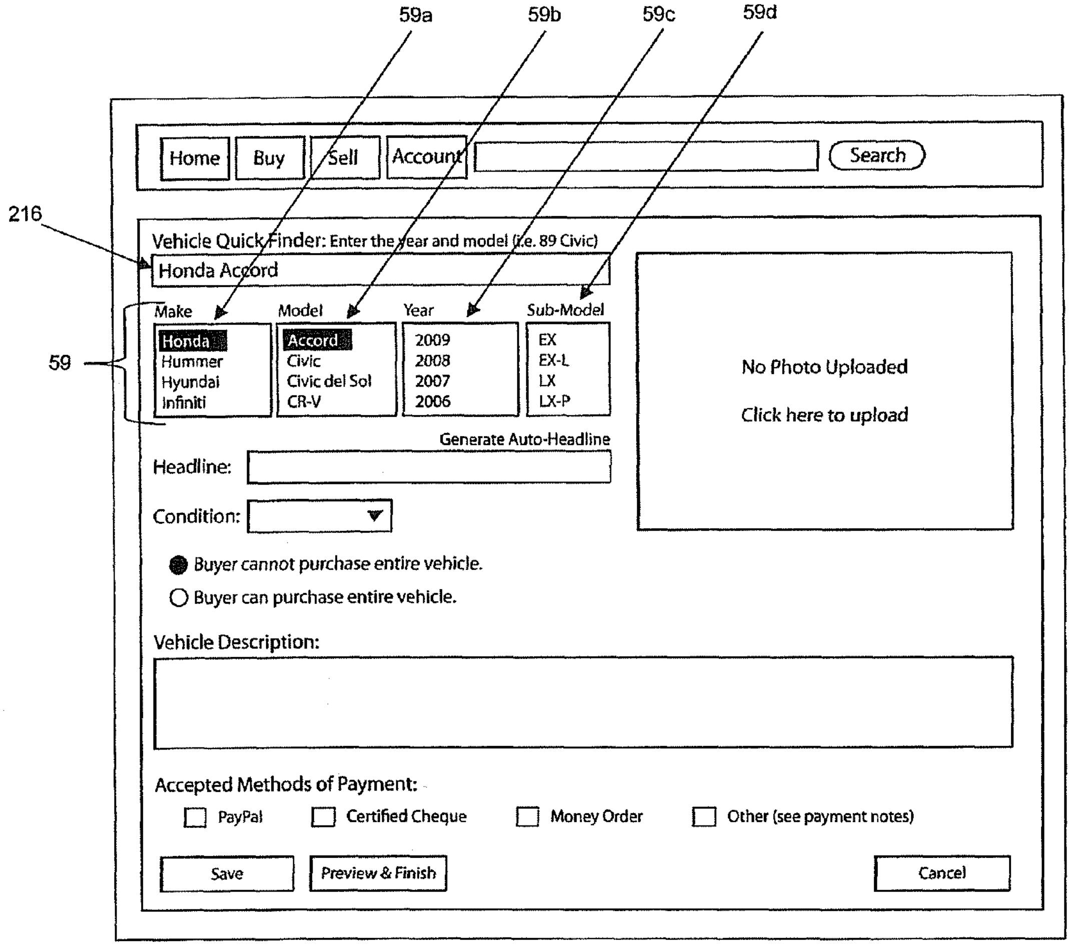

Figure 26

```
┌─────────────────────────────────────────────────────────────────────┐
│  ┌─────┐ ┌───┐ ┌────┐ ┌───────┐ ┌─────────────────────┐ ┌────────┐  │
│  │Home │ │Buy│ │Sell│ │Account│ │                     │ │ Search │  │
│  └─────┘ └───┘ └────┘ └───────┘ └─────────────────────┘ └────────┘  │
│                                                                     │
│  Vehicle Quick Finder: Enter the year and model (i.e. 89 Civic)     │
│  ┌─────────────────────────────────────────┐                        │
│  │ Honda Accord                            │                        │
│  └─────────────────────────────────────────┘                        │
│   Make         Model         Year       Sub-Model   ┌─────────────┐ │
│  ┌────────┐  ┌──────────┐  ┌──────┐   ┌─────────┐   │             │ │
│  │ Honda  │  │ Accord   │  │ 2009 │   │ EX      │   │             │ │
│  │ Hummer │  │ Civic    │  │ 2008 │   │ EX-L    │   │ No Photo    │ │
│  │ Hyundai│  │ Civic del Sol│ 2007 │   │ LX      │   │  Uploaded   │ │
│  │ Infiniti│ │ CR-V     │  │ 2006 │   │ LX-P    │   │             │ │
│  └────────┘  └──────────┘  └──────┘   └─────────┘   │ Click here  │ │
│                            Generate Auto-Headline   │  to upload  │ │
│  Headline: ┌──────────────────────────────────┐     │             │ │
│            └──────────────────────────────────┘     └─────────────┘ │
│                                                                     │
│  Condition: ┌──────────▼┐                                           │
│             └───────────┘                                           │
│                                                                     │
│   ● Buyer cannot purchase entire vehicle.                           │
│   ○ Buyer can purchase entire vehicle.                              │
│                                                                     │
│  Vehicle Description:                                               │
│  ┌─────────────────────────────────────────────────────────────┐    │
│  │                                                             │    │
│  │                                                             │    │
│  └─────────────────────────────────────────────────────────────┘    │
│                                                                     │
│  Accepted Methods of Payment:                                       │
│     □ PayPal   □ Certified Cheque  □ Money Order  □ Other (see payment notes) │
│  ┌──────┐ ┌───────────────┐                        ┌────────┐       │
│  │ Save │ │Preview & Finish│                       │ Cancel │       │
│  └──────┘ └───────────────┘                        └────────┘       │
└─────────────────────────────────────────────────────────────────────┘
```

(216 points to the Honda Accord field; 59 points to the Make/Model/Year/Sub-Model selection group)

| Home | Buy | Sell | Account | | Search |

Vehicle Quick Finder: Enter the year and model (i.e. 89 Civic)

| Make | Model | Year | Sub-Model |
|---|---|---|---|
| **Honda** | **Accord** | 2009 | EX |
| Hummer | Civic | 2008 | EX-L |
| Hyundai | Civic del Sol | **2007** | **LX** |
| Infiniti | CR-V | 2006 | LX-P |

No Photo Uploaded

Click here to upload

Generate Auto-Headline

Headline:

Condition:

○ Buyer cannot purchase entire vehicle.
● Buyer can purchase entire vehicle.

Price for Vehilce: $500.00    Cost of Vehilce: $ 75.00  ←—251

250

Vehicle Description:

Accepted Methods of Payment:
☐ PayPal   ☐ Certified Cheque   ☐ Money Order   ☐ Other (see payment notes)

| Save | Preview & Finish | | Cancel |

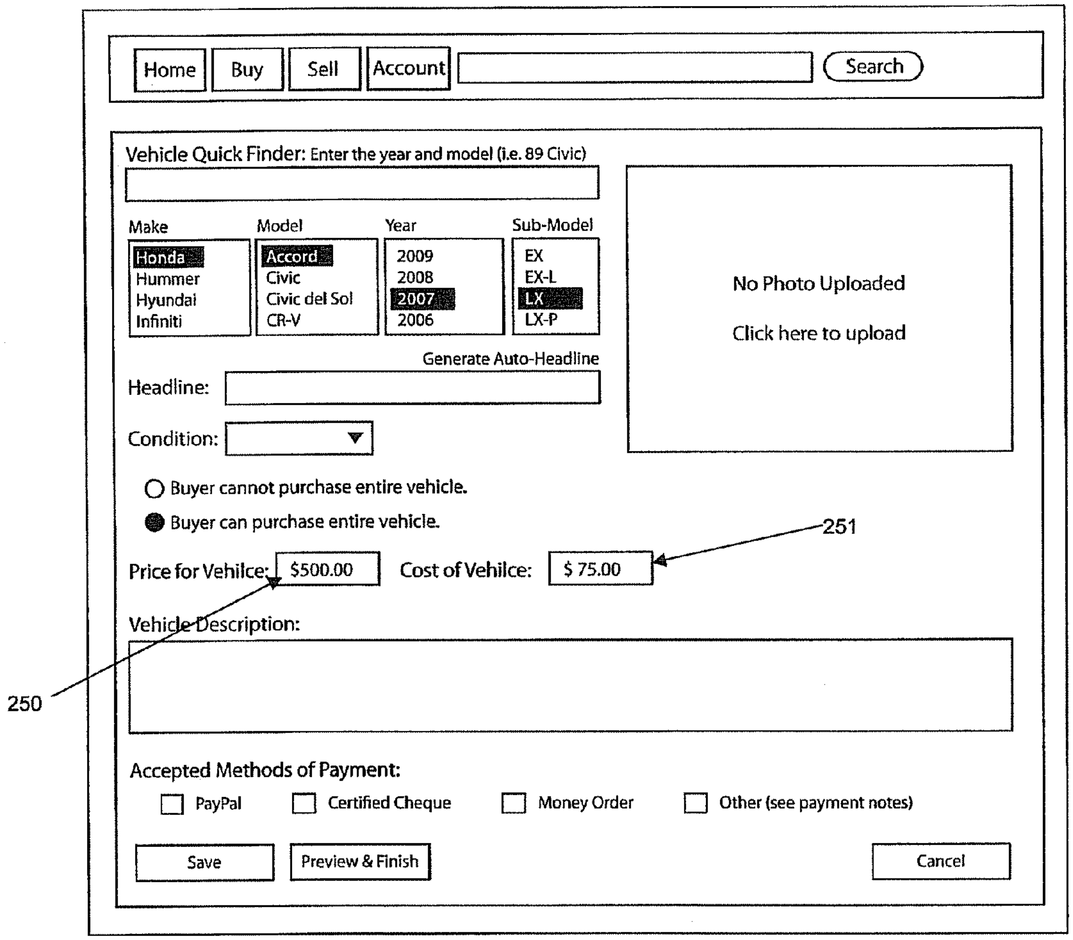

Figure 30

Accepted Methods of Payment:
☐ PayPal  ☐ Certified Cheque  ☐ Money Order  ☐ Other (see payment notes) — 202a

[Save]  [Preview & Finish] — 186a   176a   [Cancel] — 174a

172a

Optional Details — 189, 190, 191, 192, 193

| Profile | Vehicle Details | Choose Parts | Shipping & Payment | Photos/Video | — 188a

Vehicle Information

| Trim Package: | [▼] | Mileage: | [ ] |
| Body Style: | [▼] | Exterior Color: | [▼] |
| Engine Size: | [▼] | Exterior Paint Code: | [ ] |  190a
| Transmission: | [▼] | Interior Color: | [▼] |
| Drive Train: | [▼] | Interior Trim Code: | [ ] |
| Fuel Type: | [▼] | Production Date: | [ ] |

234

Features & Options — 231, 232, 233 — 235

| Exterior | Interior | Engine & Other |

Bumper Options:
☐ Chrome Bumper    ☐ Fibreglass Bumper    ☐ With Tow Hooks    ☐ Steel Bumper
☐ Painted Bumper   ☐ Aluminum Bumper      ☐ With Pads         ☐ Smooth Finish
☐ Textured Finish  ☐ With Pads & Strips   ☐ With Pads, Strips & Guards

Headlight Options:
☐ Single Headlights  ☐ Composite Headlights  ☐ High Intensity Lamps  ☐ With Fog Lamps
☐ Dual Headlights    ☐ Xenon Headlights      ☐ Without Fog Lamps     ☐ Xenon Headlights

Windshield Options:
☐ With Antenna  ☐ Heated Windshield  ☐ With Heads Up Display  ☐ With Rain Sensor

239

Door Mirror Options:
☐ Manual Mirrors  ☐ Fixed Mirrors    ☐ Painted Mirrors     ☐ Camper/RV Mirrors
☐ Power Mirrors   ☐ Folding Mirrors  ☐ With Memory Option

Custom Options:
[                                                                          ]

[Next]                               231

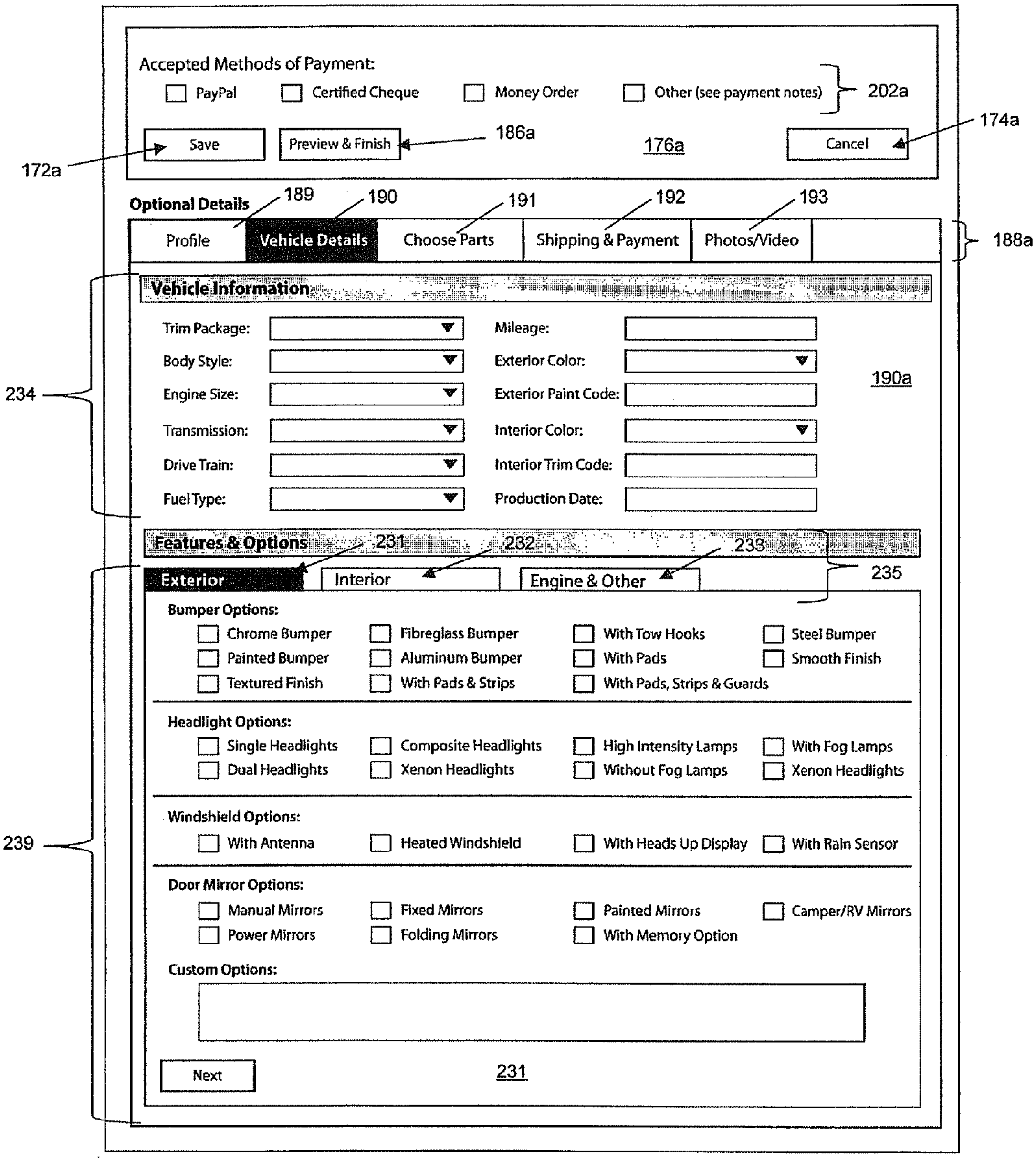

Figure 31

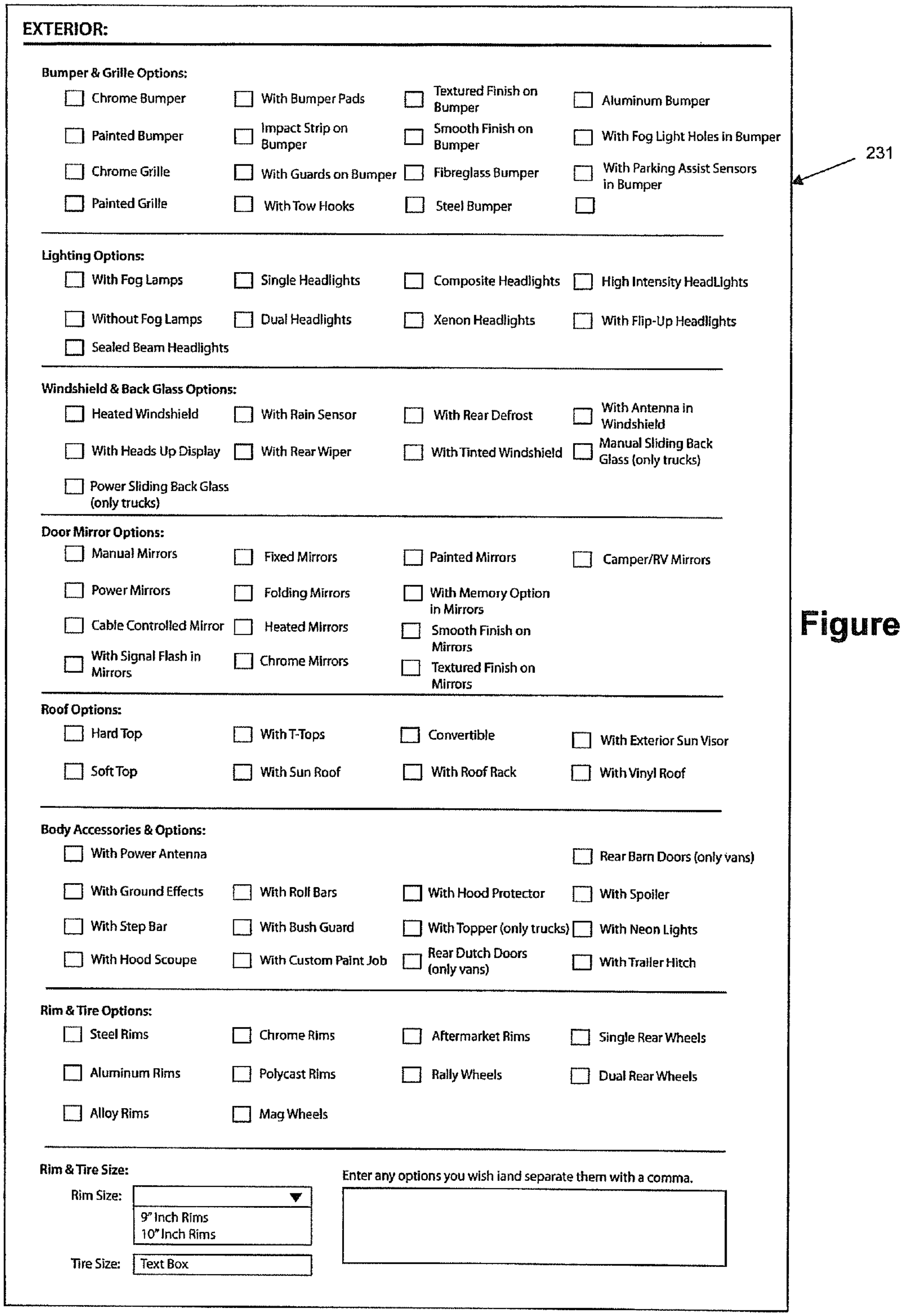

EXTERIOR:

Bumper & Grille Options:
- ☐ Chrome Bumper
- ☐ With Bumper Pads
- ☐ Textured Finish on Bumper
- ☐ Aluminum Bumper
- ☐ Painted Bumper
- ☐ Impact Strip on Bumper
- ☐ Smooth Finish on Bumper
- ☐ With Fog Light Holes in Bumper
- ☐ Chrome Grille
- ☐ With Guards on Bumper
- ☐ Fibreglass Bumper
- ☐ With Parking Assist Sensors in Bumper
- ☐ Painted Grille
- ☐ With Tow Hooks
- ☐ Steel Bumper
- ☐

Lighting Options:
- ☐ With Fog Lamps
- ☐ Single Headlights
- ☐ Composite Headlights
- ☐ High Intensity HeadLights
- ☐ Without Fog Lamps
- ☐ Dual Headlights
- ☐ Xenon Headlights
- ☐ With Flip-Up Headlights
- ☐ Sealed Beam Headlights Windshield & Back Glass Options:
- ☐ Heated Windshield
- ☐ With Rain Sensor
- ☐ With Rear Defrost
- ☐ With Antenna in Windshield
- ☐ With Heads Up Display
- ☐ With Rear Wiper
- ☐ With Tinted Windshield
- ☐ Manual Sliding Back Glass (only trucks)
- ☐ Power Sliding Back Glass (only trucks)

Door Mirror Options:
- ☐ Manual Mirrors
- ☐ Fixed Mirrors
- ☐ Painted Mirrors
- ☐ Camper/RV Mirrors
- ☐ Power Mirrors
- ☐ Folding Mirrors
- ☐ With Memory Option in Mirrors
- ☐ Cable Controlled Mirror
- ☐ Heated Mirrors
- ☐ Smooth Finish on Mirrors
- ☐ With Signal Flash in Mirrors
- ☐ Chrome Mirrors
- ☐ Textured Finish on Mirrors Roof Options:
- ☐ Hard Top
- ☐ With T-Tops
- ☐ Convertible
- ☐ With Exterior Sun Visor
- ☐ Soft Top
- ☐ With Sun Roof
- ☐ With Roof Rack
- ☐ With Vinyl Roof Body Accessories & Options:
- ☐ With Power Antenna
- ☐ Rear Barn Doors (only vans)
- ☐ With Ground Effects
- ☐ With Roll Bars
- ☐ With Hood Protector
- ☐ With Spoiler
- ☐ With Step Bar
- ☐ With Bush Guard
- ☐ With Topper (only trucks)
- ☐ With Neon Lights
- ☐ With Hood Scoupe
- ☐ With Custom Paint Job
- ☐ Rear Dutch Doors (only vans)
- ☐ With Trailer Hitch Rim & Tire Options:
- ☐ Steel Rims
- ☐ Chrome Rims
- ☐ Aftermarket Rims
- ☐ Single Rear Wheels
- ☐ Aluminum Rims
- ☐ Polycast Rims
- ☐ Rally Wheels
- ☐ Dual Rear Wheels
- ☐ Alloy Rims
- ☐ Mag Wheels Rim & Tire Size:

Rim Size: ▼
9" Inch Rims
10" Inch Rims

Tire Size: Text Box

Enter any options you wish iand separate them with a comma.

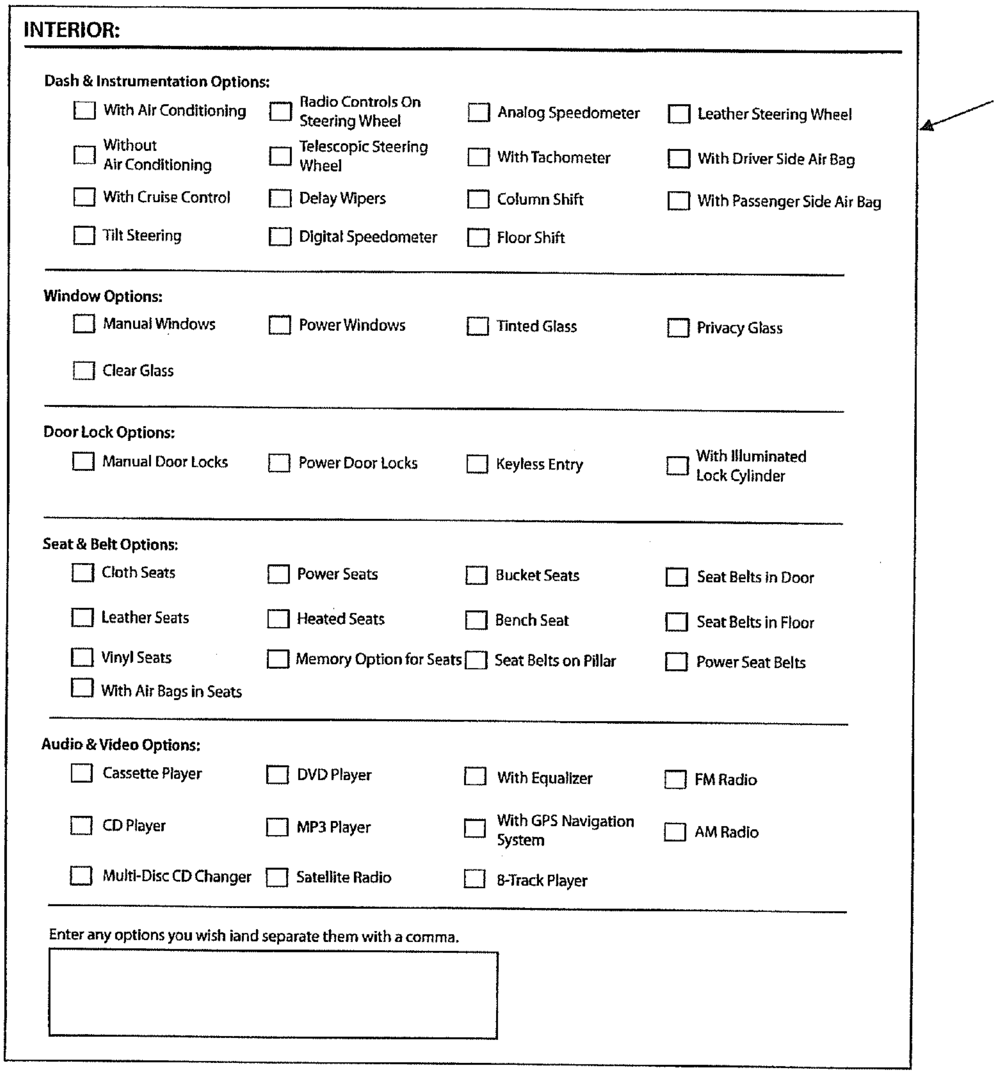
232

INTERIOR:

Dash & Instrumentation Options:

- ☐ With Air Conditioning
- ☐ Radio Controls On Steering Wheel
- ☐ Analog Speedometer
- ☐ Leather Steering Wheel
- ☐ Without Air Conditioning
- ☐ Telescopic Steering Wheel
- ☐ With Tachometer
- ☐ With Driver Side Air Bag
- ☐ With Cruise Control
- ☐ Delay Wipers
- ☐ Column Shift
- ☐ With Passenger Side Air Bag
- ☐ Tilt Steering
- ☐ Digital Speedometer
- ☐ Floor Shift

Window Options:

- ☐ Manual Windows
- ☐ Power Windows
- ☐ Tinted Glass
- ☐ Privacy Glass
- ☐ Clear Glass

Door Lock Options:

- ☐ Manual Door Locks
- ☐ Power Door Locks
- ☐ Keyless Entry
- ☐ With Illuminated Lock Cylinder

Seat & Belt Options:

- ☐ Cloth Seats
- ☐ Power Seats
- ☐ Bucket Seats
- ☐ Seat Belts in Door
- ☐ Leather Seats
- ☐ Heated Seats
- ☐ Bench Seat
- ☐ Seat Belts in Floor
- ☐ Vinyl Seats
- ☐ Memory Option for Seats
- ☐ Seat Belts on Pillar
- ☐ Power Seat Belts
- ☐ With Air Bags in Seats

Audio & Video Options:

- ☐ Cassette Player
- ☐ DVD Player
- ☐ With Equalizer
- ☐ FM Radio
- ☐ CD Player
- ☐ MP3 Player
- ☐ With GPS Navigation System
- ☐ AM Radio
- ☐ Multi-Disc CD Changer
- ☐ Satellite Radio
- ☐ 8-Track Player Enter any options you wish iand separate them with a comma.

Figure 33

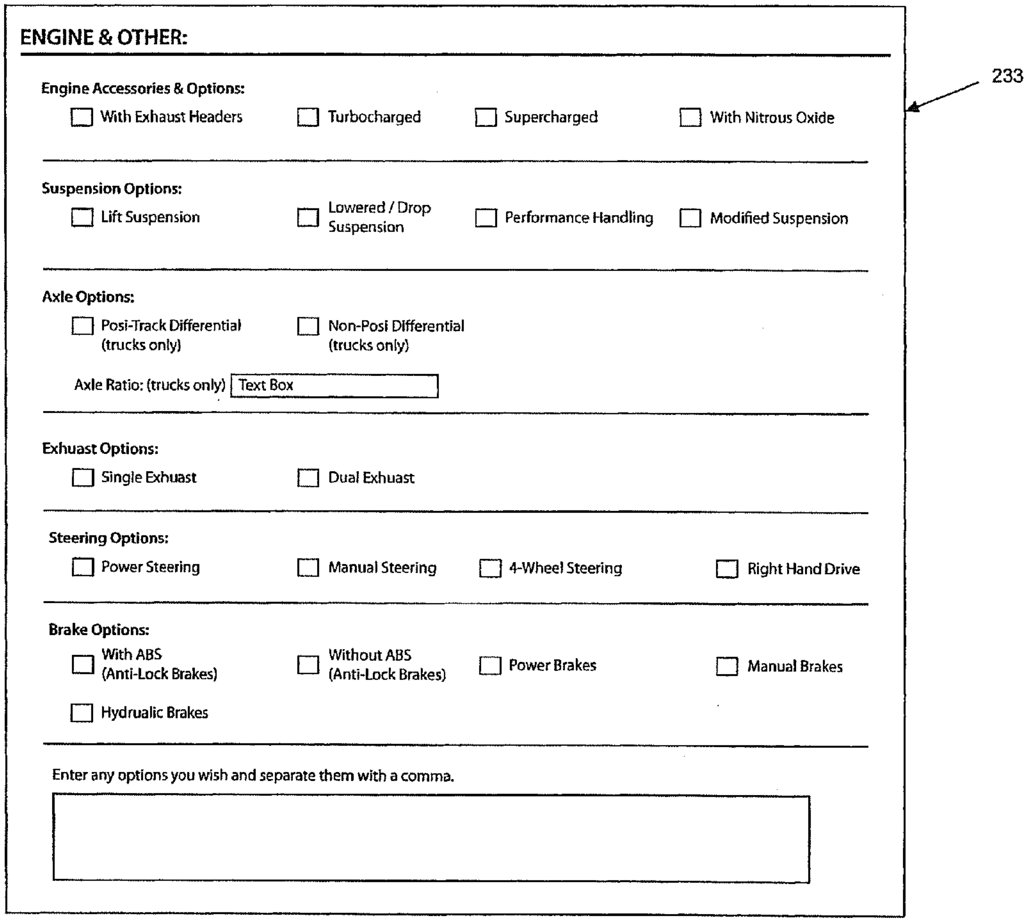

Figure 34

ENGINE & OTHER:  ← 233

Engine Accessories & Options:
- [ ] With Exhaust Headers
- [ ] Turbocharged
- [ ] Supercharged
- [ ] With Nitrous Oxide Suspension Options:
- [ ] Lift Suspension
- [ ] Lowered / Drop Suspension
- [ ] Performance Handling
- [ ] Modified Suspension Axle Options:
- [ ] Posi-Track Differential (trucks only)
- [ ] Non-Posi Differential (trucks only)

Axle Ratio: (trucks only) [ Text Box ]

Exhuast Options:
- [ ] Single Exhuast
- [ ] Dual Exhuast

Steering Options:
- [ ] Power Steering
- [ ] Manual Steering
- [ ] 4-Wheel Steering
- [ ] Right Hand Drive Brake Options:
- [ ] With ABS (Anti-Lock Brakes)
- [ ] Without ABS (Anti-Lock Brakes)
- [ ] Power Brakes
- [ ] Manual Brakes
- [ ] Hydrualic Brakes Enter any options you wish and separate them with a comma.

[                                                          ]

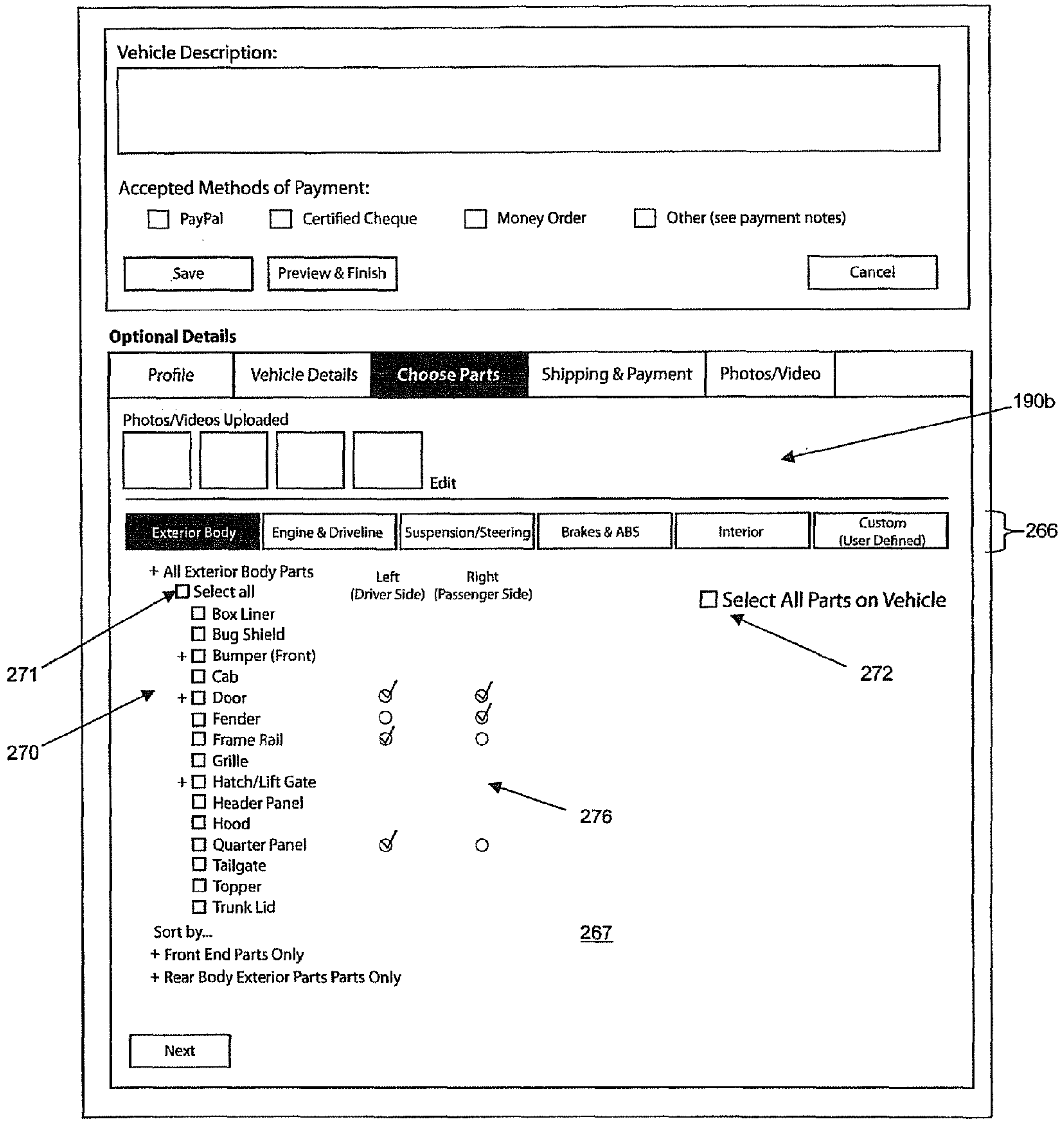

Figure 36

Vehicle Description:

Accepted Methods of Payment:
☐ PayPal  ☐ Certified Cheque  ☐ Money Order  ☐ Other (see payment notes)

[Save]  [Preview & Finish]                                           [Cancel]

Optional Details

| Profile | Vehicle Details | Choose Parts | Shipping & Payment | Photos/Video |

Photos/Videos Uploaded                                                              ──190b

[ ] [ ] [ ] [ ] Edit

| Exterior Body | Engine & Driveline | Suspension/Steering | Brakes & ABS | Interior | Custom (User Defined) |  ⎱─266

+ All Exterior Body Parts    Left    Right
  ☐ Select all  (Driver Side) (Passenger Side)    ☐ Select All Parts on Vehicle
    ☐ Box Liner
    ☐ Bug Shield
  + ☐ Bumper (Front)
    ☐ Cab                                        272
  + ☐ Door      ✓      ✓
    ☐ Fender    ○      ✓
    ☐ Frame Rail  ✓      ○
    ☐ Grille
  + ☐ Hatch/Lift Gate
    ☐ Header Panel          276
    ☐ Hood
    ☐ Quarter Panel  ✓    ○
    ☐ Tailgate
    ☐ Topper
    ☐ Trunk Lid Sort by...                267
+ Front End Parts Only
+ Rear Body Exterior Parts Parts Only

[Next]

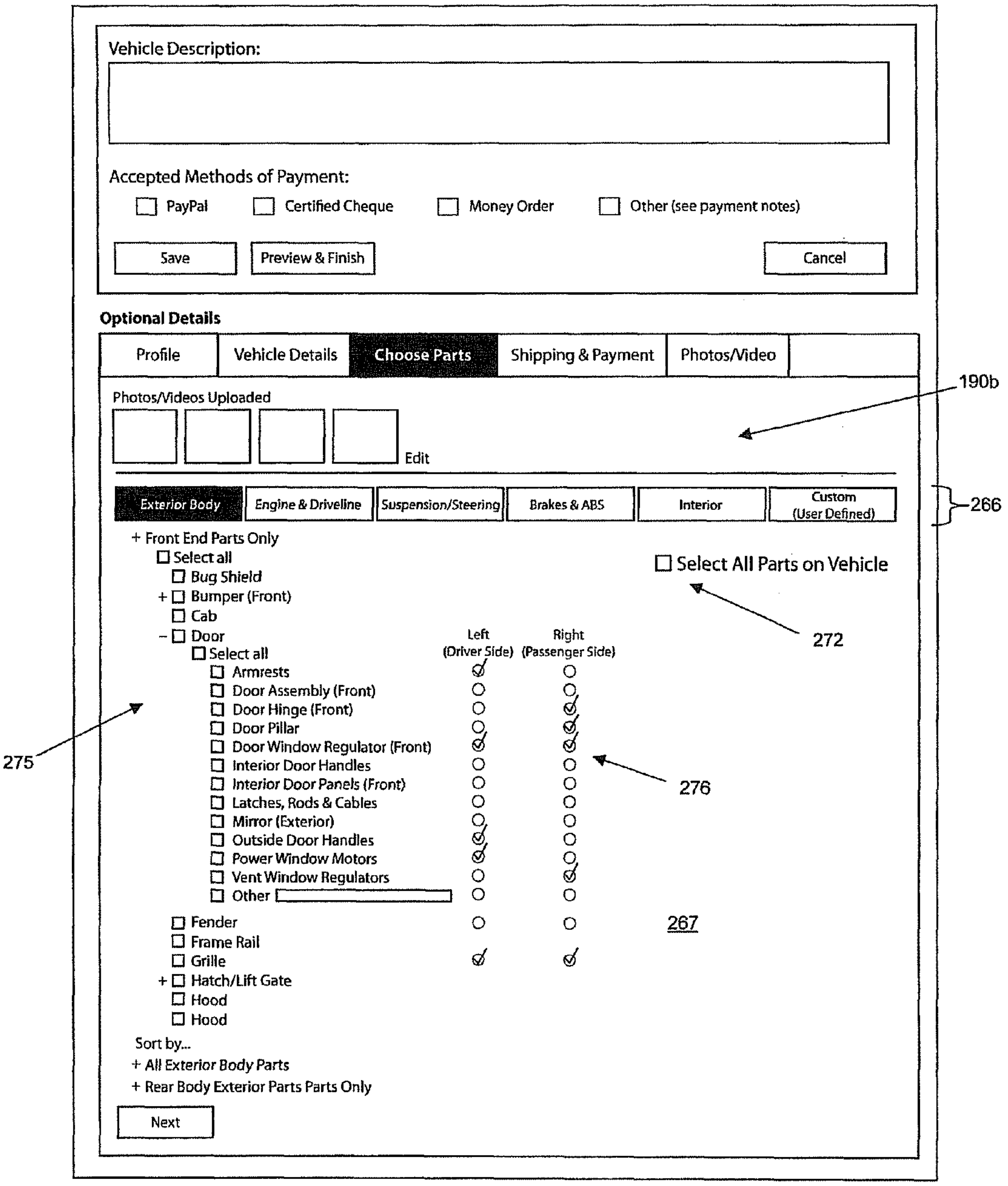

Figure 38

Vehicle Description:

Accepted Methods of Payment:
- [ ] PayPal
- [ ] Certified Cheque
- [ ] Money Order
- [ ] Other (see payment notes)

[ Save ]  [ Preview & Finish ]                                    [ Cancel ]

Optional Details

| Profile | Vehicle Details | Choose Parts | Shipping & Payment | Photos/Video |

— 190b

Photos/Videos Uploaded
[ ] [ ] [ ] [ ] Edit

| Exterior Body | Engine & Driveline | Suspension/Steering | Brakes & ABS | Interior | Custom (User Defined) | — 266

+ Front End Parts Only
- [ ] Select all
  - [ ] Bug Shield               [ ] Select All Parts on Vehicle
  + [ ] Bumper (Front)
  - [ ] Cab                                                           272
  - [ ] Door                        Left          Right
    - [ ] Select all          (Driver Side) (Passenger Side)
      - [ ] Armrests              ☑             ○
      - [ ] Door Assembly (Front) ○             ○
      - [ ] Door Hinge (Front)    ○             ☑
      - [ ] Door Pillar           ○             ☑
      - [ ] Door Window Regulator (Front) ☑    ☑
      - [ ] Interior Door Handles ○             ○
      - [ ] Interior Door Panels (Front) ○      ○       276
      - [ ] Latches, Rods & Cables ○            ○
      - [ ] Mirror (Exterior)     ○             ○
      - [ ] Outside Door Handles  ☑             ○
      - [ ] Power Window Motors   ☑             ○
      - [ ] Vent Window Regulators ○            ☑
      - [ ] Other [_____]      ○             ○
  - [ ] Fender                    ○             ○       267
  - [ ] Frame Rail
  - [ ] Grille                    ☑             ☑
  + [ ] Hatch/Lift Gate
  - [ ] Hood
  - [ ] Hood Sort by...
+ All Exterior Body Parts
+ Rear Body Exterior Parts Parts Only

[ Next ]

275

| Vehicle Description: | | | | |
|---|---|---|---|---|
| | | | | |

Accepted Methods of Payment:
☐ PayPal  ☐ Certified Cheque  ☐ Money Order  ☐ Other (see payment notes)

| Save | Preview & Finish | | Cancel |
|---|---|---|---|

Optional Details

| Profile | Vehicle Details | Choose Parts | Shipping & Payment | Photos/Video | |

Photos/Videos Uploaded — 190b

☐ ☐ ☐ ☐ Edit

| Exterior Body | Engine & Driveline | Suspension/Steering | Brakes & ABS | Interior | Custom (User Defined) | — 266

+ Electrical, Audio & Video
   ☐ Select all
   + ☐ Flashers
   + ☐ Modules
   + ☐ Switches
   − ☐ Wiring Harnesses
     ☐ Select all
       ☐ ABS Wiring Harness
       ☐ Air Conditioning Wiring Harness
       ☐ Alternator Wiring Harness
       ☐ Audio & Video Wiring Harness
       ☐ Body Wiring Harness
       ☐ Dash Wiring Harness
       ☐ Door Wiring Harness
       ☐ Engine Bay Wiring Harness
       ☐ Engine Wiring Harness - Main
       ☐ Fuel Tank Wiring Harness
       ☐ Fuse Box & Fuse Panels
       ☐ Headlamp Wiring Harness
       ☐ Other ⎕

☐ Select All Parts on Vehicle — 272

267

Sort by...
+ All Interior Parts
+ Dash
+ Seats & Seat Belts
+ Trim
+ Switches

| Next |
|---|

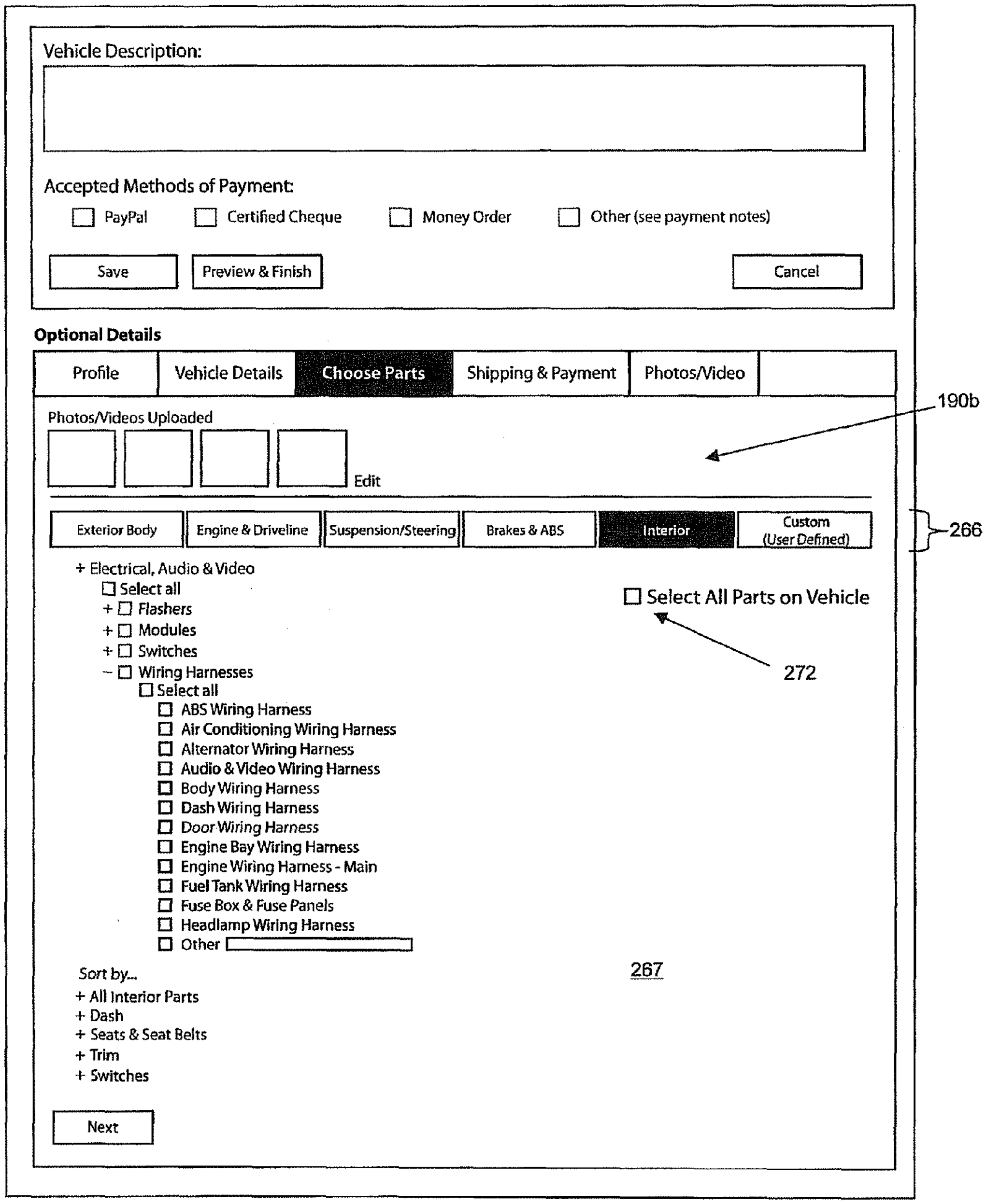

Figure 39

Vehicle Description:

Accepted Methods of Payment:
☐ PayPal ☐ Certified Cheque ☐ Money Order ☐ Other (see payment notes)

[ Save ]  [ Preview & Finish ]                                    [ Cancel ]

Optional Details

| Profile | Vehicle Details | Choose Parts | Shipping & Payment | Photos/Video |

190b

Photos/Videos Uploaded
[ ] [ ] [ ] [ ] Edit

| Exterior Body | Engine & Driveline | Suspension/Steering | Brakes & ABS | Interior | Custom (User Defined) |

266

+ Electrical, Audio & Video
   ☐ Select all
   + ☐ Flashers
   + ☐ Modules
   + ☐ Switches
   − ☐ Wiring Harnesses
      ☐ Select all
         ☐ ABS Wiring Harness
         ☐ Air Conditioning Wiring Harness
         ☐ Alternator Wiring Harness
         ☐ Audio & Video Wiring Harness
         ☐ Body Wiring Harness
         ☐ Dash Wiring Harness
         ☐ Door Wiring Harness
         ☐ Engine Bay Wiring Harness
         ☐ Engine Wiring Harness - Main
         ☐ Fuel Tank Wiring Harness
         ☐ Fuse Box & Fuse Panels
         ☐ Headlamp Wiring Harness
         ☐ Other [_____]

☐ Select All Parts on Vehicle

277

Fuse Box & Fuse Panel
The fuse box is a part that houses all the fuses. It is generally located in the engine compartment and connected to the main engine wiring harness.

Sameple Image of Fuse Box

279

278

267

Sort by...
+ All Interior Parts
+ Dash            280
+ Seats & Seat Belts
+ Trim
+ Switches

[ Next ]  [ Previous ]

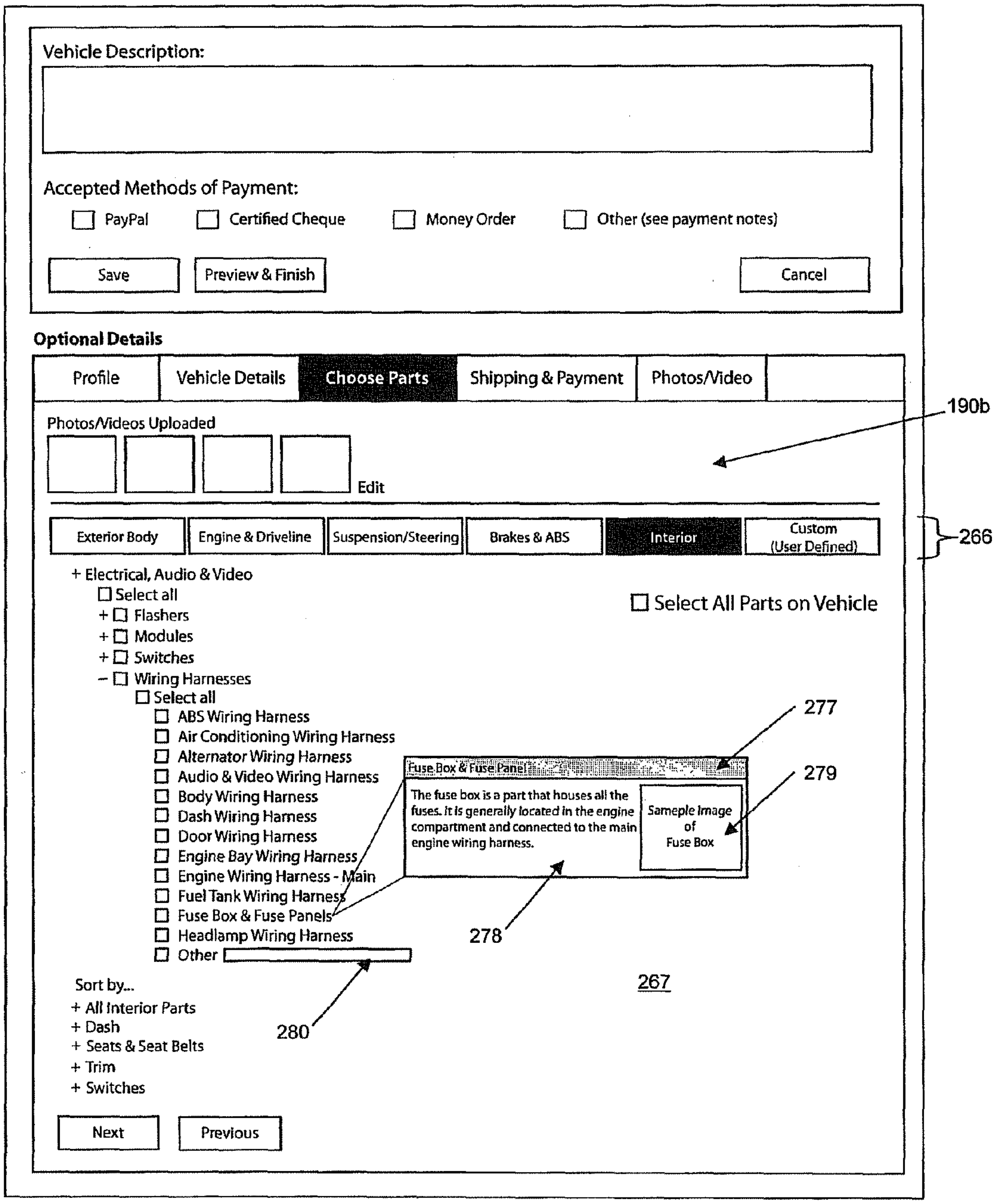

Figure 40

Vehicle Description:

Accepted Methods of Payment:
☐ PayPal  ☐ Certified Cheque  ☐ Money Order  ☐ Other (see payment notes)

[ Save ]  [ Preview & Finish ]                                              [ Cancel ]

Optional Details

| Profile | Vehicle Details | Choose Parts | Shipping & Payment | Photos/Video | |

Photos/Videos Uploaded

[ ] [ ] [ ] [ ] Edit

— 190b

| Exterior Body | Engine & Driveline | Suspension/Steering | Brakes & ABS | Interior | Custom (User Defined) | } 266

☐ Select All Parts on Vehicle ← 272

☐ Select all
 ☐ Custom 1
 ☐ Custom 2
 ☐ Custom 3
 ☐ Custom 4
 ☐ Custom 5
 ☐ Custom 5
 ☐ Custom 6
 ☐ Custom 7
 ☐ Custom 8
 ☐ Custom 9
 ☐ Custom 10
 ☐ Custom 11

281 →

Add Custom Item:

Heading: [            ]

Item: [            ]

Item Details:
● Right and Left Indicators Required
○ Detail A
● Detail B ( Add Item )

267

[ Next ]

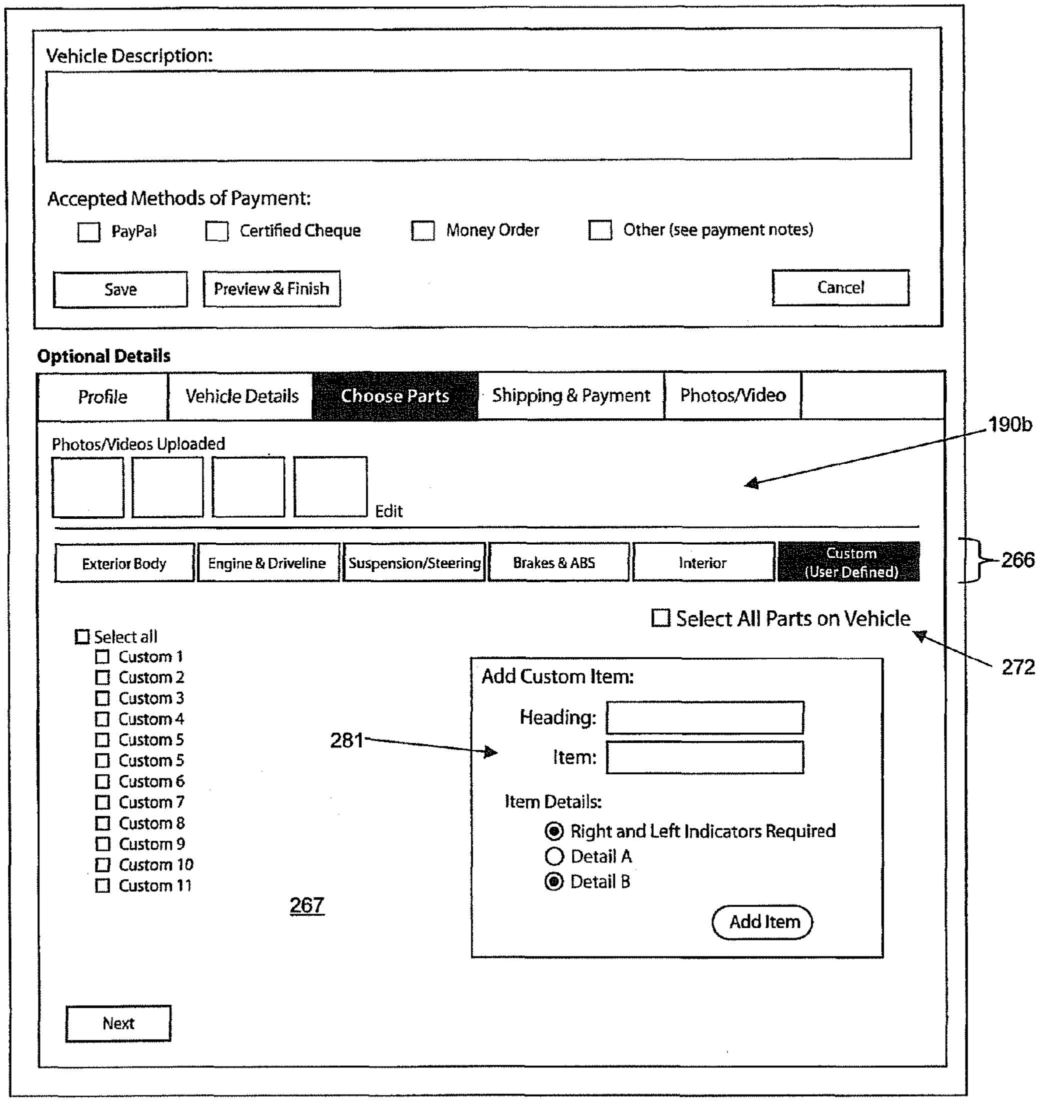

Figure 41

Optional Details

| Profile | Vehicle Details | Choose Parts | Shipping & Payment | Photos/Video |

Payment Details

Payment Instructions

[                                    ]

Shipping Details

Setup Your Prefered Shipping Methods

United States
[          ▼]

Canada
[          ▼]

International
[          ▼]

Handling Time
[      ] Days

Insurance
[     ▼] $ [    ]

Shipping Notes
[                                    ]

Warranty & Return Policy

Detail A
[     ▼]

Detail B
[      ] [     ▼]

Detail C
[     ▼]

Detail D
[      ] Days

Detail E
[     ▼]

Warranty & Return Policy
[                                    ]

[ Next ]  [ Previous ]

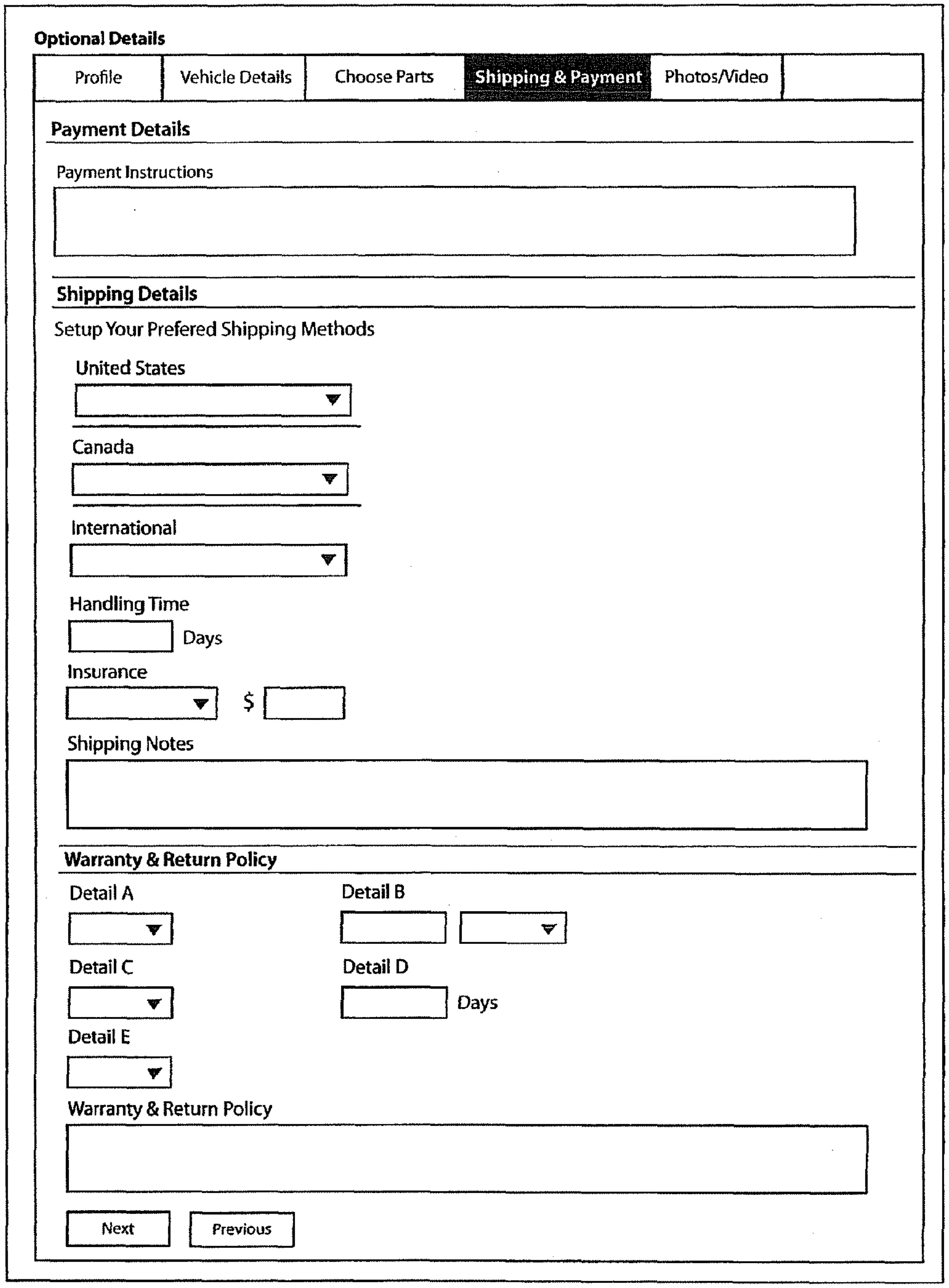

Figure 42

| Home | Buy | Sell | Account | | Search |

Vehicle Quick Finder: Enter the year and model (i.e. 89 Civic)

Browse Categories    Can't find your vehicle?

Generate Auto-Headline

Headline:

Condition: ▼

● Buyer cannot purchase entire vehicle.
○ Buyer can purchase entire vehicle.

No Photo Uploaded

Click here to upload

Vehicle Description:

Accepted Methods of Payment:
☐ PayPal  ☐ Certified Cheque  ☐ Money Order  ☐ Other (see payment notes)

| Save | Preview & Finish | | Cancel |

Optional Details

| Profile | Vehicle Details | Choose Parts | Shipping & Payment | Photos/Video |

| Choose File | | Upload |   Advanced Uploader
                                  Use Damage Designer Photo 1      Photo 2      Photo 3

Description of photo 1
Edit  Remove     Edit  Remove     Edit  Remove

| Next | Previous |

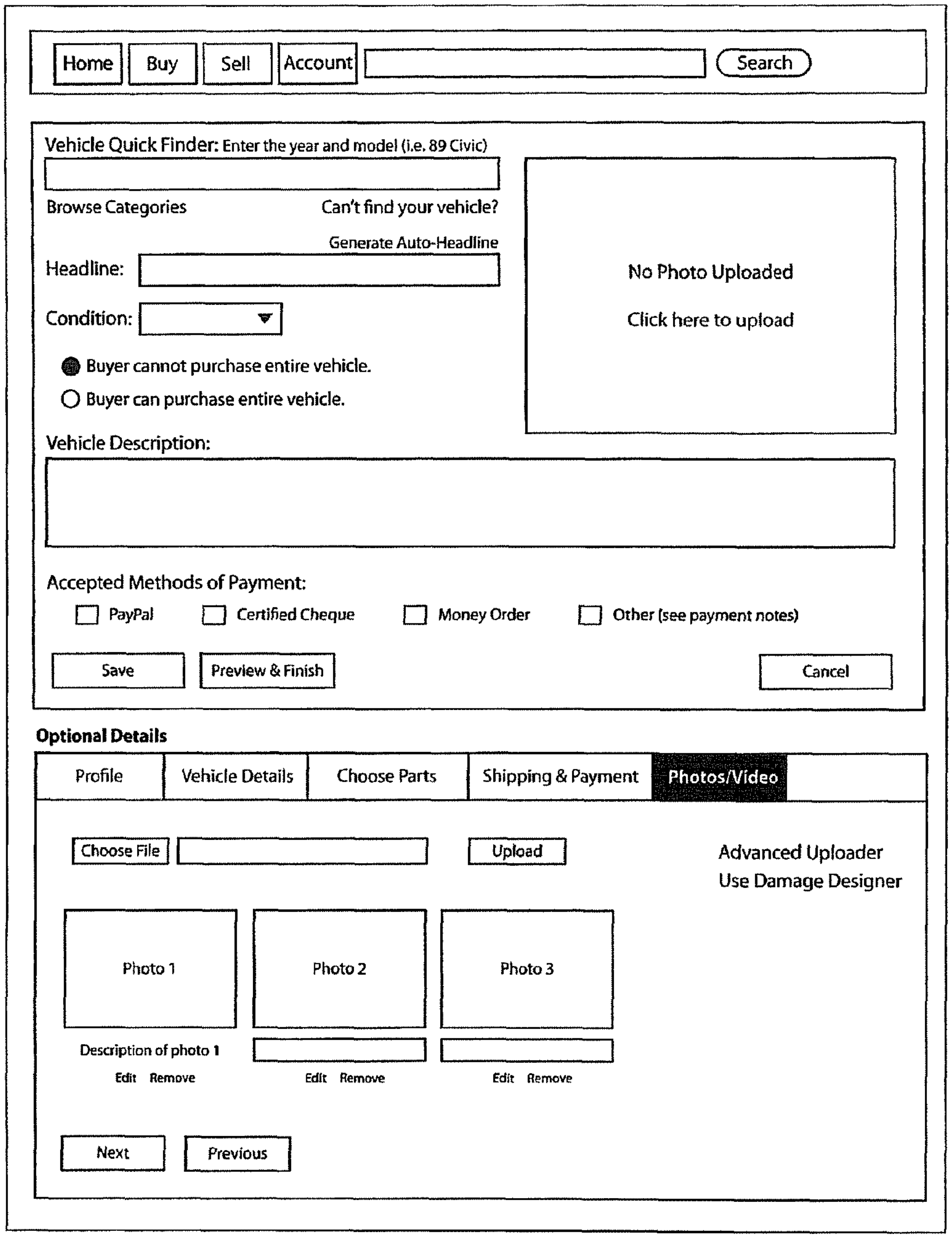

Figure 43

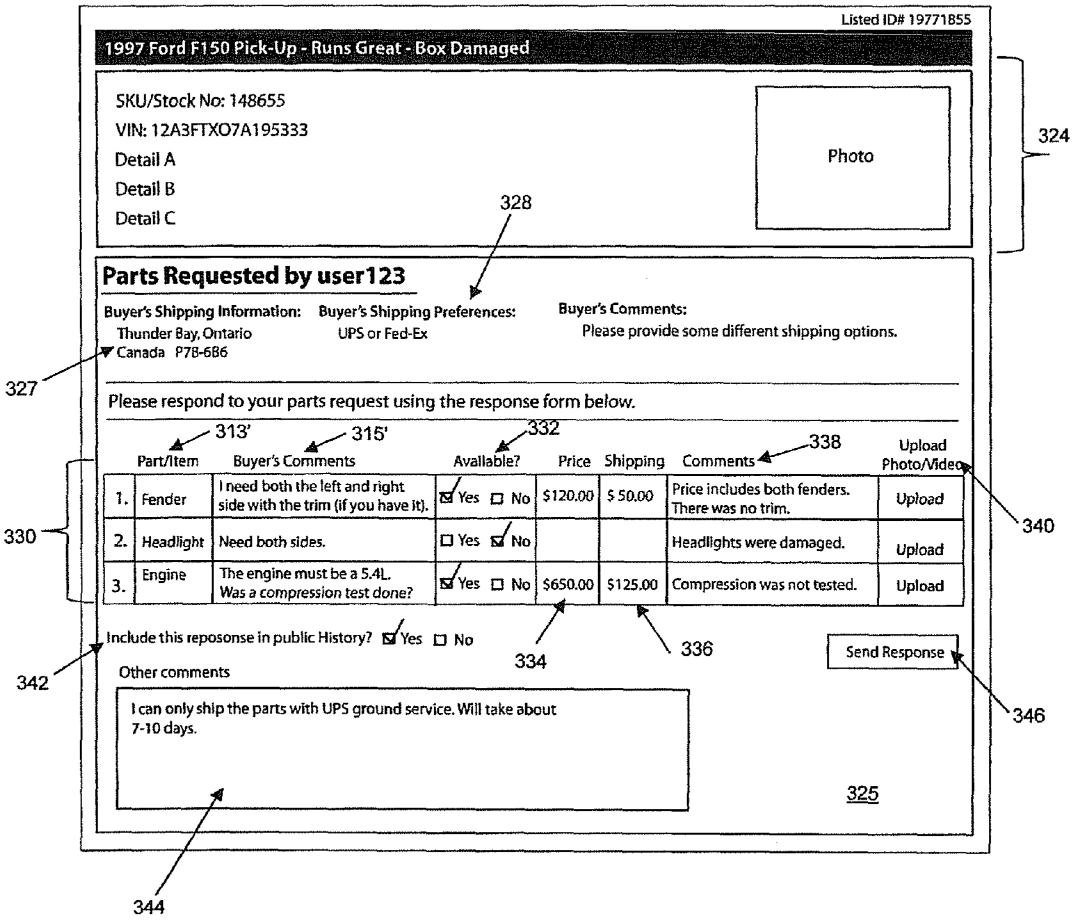

Figure 47

Listed ID# 19771855

1997 Ford F150 Pick-Up - Runs Great - Box Damaged

SKU/Stock No: 148655
VIN: 12A3FTXO7A195333
Detail A
Detail B
Detail C

Photo

Parts Requested by user123

Buyer's Shipping Information:   Buyer's Shipping Preferences:   Buyer's Comments:
Thunder Bay, Ontario                UPS or Fed-Ex                Please provide some different shipping options.
Canada  P7B-6B6

Please respond to your parts request using the response form below.

| Part/Item | Buyer's Comments | Available? | Price | Shipping | Comments | Upload Photo/Video |
|---|---|---|---|---|---|---|
| 1. Fender | I need both the left and right side with the trim (if you have it). | ☒ Yes ☐ No | $120.00 | $ 50.00 | Price includes both fenders. There was no trim. | Upload |
| 2. Headlight | Need both sides. | ☐ Yes ☒ No | | | Headlights were damaged. | Upload |
| 3. Engine | The engine must be a 5.4L. Was a compression test done? | ☒ Yes ☐ No | $650.00 | $125.00 | Compression was not tested. | Upload |

Include this reposnse in public History?  ☒ Yes ☐ No

Other comments

I can only ship the parts with UPS ground service. Will take about 7-10 days.

Send Response

325

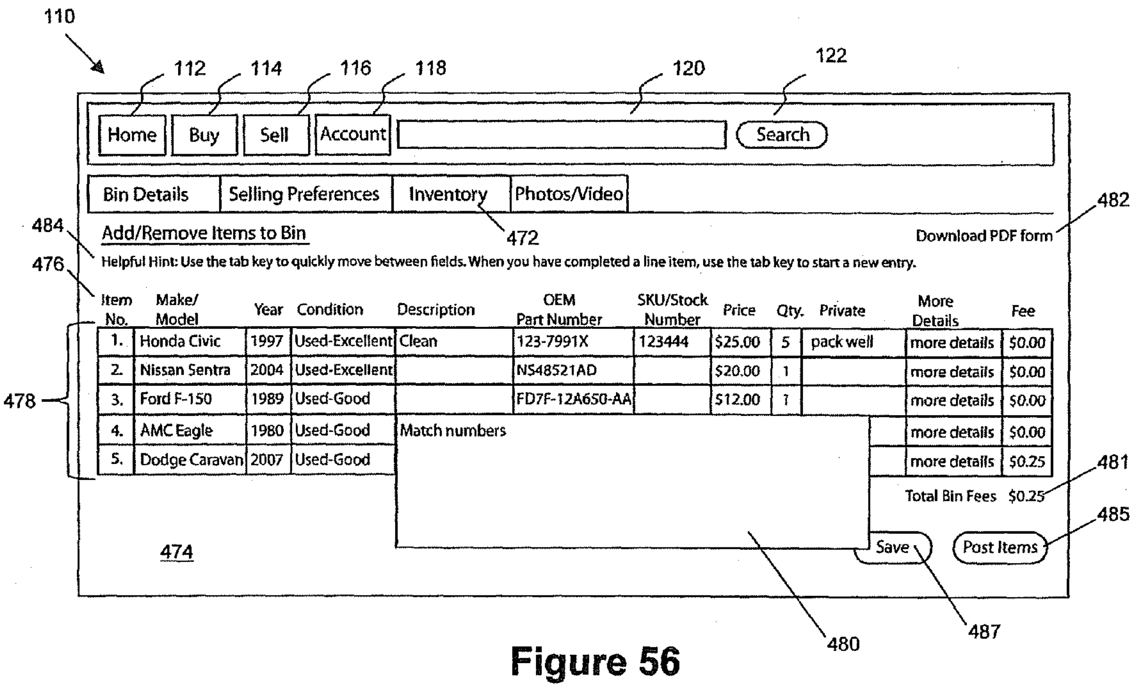

Figure 56

| Item No. | Make/ Model | Year | Condition | Description | OEM Part Number | SKU/Stock Number | Price | Qty. | Private | More Details | Fee |
|---|---|---|---|---|---|---|---|---|---|---|---|
| 1. | Honda Civic | 1997 | Used-Excellent | Clean | 123-7991X | 123444 | $25.00 | 5 | pack well | more details | $0.00 |
| 2. | Nissan Sentra | 2004 | Used-Excellent | | NS48521AD | | $20.00 | 1 | | more details | $0.00 |
| 3. | Ford F-150 | 1989 | Used-Good | | FD7F-12A650-AA | | $12.00 | 1 | | more details | $0.00 |
| 4. | AMC Eagle | 1980 | Used-Good | Match numbers | | | | | | more details | $0.00 |
| 5. | Dodge Caravan | 2007 | Used-Good | | | | | | | more details | $0.25 |

Total Bin Fees $0.25

Bin Details | Selling Preferences | Inventory | Photos/Video

Add/Remove Items to Bin

Helpful Hint: Use the tab key to quickly move between fields. When you have completed a line item, use the tab key to start a new entry.

Download PDF form

Home | Buy | Sell | Account | [ ] (Search)

Save | Post Items 110
112  114  116  118          120        122

| Home | Buy | Sell | Account |                    | Search |

What are you selling? (ie. air bags)
[          ]

Category: Browse Categories

Condition: [ ▼ ]

Headline: [          ]                 No Photo Uploaded

Price: [    ]                          Click here to upload

Quantity: [   ]  Type: [   ▼ ]

Description:
[                                    ]

Accepted Methods of Payment:
☐ PayPal   ☐ Certified Cheque   ☐ Money Order   ☐ Other (see payment notes)

ADD SHIPPING DETAILS

[ Save ]  [ Preview & Finish ]                              [ Cancel ]

Optional Details

| Item Details | Vehicle Details | Shipping & Payment | Photos |

Item Detail A: [          ]

Item Detail B: [     ] [     ] [     ] [     ] [     ]

Item Detail C: [     ] [     ] [     ]

Tag Your Item as a...
☐ Performance Part   ☐ Vintage Part   ☐ Racing Part   ☐ Classic Part   ☐ Custom Built Private Notes:
[                                    ]

[ Other Details, Options and Information ]

[ Next ]

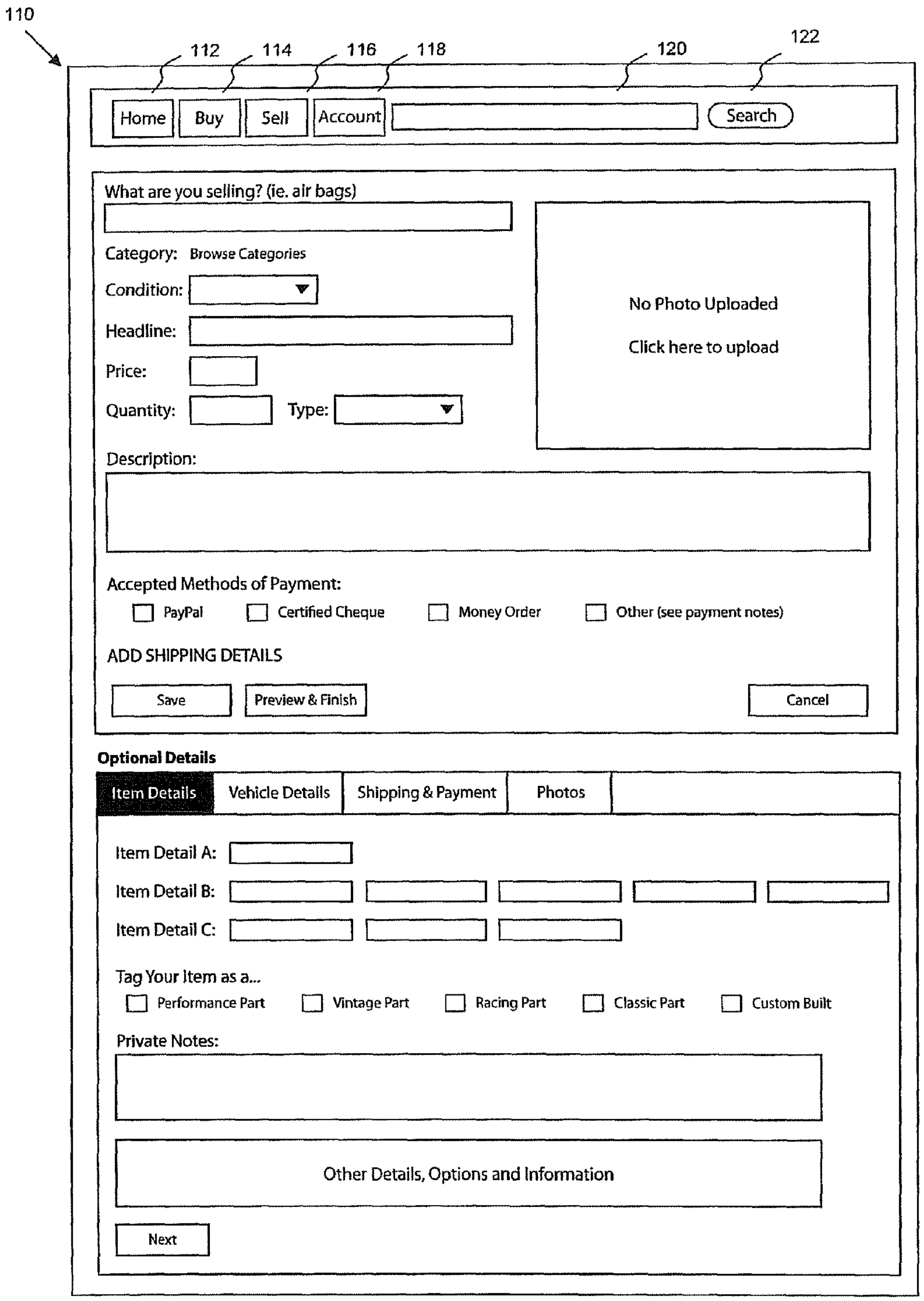

| Vehicle Field In Supplier Database (1 field) | Vehicle Fields In Seller Database (2 fields) | |
|---|---|---|
| Ford F-150 Pickup | Ford | F150 Series Pickup Truck |

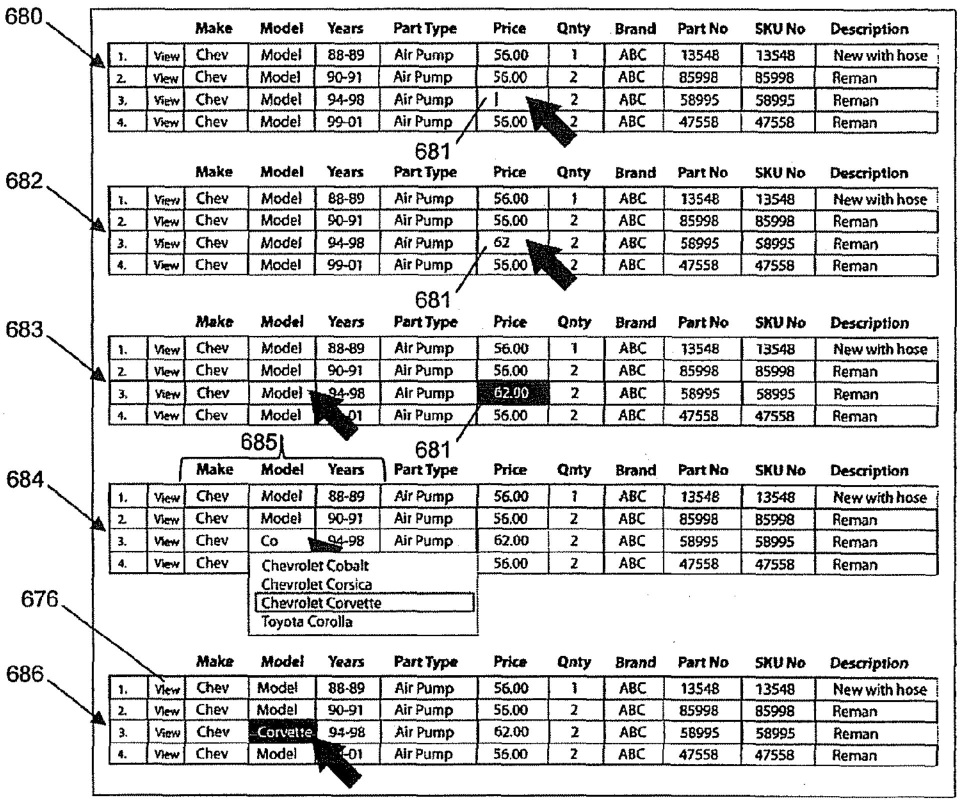

| | | Make | Model | Years | Part Type | Price | Qnty | Brand | Part No | SKU No | Description |
|---|---|---|---|---|---|---|---|---|---|---|---|
| 1. | View | Chev | Model | 88-89 | Air Pump | 56.00 | 1 | ABC | 13548 | 13548 | New with hose |
| 2. | View | Chev | Model | 90-91 | Air Pump | 56.00 | 2 | ABC | 85998 | 85998 | Reman |
| 3. | View | Chev | Model | 94-98 | Air Pump | | 2 | ABC | 58995 | 58995 | Reman |
| 4. | View | Chev | Model | 99-01 | Air Pump | 56.00 | 2 | ABC | 47558 | 47558 | Reman |

681

682

| | | Make | Model | Years | Part Type | Price | Qnty | Brand | Part No | SKU No | Description |
|---|---|---|---|---|---|---|---|---|---|---|---|
| 1. | View | Chev | Model | 88-89 | Air Pump | 56.00 | 1 | ABC | 13548 | 13548 | New with hose |
| 2. | View | Chev | Model | 90-91 | Air Pump | 56.00 | 2 | ABC | 85998 | 85998 | Reman |
| 3. | View | Chev | Model | 94-98 | Air Pump | 62 | 2 | ABC | 58995 | 58995 | Reman |
| 4. | View | Chev | Model | 99-01 | Air Pump | 56.00 | 2 | ABC | 47558 | 47558 | Reman |

681

683

| | | Make | Model | Years | Part Type | Price | Qnty | Brand | Part No | SKU No | Description |
|---|---|---|---|---|---|---|---|---|---|---|---|
| 1. | View | Chev | Model | 88-89 | Air Pump | 56.00 | 1 | ABC | 13548 | 13548 | New with hose |
| 2. | View | Chev | Model | 90-91 | Air Pump | 56.00 | 2 | ABC | 85998 | 85998 | Reman |
| 3. | View | Chev | Model | 94-98 | Air Pump | 62.00 | 2 | ABC | 58995 | 58995 | Reman |
| 4. | View | Chev | Model | 01 | Air Pump | 56.00 | 2 | ABC | 47558 | 47558 | Reman |

685  681

684

| | | Make | Model | Years | Part Type | Price | Qnty | Brand | Part No | SKU No | Description |
|---|---|---|---|---|---|---|---|---|---|---|---|
| 1. | View | Chev | Model | 88-89 | Air Pump | 56.00 | 1 | ABC | 13548 | 13548 | New with hose |
| 2. | View | Chev | Model | 90-91 | Air Pump | 56.00 | 2 | ABC | 85998 | 85998 | Reman |
| 3. | View | Chev | Co | 94-98 | Air Pump | 62.00 | 2 | ABC | 58995 | 58995 | Reman |
| 4. | View | Chev | | | | 56.00 | 2 | ABC | 47558 | 47558 | Reman |

Chevrolet Cobalt
Chevrolet Corsica
Chevrolet Corvette
Toyota Corolla

676

686

| | | Make | Model | Years | Part Type | Price | Qnty | Brand | Part No | SKU No | Description |
|---|---|---|---|---|---|---|---|---|---|---|---|
| 1. | View | Chev | Model | 88-89 | Air Pump | 56.00 | 1 | ABC | 13548 | 13548 | New with hose |
| 2. | View | Chev | Model | 90-91 | Air Pump | 56.00 | 2 | ABC | 85998 | 85998 | Reman |
| 3. | View | Chev | Corvette | 94-98 | Air Pump | 62.00 | 2 | ABC | 58995 | 58995 | Reman |
| 4. | View | Chev | Model | 01 | Air Pump | 56.00 | 2 | ABC | 47558 | 47558 | Reman |

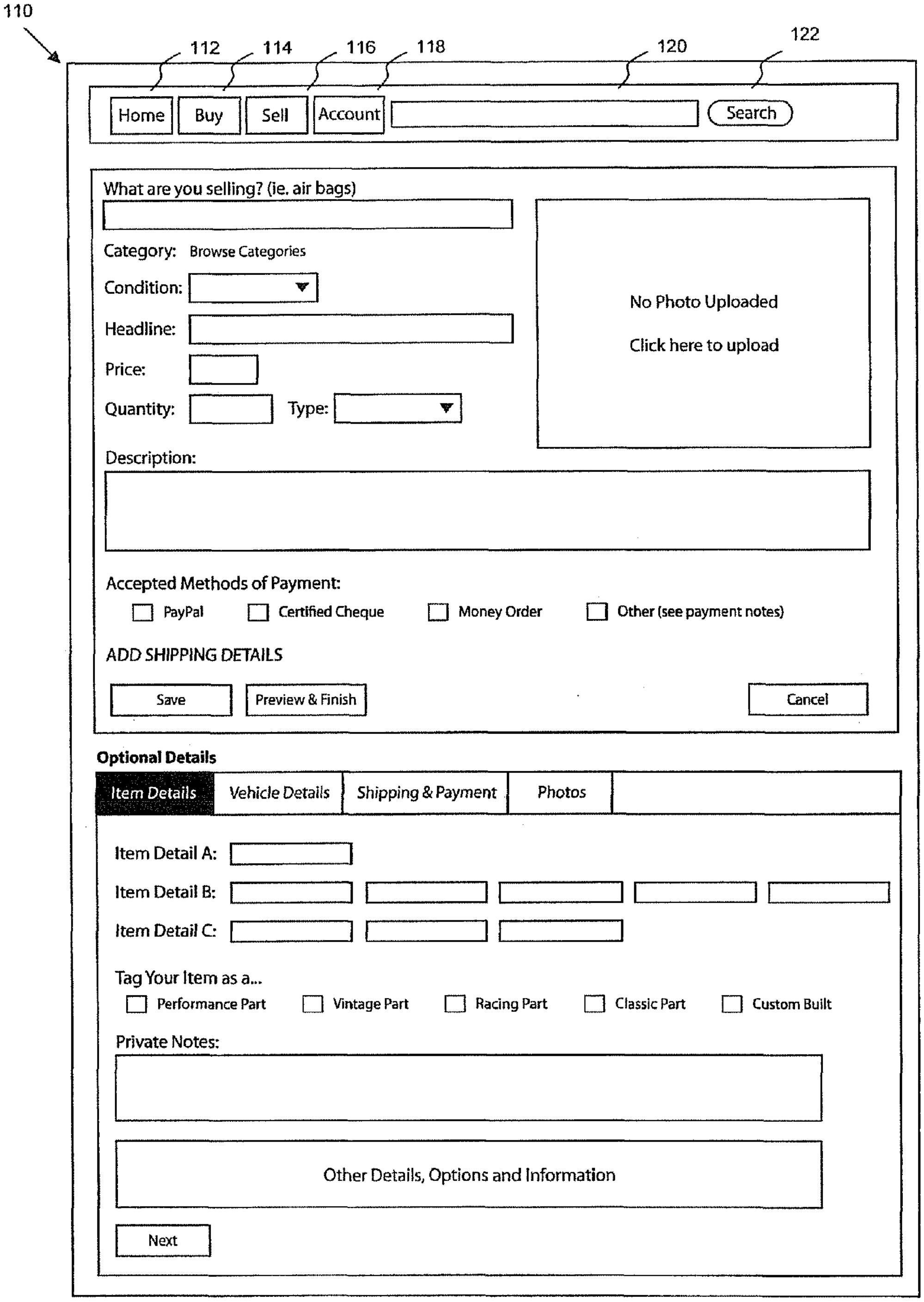

| Home | Buy | Sell | Account | [                    ] | Search |

What are you selling? (ie. air bags)
[                              ]

Category: Browse Categories

Condition: [   ▼   ]

Headline: [                    ]

Price: [    ]

Quantity: [    ]  Type: [   ▼   ]

No Photo Uploaded

Click here to upload

Description:
[                                                      ]

Accepted Methods of Payment:
☐ PayPal  ☐ Certified Cheque  ☐ Money Order  ☐ Other (see payment notes)

ADD SHIPPING DETAILS

[ Save ]  [ Preview & Finish ]                                    [ Cancel ]

Optional Details

| Item Details | Vehicle Details | Shipping & Payment | Photos |

Item Detail A: [        ]

Item Detail B: [    ] [    ] [    ] [    ] [    ]

Item Detail C: [    ] [    ] [    ]

Tag Your Item as a...
☐ Performance Part  ☐ Vintage Part  ☐ Racing Part  ☐ Classic Part  ☐ Custom Built Private Notes:
[                                                      ]

[ Other Details, Options and Information ]

[ Next ]

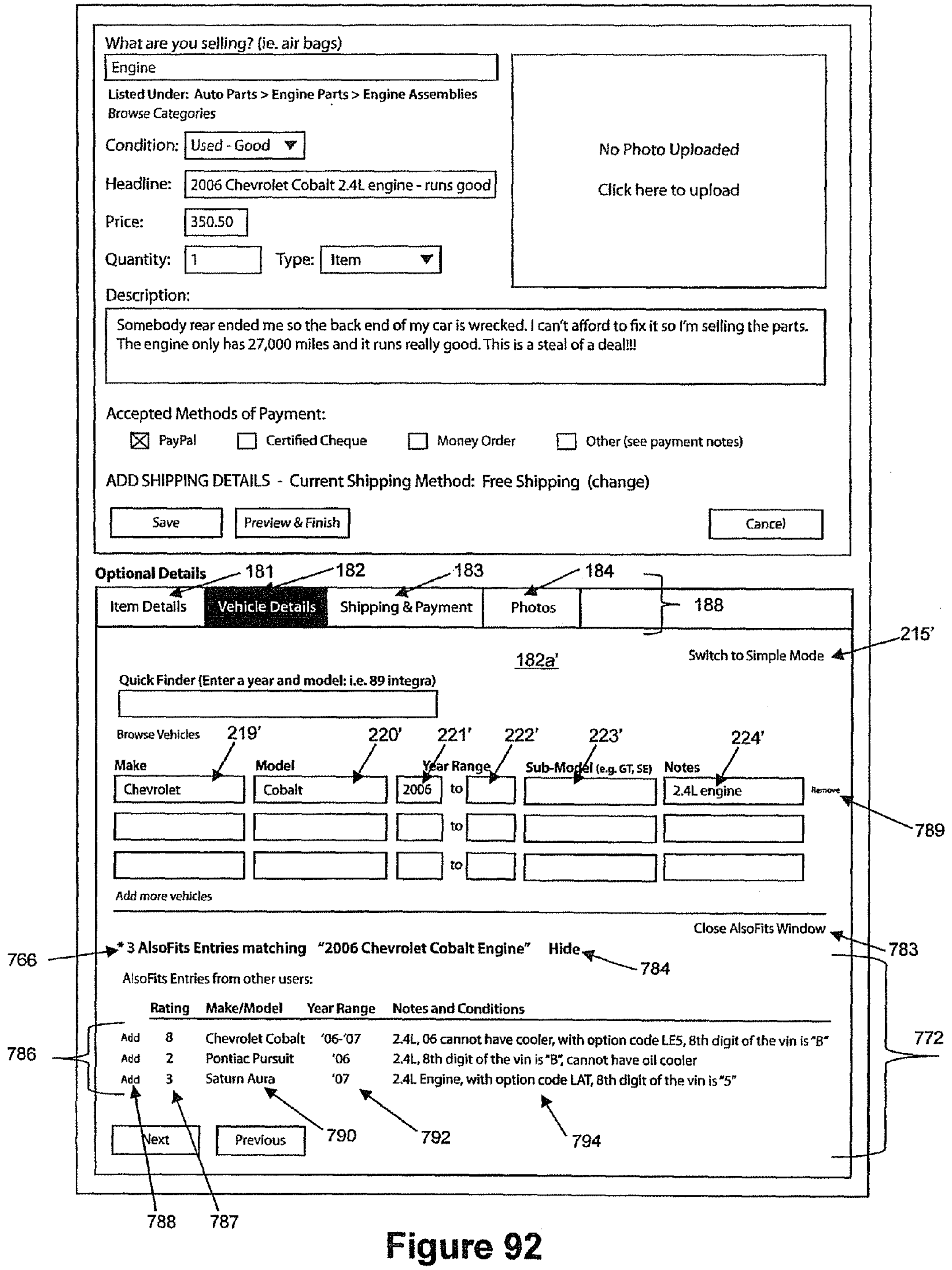

Figure 92

| | | | | | | |
|---|---|---|---|---|---|---|
| What are you selling? (ie. air bags) | | | | | | |
| Engine | | | | | | |

Listed Under: Auto Parts > Engine Parts > Engine Assemblies
Browse Categories

Condition: Used - Good ▼

No Photo Uploaded

Headline: 2006 Chevrolet Cobalt 2.4L engine - runs good

Click here to upload

Price: 350.50

Quantity: 1    Type: Item ▼

Description:

Somebody rear ended me so the back end of my car is wrecked. I can't afford to fix it so I'm selling the parts. The engine only has 27,000 miles and it runs really good. This is a steal of a deal!!!

Accepted Methods of Payment:
☒ PayPal   ☐ Certified Cheque   ☐ Money Order   ☐ Other (see payment notes)

ADD SHIPPING DETAILS - Current Shipping Method: Free Shipping (change)

[Save]   [Preview & Finish]                                              [Cancel]

Optional Details — 181 — 182 — 183 — 184

| Item Details | Vehicle Details | Shipping & Payment | Photos | — 188 |

182a'
                                                                Switch to Simple Mode ◀— 215'

Quick Finder (Enter a year and model: i.e. 89 integra)

Browse Vehicles   219'      220'      221'    222'      223'           224'
Make              Model     Year Range  Sub-Model (e.g. GT, SE)  Notes

| Chevrolet | Cobalt | 2006 | to | | 2.4L engine | Remove |
| | | | to | | | |
| | | | to | | | |

Add more vehicles
                                                        Close AlsoFits Window ◀— 783

*3 AlsoFits Entries matching  "2006 Chevrolet Cobalt Engine"  Hide ◀— 784

AlsoFits Entries from other users:

| | Rating | Make/Model | Year Range | Notes and Conditions |
|---|---|---|---|---|
| Add | 8 | Chevrolet Cobalt | '06-'07 | 2.4L, 06 cannot have cooler, with option code LE5, 8th digit of the vin is "B" |
| Add | 2 | Pontiac Pursuit | '06 | 2.4L, 8th digit of the vin is "B", cannot have oil cooler |
| Add | 3 | Saturn Aura | '07 | 2.4L Engine, with option code LAT, 8th digit of the vin is "5" |

[Next]  [Previous]   790   792   794

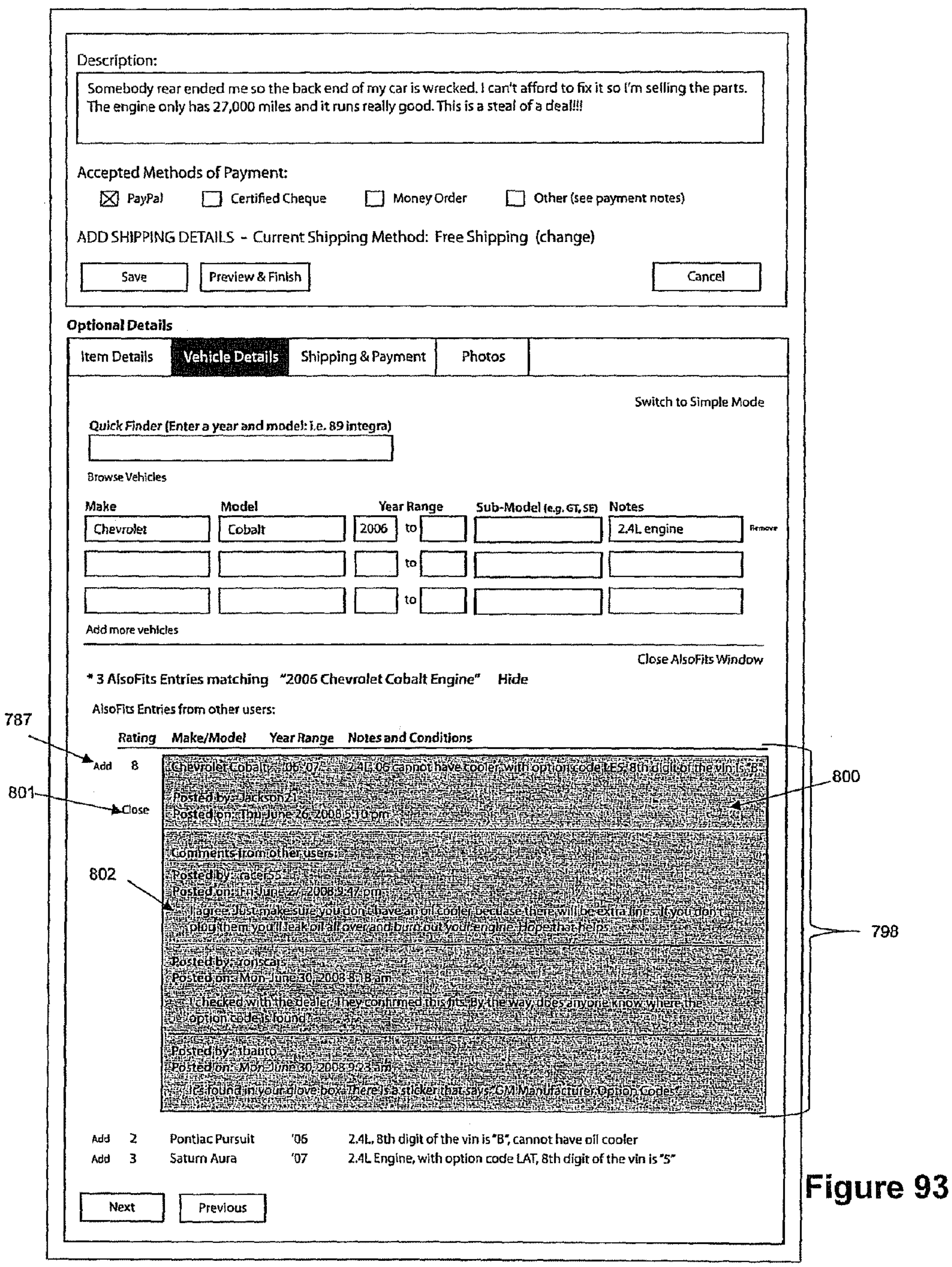

Figure 93

Description:

Somebody rear ended me so the back end of my car is wrecked. I can't afford to fix it so I'm selling the parts. The engine only has 27,000 miles and it runs really good. This is a steal of a deal!!!

Accepted Methods of Payment:
☒ PayPal  ☐ Certified Cheque  ☐ Money Order  ☐ Other (see payment notes)

ADD SHIPPING DETAILS - Current Shipping Method: Free Shipping (change)

[ Save ]  [ Preview & Finish ]                                    [ Cancel ]

Optional Details

| Item Details | Vehicle Details | Shipping & Payment | Photos |

Switch to Simple Mode

Quick Finder (Enter a year and model: i.e. 89 integra)
[                    ]

Browse Vehicles

| Make | Model | Year Range | Sub-Model (e.g. GT, SE) | Notes |
|---|---|---|---|---|
| Chevrolet | Cobalt | 2006 to | | 2.4L engine  Remove |
| | | to | | |
| | | to | | |

Add more vehicles

Close AlsoFits Window

* 3 AlsoFits Entries matching "2006 Chevrolet Cobalt Engine"  Hide

AlsoFits Entries from other users:

Rating  Make/Model  Year Range  Notes and Conditions

Add  8  [Chevrolet Cobalt '06-'07  2.4L 06 cannot have cooler, with option code LES, 8th digit of the vin is "B"
         Posted by: jackson21
         Posted on: Thu June 26, 2008 5:10 pm]

Close

Comments from other users:
Posted by: racer55
Posted on: Fri June 27, 2008 9:17 pm
I agree. Just make sure you don't have an oil cooler, because there will be extra lines. If you don't plug them you'll leak oil all over and burn out your engine. Hope that helps.

Posted by: ronscars
Posted on: Mon June 30, 2008 8:18 am
I checked with the dealer. They confirmed this fits. By the way, does anyone know where the option code is found?

Posted by: jbauto
Posted on: Mon June 30, 2008 9:45 am
It's found in your glove box. There is a sticker that says "GM Manufacture Option Code"

Add  2  Pontiac Pursuit  '06  2.4L, 8th digit of the vin is "B", cannot have oil cooler
Add  3  Saturn Aura      '07  2.4L Engine, with option code LAT, 8th digit of the vin is "S"

[ Next ]  [ Previous ]

Example for a Door Mirror

Which side is this? — 806
- [ ] Left (Driver Side)
- [ ] Right (Passenger Side)
- [ ] I am selling both left and right together

Does your mirror have any of the following options? — 806
- [ ] Power Mirror
- [ ] Cable Controlled Mirror
- [ ] Manual Mirror
- [ ] Heated Glass
- [ ] With Memory Feature
- [ ] With Signal Flash
- [ ] With Auto-Dim
- [ ] Fixed
- [ ] Folding
- [ ] Swing Out
- [ ] Door Mounted
- [ ] Pillar Mounted

808

804

Choose a colour that best matches your item. — 806

810
```
Black
White
Grey
Red
Burgandy/Maroon
Pink
Orange
Brown
Gold
Tan
Light Yellow
Yellow
Green-Light
Green-Dark
Blue
Blue-Dark
Turquoise
Purple
Cream/Ivory
```

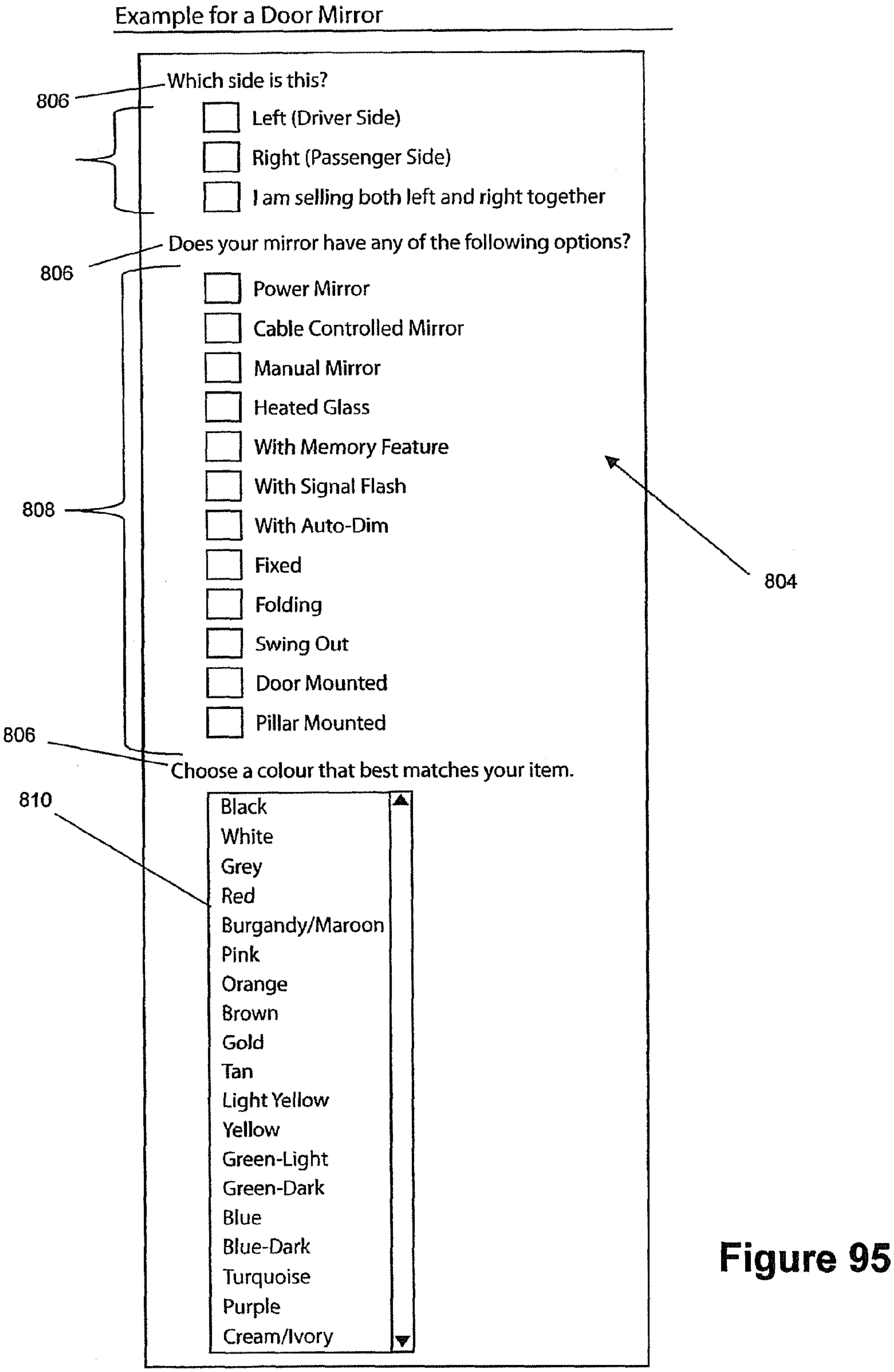

Figure 95

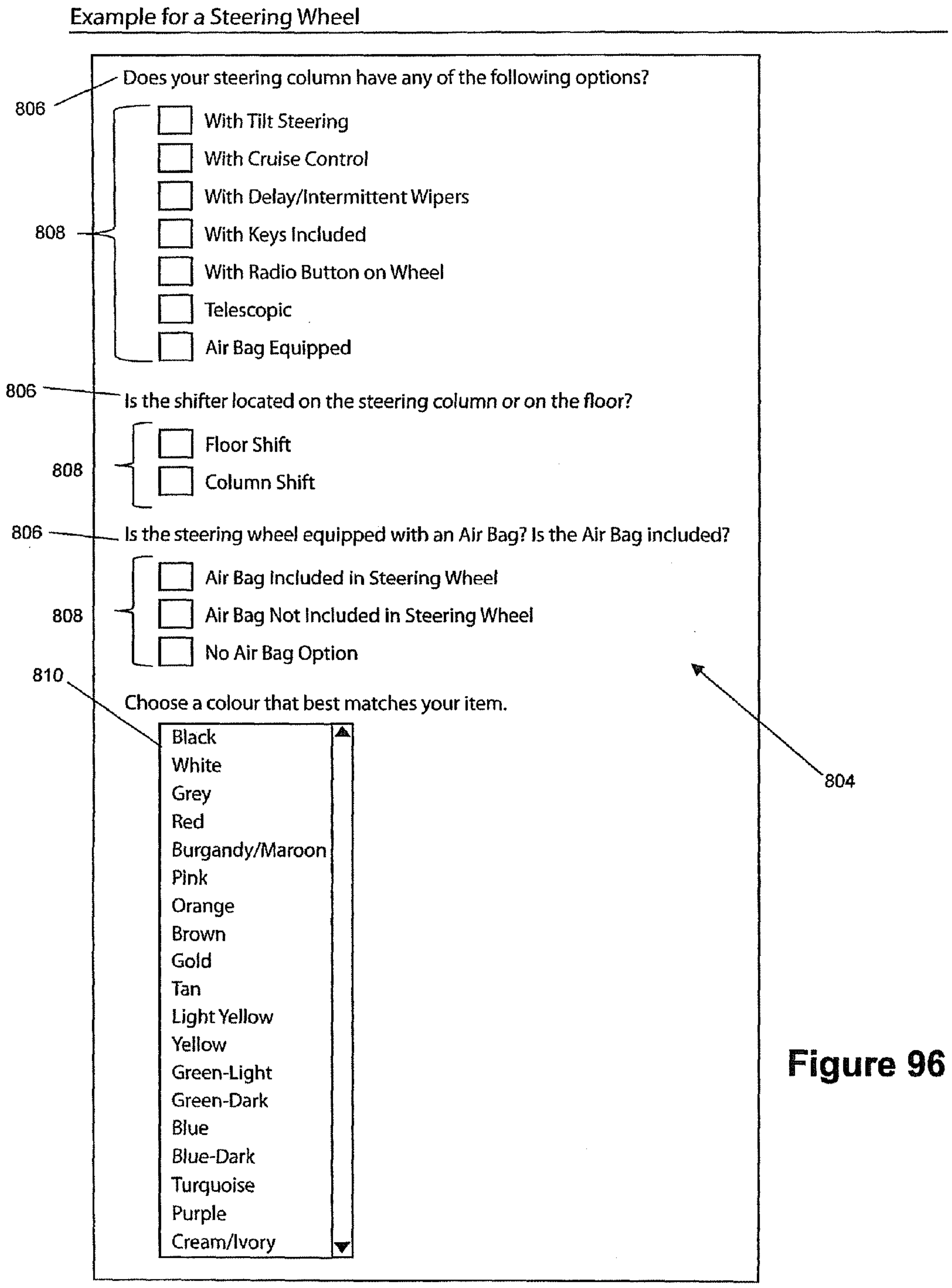

Figure 96

Example for a Steering Wheel

806 — Does your steering column have any of the following options?

808 —
- [ ] With Tilt Steering
- [ ] With Cruise Control
- [ ] With Delay/Intermittent Wipers
- [ ] With Keys Included
- [ ] With Radio Button on Wheel
- [ ] Telescopic
- [ ] Air Bag Equipped 806 — Is the shifter located on the steering column or on the floor?

808 —
- [ ] Floor Shift
- [ ] Column Shift

806 — Is the steering wheel equipped with an Air Bag? Is the Air Bag included?

808 —
- [ ] Air Bag Included in Steering Wheel
- [ ] Air Bag Not Included in Steering Wheel
- [ ] No Air Bag Option 810 — Choose a colour that best matches your item.

Black
    White
    Grey
    Red
    Burgandy/Maroon
    Pink
    Orange
    Brown
    Gold
    Tan
    Light Yellow
    Yellow
    Green-Light
    Green-Dark
    Blue
    Blue-Dark
    Turquoise
    Purple
    Cream/Ivory

804

SYSTEM AND METHOD FOR LISTING ITEMS ONLINE

This application is a continuation of PCT Application No. PCT/CA2009/000740 filed Jun. 2, 2009 and claims priority from U.S. provisional application No. 61/058,475 filed Jun. 3, 2008, and U.S. provisional application No. 61/101,029 filed Sep. 29, 2008, all of which are hereby incorporated by reference.

FIELD OF THE INVENTION

The invention relates to listing items online.

BACKGROUND

Various websites and other programs or applications allow users to "post" or "list" items. Such items may be listed or posted for sale or simply to provide information and/or details of the items depending on the application or the website. Many existing tools provided by posting or listing items utilize multiple steps in multiple pages while information and data is being gathered, which can be a time consuming process. Users are typically also required to categorize the items being posted based on a category that best matches what it is they are posting. This may or may not be an accurate description of the actual item. For example, when selling a specific auto part such as a starter brush, a suitable category may not appear. Instead, a list of suggested categories may appear, which requires further effort and time from the user.

It is therefore an object of the following to obviate or mitigate the above-mentioned disadvantages.

SUMMARY

In one aspect, there is provided a method for listing an item online, the method comprising providing a user interface comprising a first pane for entering information pertaining to the item; providing in the user interface, an upload tool for enabling one or more multimedia objects related to the item to be uploaded to facilitate the entering information pertaining to the item; and upon entering one or more characters in a field in the first pane identifying the item, searching a database of item identifiers being either parts or components and displaying organized lists of possible choices for the item in the first pane to enable selection of the information.

In another aspect, there is provided a method for listing a multi-item online, the multi-item comprising a plurality of constituent items, the method comprising providing a first user interface for entering information identifying the multi-item; providing a second user interface for selecting the plurality of constituent items from respective lists for one or more categories displayed in the second user interface; associating the constituent items with the multi-item and storing an indication of the association in a database; and enabling a request for one or more of the constituent items to be received from a third user interface to enable the constituent items to be sold independent of the multi-item as a whole.

In yet another aspect, there is provided a method for listing items online, the method comprising providing an intermediary comprising communication interfaces for sellers posting the items, for buyers viewing the items, and for suppliers providing the items through the sellers; enabling a catalogue of items from one or more suppliers to be provided to the intermediary; associating the catalogue with at least one of the sellers; maintaining an inventory list for the catalogue of items; enabling the buyers to view the catalogue and communicate with the sellers to purchase one or more selected items; and enabling a Corresponding seller to communicate with a corresponding supplier for completing the purchase.

In yet another aspect, there is provided a method for categorizing items listed online, the method comprising obtaining a first categorization database for the items, the first categorization database comprising an industry standard set of terminology; obtaining a second categorization database generated by an intermediary responsible for listing the items; amalgamating the first and second databases and applying predefined descriptors to the amalgamation to provide a consistent naming convention; organizing the descriptors in a tiered structure comprising a main category in a first tier and at least one additional tier further describing the main category; storing the amalgamation in a main categorization database; and making the main categorization database available to the intermediary for enabling searching of the items and posting of new items.

In yet another aspect, there is provided a method for listing a plurality of items online, the method comprising providing a first user interface for generating a storefront for listing the plurality of items; providing a second user interface for entering information pertaining to each the plurality of items; associating the plurality of items with the storefront; and providing a third user interface to enable the plurality of items to be viewed through the storefront by categorizing and displaying the plurality of items in the third user interface.

In yet another aspect, there is provided a method for organizing items to be listed online, the method comprising providing a first user interface for generating a bin representing a plurality of items; enabling entry of information pertaining to the bin for identifying the plurality of items; providing a second user interface for adding or removing the plurality of items to the bin; associating the plurality of items with the bin; providing a third user interface displaying the bin and the information pertaining to the bin; and enabling the plurality of items to be associated with the bin upon searching for the plurality of items or through selection of the bin from the third user interface.

In yet another aspect, there is provided a method for listing an item online, the method comprising providing a first user interface for entering information pertaining to the item, the item being associated with a first product comprising a plurality of items; in the first user interface, enabling the item to be associated with one or more other products with which the item is compatible; associating the one or more other products with the item; and storing the association to enable additional ones of the item to be listed identifying the association for facilitating a search for the item.

In yet another aspect, there is provided a method for listing an item online, the method comprising storing a database of queried information associated with the item; providing a first user interface for listing the item and entering information pertaining to the item; upon initiating the listing, providing one or more of the queried information and enabling selection of a reply to further describe the item; and enabling the one or more queried information to be used in searching for the item to filter results of a search.

In yet another aspect, there is provided a method for enabling searching of items listed online, the method comprising providing a database of a plurality of items, each item comprising information associated therewith which has been entered upon listing the item; providing a first user interface for entering one or more identifiers to search for a desired item; upon detecting entry of the one or more identifiers, searching a database of item identifiers being either parts or components and displaying organized lists of possible choices for the item to enable identification of the item; and upon detecting selection of at least one of the choices, searching a database of items listed and displaying matched items for the choices.

In yet another aspect, there is provided one or more computer readable media comprising computer executable instructions for performing any one or more of the above-described methods.

BRIEF DESCRIPTION OF THE DRAWINGS

Embodiments will now be described by way of example only with reference to the appended drawings wherein:

FIG. 5A shows an example set of results generated by the auto-fill tool shown in FIG. 2.

FIG. 5B shows another example set of results generated by the auto-fill tool shown in FIG. 2 illustrating the auto-complete feature.

FIG. 5C shows another example set of results generated by the auto-fill tool shown in FIG. 2.

FIG. 11B is a screen shot of a selling preferences entry page for Non-Canadian and Non-US sellers.

FIGS. 24 through 30 are screen shots of the multi-item listing pages, accessed by selecting the List a Multi-Item option in FIG. 12, for the Profile tab during the creation of an exemplary posting.

FIGS. 31 through 34 are screen shots of the multi-item listing pages for the Vehicle Details tab during the creation of an exemplary posting.

FIGS. 36 to 40 are screen shots of the multi-item listing page during the selection of parts for a vehicle in the exemplary posting shown in FIGS. 24 to 34.

FIG. 41 is a screen shot of the multi-item listing page during entry of custom parts for the exemplary posting of FIGS. 24 to 34.

FIG. 42 is a screen shot of the multi-item listing page for the Shipping & Payment tab during the creation of an exemplary posting.

FIG. 43 is a screen shot of the multi-item listing page for the Photos tab during the creation of an exemplary posting.

FIG. 47 is a screen shot of a seller's response form generated upon submission of a buyer's request faun to the seller for the multi-item listing.

FIG. 56 is a screen shot of an item entry page for adding inventory to a bin.

FIG. 57 is a screen shot of a detailed listing of an item from a bin selected by the seller while adding inventory to a bin.

FIGS. 82 to 85 are a screen shots showing an inventory catalogue listing all of a supplier's inventory items illustrating how a supplier can edit the details of their item's inventory listing.

FIGS. 91 through 94 are screen shots showing a single item listing page during the creation of an exemplary posting using the AlsoFits tool.

FIG. 95 and FIG. 96 are screen shots showing example questions that may be shown to a seller during the creation of exemplary postings.

DETAILED DESCRIPTION OF THE DRAWINGS

Figure 1:
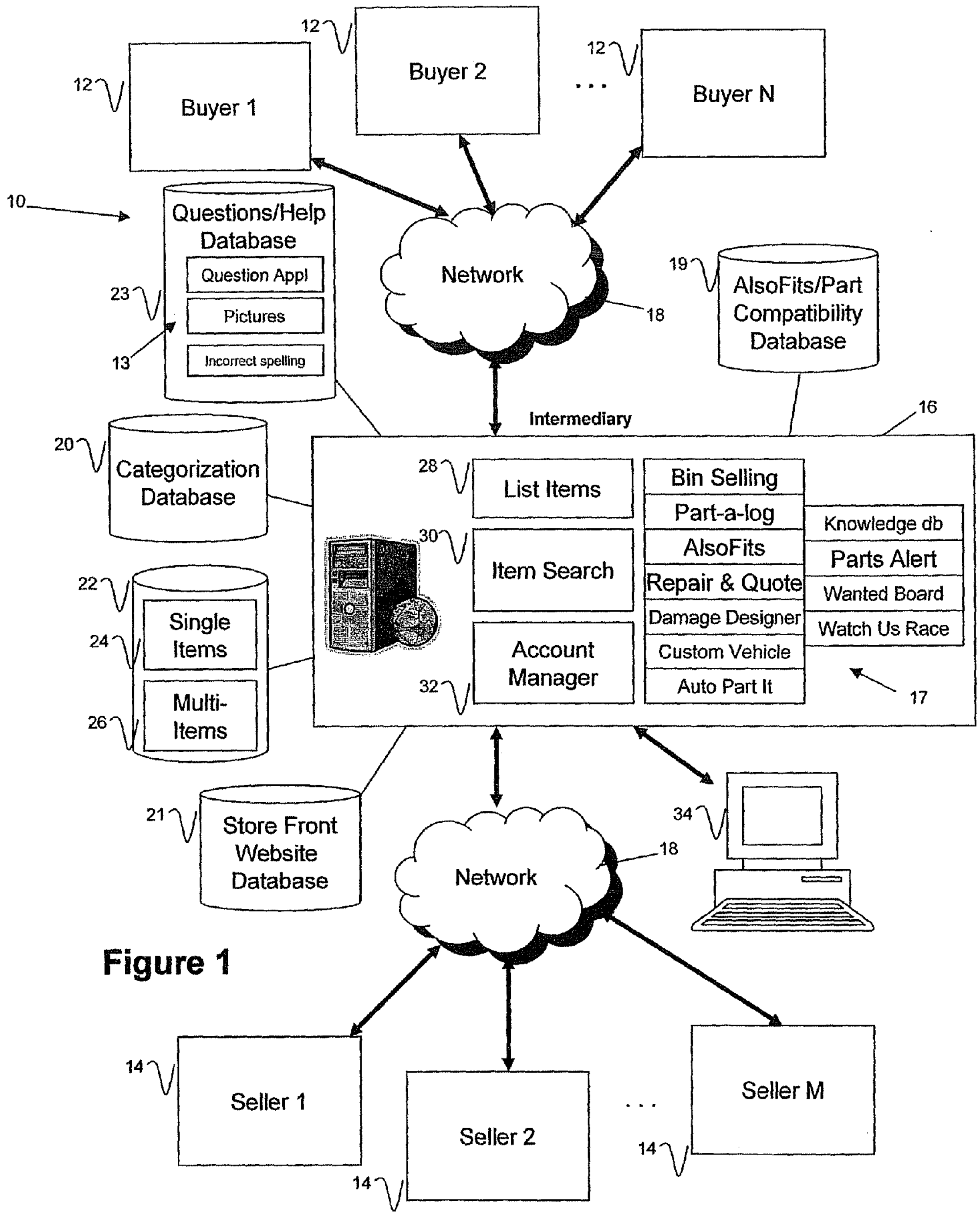
FIG. 1 is a block diagram illustrating one example of a configuration for a system used to post items to be viewed through a network.

Turning now to the drawings, and in particular FIG. 1, a system for posting or listing an item and for searching and viewing already posted or listed items is generally denoted by numeral 10 and with hereinafter be referred to as the system 10. The system 10 is configured to enable one or more buyers 12 to search, view and purchase listed items that have been posted or listed by one or more sellers 14 through an intermediary 16. The intermediary 16 may comprise a server machine or any other hardware or software required to host a listing service, in this example a website provided through the Internet. The buyers 12 and sellers 14 can access the intermediary 16 through an appropriate network 18, which in the following examples will be the Internet. However, it will be appreciated that the network 18 may be any other suitable network such as a local network or other closed system.

The intermediary 16 has access to or comprises a categorization database 20, which includes data pertaining to the way in which an item is categorized, classified, named, organized etc. as will be explained in greater detail below. The intermediary 16 also has access to or comprises a data storage device or memory hereinafter referred to as the items database 22, which stores the items that are listed. In this example, the items database 22 stores single items 24 and multi-items 26, wherein multi-items 26 are items which may themselves comprise multiple parts or components that could be individually posted as single items 24 but are more conveniently posted as a multi-item 26. For example, when selling auto parts, an entire car may be posted as a multi-item 26 with all its parts so that sellers 14 can simply browse through the parts associated with the particular vehicle and list them all at once without having to manually list them one by one. Buyers 12 can also make requests for parts through the system 10 using the request form 310, shown in FIG. 46, and the request/response page 325, shown in FIG. 47, as later described herein. The items database 22 shown in FIG. 1 is for illustrative purposes only and may also store other items such as but not limited to bin and catalogue items.

Single item listings 24 allow sellers 14 to create both single item listings and multiple quantity listings (for identical or similar items). With a single item listing, when a buyer 12 opts to buy that "item", they are effectively purchasing every item included in that listing. For example, if selling auto parts, a seller 14 may list 4 rims with a price of $50. When the buyer 12 opts to buy this "item" they are in fact buying 4 rims for $50. In contrast, a multiple quantity listing (described later) allows the seller to list 4 rims at $50 each separately, so the buyer 12 would need to select how many of the 4 rims they are buying and if buying all 4, the total price would be $200 ($50×4).

The intermediary 16 also comprises a list items tool set 28, which is a set of computer readable instructions that are used by a website or other program hosted by the intermediary 16 to enable a seller 14 to list items; an item search tool 30, which is a set of computer readable instructions that are used by the website or other program hosted by the intermediary to enable a buyer 12 (or potential buyer 12) to search for, browse or otherwise find a single item 24 or multi-item 26 stored in the items database 22 and purchase it; and an account manager 32, which is any software tool, module or program or group or suite of software programs or tools that can be accessed by an administrator 34 for updating the databases 20, 22 and for general maintenance and administration of the system 10. For example, the account manager 32 may be used to manage accounts for buyers 12 and sellers 14 and also advertisers (not shown) and other partners or entities. Other features 17 accessible to and/or used by the intermediary 16 are shown in FIG. 1, details of which are explained in the sections below.

The intermediary 16 also has access to or comprises a data storage device or memory hereinafter referred to as the questions/help database 23, which stores details to facilitate a user posting an item, as described later herein. The database 23 includes various question/help tools 13, details of which are explained later. The intermediary 16 also has access to or comprises a data storage device or memory hereinafter referred to as the AlsoFits database 19, which stores information and data pertaining to the fitment and compatibility of items listed on the system 10. For example, a seller 14 lists a "fender" and specifies that it will fit a "1994-1997 Ford F-150, F-250 and F-350 truck". The AlsoFits database 19 stores this information so that the next time a seller 14 lists a fender that fits that description, the system 10 can suggest this compatibility information and allow that seller 14 to include it in their listing to make it easier for buyers 12 to find their item. This is described in more detail later herein. The intermediary 16 also has access to or comprises a data storage device or memory hereinafter referred to as the store front website database 21, which stores information and data pertaining to individual web domains and item catalogues for various sellers 14. In the examples provided below, the web domains are used to provide a "store front" within the intermediary 16 for the seller 14 to allow them to make their existing store or new store accessible to buyers 12 and to enable the seller 14 to link an existing web site to the system 10, e.g. through the network 18. For example, a seller 14 with an existing website could essentially take their website and "plug it into" the intermediary 16 creating a virtual extension of their existing website and inventory.

Figure 2:
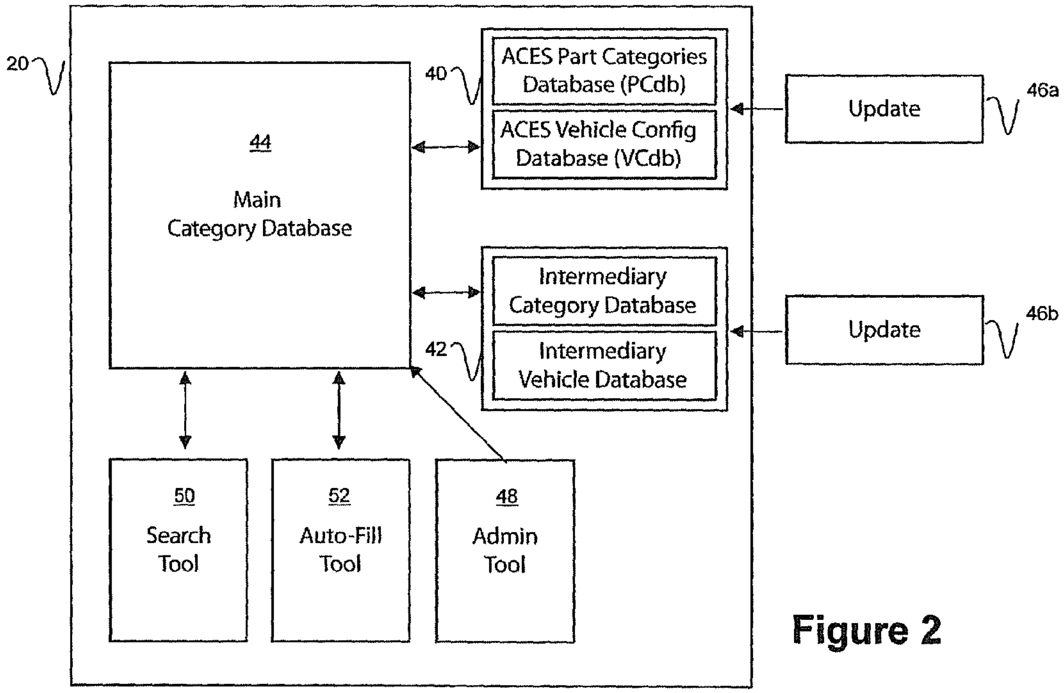
FIG. 2 is a block diagram illustrating further detail of the categorization database shown in FIG. 1.

Turning now to FIG. 2, further detail of the categorization database 20 is shown. It may be noted that the categorization database 20 and the structure therein is shown conceptually and it will be appreciated that the database 20 may be configured in any format to suit the particular application of the system 10. Moreover, the tools shown therein are also conceptual modules that represent computer executable instructions for utilizing the contents of the categorization database 20 and may or may not run on and/or be stored within the database 20. The categorization database 20 comprises a main category database 44, which, in this example (directed to auto parts) is a comprehensive category and vehicle database created through the amalgamation of the industry standard ACES Part Categories Database (PCdb) 40 and Vehicle Configuration database (VCdb) 40 with an intermediary category database 42 and intermediary vehicle database 42, which incorporates any custom, specific parts, components, question database 23, part compatibility database 19 and categorization rules for the specific application. Moreover, the main category database 44 may include more ACES database components or other third party databases (not shown). It will be appreciated that for other types of items, e.g. electronics or consumer items, an industry standard may not exist, in which case, a single database, namely the main category database 44 can be created specifically for the intermediary 16.

The main category database 44 is designed to enable the system 10 to provide for speed, ease of use and functionality while at the same time building a comprehensive database of parts and components or other related categorization group names such as accessories as well as a database of parts and part compatibility information related to vehicle makes, models, years or related to other types of information deemed important by the administrator 34. For example, the main category database 44 may be able to distinguish that an air bag was not available in vehicles in the 1940s or that a part for a particular vehicle can fit other vehicles. The main category database 44 and the system 10 is also designed to evolve and grow into a more detailed database by allowing the administrator 34, buyers 12, sellers 14 and other users to populate the categorization database 20 with data. For example, as more sellers 14 list items for sale and include part compatibility information, which is stored in the AlsoFits database 19, more user generated content is stored in the system's 10 databases 19, 20, 21, 23 improving the buying, searching and selling processes as will be described later herein.

In an effort to build the detailed main category database 44, mass quantities of data needed to be efficiently combined and reorganized. Typical designs for category systems often include only the main category and sub-category headings to keep the lists small. For example, traditionally, users would have chosen a category and sub-category that best matched what they were looking for or selling from a general list. The intent of the main category database 44 is to include as much detail as possible to make it easy for users by pre-setting the categories and sub-categories 60*a* based on the items specified by the user making the system 10 faster and more user friendly. Continuing with the auto parts example, it is known that there are thousands and thousands of "items" that make up a vehicle so creating categories and sub-categories 60*a* for all of these would result in a gigantic list which would make it very difficult and very time consuming for users to navigate through. This can be particularly true for sellers 14 who may find it difficult to find the appropriate category in which to sell their items. To buyers 12, it can appear to them that the intermediary 16 does not have many items to sell, since there may only be a relatively few categories that have many items listed therein when including so many categories and sub-categories 60*a*.

This observation identified the need to re-evaluate the architecture of the main category database 44 to achieve the following: 1) Build a comprehensive database with more item details than any other database and fit it into a small, concise category and sub-category architecture design; 2) Allow sellers 14 to specify "what" they are selling instead of wasting time finding a "category and sub-category" in which to sell their item; 3) Be robust enough to allow large volume sellers 14 and suppliers 520 with massive catalogue inventory data to import their items seamlessly into the intermediary 16 (e.g. many sellers 14 and most suppliers 520 have large inventory catalogues or databases of items that they would need to import into the items database 22. The main category database 44 would allow them to quickly import all of their items and automatically assign the appropriate categories and sub-categories 60*a* based on the items being listed. Considering that some sellers 14 and suppliers 520 have more than 4 million items in their item catalogue database, the main category database 44 must be robust and scalable to handle this); 4) Make the system 10 easy for buyers 12 to find the “needle in the haystack” items (i.e. be able to find items that are often extremely difficult to find by simple searches on the Internet, e.g. auto parts such as plugs, trim, mouldings, clips and fittings); 5) Make it easier for sellers 14 and suppliers 520 of smaller and/or less common items (e.g. starter brushes, body clips) to post their items on the intermediary 16; 6) Be able to import item listings from other systems and/or databases on the network 18 and promote them on the intermediary 16 (e.g. item listings from other websites or online stores may be imported and listed on the intermediary 16 to provide better product exposure making the system 10 essentially a portal for all items of its kind. Considering the auto parts example, other auto parts websites may export their item listings via RSS, XML or other system into the categorization and items databases 20, 22 to be used on the system 10; 7) Find an easier way to keep the categories and sub-categories 60*a* updated when new vehicles and parts are built from vehicles from around the world (e.g. ACES only provides data for vehicles marketed in North America and may not include data from vehicles in Europe or Asia etc. The main category database 44 is able to store data from any vehicle.); 8) Find an easier and faster way to build up a database of keywords, descriptors and part compatibility; and 9) Be able to integrate with databases other than ACES to further build up the main category and AlsoFits databases 44,19.

As noted above, the categorization database 20 incorporates the ACES Part Categories Database (PCdb) 40 and the ACES Vehicle Configuration Database (VCdb) 40 with a custom intermediary category database 42 and vehicle database 42 which is either currently being used or comprises application specific or custom categories etc., and blends the databases 40, 42 together to form a scalable category model. In order to achieve what was noted above, the ACES 40 and intermediary 42 databases are amalgamated and revised to form the main category design used by the intermediary 16. This involves renaming, hiding and moving ACES assigned categories and sub-categories (assigned by ACES database administrators) into the different categories and sub-categories 60*a* of the intermediary database 42 deemed by the administrator 34. For example, ACES may contain 24 main categories and 177 sub-categories, in this example, that are seen by the user but when amalgamated with the intermediary database 42, they may be reduced to 18 and 129 respectively or any other number that is deemed to be reasonable for the particular application.

Figure 3A:
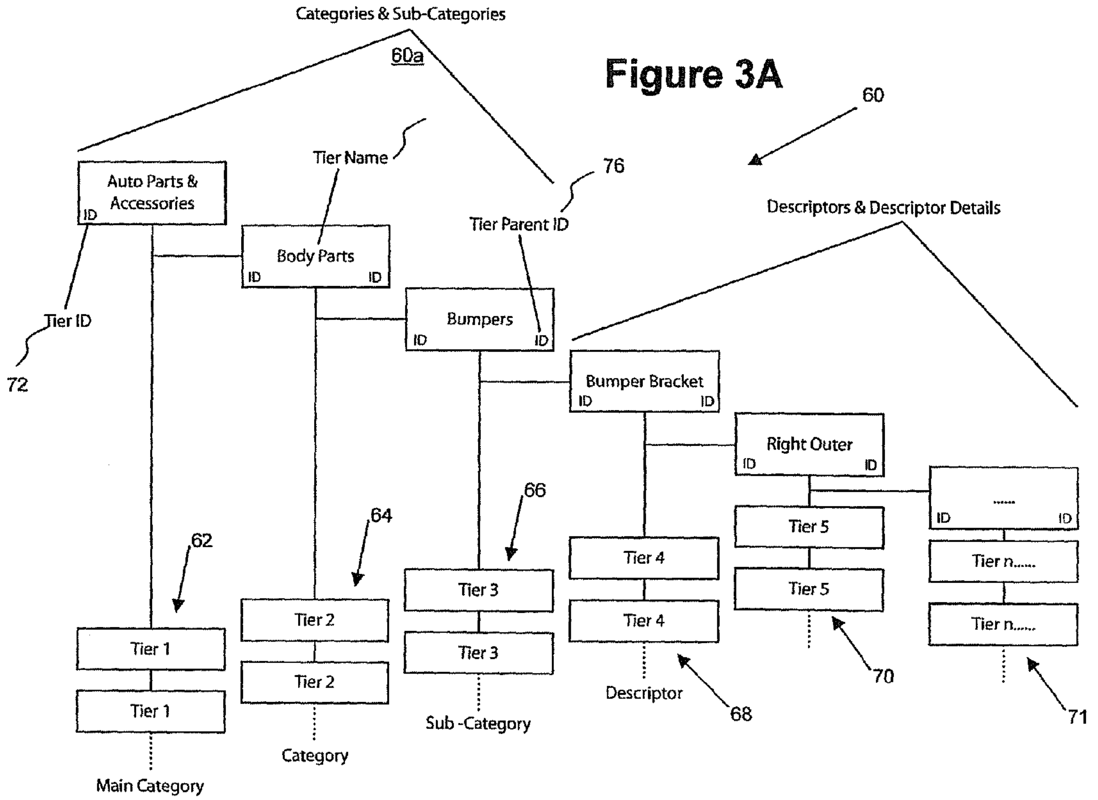
FIG. 3A is a block diagram of a tree diagram conceptually illustrating an example structure used for the main category database shown in FIG. 2.
Figure 3B:
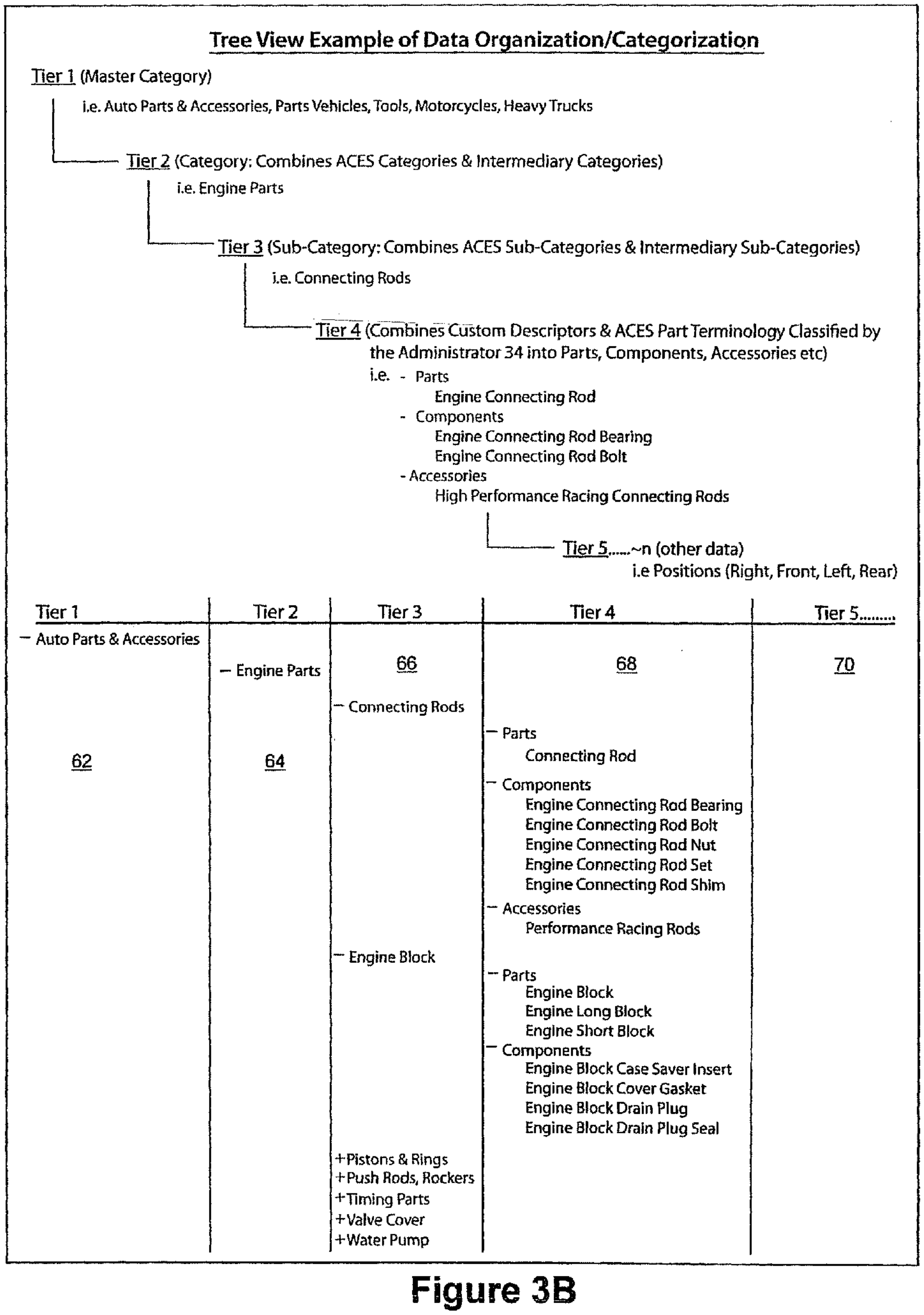
FIG. 3B is an example of an auto parts categorization using the structure shown in FIG. 3A.

Turning now to FIG. 3A, the categories and sub-categories 60*a* are organized into a tree structure 60, for the sake of illustrating the category design, with a Tier 1 62, a Tier 2 64, a Tier 3 66, a Tier 4 68, Tier 5 70 and each tier thereafter denoted by the numeral 71, although more or fewer tiers may be used. Each tier is a node in the tree 60 and there may be one or more nodes per tier. Tier 1 62 represents the main category that allows users to choose from different data sets (i.e. Auto Parts, Motorcycles, Heavy Equipment, Construction Equipment etc.). Tier 2 64 represents the category and Tier 3 66 represents the sub-category. Only the first three tiers, made up of the most popular and frequently used categories and sub-categories 60*a*, are made visible to users in the click boxes 58 or other selection mechanisms used by users to prevent excessive scrolling and browsing. However, the administrator 34 can add a sub-category to a sub-category (not shown) if needed. For example, if it is deemed necessary by the administrator 34 to further refine the category path, “Auto Parts>Charging, Starting & Ignition>Starters” to “Auto Parts>Charging, Starting & Ignition>Starters>Starters 1” and “Auto Parts>Charging, Starting & Ignition>Starters>Starter 2”, the administrator 34 could do so. FIG. 3B shows another depiction of the categorization system.

Figure 4:
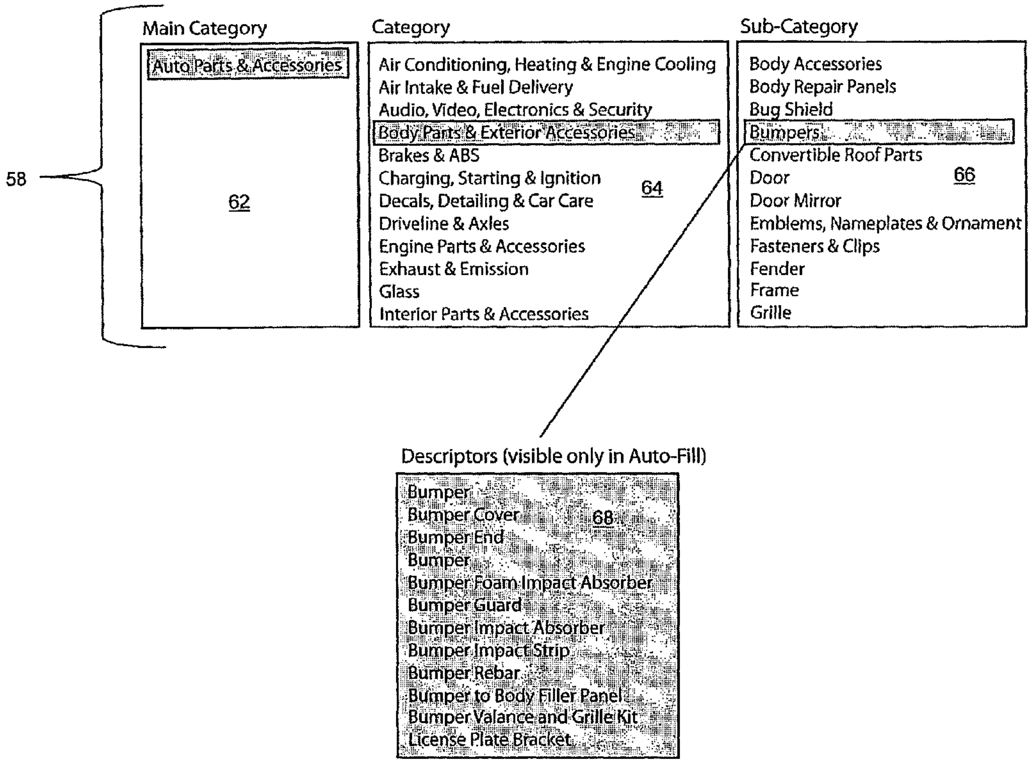
FIG. 4 is an example showing the use of the click boxes to select a category and sub-category and showing the hidden descriptors list used in the main category database.

Furthermore, the main category database 44 combines the “Part Terminology” data used by the ACES database 40 with “Item” names in the intermediary database 42 to form “Descriptors” which are pre-set “items” that buyers 12 and sellers 14 may look for or want to sell. These can be revealed using the auto-fill tool 52 or any other tool employed by the system 10. For example, FIG. 3A shows the Tier 3 66 sub-category name as ‘Bumpers’ while the descriptor (Tier 4 68 in this example) is a “Bumper Bracket”. The administrator 34 can assign any descriptors to any number of categories and sub-categories 60*a* as they deem necessary. For example, “Bumper Assemblies”, “Bumpers Brackets”, “Bumper Absorbers” and “Bumper Rebars” are all auto parts that ‘relate’ to the sub-category “Bumpers” (Tier 3 66), which relates to the category “Body Parts” (Tier 2 64), which relates to the “Auto Parts & Accessories” (Tier 1 62) main category. Instead of displaying every bumper descriptor under the Tier 3 (66) bumper sub-category and cluttering it up with too much data making it difficult to use, they are only displayed in the auto-fill tool 52. FIG. 4 illustrates that using the click boxes in this example, users only see up to the “Bumpers” sub-category (Tier 3 66) keeping the list concise. However, using the auto-fill tool 52, the users would be able to see and select one of the descriptors attached to this sub-category (shown only for illustrative purposes in this Figure). This is explained in subsequent sections. This is particularly helpful for sellers 14 who can type in a descriptor during the selling process and have the system 10 automatically assign the category and sub-category 60*a* for the seller 14 so they do not have to manually choose them like other systems require. (If the seller 14 wishes to change the category and sub-category 60*a* after they are automatically assigned, they can do so in case they wish to choose another). This increases both speed and usability by making it very convenient for the seller 14 since the system 10 knows which category or sub-category 60*a* the descriptor is associated with. In this way, there can be millions of items (descriptors) with pre-set category paths (preset by the administrator 34) while maintaining a concise category and sub-category 60*a* list that is easy to use for buyers 12 and sellers 14 minimizing excessive clicking, scrolling and reading category line items.

To make the system 10 even easier and more user friendly, the administrator 34 can be tasked with classifying each of the 7,044 descriptors, in this example, from the main category database 44 with a “Parts”, “Components” or “Accessories” identifier (or any other categorization group name deemed important by the administrator 34). Components are defined as smaller, more granular parts that are combined with other parts to make up one other part assembly, referred to as a “Part”. For example, when dealing with auto parts, it is realized that starter “brushes” are components that are found in a starter so the “starter” would be the ‘Part’ and the “starter brushes” would be a ‘Component’ of the starter. One main purpose of classifying each descriptor as a part, component or accessory is to make it easier for the user to choose a descriptor from the auto-fill results 100. Turning to FIG. 5A, an example of an auto-fill result 100 generated by the auto-fill tool 52 is shown to illustrate that separating the descriptors into a more readable format is easier for the user. FIG. 5A for example, shows that typing "Car" into the auto-fill tool 52 would result in a large list of matching 'carburetor' descriptors. If the descriptors were not organized into part, component and accessory groups, it would be difficult for the user to make their selection from such a large list without excessive reading and scrolling. (FIGS. 5A, 5B and 5C are shown as examples only and more or fewer descriptor results may be displayed). With the descriptors organized by the administrator 34, the user could simply filter out descriptors by deciding whether they are looking for a part, component or accessory thereby eliminating results that do not apply to their needs, thus choosing from a smaller more refined list. For example, most auto parts users in this example will be looking for a "Carburetor" (displayed in the Parts list 102) of the auto-fill list result 100 rather than an uncommon item such as a "Carburetor Choke Tube Gasket" (displayed in the Components list 103).

As mentioned above, the auto-fill tool 52 allows users 14 to enter into a user interface (UI), exactly what they are looking for. For sellers 14, that means they can specify exactly what they are "selling" rather than have them find a category and sub-category 60*a* to sell their item in. It also allows them to find and list very specific, granular items easily and make it easier for buyers 12 to find their items. It has been observed that in many instances, sellers 14 spend a great deal of time searching for the right category and sub-category when trying to post an item to sell. The categorization database 20 may host millions of "descriptors" with pre-set categories and sub-categories 60*a* so that sellers 14 can quickly choose an item from the auto-fill results 100 and let the system 10 do the work to find the category and sub-category 60*a* to list the item in. The auto-fill tool 52 works by matching what users are looking for to all of the descriptors in the categorization database 20 and conveniently organizes them into a parts list 102, a components list 103 and an accessories list 104. In this way, it is easier for both the buyer 12 and seller 14 to find what they are looking for, quickly and efficiently. In the example shown in FIG. 5A, by typing "Car" into an appropriate interface that is linked to the auto-fill tool 52, the system extracts the parts, components and accessories from the main categorization database 44 that begins with "car". The system 10 can be configured to auto-fill what the user is typing with most commonly searched parts, components or accessories that match what is typed into the auto-fill tool. For example, FIG. 5B shows "Carburetor" by auto-completing "car" with "buretor" (highlighted portion) to allow the user to quickly choose "carburetor" instead of having them select it from the parts list 102, components list 103 and accessories list 104. In this example, the system 10 recognized 'carburetor' to be the most commonly used match for "car" therefore it auto-filled "carburetor". The user can continue typing, or press the enter key or other input mechanism to accept the selection. As the user types, the results displayed change based on what descriptors the system 10 matches. The parts, components and accessories list may be organized in any suitable fashion and the single column of lists shown in FIGS. 5A and 5B are only for illustrative purposes. Another example result 100' is shown in FIG. 5C, which utilizes a side-by-side arrangement and like elements are given like numerals with the suffix "'" for clarity. In other embodiments, the auto-fill tool 52 may classify the auto-fill results 100 into other lists such as a Performance list 105.

The system would be able to preset the categories and sub-categories 60*a* because the parent IDs 76 shown in FIG. 3A provide the relationship between the categories and sub-categories 60*a*. Each tier has a unique identification number (ID) which can be used to link categories in the tree 60, i.e. in a child-parent-grandparent etc. relationship. By linking the categories and sub-categories 60*a* in this way, as also shown in FIG. 3A, each descriptor can be stored in the database 20, in any location with a tier ID 72, a tier name 74, and a parent ID 76. A relationship between a descriptor and a category can also be created manually without having to reverse the path using the parent ID 76.

Turning back to FIG. 3A, the first three tiers represent the categories and sub-categories 60*a* and tier 4 68 on represents data pertaining to descriptors. For example, Tier 5 (70) contains position details that pertain to the Tier 4 (68) descriptors. For example, there can be a right inner, right outer, left inner and left outer bumper bracket; details that further describe the tier 4 (68) item. Tier 5 (70) can therefore add valuable information allowing the seller 14 to provide more details about the item they are selling while providing buyers 12 with more search filter options. Tier "n" represents infinite tiers of additional information that can be attached to a descriptor.

The system administrator 34 can monitor what sellers 14 are listing and what buyers 12 are searching for and, if these items are not found within the main category database 44, the administrator 34 can add them to keep the main category database updated and constantly evolving. For example, when sellers 14 are creating a listing for an item that is not found within the auto-fill results 100, as will be described in further detail in subsequent sections, they can continue typing their item in the 'What are you selling' 194 field. Since the item did not match a descriptor in the main category database 44, the system 10 could not automatically associate the category and sub-category to the descriptor. In this case, the seller 14 would be forced to manually select a category and sub-category to sell their item in. Once they finish listing their item, the administrator 34 could review the custom item and decide whether or not to add it to the main category database 44. If it is added, the administrator 34 would review the category and sub-category 60*a* assigned to it by the seller 14 and either keep them assigned or modify them. Finally, the new descriptor would need be classified with a Part, Component or Accessory identifier. Once it is added, the next time a buyer 12 or seller 14 typed that item name in the auto-fill tool 52, the main category database 44 would recognize the descriptor and display it in the auto-fill results 100. For example, a seller 14 lists a 'B Switch' and since it is not found in the main category database 44, they choose the following category and sub-category: 'Auto Parts>Modules, Sensors & Electrical>Switches'. The administrator 34 then decides to add 'B Switch' to the main category database 44, reviews the category and sub-category associated with it and does not change them, and finally classifies it with a component identifier. The next time a seller 14 types 'B Switch' in the auto-fill 52, it would appear in the auto-fill results 100 under 'Components' allowing the user to select it and have the system automatically choose the category path: 'Auto Parts>Modules, Sensors & Electrical>Switches'.

Each tier contains a group of tables that store other data not found in the ACES databases such as, but not limited to, a list of keywords, alternate names, spelling variations of the tier name and other information deemed important by the administrator 34 to improve the overall functionality of the system 10. For example, the administrator 34 may change the name of an ACES category, sub-category or descriptor to better fit the main category database 44 but will store the original ACES name in the keyword table. For example, a descriptor from the ACES database called "Air Mass Flow Sensor Meter" is the correct name of this auto part but the administrator 34 knows that the part is commonly referred to as a "Mass Air Flow". In order to improve the searching, buying and selling processes, the descriptor name is changed to 'Mass Air Flow' and the keyword phrase, "Air Mass Flow Sensor Meter" is added to the keyword table. The next time users type "Air Mass Flow Sensor Meter", the system 10 can understand it and display "Mass Air Flow" in the auto-fill results 100. Furthermore, the administrator 34 can be tasked with adding spelling variations to categories, sub-categories, descriptors, vehicles etc and storing them in the questions/help database 23. For example, adding "Senser" as a spelling variation to the descriptor "Sensor" will allow the system 10 to understand that when users type in 'senser' they mean 'sensor'. Another example would be to add alternate names and spelling combinations for vehicles to greatly increase the usability of the system 10. For example, if a user types, "Plimoth" (incorrect spelling), the system 10 could understand it as "Plymouth" (the correct spelling) if the administrator 34 added Plimoth as an alternate name for Plymouth.

The administrator 34 is able to rename anything in the ACES database 40 because no IDs are changed when doing this to preserve the integrity of the ACES database data. This makes updating the ACES databases 40 simple because the IDs are used in update process. For example, assume the ACES descriptor "Engine Harmonic Balancer" with the ID 5, was renamed in the main category database 44 as "Harmonic Balancer". The ID remains 5. Even if the ACES database if updated, the revised descriptor name does not change and if sellers 14 or suppliers 520 wanted to import their data using the ACES standards, even though names would be different, the data would be successfully imported into the system 10 by using the IDs.

Since the ACES database 40 is continually updated, and the intermediary category database 42 may also need to be updated, the categorization database 20 is, in this example, capable of receiving and processing updates 46 for the individual databases (46*a* for ACES and 46*b* for the website/intermediary). In this way, the original sources of the categories can be updated per the usual while the main category database 44 can be updated by simply creating a new amalgamation of the updated databases 40, 42. For example, the databases 40, 42 can be kept separate and the ACES database 40 updated by downloading the latest update from a central ACES website and refreshing the data. The intermediary category database 42 can be customized and updated at any time by the administrator 34, or using batch updates or any other schedule. A script can then be used to merge the changes to both databases 40, 42 and the administrator 34 can review the final update to validate the integrity of the main category database 44. Various tests can be employed if desired and then the main category database 44 can be released to the website. In order to update the databases 40, 42, 44, an admin tool 48 can be provided that can be used by the administrator 34 as needed. As can also be seen in FIG. 2, a search tool 50 and an auto-fill tool 52 are provided with access to the main category database 44. Currently, ACES is updated monthly for those who subscribe and, as such, a script or a custom tool that runs automatically such as the admin tool 48 can be used so the ACES and intermediary categories can be updated easily and seamlessly.

When updating and amalgamating the ACES and intermediary databases 40, 42, there may be some duplication with category, sub-category, descriptor and vehicle names or other duplicate content. For example, if the administrator added the descriptor "Cylinder Head" to the intermediary database 42 and two months later when the ACES database 40 was updated, they too added Cylinder Head, the administrator 34 can be tasked with merging the data together.

Furthermore, relationships between different tables in the ACES database 40 that previously did not exist may be formed by the administrator 34 thereby making the ACES database 40 within the main category database 44 more detailed than it originally was. For example, the ACES Vehicle Configuration database (VCdb) 40 tracks some of the year, make and model information for vehicles marketed in North America and contains some common information about the engine size, body structure (2 door, 4 door etc.), transmission type (manual, automatic etc.), etc. However, the ACES database 40 does not form relationships between auto parts and vehicles so their database, for example, cannot distinguish that an airbag was not available in vehicles built in the 1940s. The administrator 34 can setup these relationships to create a more comprehensive and detailed database within the categorization database 20 than ACES 40 originally provided. These relationships can be used to assist in filtering searches by eliminating parts from models for years when they did not exist etc. For other types of items, any industry available equivalent to the ACES PCdb and VCdb 40 can be used to provide a similar function.

The ACES category database 40 is one most commonly used Industry Standard for the management and exchange of automotive catalogue and vehicle data in the United States. With ACES, sellers 14 and suppliers 520 who are ACES compliant (following the ACES industry standards) can publish automotive data with standard coded designations for vehicle attributes, parts classifications and qualifier statements. ACES provides a machine-readable format (XML) for trading partners to use in exchanging vast amounts of information. The Electronic Commerce Committee of the Automotive Aftermarket Industry Association develops standards and best practices to lower costs throughout the aftermarket and increase the efficiency of supply chain technology. The committee recognized that part availability inquiries and associated special order transactions occurred many thousands of times each day at all levels of the aftermarket. These transactions were conducted by phone, fax and a growing number of negotiated electronic transaction formats. In the interest of providing an open industry guideline for this business process the AAIA committee identified the ACES standards and a workgroup was formed from interested parties. The Internet parts ordering standards in the document produced were developed with broad industry participation. It can therefore be seen that by leveraging off of one of the industry standards for categorization, the main category database 44 can be designed to be simpler to use but still utilize the vast amounts of data developed for ACES. Furthermore, the administrator 34 may integrate other database standards such as the Internet Parts Ordering standards developed from the AAIA, the Hollander Interchange platform from Solera etc. and amalgamate them into the main category database 44 using the same techniques as described in previous sections.

Figure 6:
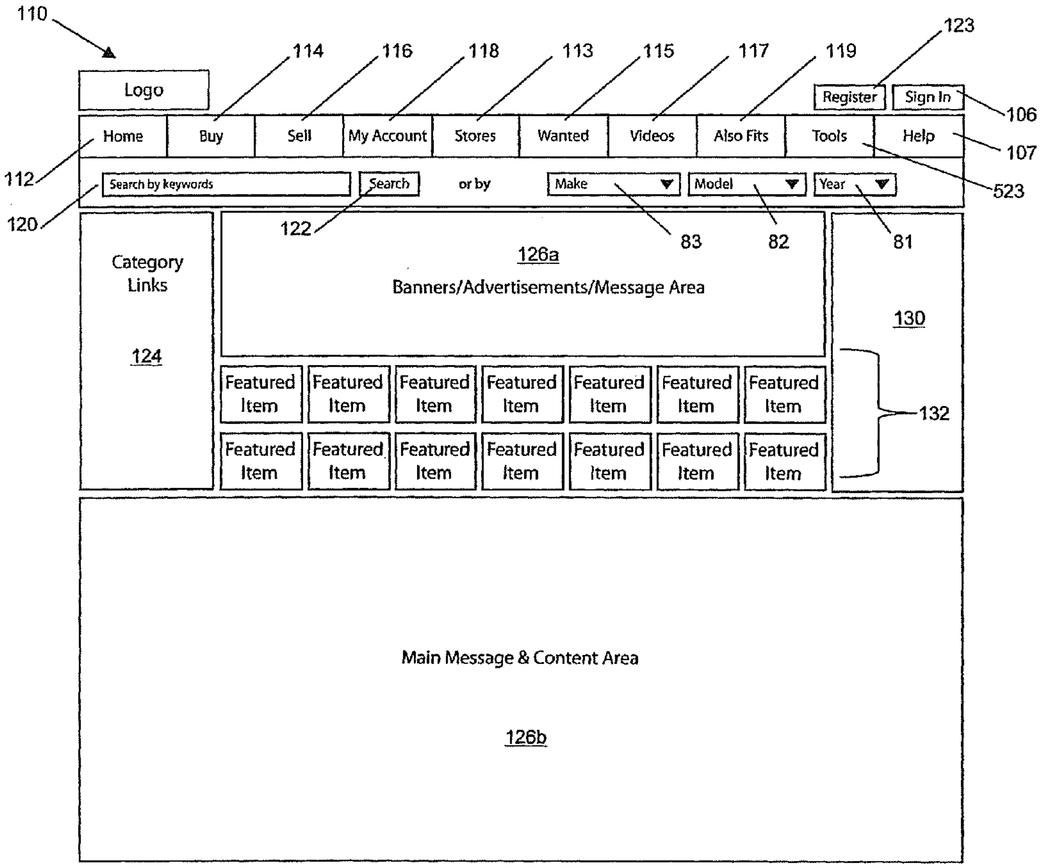
FIG. 6 is a screen shot of a main page for a user interface provided by the intermediary in FIG. 1 for posting and searching for items that have been posted.

The intermediary 16 enables buyers 12 and sellers 14 to transact with each other over the network 18 by hosting a program, application or website. FIG. 6 illustrates a main screen for a website UI 110. In this example, the website UI 110 is accessed by entering a URL through a browser connected to the Internet, the URL being associated with the intermediary 16. The website UI 110 comprises various main navigation options, in this example, a home link 112, which allows the user to return to the main screen shown in FIG. 6 at any time; a Buy link 114, which, when selected, initiates a buying process for a buyer 12; a Sell link 116, which, when selected, initiates a selling process for a seller 14, i.e. to post or list one or more items; a My Account link 118, which, when selected, accesses account information and enables a user to log-in to their account or set up a new account etc.; a Search entry box 120, which enables a user to enter text for conducting a quick search at any time, which is initiated by selecting a Search button 122; Make 83 Model 82 and Year 81 drop downs which enables users to search based on the make, model and year of their vehicle initiated by clicking the search button (not shown); a Stores Link 113, which, when selected, allows the user to browse and search through sellers' 14 items and item catalogues from sellers' 14 stores; a Wanted Link 115, which, when selected, allows the user to view items requested by other users and allows sellers 14 to post requested items to the items database 22; a Videos Link 117, which, when selected, brings the user to pages that display 'Do-It-Yourself', 'How To', instructional, educational and other videos related to the system 10; an AlsoFits Link 119, which, when selected, allows the user to access part compatibility information pertaining to items; a Tool link 523 which provides access to other tools and applications; a Help Link 107, that when selected, allows the user to access help files pertaining to the use of the system 10; a Register Link 123 which, when selected, initiates a registration module, and a Sign In Link 106 which, when selected, provides access to the registration/sign-in page shown in FIG. 7. In other embodiments the navigation options may expand to include additional tabs, not depicted here and may have different names than shown in these Figures. Other Figures may only display some tabs for illustrative purposes only. The main screen shown in FIG. 6 can be used to provide banners 126*a*, 126*b* for advertisements and messages, and may comprise different portions or panes that provide links 124, 130 and featured items 132. Also, the main screen may allocate a portion for assisting the user in getting started, e.g. with preliminary instructions or helpful tips. Moreover, FIG. 6 illustrates extra links and features that are available throughout the system although they may not be depicted in other Figures.

Figure 7:
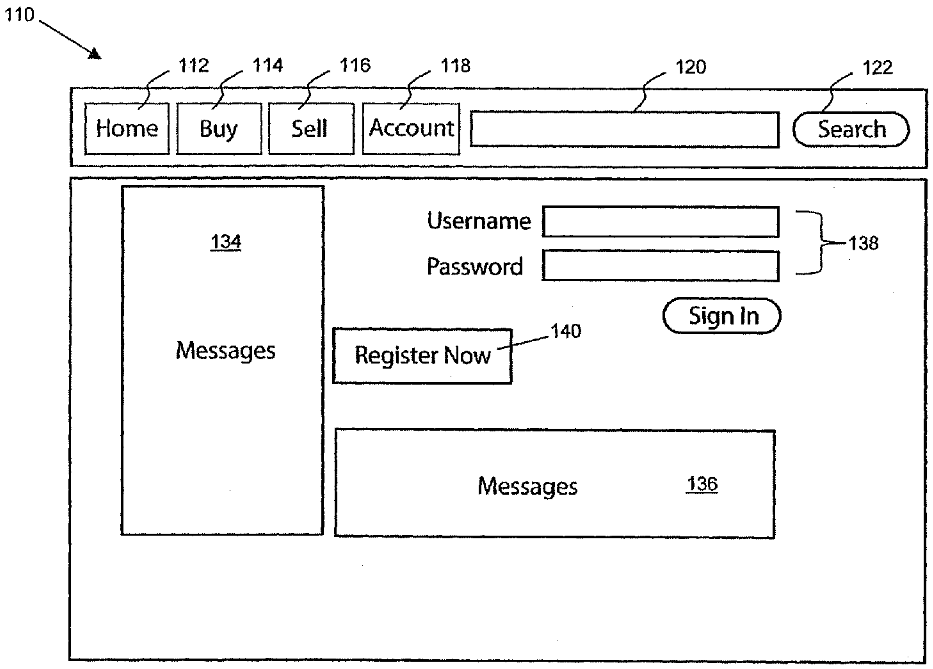
FIG. 7 is a screen shot of a sign-in page accessed through the main page of FIG. 7.

Turning now to FIG. 7, a registration/sign-in screen is shown, which may be initiated upon selecting the account link 118, or sell link 116 or using any other feature that requires users to be signed into their account. For users that have already registered, standard username and password entry boxes and a sign in button, collectively referred to as a sign-in tool by numeral 138, can be filled in by typing the appropriate username and password and selecting the sign in button. If a user has not yet registered, they can select the register button 140, which then initiates a registration module (not shown), e.g. run by the admin tool 48 to gather the appropriate user information. Messages 134, 136 may also be displayed to provide an advertisement or system message encouraging users to register if they haven't done so or to upgrade to premium services etc.

Figure 8:
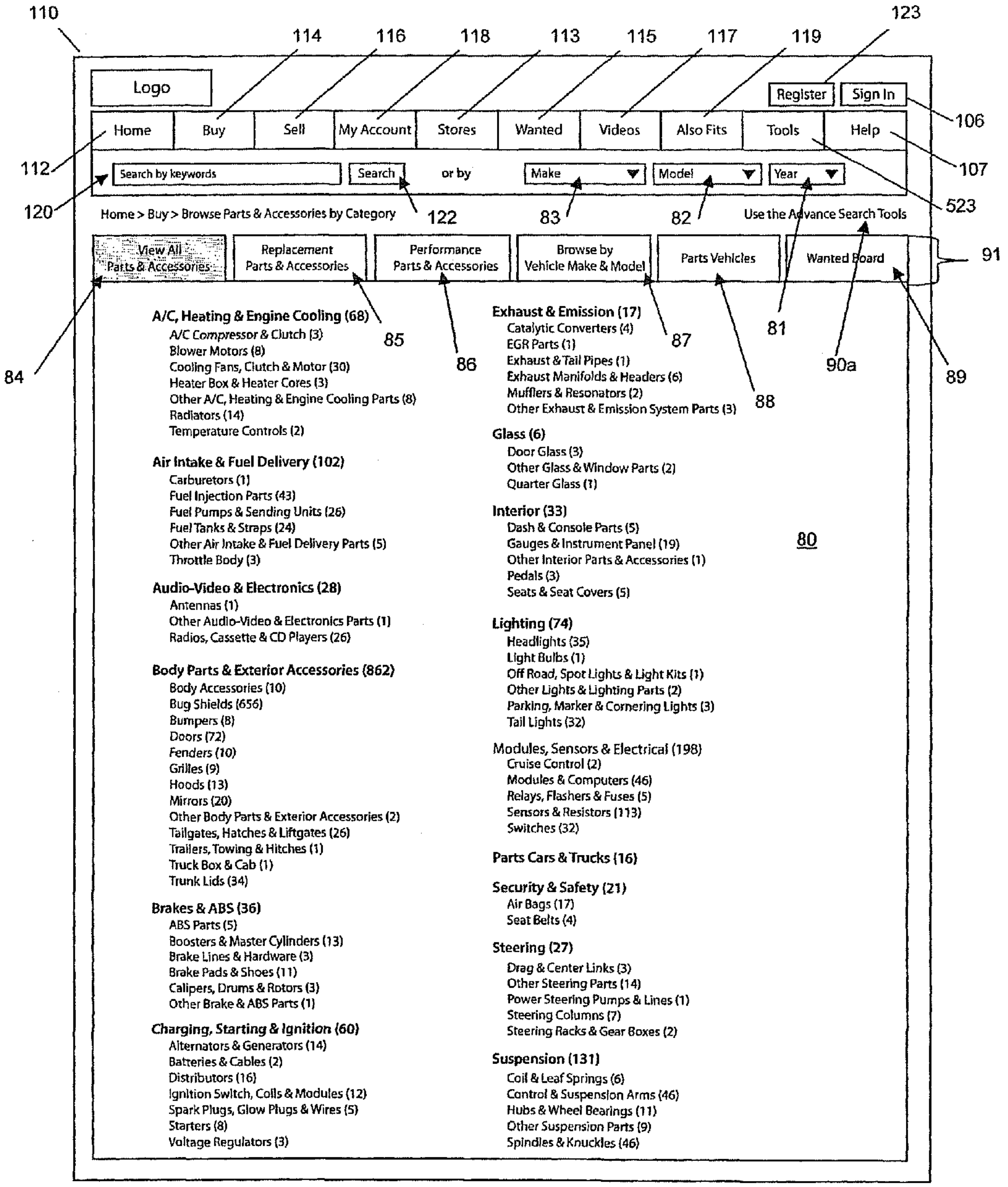
FIG. 8 is a screen shot of a main buy page accessed by selecting the Buy option in shown in FIG. 6.

FIG. 8 shows the main Buy page accessible by clicking the buy tab 114 from the top menu and provides many ways for buyers 12 to search for items including but not limited to; 1) a text search 120, explained earlier; 2) make 83, model 82 and year 81 drop down searches (in which users can search using a combination of; a) make only: to search for all models and years of the selected make; b) make and model only: to search for all available items for the selected model years; and c) by make, model and year: to search for all items for their specific search criteria, in this example a vehicle. The search is initiated by clicking a search button (not shown). 3) Buyers 12 can use the tabs 91 to load different pages that display different search criteria. For example, the first tab "View All Parts & Accessories" 84 displays all categories and sub-categories 80 that when anyone is selected, a search returns a list of all items posted on the intermediary 16 for that sub-category. For example, if a user clicked the Blower Motors sub-category, all of the blower motors posted would be displayed in the appropriate results page (not shown here).

Other tabs, in this example, such as "Replacement Parts & Accessories" 85, "Performance Parts & Accessories" 86, "Vintage Parts" (not shown), "Racing Parts" (not shown) etc. can perform the same type of search as the "View All Parts & Accessories" 84 tab however, the results return only items that match the specific "attributes" the tab is assigned. An attribute is a particular characteristic of the item assigned by the seller 14 during the selling process. When a seller 14 tags their item with an attribute, the system 10 then adds that item to a special group of items (based on the attribute) to give buyers 12 more searching options. For example, clicking the Blower Motors sub-category link on the Performance Parts & Accessories 86 tab would display all "Performance" blower motors posted in the items database 22 that are available; that is, all blower motors with the performance attribute. It may be noted that an attribute in this example is not a new category but simply a flag given to an item that can be searched and filtered. This will be explained in more detail when describing the single item 24 selling tools. Other tabs may perform similar functions but search different items. For example, the "Parts Vehicles" 88 tab is an example of a search page dedicated to searching multi-items 26. Buyers 12 can also post items they are looking for on the "Wanted Board" 89 to allow sellers 14 to view items requested by other users and use the "Parts Alert" tool (not shown) to post a requested item to the items database 22 and notify the buyer that a matching part is available. The Browse by Vehicle Make & Model 87 tab offers users an alternative way to search for items by vehicle make and model. Buyers 12 can use the advanced search tools by clicking the Use the Advanced Search Tools link 90*a* which loads the advanced search page shown in FIG. 9.

Figure 9:
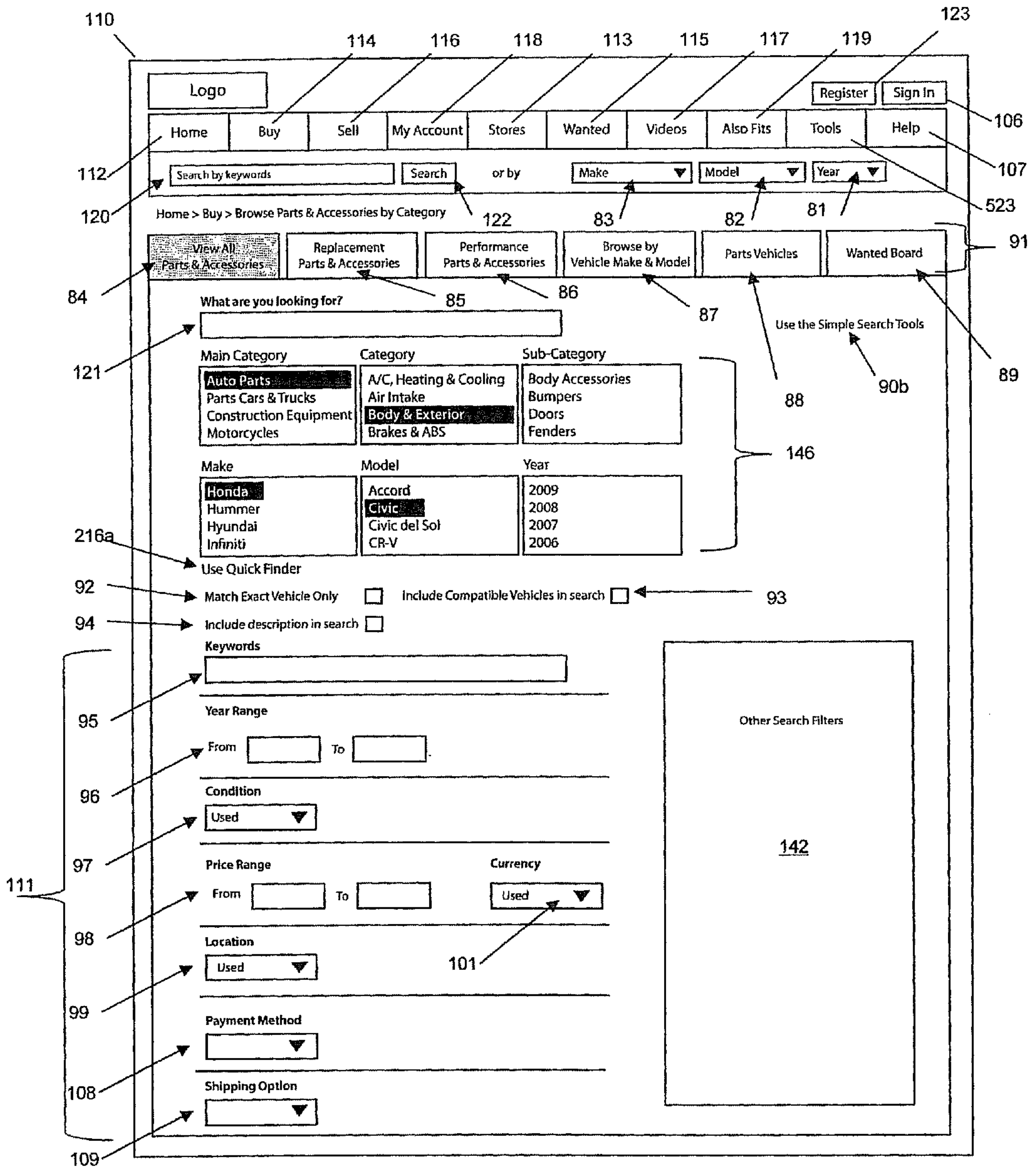
FIG. 9 is a screen shot of the advanced search page accessed by clicking the Advanced Search link shown in FIG. 8.

The advanced search page shown in FIG. 9 presents more search filters and auto-fill search tools so that users can further refine their search. For example, a user may want to search for items only in a particular country and/or search for items priced under $50. The buyers 12 can also use the click boxes 146 with the first click box containing the first tier of categories and when a user selects that category, the next pane displays a more detailed breakdown of it. Users can simply click on the contents in the left pane to get a more detailed list in the right pane. The further to the right you go, the more detailed your search will be. Stay to the left and the more general your search will be. These click boxes 146 display only up to three tiers, in this example. The top row in the click boxes 146 contain the categories and sub-categories while the bottom boxes contain, in this example, vehicles or other related information. The users can mix and match their search criteria to perform broad or very detailed searches. For example, one user may want to search for a fender for their 1987 Honda Civic by selecting the sub-category "fender" from the top third click box 146 and choosing a 1987 Honda Civic from the bottom click boxes 146. Another user may want to search all Body & Exterior items listed for their Civic by only choosing the Body & Exterior category from the above boxes 146 and selecting Honda, Civic from the first two bottom boxes 146. Notice that no year was selected so the search will pull up all Body & Exterior results for all years of Honda Civics. The search is activated by clicking the search button (not shown). The user can also click the Use the Quick Finder 216*a* link to load the vehicle quick finder tool 216*a* as will be explained later.

The user may want to use the "What are you looking for" 121 search box to use the auto-fill tool 52 and access a detail descriptor list explained earlier. After the user selects a descriptor from the auto-fill result 100, they can add more search criteria or execute the search by clicking the search button (not shown). For example, if a user typed in "Starter" and selected "Starter Brushes" from the auto-fill result 100 and clicked the search button, the system searches for all starter brushes. If additional search criteria such as, the item price must be less than $50, was added, clicking the search button would search for all "Starter Brushes" with a price less than $50. Users can also use the links on the side menu (not shown) to quickly search for items. The Match Exact Vehicle Only 92 and Include Compatible Vehicles in Search 93 options allow the user to search for items that fit their exact vehicle or search for items that are from different vehicles but still compatible with the vehicle the user selected. In other words, the second search filter will search for items from other vehicles that "Also Fit" their vehicle. Users can still use the search bar 120 and the vehicle drop downs 83, 82, 81 at the top of the page to find items as explained earlier. Other search filters 111 include, description in search 94, keywords 95, year range 96, condition 97, price range 98, currency 101, location 99, payment method 108 and shipping options 109, are available to the user at the bottom of the page to refine their search. Other search filters 142 will offer similar functionality. The user can return to the simple search page by clicking the "Use the Simple Search Tools" link 90*b*.

Figure 10:
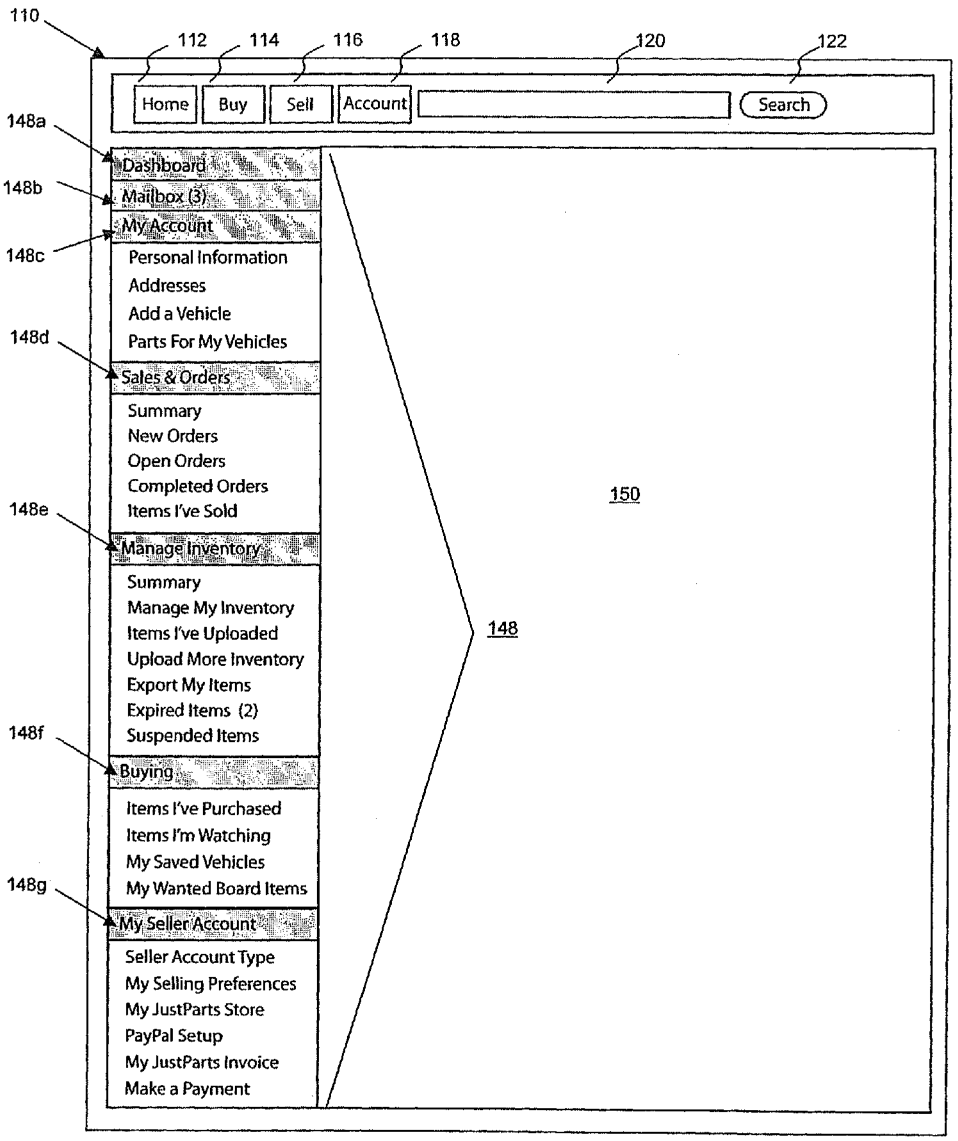
FIG. 10 is a user account page accessed by registering or logging in through the page shown in FIG. 7.

If the user is registered, the screen shown in FIG. 10 may be displayed by clicking the Account Link 118. The user's account page can be divided into an information pane 148 and a message pane 150. The information pane 148 is broken up into different sections. The Dashboard 148*a* displays summary information from various account pages; The Mailbox 148*b* is where they can send and receive messages from other users; My Account 148*c* allows the users to manage their account information and add the vehicles they drive, in this example, to their profile so that the system 10 can automatically search for and present the user with all items related to their vehicle without the user having to manually search for them; Sales and Orders 148*d* allows sellers 14 to manage their sales and orders, similar to the features shown in FIGS. 71 to 74; Manage Inventory 148*e* allows sellers to manage their inventory as shown in FIGS. 81 to 85; Buying 148*f* allows buyers 12 to review their purchases, view their saved searches and review items they posted to the Wanted Board; and the My Seller Account 148*g* allows sellers to manage their seller account, setup their selling preferences, setup their PayPal, Google Checkout and other payment processors accounts, and make payments to the system 10 for charges related to their account. The message pane 150 provides a UI for the user to view messages from buyers and create their own messages, which provides a convenient communication tool within the system 10. The message pane 150 displays the appropriate details from the information pane 148. For example, if the user chooses to edit their account information by selecting the link in the My Account information pane 148*c*, they would make the change in the message pane 150 on the right. If users are not registered, they can access a similar account page (not shown) dedicated to Guest users with certain options restricted. For example, an unregistered user, or a user not signed in, may be able to add vehicles to their Guest account, view messages sent from sellers 14, save their custom searches, add items to their Watch List etc. The system 10 uses a combination of programming and cookies to allow this functionality.

Figure 11A:
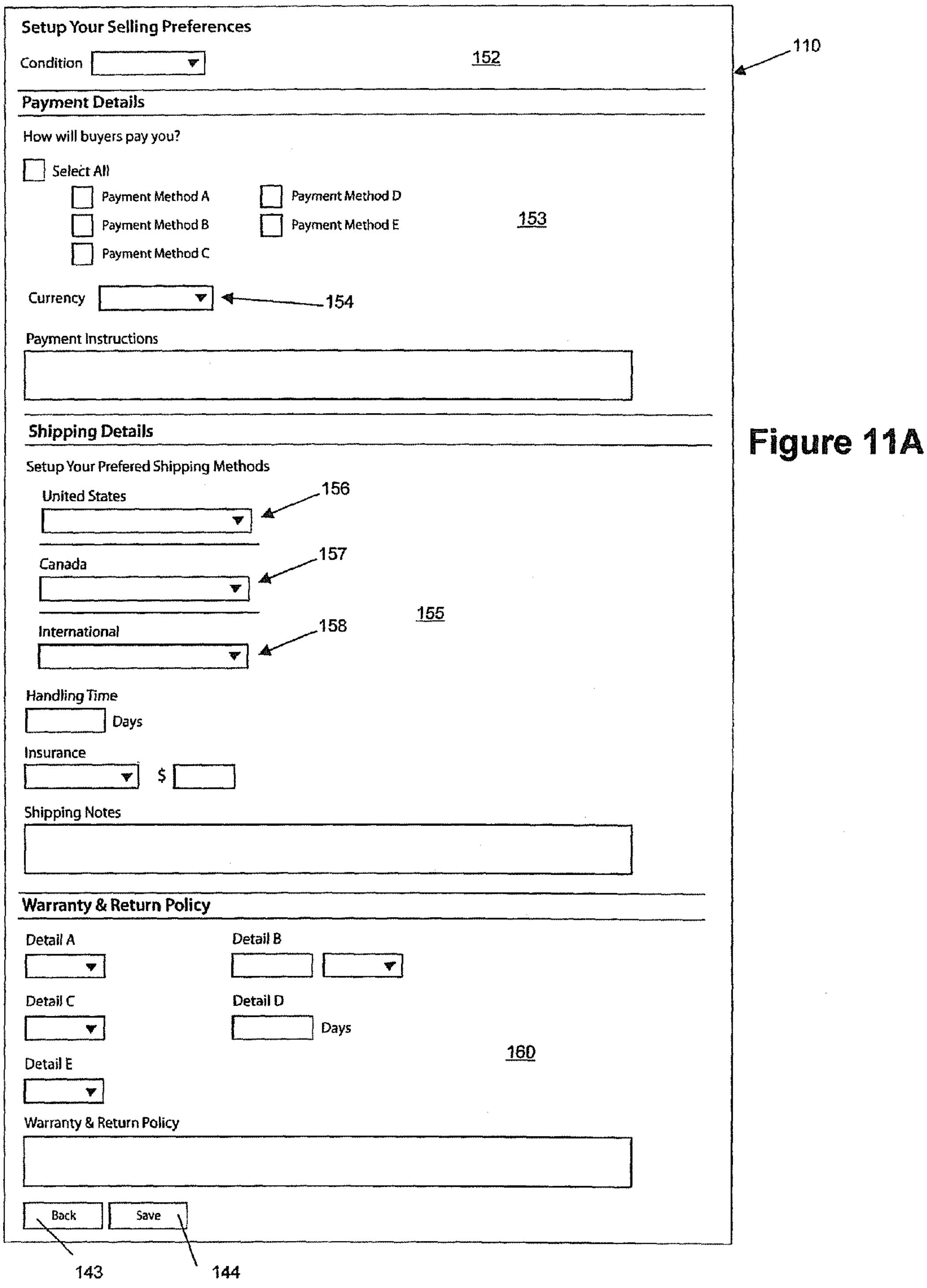
FIG. 11A is a screen shot of a selling preferences entry page for Canadian and US sellers.

Once users activate their seller account, a list of options may then be provided, such as to allow the seller 14 to setup their selling preferences/defaults as shown in FIG. 11A. Referring also to FIG. 10, the selling preferences can be listed under My Seller Account 148*g* or can be presented to the user automatically during the registration setup or the seller account setup. As can be seen in FIG. 11A, the selling preferences can comprise any suitable details that the user may use more than once, thus a default. In this example, the following default types are shown: a) condition 152 such as used—very good, used—excellent etc.; b) payment details 153, which may be selected from a standard list and may allow the user to "select all", along with payment instructions, which enables the user to add a textual set of instructions to assist the buyer 12; c) currency 154, to enable the user to select a default currency in which to transact; d) shipping details 155 including handling time, shipping notes and insurance, which allows the user to preset the type of insurance they wish to add such as required, optional etc.; e) a warranty and return policy 160 which allows the user to specify if and how to return items and if a warranty or particular period applies and other details pertaining to the returns.

The shipping details 155 include drop down boxes, in this example, in which the seller can preset how they will ship items to buyers in the United States 156, Canada 157 and Internationally 158. The seller has various options to choose from as will be explained later in the selling process. FIG. 11B shows a similar selling preferences page only accessible to Non-Canadian and Non-US sellers. An extra shipping location, Seller's Country 159, is available that matches the country the seller is located in. For example, if the seller 14 is from Australia, the drop down will display Australia to allow the Australian seller 14 to specify how they will ship the item to buyers 12 in their country. Seller's Country appears in FIG. 11B as an illustration only and will be replaced by the actual name of the country the Non-US/Non-Canadian seller 14 is located in.

A Back button 143 allows the user to return to their account page and a Save button 144 enables the user to save the selected preferences, in whatever the current state of the defaults page happens to be. By setting defaults, the user's choices can be automatically populated during the selling process when creating a new listing, allowing the user to save additional time.

At any later time, the user should be able to click on "My Selling Preferences" in their My Seller Account 148*g* to be taken to the selling preferences setup page shown in FIGS. 11A and/or 11B to allow the user to modify and/or update their default preferences. The selling preferences screen can use radio buttons, drop down boxes and text boxes and any other input mechanism 78 to allow the user to select or specify a default preference. Users should be able to setup all of the default options if they wish, setup some of the default options or not setup anything if they do not wish to utilize any defaults. If they do not wish to add any selling preferences, they would choose the Back button 143. Once they enter a selling preference, they would choose the Save button 144 to save their changes and return to their account page, e.g. that shown in FIG. 10. Similarly, the seller 14 can save their preferences when selling an item as discussed below.

As noted above, the selling preferences can be used during the listing process to allow the user to save time by utilizing common options and preferences. When sellers 14 are listing an item, whatever preferences have been previously setup will automatically appear in a users listing. For example, User A has setup his Payment Details 153 to accept Payment Method A, B and E. A few days later, User A begins to list an item and the Payment Method A, B and E are automatically pre-selected for convenience.

The sellers 14 should be able to view and modify their selling details during the sell process at any time by clicking on an option to view and modify the selling details. If the user selects such an option, they would then see the UI 110 display their selling details to view and/or modify similar to what is shown in FIGS. 11A and 11B. When a user is listing an item and the system 10 populates the fields with the user's default settings, the user should still be able to change any of the options. For example, if User A had previously set his preferred shipping method to Canada 157 as Contact Seller and has listed a new item that should be configured to offer Free Shipping, User A can simply change the shipping method for Canada 157 to Free Shipping. This will not change his selling preferences unless the user decides to update their preferences during the listing process. For example, presetting the shipping method to the United States 156 with Free Shipping was an error so User A changes that to Calculated Shipping. To change it for all future listings, that is, to change their preference, an option should be available to update the selling preferences within the sell page using the currently selected selling details rather than having User A return to their account page and select the selling preferences link.

It may be noted that other options and restrictions can be incorporated, e.g. where multiple sellers are introduced. In such a case, a restriction can be set such that only the account administrator (i.e. a selected one of the sellers) can set selling preferences. This can be done to minimize concurrency issues, e.g. when there are multiple users acting for the same entity. When having multiple users, the account should allow multiple items to be listed at the same time, using the same preferences.

Figure 12:
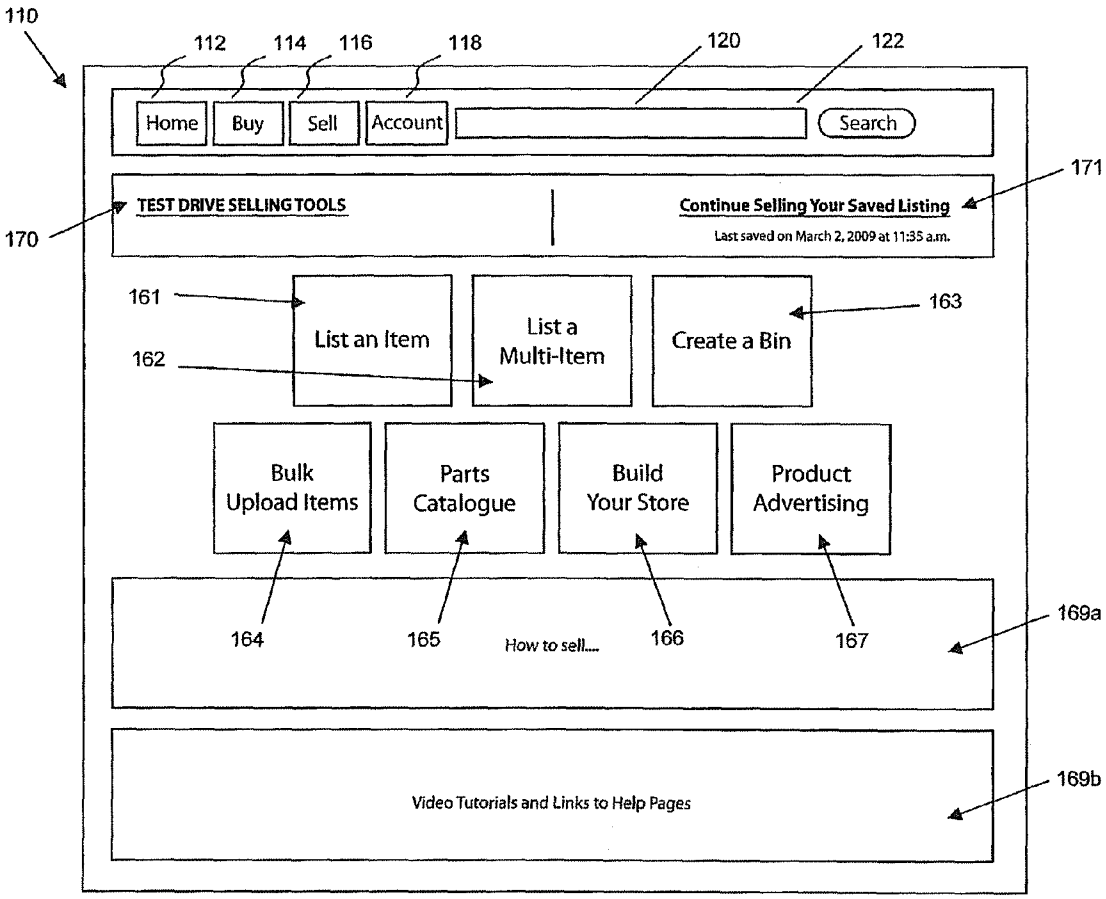
FIG. 12 is a screen shot of a seller's main sell menu page accessed by selecting the Sell option in the menu shown in FIG. 6.

When a user selects the Sell link 116 through the main navigation portion of the UI 110, a main sell menu page may be initiated as shown in FIG. 12. The main sell menu page allows the user to select from various selling formats. In this example, a single item 24 may be listed by selecting the List an Item option 161 and a multi-item 26 may be listed by selecting the List a Multi-Item option 162. As can also be seen in FIG. 12, and which will be described later, the user may also select the Create a Bin option 163 to start the bin selling process. The Bulk Upload Items 164 option allows sellers 14 to post a large volume of items at one time from a spreadsheet or other resource. A Parts Catalogue option 165 can also be selected, which allows a seller 14 to create a digital catalogue for their items 24 and multi-items 26 etc., import their entire product inventory into the items database 22 and allow sellers 14 and suppliers 520 to utilize the Part-a-Log features as will be described later. The system 10 can also be configured to connect to the seller's 14 product catalogue through an API (application programming interface) provided by the system 10 and/or the seller 14 to keep the seller's 14 product inventory updated in real time. The Build Your Store option 166 allows the seller 14 to create and configure their virtual store within the intermediary 16 and set up parameters and promotional materials, e.g. for users who wish to utilize the system 10 for posting, selling and buying items on behalf of an organization such as a store or other business.

A Product Advertising option 167 can be selected to allow sellers 14 or administrators of other websites or systems to integrate and/or promote their item listings from their website into the items database 22 and the system 10. For example, ABC Company may have their own website but may want to use the intermediary 16 to promote their items and generate more sales by listing all of their items in the intermediary's 16 items database 22. The system 10 can be configured to generate revenue from sending referrals from the intermediary 16 to the seller's own website or store and/or charge a commission fee for sales generated from buyers 12 who found the seller's 14 item on the items database 22 but purchased the item from the seller 14 on the seller's 14 own website. Various help pages and instructions 169*a*, 169*b* can assist the seller 14 with choosing an option. A test drive link 170 allows a user to try out the selling tools without posting anything to the items database 22. A Continue Selling Your Saved Listing link 171 allows the seller 14 to continue a saved listing. The system 10 can be configured to include more or less options than illustrated in FIG. 12.

The main sell menu page can be configured to show all options available to a particular seller 14. For example, if a seller does not have a particular account type or membership required to use one of the features, that feature can be omitted or "greyed out" with a message telling them they must upgrade their account to use the feature. This provides an avenue to create awareness for the different products and always encourage users to upgrade their accounts.

An example of the single items 24 selling process is now described, which enables the user to quickly and efficiently list or post items in much less time than previous listing processes. The process comprises specifying the item being sold (which the system can automatically preselect the best category and sub-category the item should be sold in) as explained earlier, adding records details, uploading pictures and/or video and sending the item to the system 10. The selling page is organized into different sections to ensure the user enters all important information about their item in one area minimizing time, effort and scrolling operations. In this way, the user is given a certain amount of control over the selling process, while keeping the process consistent and in a logical work flow.

List a Single Item

In the following example, once the user selects the "List an Item" selling option 161, they are directed to the sell page shown in FIG. 13. Everything the seller 14 needs has been arranged onto one page to minimize scrolling and clicking and organized into different sections for convenience. The page is broken up into two main areas: The required details pane 176 and the optional details pane 175. The required details pane 176 contains details the seller 14 must complete in order to post the item to the items database 22. The optional details pane 175 is where the user can add extra, optional details to better describe the item for sale. It is also where the system 10 can add different applications and utilize third party applications. For example, the Vehicle Details tab 182 will utilize the AlsoFits application (explained later) to provide part compatibility data (data about other vehicles the item is compatible with). The user can save the listing by selecting the Save button 172 so they can complete it at another time. Saved listings appear in the main sell menu page under the Continue Selling Your Saved Listing link 171 shown in FIG. 12. During the selling process, the seller 14 may at any time preview their listing by selecting the Preview & Finish button 186 and can proceed to list or post the item or can abort the current listing by selecting the Cancel button 174.

The administrator 34 can modify the details in the required and optional detail panes 176, 175 by making global changes, that it for all types of items, or can modify the requirements for different descriptors. For example, some electronics such as relays or switches may require the seller to add a part number to their listing, whereas a fender would not require this.

The optional details pane 175 comprises one or more tabs 188 that can be configured, e.g. using AJAX (Asynchronous Javascript and XML), to prevent page refreshes when the appropriate tab 188 is selected in the optional details pane 175. Examples of suitable tabs 188 for auto parts includes without limitation: Item Details 181, Vehicle Details 182, Shipping & Payment 183 and Photos 184. The required details pane 176 may also comprise a tabbed configuration (not shown).

Figure 13:
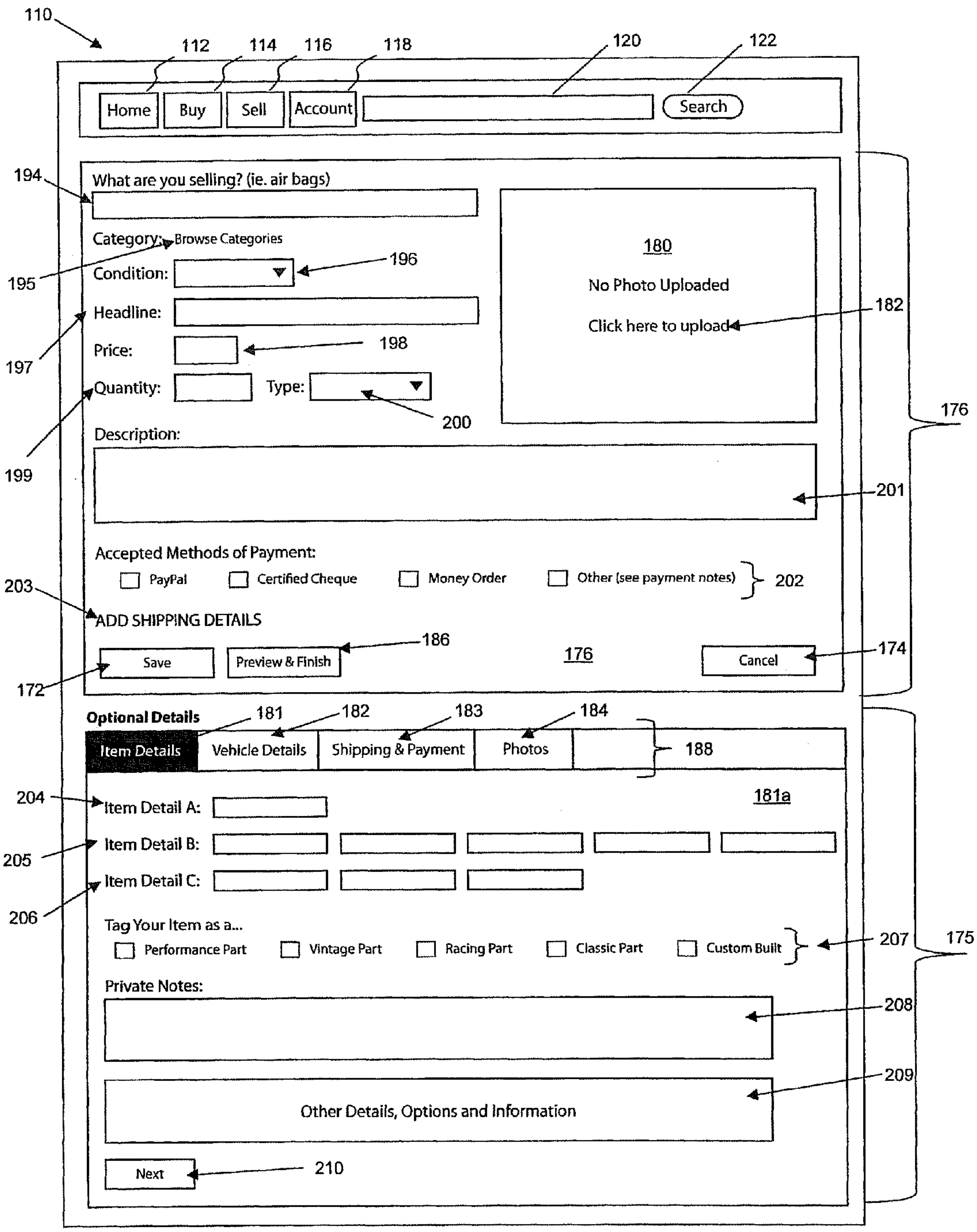
FIG. 13 is a screen shot of a single item listing page accessed by selecting the List an Item option in FIG. 12.

When the user first arrives at the sell page, as shown in FIG. 13, they may be given the opportunity to upload one or more pictures immediately by clicking either the "Click here to upload" link 182 in the photo preview box 180, or by clicking the Photos tab 184 to direct the user to the upload photos tools. If any photos have been uploaded, the first photo will be contained in the photo preview box 180, with the ability to edit the photos at any time. Allowing the seller 14 to upload their photos at any time in the selling process adds to the uniqueness of the selling tool. It has been found that by having a photo available to the user for referencing during the selling process makes it easier for the user to describe what it is they are selling. In this way, the seller 14 can upload the photos of the item before beginning to create the listing. This also allows the user to continually refer back to the photos as they are attempting to describe it for the listing. If the seller has uploaded more than one photo, the system may be configured to display Next and Previous buttons (not shown) to allow the seller 14 to browse through the different photos without leaving the required details pane.

Figure 14:
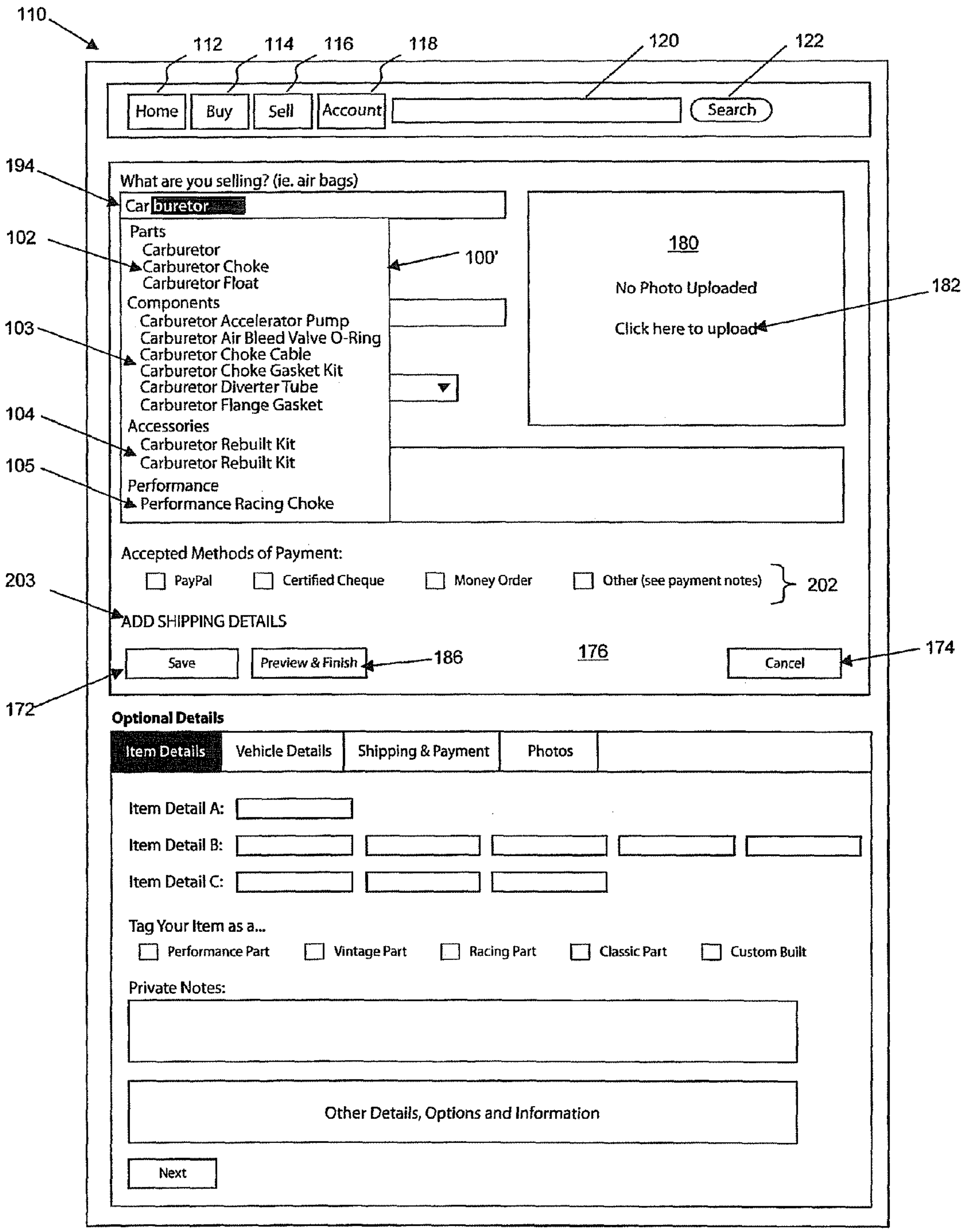
FIGS. 14 and 15 are screen shots of the single item listing pages during the selection of a descriptor, category and sub-category using the auto-fill tool and click boxes.

It has been recognized that the categorization of parts, components and accessories described above can be used to assist the user in finding and selecting categories and sub-categories 60*a*, in particular when selling an item. As described earlier, traditional selling processes often require that sellers have to manually choose a category and sub-category that best matches the item they are selling which can take time and may require many page refreshes. These traditional listing processes have been found to not be particularly intuitive and may be considerably slow, especially when a seller does not know what category their item falls under. The auto-fill tool 52 allows the seller 14 to type in the exact "item" they are selling and, if that item matches a descriptor in the main category database 44, the system 10 can automatically choose the category and sub-category 60*a* that best fits their item in one simple step. When the sell page loads, the user can immediately begin typing what they are selling in the "What are you selling" auto-fill box 194. FIG. 14 shows one use of the auto fill result 100 in the inline orientation. As explained earlier, the system 10 will automatically provide a list of descriptor items that best match what they are typing and organizes them into a "Parts" 102, "Components" 103, "Accessories" 104 and "Performance" 105 list. The user may continue typing what it is they are selling (e.g. carburetor, engine assembly etc.) and the auto fill result 100 will automatically update displaying the closest matching descriptor results as the typing continues.

Using the cursor keys or any other appropriate input or selection mechanism, the user would be able to select an item. For example, FIG. 14 shows a seller typing "Car" and the auto-fill tool 52 automatically highlights "Carburetor" in the "What are you selling" field 194. The user can hit the Enter key to accept carburetor. If they wanted to choose "Carburetor Float", they could continue typing the phrase until it matches the descriptor, or use the arrow down key to select it from the drop down list. The descriptor lists 102, 103, 104 and 105 can shrink or expand depending on what the user types and how many matches are found. It may be noted that various parameters may be used, such as requiring the user to type at least a certain number of characters before creating the auto-fill result 100.

Figure 15:
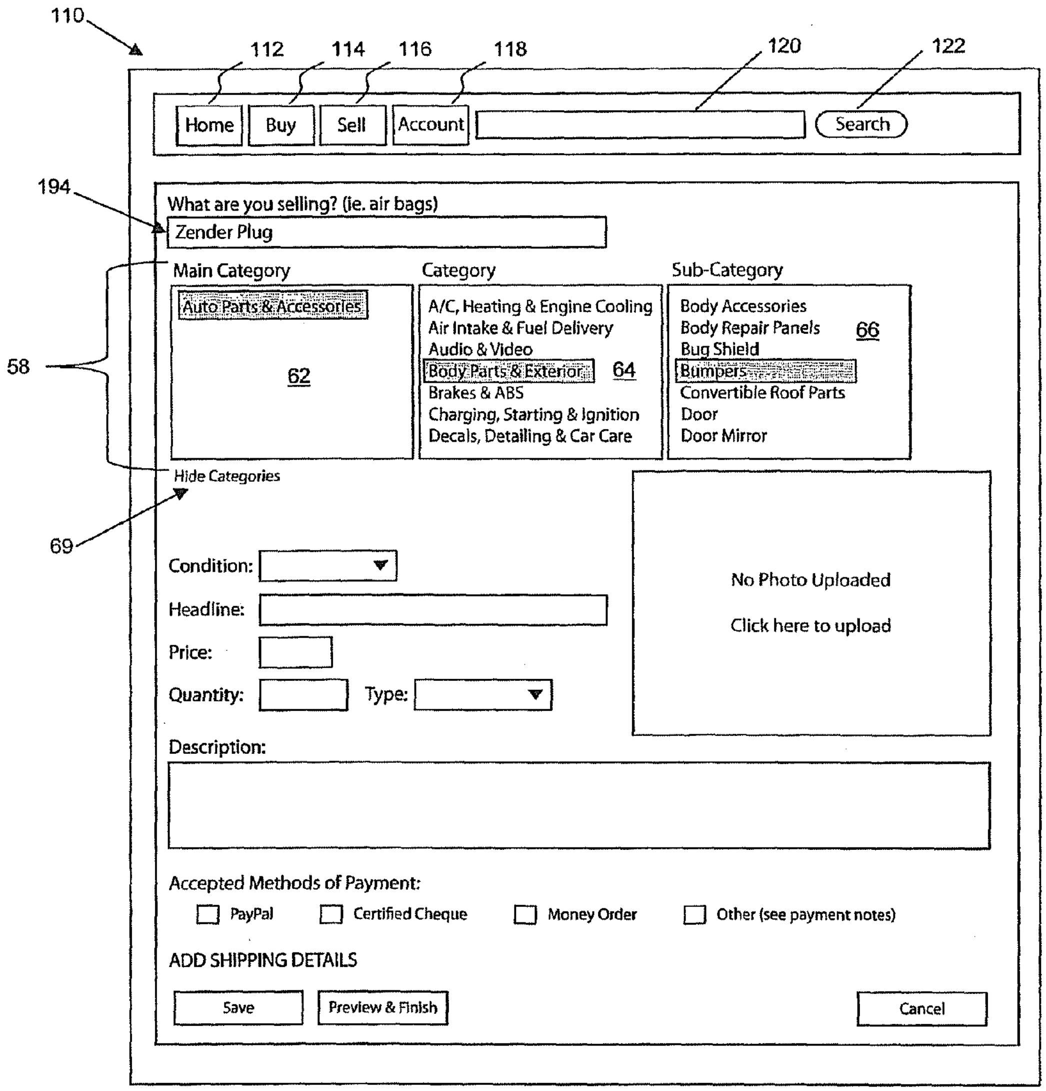

For scenarios where the user types an item into the What are you selling field 194 that is not found in the categorization database 20, no auto-fill results are shown and the user can continue typing. When an auto-generated category and sub-category 60*a* cannot be pre-selected, the seller 14 must manually choose them using any suitable search tools such as a series of click boxes 58 as shown in FIG. 15. The click boxes 58 automatically appear so the user can choose where to list their item. Once the user has chosen their category and sub-category 60*a*, they can either click the Hide Categories link 69 or navigate to one of the other fields such as condition 196 to automatically hide the click boxes 58. If the user wants to view the click boxes 58 again, they could click the Browse Categories link 195 shown in FIG. 13 to load the click boxes 58. Once the user chooses their category and sub-category 60*a*, the category path is displayed above the Browse Categories link 195 (not shown) to show the user which category their item will be placed in. This information can then be tracked and stored so that the administrator 34 can determine whether to update the main category database 44 by adding a new category, sub-category, descriptor or other maintenance task. For example, if the user typed in "Zender plug", nothing would appear in the auto-fill results list 100 because, in this example, "Zender plug" is not found in the main category database 44 and therefore, the category and sub-category 60*a* cannot be pre-selected by the system 10. The user would need to choose them, e.g. "Auto Parts & Accessories>Module, Switches & Wiring>Other" (or another suitable category). If the administrator 34 adds this information to the main category database 44, the next time a user types in "Zen", 'Zender plug' would appear in the auto-fill results 100 and the system 10 would be able to pre-select the category and sub-category for the user.

Additional embodiments may present the seller with pictures of parts and/or vehicles, either from the system's 10 custom database 23 or by a third party data provider (not shown). For example, the user may view a picture of a vehicle and click the headlight (in the picture) to automatically fill in the 'What are you selling' 194 field with 'headlight' and its associated category and sub-category 60*a*. The auto-fill tool 52 also utilizes the incorrect spelling database 23. This can be particularly helpful to a user that has misspelt their item name. For example, if the seller 14 typed in "O2 Sensir", the system 10 can still display "O2 Sensor" in the auto-fill result 100 by utilizing the incorrect spelling database 23. Although they spelt it incorrectly, they can choose the correct spelling from auto-fill result 100. The system 10 can also be configured to automatically correct the misspelled word/phrase after the seller 14 types it.

Once the user specifies what they are selling and chooses a category (if the system 10 did not do it automatically for them), they are brought to the condition 196 field. The condition drop down list 196 would display the condition the user preset in their selling preferences if the seller previously set it up. In this case, the user does not have to select anything further. If they did not save their condition 196 in their selling preferences, the user would use a mouse, arrow keys or other input mechanism 78 to make their selection from the drop down list. Some examples of conditions that can be selected may include without limitation: Used—Excellent, Used—Very Good, Used—Good, Used—Fair, Used—Poor, New—OEM (Original Equipment Manufacturer), New—Aftermarket, etc.

Referring back to FIG. 13, the user may be required to add a headline 197 for their listing. The headline 197 is one of the first details 294 users see when the item appears in the results page (shown in FIGS. 18 and 19). Other required details in the required details pane 176 include but are not limited to, the item price 198, the quantity of items for sale 199, the quantity type 200, in which the seller can specify if they are selling a case, a lot, a palette of items etc., and a description 201 of the item. The user must also specify how they wish to be paid from buyers 12. If the user preset the methods of payment 153 during their selling preferences, then the methods of payment 202 shown in the sell page would be preselected. If not, the user would be required to choose one or more methods of payment from the click boxes 202. Finally, in this example, the user is required to specify shipping information. If the seller preset their shipping preferences then they could disregard this requirement unless they wanted to modify their shipping options. If they did not preset their shipping preferences, the system 10 would automatically configure the listing with 'Contact Seller' as the shipping method for all locations 156, 157, 158 and 159. The Contact Seller method, as will be explained in more detail later, requires buyers to contact the seller for shipping quotes to their location. This is done to make the listing process very quick and easy. If the seller 14 wants to add shipping details for this listing, they would click the 'Add Shipping Details' link 203 to bring them to the Shipping & Payment tab 183. This is explained below.

Referring to the quantity field 199, if the user wants to sell more than one identical item in the same listing, they could enter a quantity greater than one. Depending on how many items the user enters into the quantity field 199 and what price they entered in the price field 198, a message may be displayed to ensure their listing is correct. For example, assuming that User A entered a quantity of 4 with a price of $65, the message may be: I am selling 4 items for $65 each (that would total $260 if all items are purchased). This prevents the scenario of a user that enters a quantity of 4 with a price of $65 who wants to sell all 4 rims for $65, not $260.

The item details tab 181 contains extra details in the item details pane 181*a* the user may want to add to their listing. Item Details A 204, B 205, C 206, Private Notes 208 and Other Details, Options and Information 209 illustrate examples of fields where the seller 14 may enter more details. The optional details pane 181*a* may include the following details, but is not limited to, brand, part numbers, sku numbers and private notes. They can be added, selected etc. using various tools or entry mechanisms 78 known in the art as exemplified above, e.g. auto fill lists, entry boxes, click boxes, drop down lists etc.

One particular unique option allows the user to 'tag' the item's "Attributes" 207. As explained earlier, an attribute is a particular characteristic of the item and is not a new category but a flag given to items for searching purposes. When a seller 14 tags their item with an attribute identifier, the item is automatically added to a tab in the Buy page 91 once the item is posted. For example, User A chooses the "Performance Parts" attribute. Once their item is posted, the item becomes searchable on the Performance Parts tab 86 in the Buy page. The administrator 34 can dynamically add, edit or remove attributes from the item details pane 181*a* which in turn, automatically changes the Buy pages tabs 91. For example, if the administrator adds a "Vintage Parts" athibute (not shown in FIGS. 8 and 9), a Vintage Parts tab would appear on the Buy page and all items flagged with that identifier would be listed therein. The seller can add more than one attribute to their item. For example, User A may choose to add Performance, Racing and Custom Built attributes 207 to their listing so their item would appear in three different tabs 91 in the Buy page. This makes it easy for buyers to find parts. If they are looking for racing items, they could look under Racing Parts etc. Some examples of attributes appropriate for auto parts may include without limitation: performance parts, vintage parts, racing parts, classic parts, custom built etc.

Figure 16A:
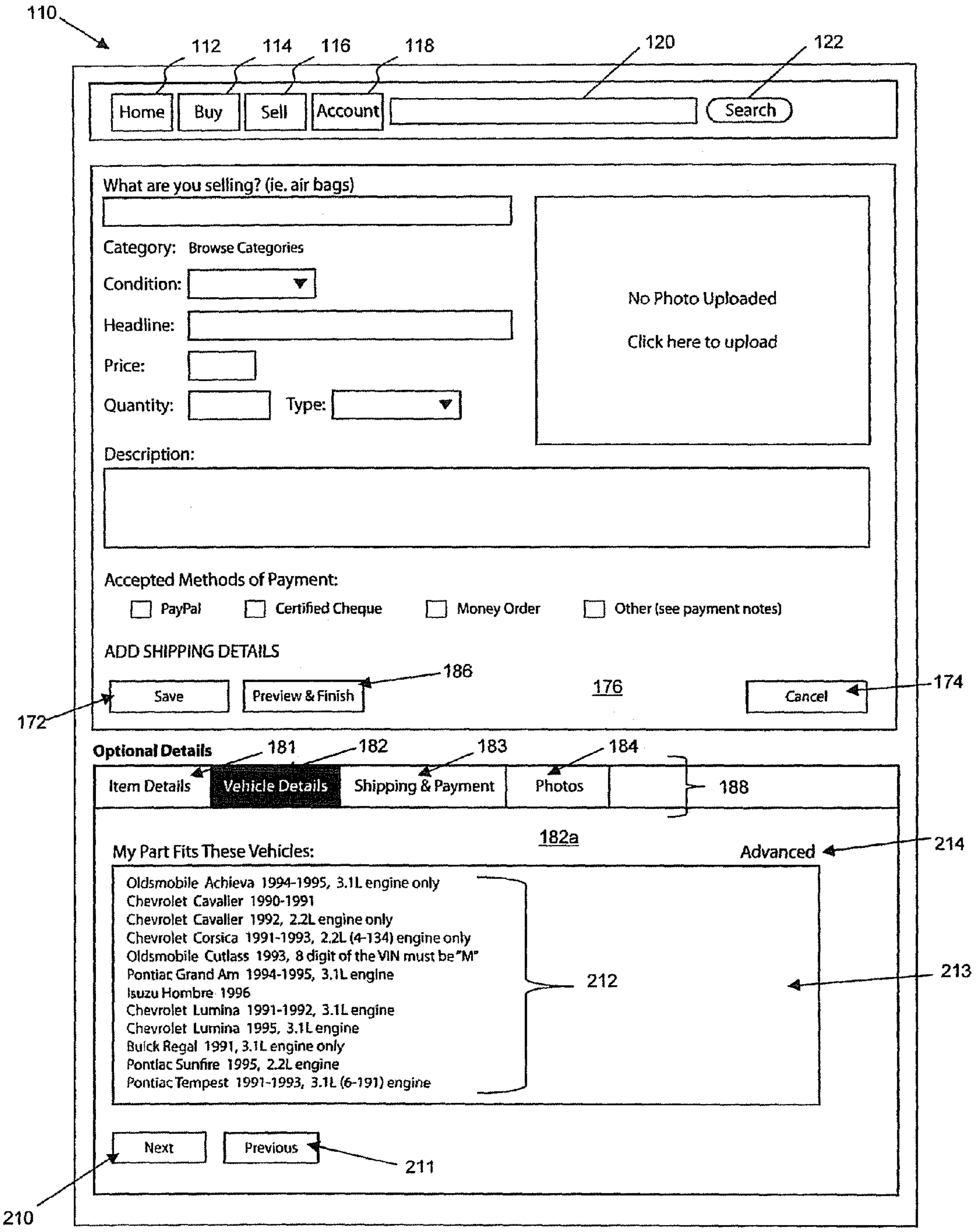
FIGS. 16A through 17 are screen shots of the Vehicle Details tab in the single item listing pages during the creation of an exemplary posting.

If the user wants to navigate to the next tab in the optional details pane 175, in this example Vehicle Details 182, they could either click the tab 182 or click the Next button 210. FIG. 16A shows Vehicle Details tab 182 which allows the user to add vehicle part compatibility data to their listing and associate the item they are posting to a particular vehicle or group of vehicles so that when a buyer 12 searches for their item, the system will search through the item's part compatibility data that the seller 14 has provided to find a match. If there is a match, the listing would appear in the search results. One of the main benefits of adding this information is to make it easier for buyers 12 to find sellers' 14 items. For example, if User A specified that their fender will fit a 1990-1994 Ford Tempo and 1990-1994 Ford Topaz, buyers 12 would have eight ways, in this example, to find the fender because there are four model years for two vehicles that the buyer can choose from. If the seller specified that their fender only fit a 1992 Ford Tempo, for the buyer 12 to find the fender, they would have to search specifically for a 1992 Ford Tempo. Searching for a 1991, 1993 or 1994 Tempo, or a 1990-1994 Topaz would not match the seller's 14 item and therefore not appear in the search results. It can be seen that the more part compatibility data that sellers 14 add to their listing, the greater the probability of their listings appearing in buyers' 12 search results.

This tool allows the user to quickly and efficiently add vehicle fitment data by simply copying it from another source (e.g. their catalogue, website etc.) and pasting it into the AlsoFits box 213 located in the Vehicle Details pane 182*a*. This also allows the user to add large amounts of data into their listing quickly without them having to add it individually one at a one time. The compatibility data is stored in the AlsoFits database 19. FIG. 16A illustrates that the seller has added 12 different compatibility data rows 212 for their item. For example, the first two rows indicate that their item will fit a 1994-1995 Oldsmobile Achieva with a 3.1 L engine as well as a 1990-1991 Chevrolet Cavalier. The AlsoFits database 19 allows the seller 14 to add their data in different formats (i.e. make, model, year range, notes; model, year, notes etc.) and then parses the data and stores it in the AlsoFits database 19 and in the seller's 14 listing so that it is searchable to all buyers 12 using all the search tools available to them (i.e. click boxes 146, text searches 120, make 83, model 82 and year 81 drop downs etc.). Data that is not readable, either because the vehicle is not found in the main category database 44 or because it is not in a format accepted by the system 10, is added to the item description 201 so that it can remain searchable using text searches 120. The system administrator 34 can review all the non-readable data and analyze it to determine if another format should be acceptable. The administrator 34 can then add the different format logic to the AlsoFits 19 database so the next time a seller 14 adds data in that format, it will be understandable by the system 10.

Figure 16B:
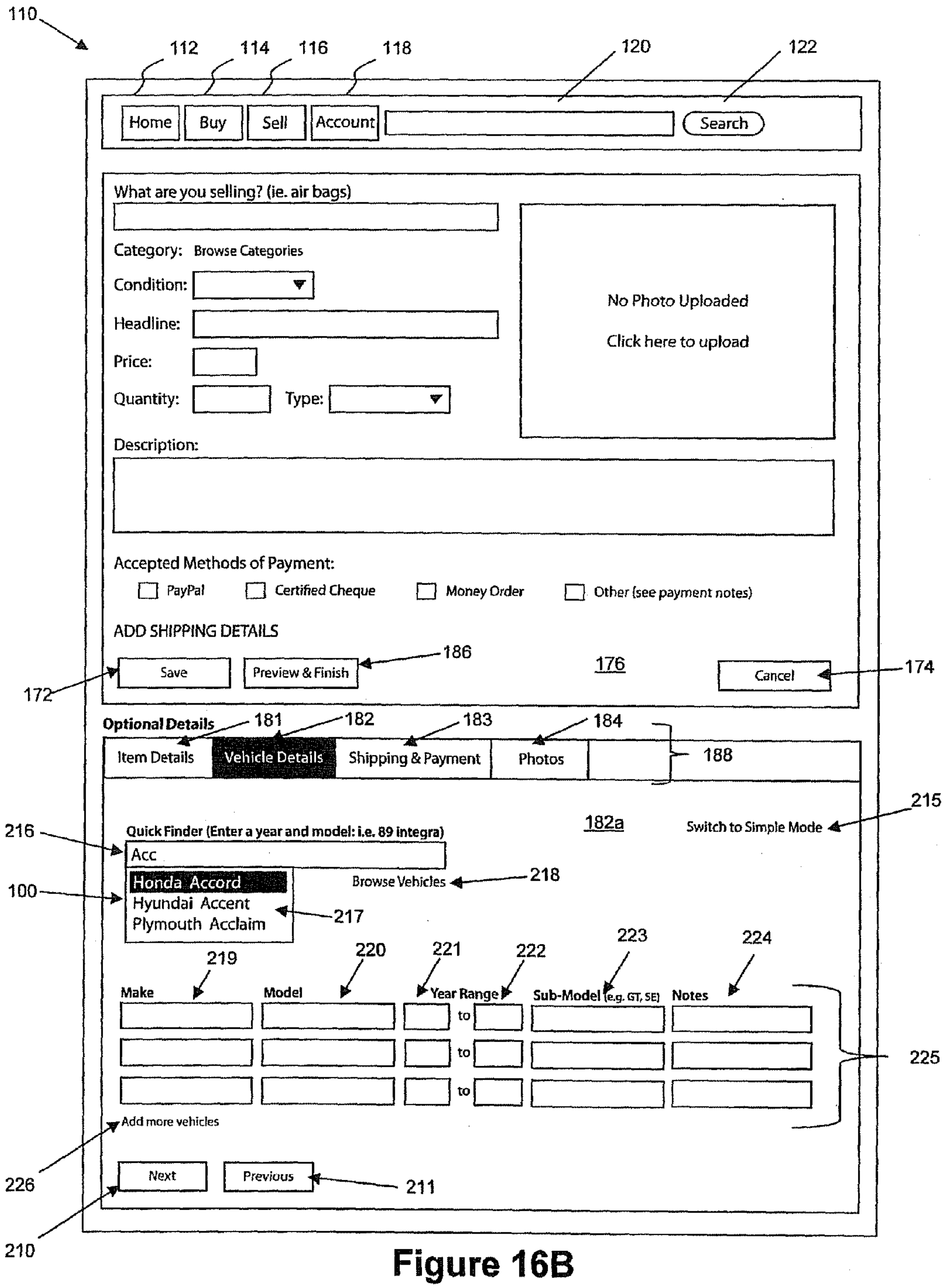
Figure 16C:
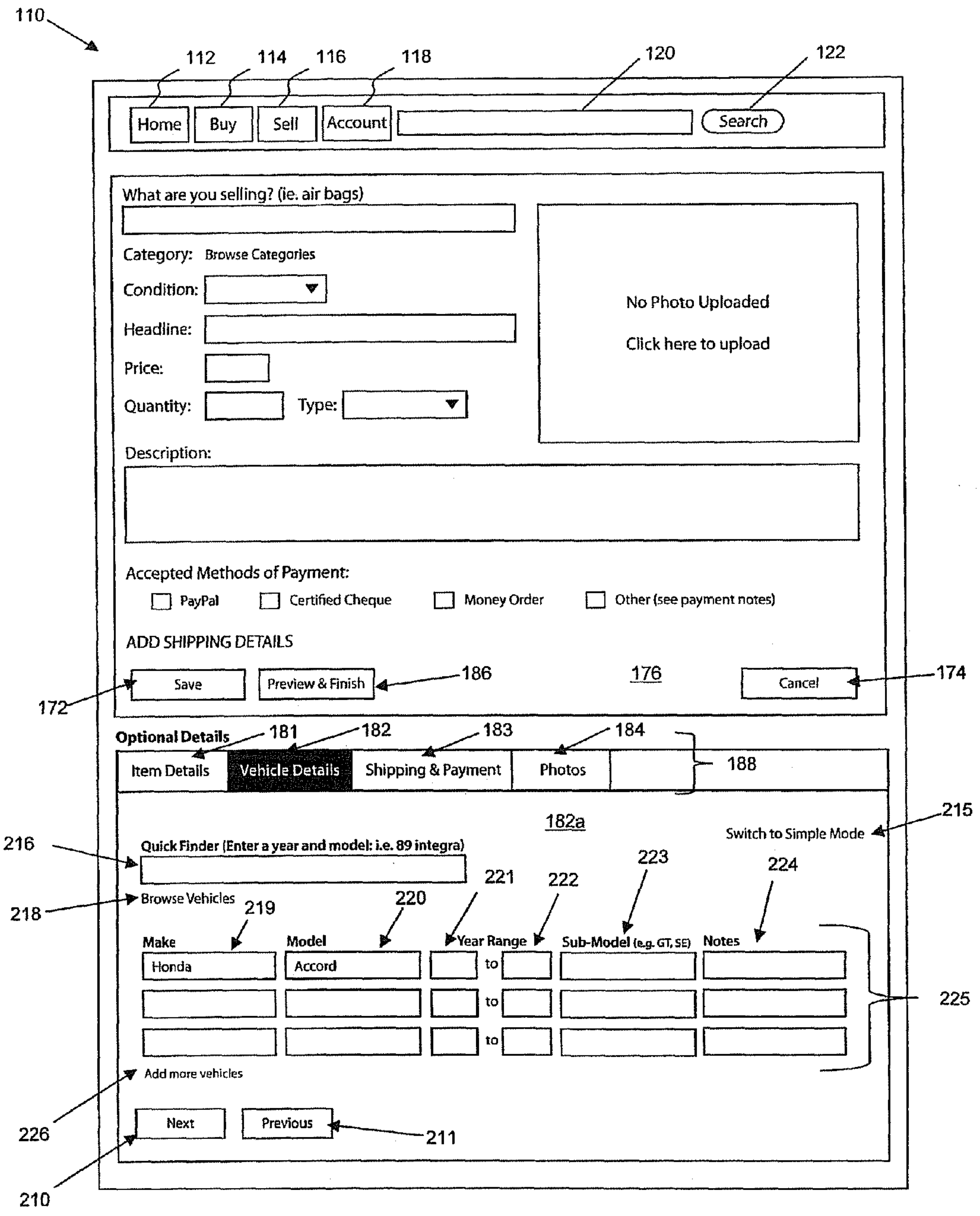

The advanced vehicle details page shown in FIG. 16B is accessible by clicking the Advanced link 214 (shown in FIG. 16A). This allows the seller 14 to add vehicle part compatibility data one by one into the individual make 219, model 220, year range 221, 222, sub-model 223 and note 224 fields. Each field except for the notes 224 utilizes the auto-fill tool 52 that, in this scenario, is directly connected to the vehicle portion of the main category database 44; that is, the auto-fill 52 searches vehicle related data, not descriptors. This page also utilizes the auto-fill 52 in the Quick Finder tool 216 which provides advanced searching capabilities for both simple matching and advanced queries. In particular, the Quick Finder 216 can search and cross-reference years, makes, models, sub-models and types (car, truck, van etc.)

from the main category database 44 with one another and display the matching results 217 quickly. For example, the seller 14 may type '08 Honda' in the Quick Finder 216 and it would display all models and sub-models available for 2008 Honda's. Another example would be typing in "d'elegance", would display Cadillac Brougham D'Elegance where Cadillac is the make, Brougham is the model, and D'Elegance is the sub-model. This is very useful when sellers 14 may not know the actual model name of their vehicle but know the sub-model as exemplified in the D'Elegance example. Each time the seller 14 arrives to the Advanced Vehicle Details page, the cursor flashes in the Quick Finder 216 allowing the seller 14 to immediately begin adding their data. In the example in FIG. 16B, the seller 14 typed "Acc" and the auto-fill result 100 displayed a matching list of results 217 for "Acc". The seller 14 selected Honda Accord using the arrow and enter keys or other input mechanism. FIG. 16C, shows that after the seller 14 chooses a result from the quick finder results list 217, the available data pre-fills in the appropriate fields in the data rows 225. In this example, the make 219 and model 220 are pre-filled. If the seller 14 added the year to their search criteria, the year would have been pre-filled as well. For example, if the seller 14 typed "98 Acc", the quick finder 216 would have displayed 1998 Honda Accord in the results list 217 and, if the seller 14 selected this, the year field 221 would have pre-filled with 1998. If the seller searches for and selects another vehicle from Quick Finder results list 217, the results would pre-fill in the next empty data row in the data fields 225. The quick finder results 100, 217 can be configured to add more or less details than illustrated in these examples.

Figure 16D:
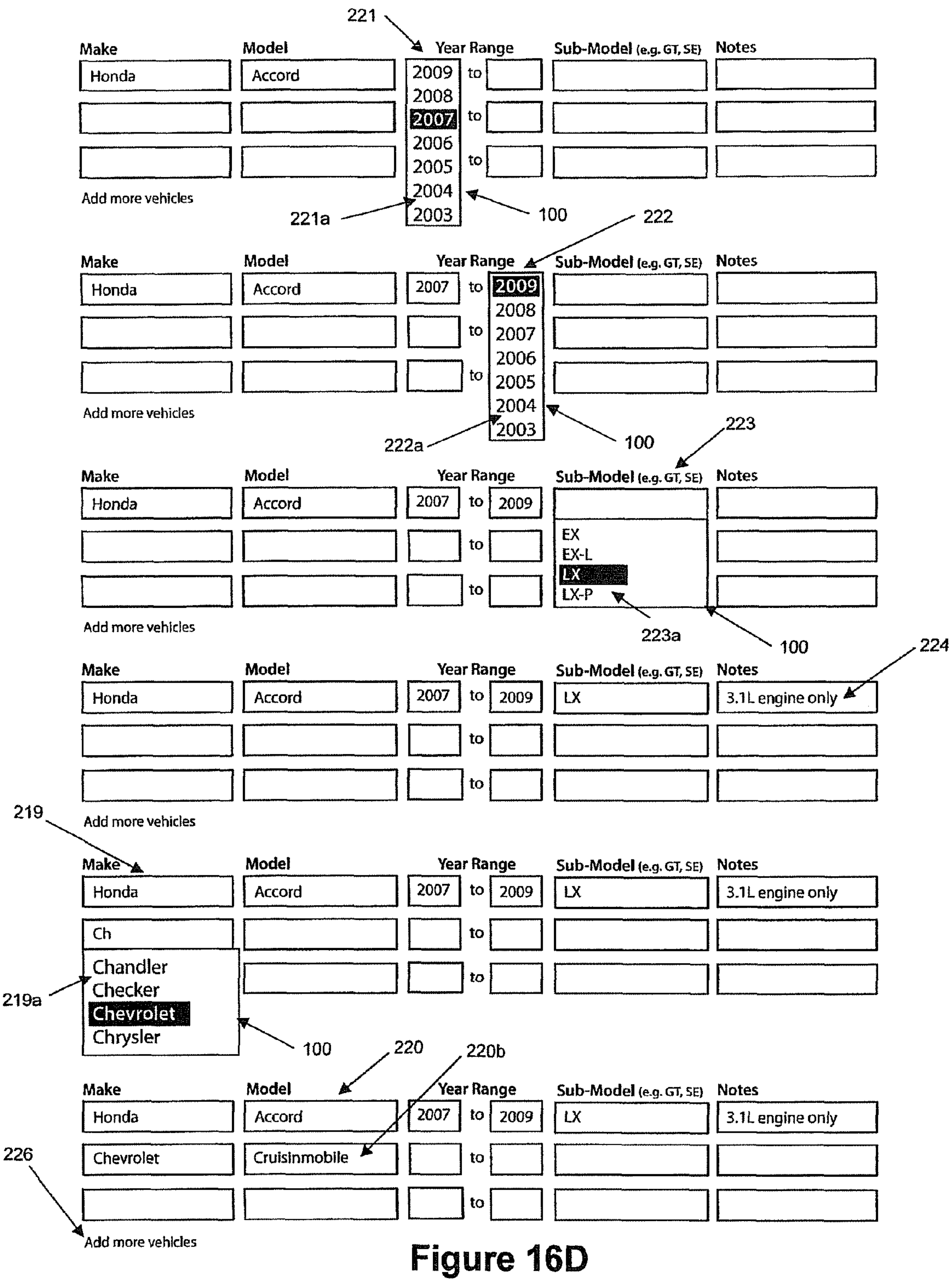

The seller 14 does not have to use the quick finder 216 to enter their data; they can enter it individually field by field. For example, to enter a make, the seller would type into the make field 219; to enter a model they would type it into the model field 220 etc. FIG. 16D shows the sequential work flow of the seller 14 adding the data field by field. In this example, the seller begins to type a year in the 'from year' field 221 and since the make and model are found within the main category database 44, the auto-fill 52 displays a list of years 221*a* that match the make and model. The user could arrow down and use the enter key to make their selection as explained in earlier sections. If the seller 14 wants to add a year range, they can enter a second year in the 'to year' field 222 and display another results list 222*a*. This allows the seller to add a year range such as 2007-2009, to their listing. The AlsoFits database 19 will therefore understand that the item in this example will fit a 2007, 2008 and 2009 Honda Accord. If the seller 14 wants to add a sub-model, they could begin typing in the sub-model field 223, or, as shown in the Figure, not type anything and use the arrow down key to see all the corresponding sub-models available for that make 221, model 220 and year range 221, 222. The system 10 is intuitive to know not display sub-models that were not available for the specified criteria (make, model and year range).

If the seller wants to add data not found in the auto-fill results 100, they may type it in and disregard the auto-fill results 100. This is illustrated in the model 220 field. Notice that the seller 14 chose Chevrolet from the make results list 219*a* in the second data row but no auto-fill results appeared for the model name "Cruisinmobile" 220*b*. This is because the model name "Cruisinmobile" did not match a Chevrolet model name in the main category database 44 however, the seller 14 was still able to enter their custom name. This is very useful in the event that a make, model, year etc. is not found within the main category database 44. The seller 14 can navigate between fields by using the tab key or other method.

Similar to the process for determining what the user is selling, the system 10 may record the compatibility data so that the administrator 34 could decide whether to add the vehicle data to the main category database 44 so that the next time a user types in, for example, "Cruisin" in the model field 220 associated with Chevrolet, "Cruisinmobile" would be displayed in the auto-fill result list 220*a* (not shown). The user could continuously use the Quick Finder tool 216 to add vehicle data to the fields in the next empty row. For example, in FIG. 16D, if the user searched for and selected a vehicle from the Quick Finder 216, the vehicle data would be added to the third data row because it is empty. If the user wants to add more vehicle rows, they could click the "Add more vehicles" link 226 to add more rows. The system 10 may be configured to include a delete button (not shown) to remove data rows.

Figure 17:
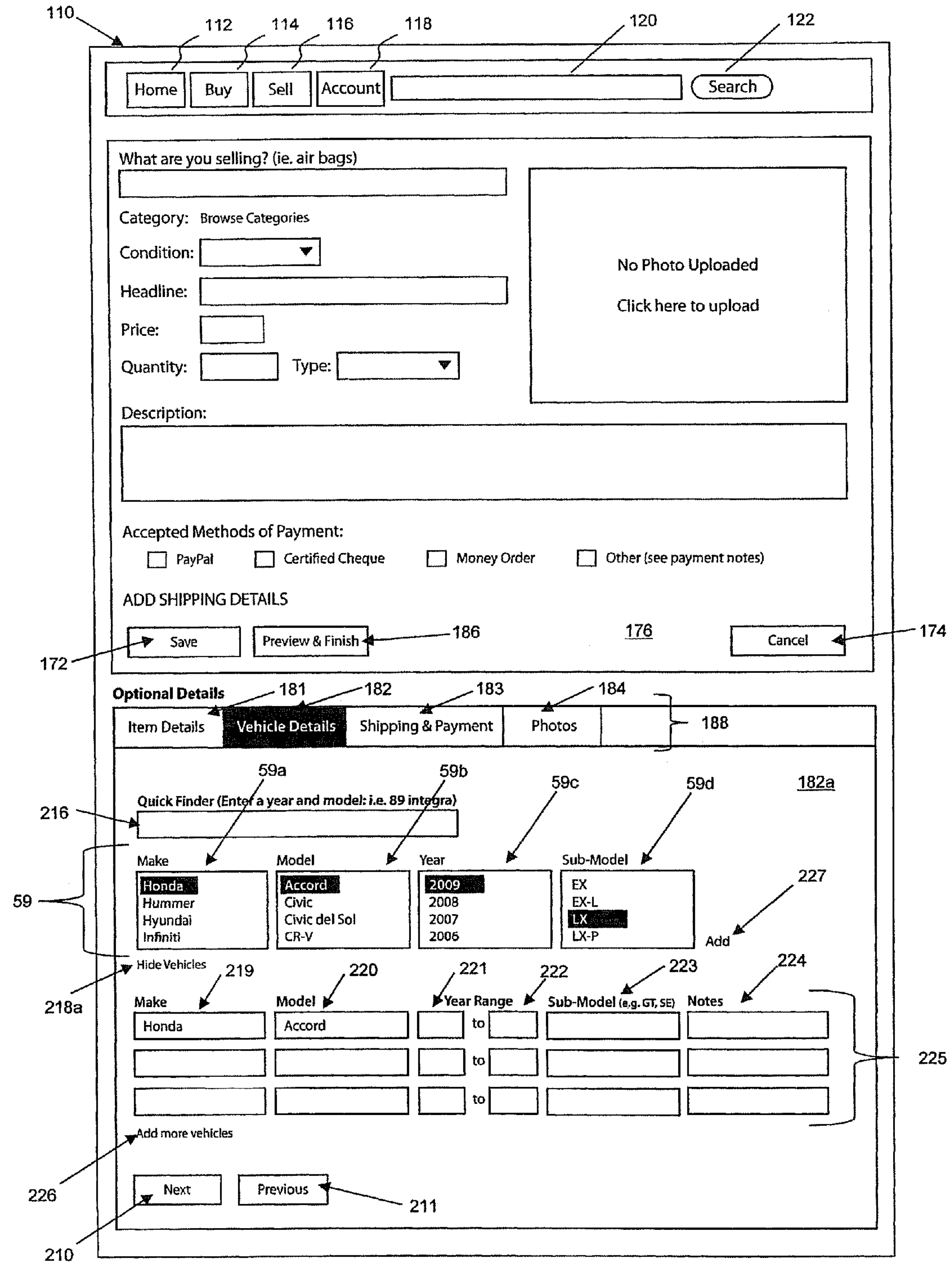

Referring now to FIG. 17, the user could also click the Browse Vehicles link 218 (shown in FIGS. 16B and 16C) to display the click boxes 59 allowing the seller 14 to browse through the list of vehicles stored in the main category database 44 as explained in the Buy page. To hide the click boxes 59, the seller 14 would click the Hide Vehicles 218*a* link. In this example, the seller 14 has selected Honda from the make click box 59*a*, Accord from the model click box 59*b*, 2009 from the year click box 59*c* and LX from the sub-model click box 59*d*. Once the seller 14 has made their choices, they may be required to click the Add link 227 to add the data from the click boxes 59 into their appropriate places in the data fields 225. It can be seen that sellers 14 have a wide variety of unique tools at their disposal.

Other AlsoFits tools, discussed later herein, can also be used to allow the seller 14 to specify compatibility data suggested by other users. For example, a compatibility list accumulated from multiple sellers' data may be presented to the seller 14 in the vehicle details 182 tab so they could quickly attach the other sellers' suggested compatibility data without them having to re-enter it. For example, once a seller 14 specifies that a fender fits a 1987-1991 Ford F-150, F-250 and F-350 pick-up truck, when another seller 14 creates a listing to sell a fender that matches this criteria, the compatibility data the first seller 14 added appears allowing the second seller 14 to add this data to their listing quickly without them having to re-enter the same data the first seller 14 did.

The use of the auto-fill tools 52 and the Quick Finder 216 can be particularly advantageous. For example, assume User A types "Ford" in the make field 219 or selects it from the Make click box 59*a* when browsing vehicles then tries to find "Topaz" in the model field 220 or model click box 59*b*. They would not find Topaz because Topaz is manufactured by Mercury (part of the parent company of Ford which may cause the confusion). This may cause frustration and reduce the user's experience. Using the quick finder 216, the user could type in "Topaz" and find Mercury Topaz from the auto-fill results list 217. The main category database 44 knows this information from the ACES and intermediary databases 40, 42. This method reduces the discrepancies with different manufactures that are part of the same corporation. For example, Ford and Mercury or GMC and Chevrolet are different divisions of the same corporation.

The auto-fill tool 52 and the Quick Finder 216 can be configured to recognize years in various ways. For example, it can be configured such that the user can either type in the first two digits of the year, e.g. "19", or simply the last two digits of the year to show the year results e.g. "90". For example, by typing "90", the system 10 will recognize it as either 1990 and/or 1890. Other considerations may be made, such as the reoccurrence of short-hands like '02 when a century changes. For auto parts, the digits of the years 2000 and forward may appear as '00, '01, '02 etc. There should not be issues with confusing "02" between '1902' and '2002' since the make and model names available in 2002 would be different than those in 1902.

When implementing the system 10 for auto parts, a few considerations may be noted. For instance, if the user skips the make 219 and model 220 fields and enters a year in the year field 221, then returns to the make 219 and model 220 fields, the system 10 should be configured to only list makes and models that were available in that year. For example, if a user typed 1987 in the year field 221 and types "Ford" in the make field 219 and "C" in the model field 220, the results list 220*a* will show Crown Victoria. If the year was entered as 1995, the model results list 220*a* adds Ford Contour since the Ford Contour was first manufactured in that year. This feature is particularly advantageous as it prevents users from searching for parts for a vehicle that did not exist in the chosen year. Parameters can be set to control how results are displayed. For example, users may be required to type at least "one" character before the auto-fill result 100 will display. It may also be noted that the placement of the fields can be made to guide the user through the listing process and avoid common pitfalls. In the auto parts example, the make and model fields 219, 220 appear before the "Year" field 221. This is because it has been recognized that users often make more mistakes with the year than with the make or model. For example, if a user chooses 1995 as the year of their vehicle, Tempo (the model) will not appear in the results since it stopped being made in 1994. Information of this kind can be determined from the categorization database 20.

Figure 18:
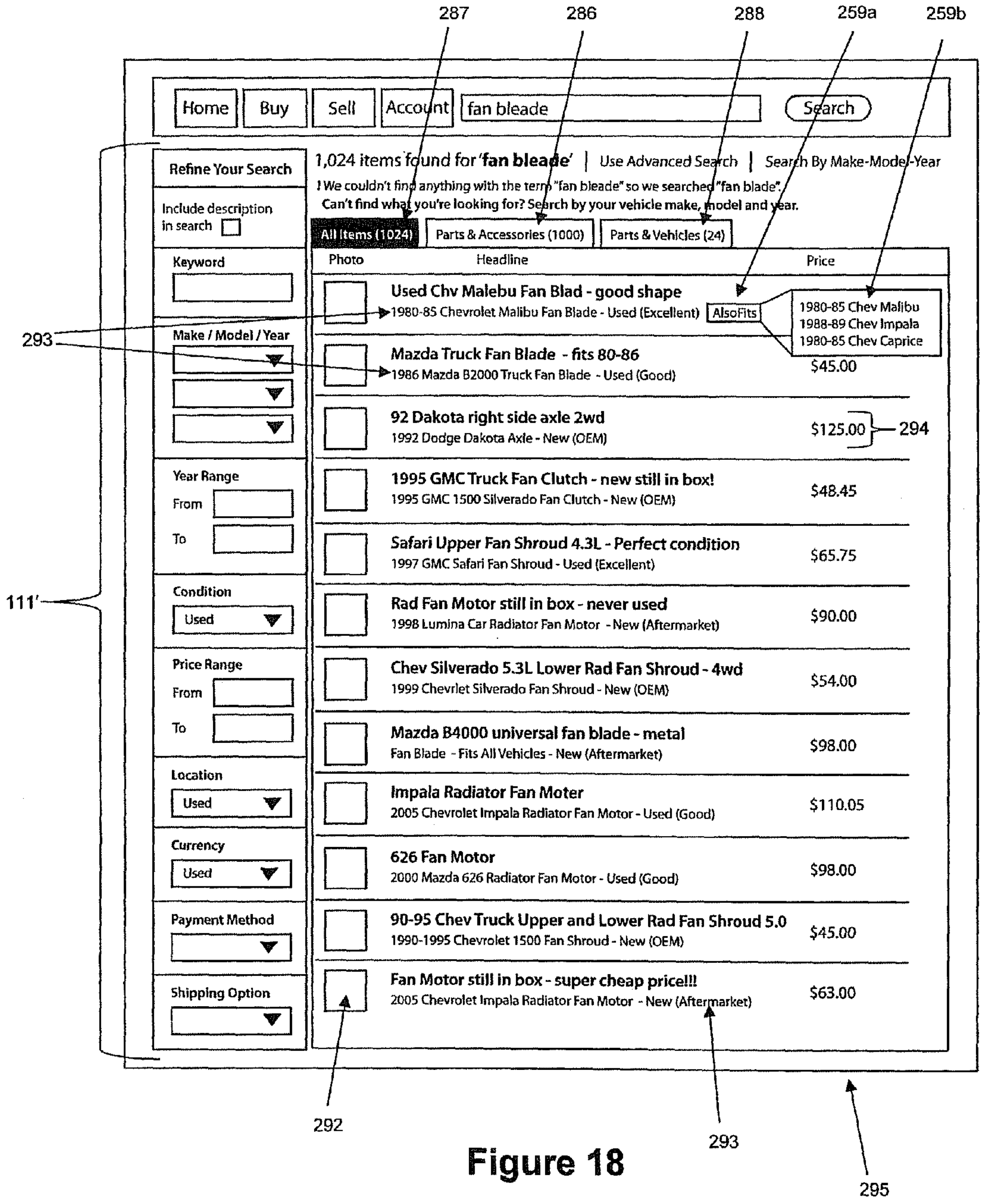
FIG. 18 is a screen shot of the main results page.

Referring to the headline field 197, the system 10 may be configured to automatically generate a sub-headline 293 to improve searching as shown in FIG. 18. For example, if User A entered the following data: What are you selling 194: 'Fan Blade'; Make 219: 'Mazda'; Model 220: 'B2000'; Year 221: '1986'; Condition 196: 'Used—Good', the auto-generated sub-headline 293 could be: "1986 Mazda B2000 Fan Blade—Used (Good)" as shown in the second result in FIG. 18. The sub-headline 293 can therefore be used as a secondary title allowing the user to give more information about the item and thus improving searching. If the seller specified that their vehicle can fit more than one year, the auto-generated sub-headline 293 can be configured to show the year range as shown in the first result in FIG. 18 (1980-85 Chevrolet Malibu . . . ). Furthermore, the auto-generated sub-headline 293 can improve searching especially when a seller 14 makes spelling mistakes in their headline 197 or leaves out important information. For example, the first listing in FIG. 18 shows the seller 14 spelt "Malibu" incorrectly. If a buyer 12 searched for "Malibu", this result may not have appeared because the seller 14 typed "Malebu". As well, the seller 14 in this example, typed "Chv" as a short form for "Chevrolet". Most buyers 12 will not search for the term 'Chv'; they would search 'Chevrolet'. However, because the auto-generated sub-headline 293 included the full spelling for Chevrolet and spelt Malibu correctly, the listing would appear in the search results. Another example can be seen at the last listing shown in FIG. 18. The seller 14 in this example did not include any vehicle details so a buyer's 12 search would likely not find this listing. The auto-generated sub-headline 293 automatically included the vehicle data so the listing would be searchable. It can therefore be seen that as more detail is entered into the listing, the system 10 can intelligently assist the user by creating automatically generated details.

If the seller 14 added part compatibility data to the listing as explained above, an AlsoFits button 259*a* would appear in the listing results 294 allowing users to either mouse over or click the button 259*a* to display the also fits information box 259*b* showing the part compatibility details. This makes it easy for the buyer 12 to determine if that item would fit their application.

Continuing with the auto parts example, once vehicle data is added in the vehicle details tab 182, the system 10 may present the seller 14 with additional vehicle and/or item questions derived from the questions database 23 giving the seller 14 the option to add more details to describe their item. Questions regarding "Engine size, Body Style, the type of Transmission" are some general examples. It should be noted that the terms "questions" and "questions database" are general terms used to encapsulate questions, features, options etc. and does not necessarily mean that the seller 14 will be asked a "question". They may be presented with a list of options and asked to choose any of the options that pertain to their item. For example, if the seller 14 is creating a listing for a door, the seller 14 may be asked to specify if the door is from a two door or four door vehicle, or they may be presented with a list of options such as, power windows, manual windows, front door, rear door etc. The seller 14 could then choose which of those options pertain to their item. Further detail can be displayed that combine the vehicle data (provided by the seller 14) and the descriptor to form specific targeted questions for that exact item and vehicle. For example, if a seller 14 is selling an engine from a 1990 Ford F-150, the system 10 may ask the seller if their engine size is 4.9 L, 5.0 L or 5.8 L. Some questions and answers may be extracted from the ACES database 40 while others can be extracted from the intermediary's custom questions database 23. The system 10 can utilize drop downs, click boxes, text boxes and other entry tools for the seller 14 to add their data. These questions appear in the vehicle details tab 182 below the compatibility data (not shown in the figures). The user can answer the additional questions or skip them as they are optional.

The system 10 can also be configured 10 to integrate other third party databases to pull in their questions. For example, the system 10 may integrate with the Hollander Interchange System provided by the Solera Company. Their interchange system can be integrated so that when a user lists an item from a vehicle that matches their database, their questions can be asked allowing the seller to create very detailed, compatibility rich listings. For example, the Hollander System may ask the seller 14 to choose which line applies to their 1990 Ford F-150 engine:

| | | |
|---|---|---|
| 1. | 6-300 (4.9L, VIN Y), | AIR in head, w/E40D |
| 2. | | w/o E40D |
| 3. | | AIR in manifold, w/E40D |
| 4. | | w/o E40D |
| 5. | 8-302 (5.0L, VIN N) | |
| 6. | 8-351W (5.8L, VIN H) | |

Figure 19:
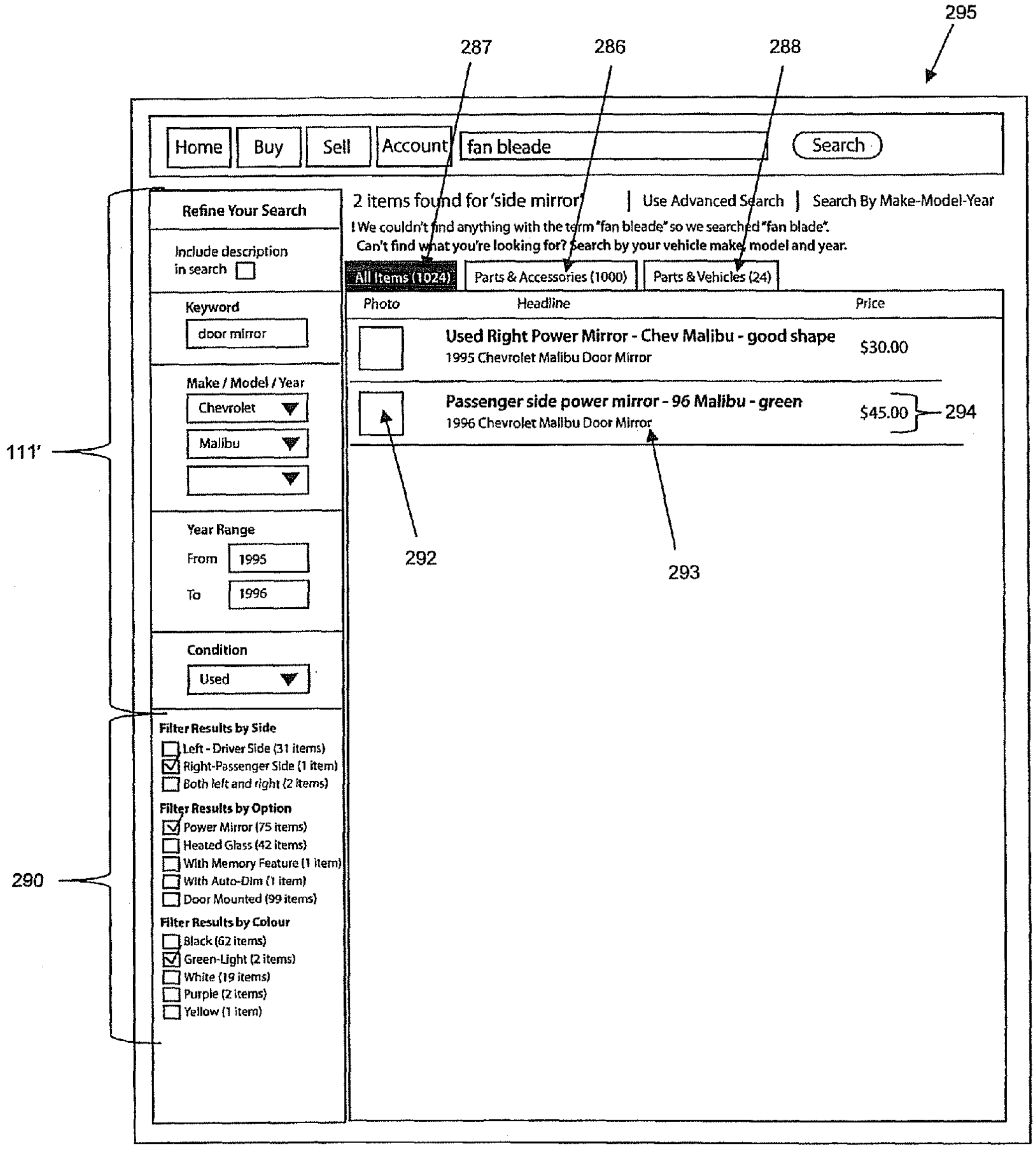
FIG. 19 is a screen shot of the results page illustrating a user using advanced search filters to filter the results list.

As mentioned earlier, the questions and answers presented to sellers 14 can assist users in searching particularly by allowing buyers 12 to filter their searches with the answers sellers 14 provided during their listing creation. For example, assume Seller A was creating a listing for his door mirror and was presented with three questions: 1) Which side are you selling? The right? The left? Both sides?; 2) Which options, if any, does this mirror have?; and 3) What colour is the mirror? FIG. 19 shows how the answers to these questions can appear in the search filters 290. In this example, a buyer 12 has chosen to filter his search by displaying all Right-Passenger Side, Light Green Power Mirrors. The brackets beside each filter 290 display the number of items available with that criteria. In FIG. 19, there are 75 mirrors that are power, two that are light green in colour and 1 from the right-passenger side. When buyers 12 filter their search using the search filters 111, 290, the listing results change to display the items that match the filter criteria. FIG. 19 is an illustration only and the advanced filters may be presented in an alternate way.

Figure 20:
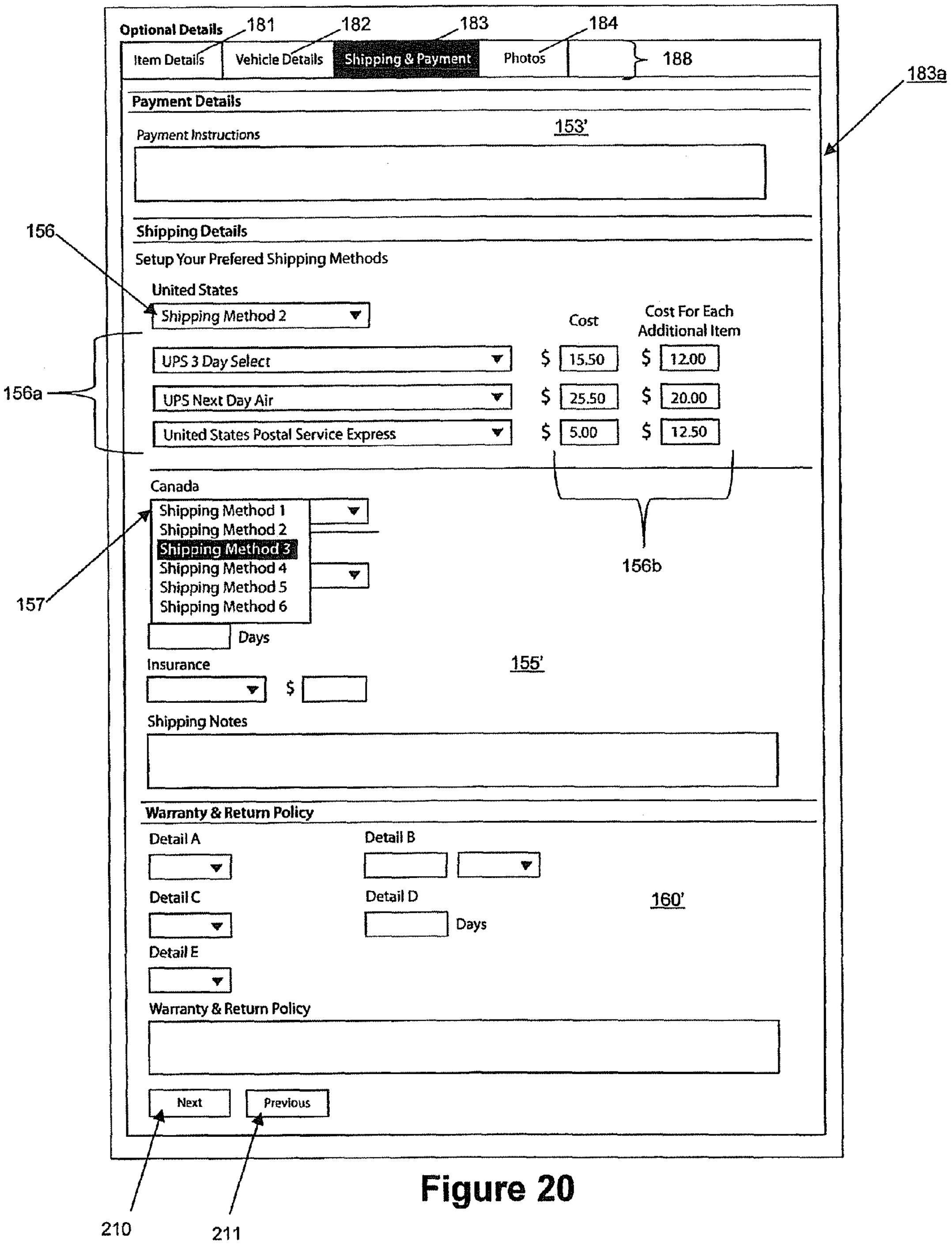
FIG. 20 is a screen shot of the Shipping & Payment tab in the single item listing pages during the creation of an exemplary posting.

Turning now to FIG. 20, the Shipping & Payment tab 183 displays information similar to that shown in the selling preferences. It should be noted that in this figure, for illustrative purposed only, the required details pane is not shown. In this tab, sellers 14 can specify how they will ship their item to buyers 12. As mentioned earlier, Canadian and US sellers 14 may choose different shipping methods to buyers 12 in Canada, the United States and international buyers 12. If the seller 14 is not from Canada or the US, they would have a fourth option allowing them to specify their shipping method to buyers in their own country. For example, if the user is from Australia, they can specify a shipping method for shipping within Australia, shipping to Canada, the United States and shipping internationally. This unique tool allows the seller 14 to be flexible and "mix and match" their shipping options to different geographic regions. For example, the seller 14 in Australia may want to offer free shipping to buyers 12 within Australia, offer a flat shipping rate to buyers 12 in the United States, use calculated shipping (using UPS, Fed-Ex, the United States Postal Service etc. to automatically calculate the shipping price based on the buyer's location and weight and dimensions of the packaged items), and finally require that international buyers 12 make individual shipping requests to the seller 14 so that they could determine shipping on a per user basis.

The different shipping methods can include but are not limited to: free shipping, no shipping, calculated shipping, flat shipping and contact seller. The seller 14 can choose the appropriate shipping method for each region using the drop down box for that region. For example, FIG. 20 shows the seller is selecting Shipping Method 3 from the Canada drop down list 157 and has chosen shipping method 2 from the United States drop down list 156. Once the seller 14 chooses their shipping method, the page displays the corresponding required data fields to allow the seller 14 to complete their shipping requirements. For example, if the seller 14 chooses "Free Shipping", they will be able to add up to three shipping services (i.e. UPS Ground, UPS Next Day Air, FedEx Overnight etc.) so that the buyer 12 knows how the item will be shipped. If more than one service is added, buyers 12 will be able to choose their shipping method when purchasing the item. If the shipping method is "Flat Fee" as illustrated in FIG. 20 for the United States 157, the seller can specify the shipping services 156_a_ and the cost for each service 156_b_. The seller 14 can also add a different price for situations in which the buyer 12 purchases more than one item. For example, FIG. 20 shows that the seller 14 specified that shipping the item by UPS 3 Day Select will cost $15.50 for the first item, and for each additional item, it will cost, $12.00. So if the buyer purchases three items, shipping will cost $39.50 ($15.50+$12.00+$12.00). Or, the buyer 12 could choose UPS Next Day Air and pay $25.50 for the first item and $20.00 for each additional item. If the seller 14 chose calculated shipping (not shown) they could enter the dimensions of the packaged item, choose whether the dimensions use the metric or imperial (cm/kgs or in/lbs) measurements and other related information. They could also choose up to three shipping services from a list of participating service providers provided by the administrator 34. For example, UPS and the United States Postal Service may be configured so that the seller 14 could use these services to automatically calculate the shipping price based on the packaged item dimensions and the buyers location.

The last shipping option, in this example, is Contact Seller. This is a unique shipping option available to sellers 14 that allows them to leave out the shipping price so that they could quickly complete their listing. Buyers 12 interested in their item would use the system's 10 unique messaging tools to request the shipping price for the item. This is especially attractive to sellers 14 who are listing a wide variety of items and do not have a flat shipping price for each item or, do not know the dimensions of the packaged item needed for calculated shipping. For example, assume User A is selling an engine. Because the engine is so large and requires special shipping and handling, it would be very difficult to determine the shipping price to buyers 12 when User A doesn't know where the buyers 12 are located. With the Contact Seller shipping method, when buyers view the detailed listing 236 shown in FIG. 21, in the Shipping price field, buyers 12 would see a "Request Shipping Price From Seller" link 238. Clicking this would bring the buyer 12 to a shipping request page where they could request the shipping price from the seller 14. When a seller 14 receives a shipping request, they are shown the buyer's shipping location (e.g. city, state, zip etc.) so they can calculate the correct shipping price for that particular buyer 12. The seller 14 may add up to three shipping services and prices similar to that of flat fee shipping shown in FIG. 20 in the United States region 156. Once the seller 14 responds to the buyer 12, the buyer 12 will have a Buy It button in their message (not shown) allowing them to purchase the item directly from the message and choose which shipping service they prefer. For example, Seller A may respond to a quote and give the buyer 12 two options: UPS Overnight Service for $40.00 or, UPS Ground for $18.00. The buyer 12 chooses UPS Ground and is then directed to the purchase confirmation page where the shipping price ($18) is added to the item price and insurance cost to give the buyer 12 a final total price for the item. The buyer 12 could then complete the transaction or send another shipping request to the seller 14 and ask for a different quote.

Figure 21:
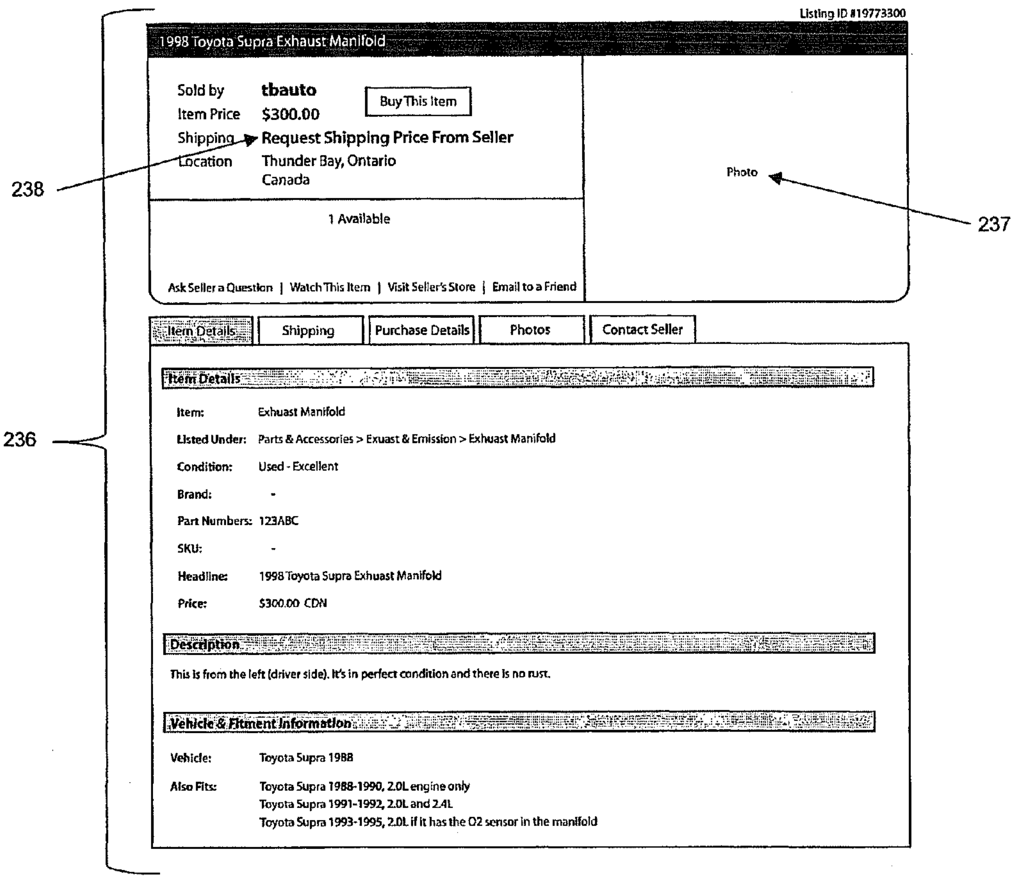
FIG. 21 is a screen shot of a detailed listing for an item with no shipping cost specified accessible by searching for and finding a single item.

It should be noted that the detailed item listing 236 shown in FIG. 21 is one example of the listing layout.

If the seller 14 had previously setup their selling preferences, all fields that had default values set would be pre-filled and the seller 14 would have the opportunity to review them and make any necessary changes they wish to reflect their listing. If the seller 14 does not make any changes to their details, the seller 14 could click the Next 210 or Previous 211 buttons to navigate to another tab or click any of the tab names 188 to continue adding optional details to their listing. If the seller 14 makes changes to their existing selling preferences, they can click on the "Save" button (not shown) to save the preferences for future listings. In this way, the user can update their preferences if they notice something that should be updated during a listing and would not have to remember to go back to the main preferences page to do so.

Figure 22:
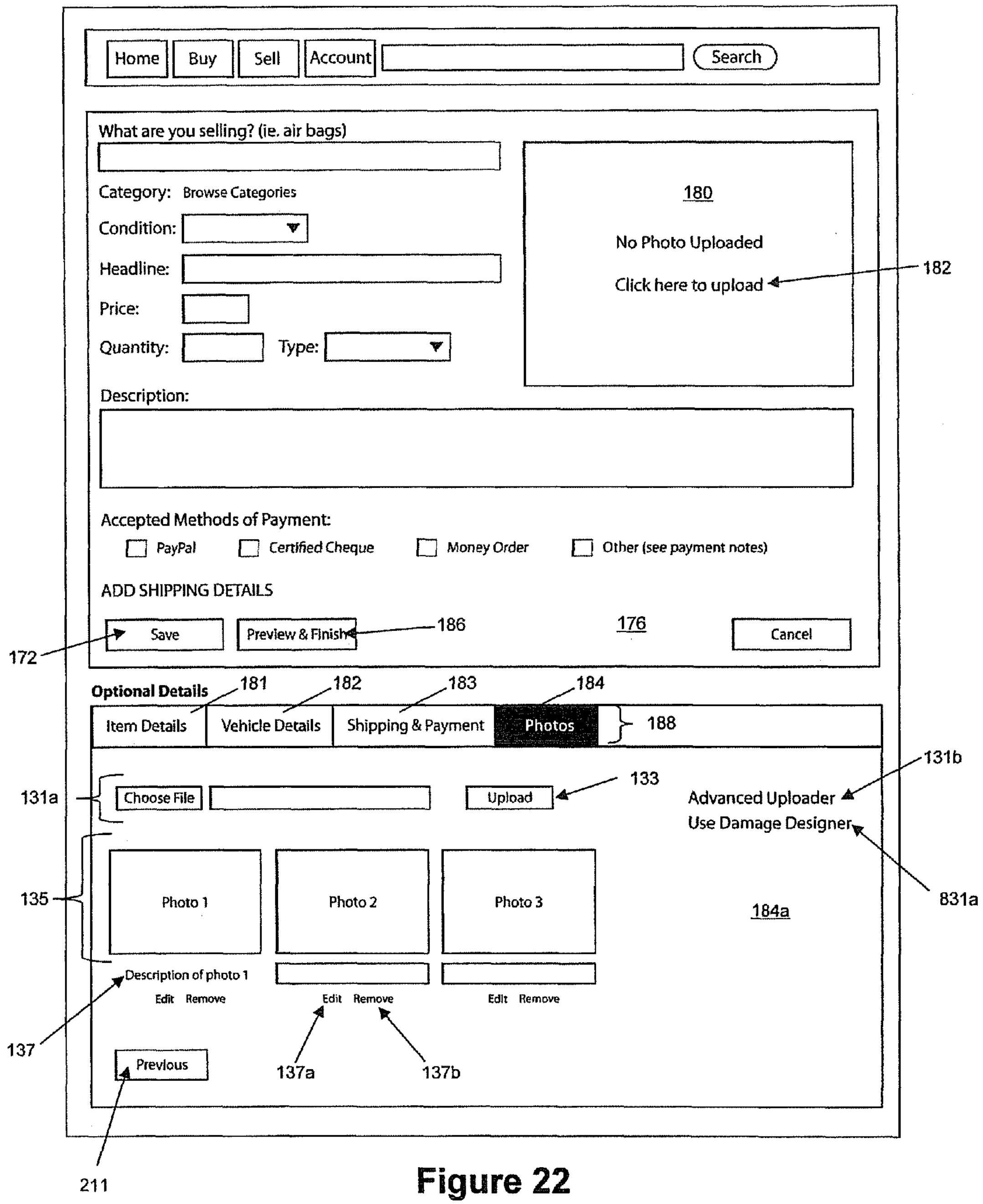
FIG. 22 is a screen shot of the Photos tab in the single item listing pages during the creation of an exemplary posting.

Turning now to FIG. 22, which, in this example shows the Photos tab. The seller 14 can upload one or more photos at a time using the simple uploader 131_a_ or use the advanced uploader (not shown) by clicking the Advanced Uploader link 131_b_. This allows the seller 14 to browse their computer for pictures and video and choose multiple files to upload at the same time. The seller 14 may also use the Damage Designer to mark-up the images, as will be discussed later, by clicking the Use Damage Designer link 831_a_. When the upload button 133 has been selected, the pictures are uploaded to their listing and displayed in the picture review area 135. Once the files are uploaded, the seller 14 can add more pictures, remove pictures, add a description 137 to a picture and other options. When adding a description 137 to a picture, it appears under the picture when being viewed in the photo preview area 180 in detailing listing 236. To change or remove a description, the seller 14 can use the Edit 137*a* and Remove 137*b* links under the description. The first picture in the picture review area 135 will be the picture displayed in the photo area 180 of the seller's 14 item listing and displayed in the photo area of the detailed listing 237 shown to buyers 12, illustrated in FIG. 21, and displayed as a thumbnail image in the results page 292. By clicking the Display in Results Page link (not shown), the seller 14 can make any picture the one to be displayed first. Another option that can be included is an option to allow sellers 14 to upload multiple pictures at the same time and store them under their "My Account" 118. For example, another tab can be included called "Tool Box" 523 from which the user is able to do a bulk upload of pictures to access the pictures at a later date. When creating a listing, rather than browsing for files in their computer, they could move them from their Account 118 to their listing, i.e. where no uploading is required. For users that will be listing many items, this feature would further speed up the listing process.

It has been found that the incorporation of photos into an item listing can be an important part of the actual listing. It may be noted that the first picture uploaded by the seller 14 can, at any time, be displayed in a full view in the photo review area 180 when creating a listing to help the user to create that listing. This can be useful since the actual person making the listing is not always the person who took the picture of the item. They may not know the condition of the item or may not remember the brand. The user may also be able to scroll through their pictures from photo review area 180 by using the "Next" and "Previous" button (not shown).

Figure 23:
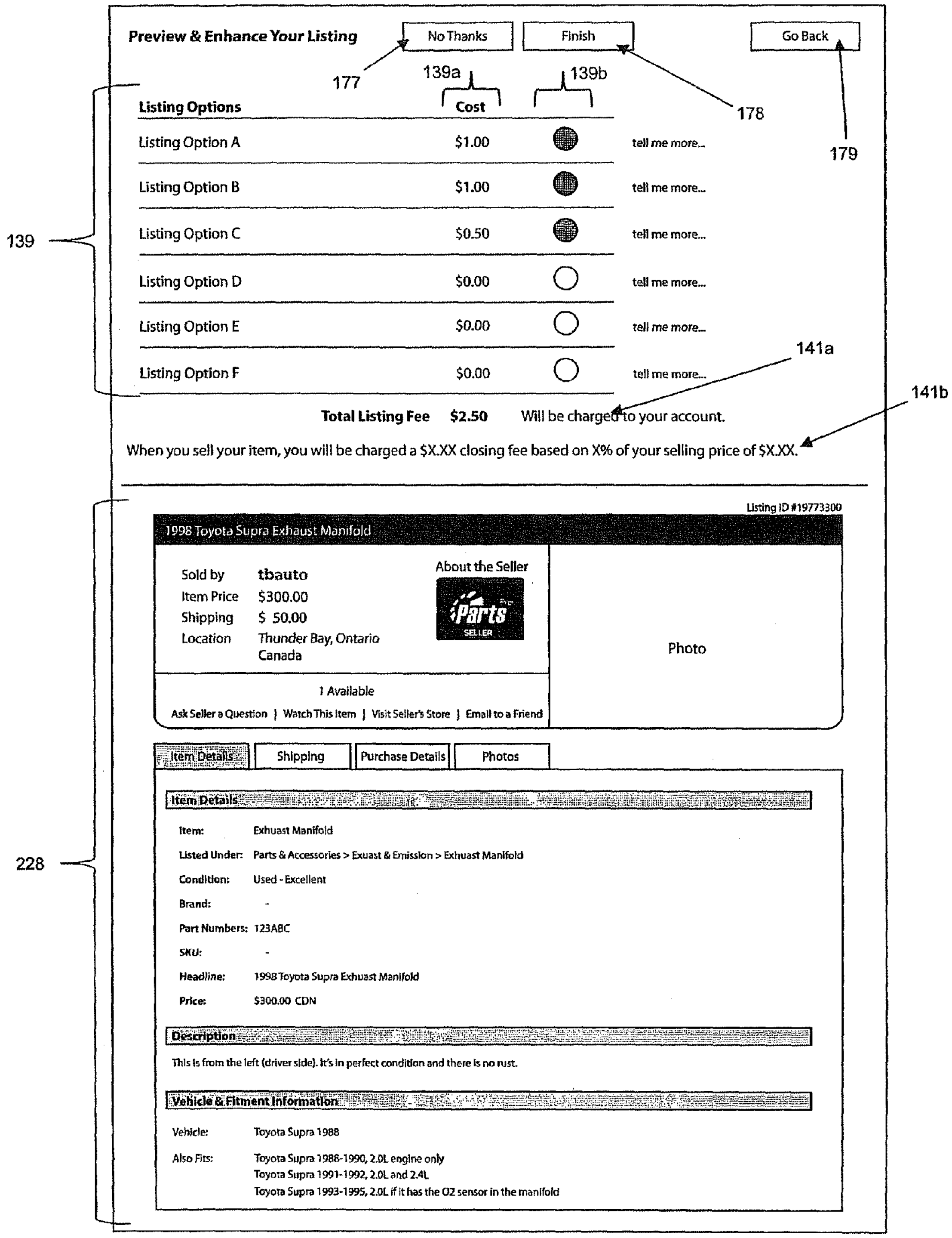
FIG. 23 is a screen shot of the Preview & Finish page for a single item listing showing a preview of the completed posting before uploading the item to the system.

Once the seller 14 is satisfied with their listing, they would click the Preview & Finish button 186 to bring the user to the page illustrated in FIG. 23. The system 10 would, in this example, display a preview 228 that includes all the details and photos for the user to peruse. The seller 14 would then have the opportunity to add special enhancements 139 to their listing for a fee. For example, Listing Option A may offer front page exposure while Listing Option B will allow their listing to appear at the top of each results page. The listing options are optional and if the user does not want to add any listing enhancements, they could click the No Thanks 177 or Finish button 178 to post the item. If they wish to make any changes to their listing, they could click the Go Back 179 button to return to the listing creation page. If the seller 14 wants to add the enhancements, they could review the enhancement, review the cost 139*a* and click the check box 139*b* beside the enhancement of their choice and the listing price 141*a* would update accordingly. The seller 14 may also be shown a confirmation indicating what the fee will be when the seller 14 sells the item 141*b*. When the seller is ready to post the item, they would click the Finish button 178 to post the item with the enhancements. The charges will be added to their invoice in their account 118.

List a Multi-Item

Referring again to FIG. 12, as noted above, a seller 14 can select the List a Multi-Item option 162 from the main sell menu. The Multi-Item option 162 allows sellers 14 to list their entire item, e.g. an entire vehicle, through the intermediary 16 in one easy listing without having to enter each and every constituent item 24 that makes up the multi-item 26. The system 10 can also be configured to automatically create individual item listings that resemble single items 24 and that are searchable and appear in the results page for the seller 14 based on the details from their Multi-Item 26. Referring again to the auto parts example, it has been recognized that sellers 14 are interested in selling multiple items from a vehicle but do not necessarily have the time or the patience to enter the parts one at a time. Being able to post an entire vehicle in one listing as a multi-item 26 is particularly attractive for both simplicity and time savings. In this way, the Multi-Item option 162 allows the seller 14 to receive part requests from prospective buyers 12 through a request and purchase interface, which will be described below.

To illustrate the effectiveness of the Multi-Item option 162, an example will now be provided. A seller 14 wants to sell the parts from a 1987 Chrysler New Yorker but does not know if and when they will sell the parts, so spending too much time listing parts is unattractive to such a seller 14. Instead, the seller 14 can create one listing for the vehicle using the Multi-Item option 162 by accessing the main sell page as shown in FIG. 12 and selecting List a Multi-Item option 162, which then initiates and displays the interface shown in FIG. 24. The seller 14 in this example can create a vehicle profile and specify the engine size, the colour, body style (2 Door, 4 Door, Station Wagon etc), power options (power/manual windows, power/manual locks), and other vehicle details to give potential buyers 12 a good understanding of the seller's 14 vehicle. If the seller 14 wants, he can also choose which parts to sell from the vehicle to prevent potential buyers 12 from contacting him about parts that are not available. This will be explained later.

A buyer 12 then, upon searching for a hood for a 1987 New Yorker, finds that no hood "listings" are returned through a regular single item 24 search. However, since the seller 14 has posted an entire vehicle as a multi-item 26, a 1987 Chrysler New Yorker multi-item listing is available. The buyer 12 can view the listing and see the detailed profile of the vehicle complete with pictures, video, a list of the available parts (if the seller 14 provided it), and other information posted by the seller 14. A special request form allows the buyer 12 to make part requests to the seller 14 of the New Yorker. The request can be sent to the seller 14 along with the city, province/state, postal/zip code of the buyer 12 so the seller 14 can determine the shipping costs for the requested item. The seller 14 then responds to the buyer 12 through a response form. When the buyer 12 receives the response, they can purchase the items directly from the response form if they choose. The seller 14 has then sold parts from the multi-item 26 without having to individually list any of the parts.

It may be noted that the List a Multi-Item option 162 can be a particularly attractive option for entities such as automotive recyclers, construction and heavy equipment used parts dealers and the like, who have hundreds and many times, thousands of vehicles (e.g. cars, machines, tractors, transport trucks etc.) in their inventory but do not have the time or the desire to list the parts available on these vehicles individually. The Multi-Item 26 also does not deviate from the current business processes of the industry.

Figure 24:
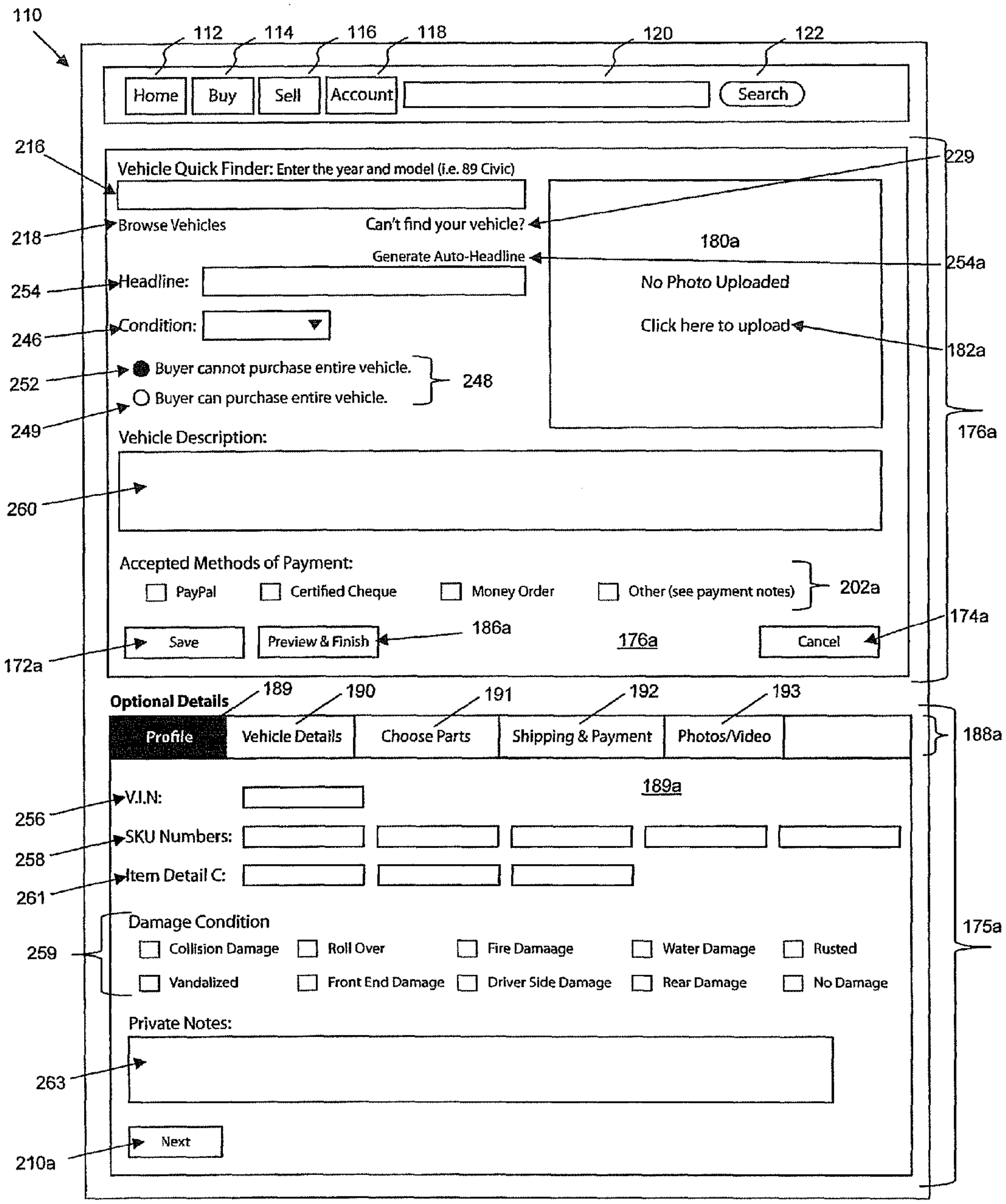

In the following example, there are two stages performed in creating a Multi-Item listing 26, namely creating a vehicle profile and choosing the parts that are available for sale. FIG. 24 shows the interface for creating a vehicle profile page, which is similar to the interface for sell an item 24 shown in FIG. 13 with different fields and options provided that are suited to posting a multi-item 26. In the following illustrations, features that are similar to those used in the single item 24 listings are given the same reference numeral with the suffix "a" for clarity.

A required details pane 176*a* lists details required to complete the multi-item listing 26 and an optional details pane

175*a* allows sellers 14 to add optional details to further describe their listing. The optional details pane 175*a* is also organized into tabs 188*a*: a Profile tab 189, a Vehicle Details tab 190, a Choose Parts tab 191, a Shipping & Payment tab 192 and a Photos/Video tab 193.

Figure 25:
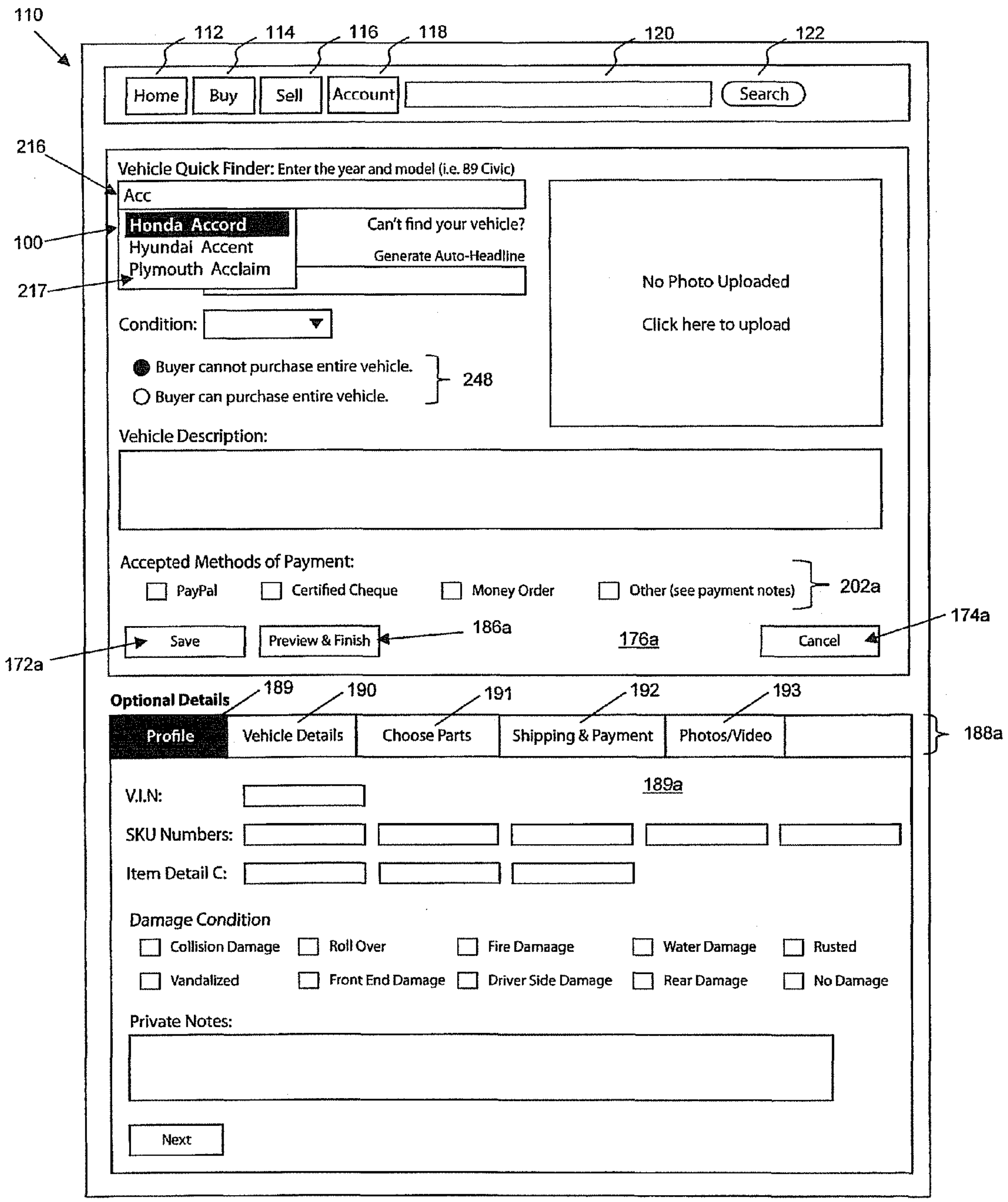

The required details pane 176*a* can be used to begin specifying features and characteristics of the multi-item 26 being listed, in this example an entire vehicle. Users can immediately begin typing the year and model of their vehicle into the Quick Finder tool 216, explained earlier. The seller 14 can use a number of different query combinations to find their vehicle including but not limited to: year and make, year and model, make and model, year and sub-model etc. It has been found that users may not know the exact name of a vehicle and therefore the Quick Finder tool 216 is very useful and it searches the categorization database 20 for all vehicles that match the search criteria. For example, a seller 14 may want to post their 1987 Suburban but the exact name of the vehicle is actually, Chevrolet R10 Suburban. The Quick Finder 216 will find all the 1987 Suburban results and display them to the user. The system 10 can be configured to extract as much or as little detail as deemed necessary by the administrator 34. For example, the quick finder results 100 may display the year, make, model and sub-model that matches the seller's 14 query. In the above Suburban example, the sub-models for a 1987 Suburban can be Custom Deluxe, Scottsdale and Silverado which represent different vehicle options and packages thereby making them different. Another query may include the engine size etc. FIG. 25 illustrates the seller typing "Acc" in the quick finder 216 and choosing Honda Accord from the results list 217.

Turning now to FIG. 26, once the seller 14 selects the vehicle they are creating the listing for from the quick finder 216, either by using the arrow keys or by other input method, the chosen vehicle is shown to the seller 14 by displaying their choice in the vehicle click boxes 59. This helps the user identify what they have chosen. Note that because the make and model of the vehicle were displayed in the results list 217, the make click box 59*a* and model click box 59*b* are pre-filled to match the selected make and model from the results list 217. Since the year and model was not entered into the quick finder 216, the system 10 does not know what they are. The seller 14 could therefore choose the year and sub-model from the year 59*c* and sub-model 59*d* click boxes.

Figure 27:
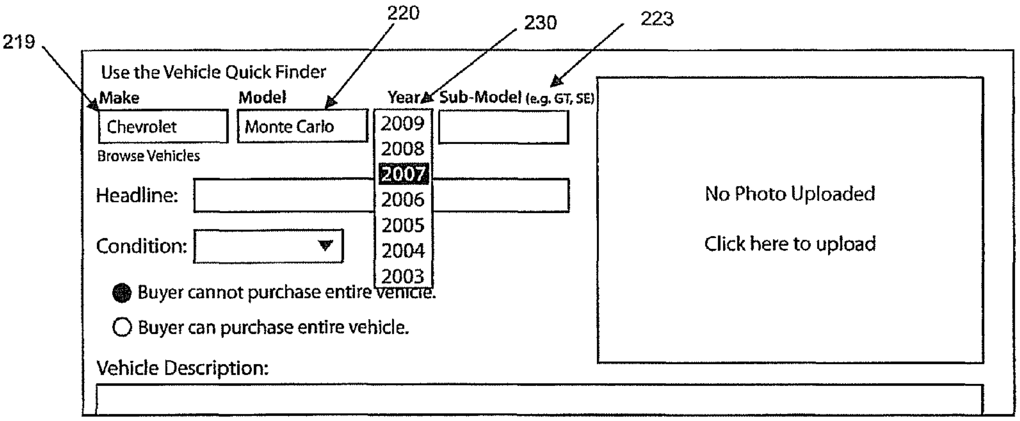
Figure 28:
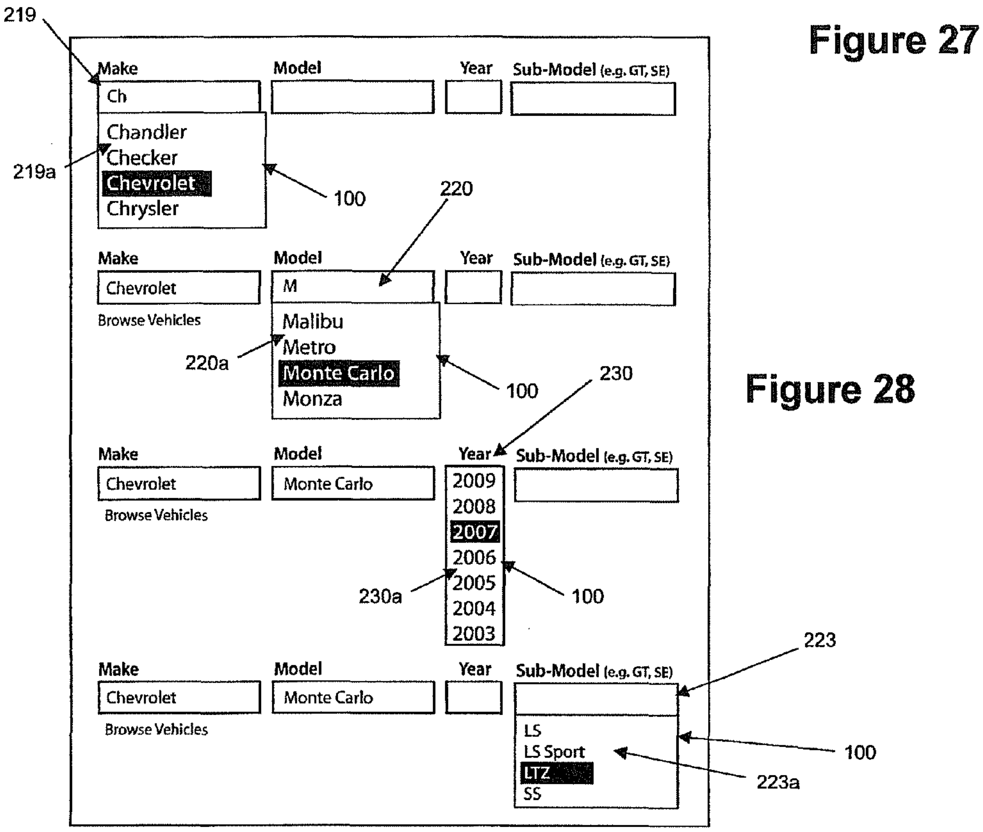
Figure 29:
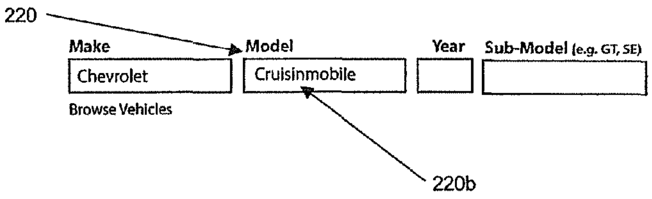

Similar to the single listing process described above, if the Quick Finder 216 cannot match the seller's 14 entry to the main category database 44, the seller 14 can click the Browse Vehicles link 218, shown in FIG. 24, to display the click boxes 59 and allows the users to browse through all the vehicles listed in the categorization database 20. The user can also click the Can't find your vehicle link 229, also shown in FIG. 24, which loads the custom vehicle entry tool explained earlier in the single listing process and shown in FIGS. 27, 28 and 29. In these examples, the Make 219, Model 220, Year 230 and Sub-Model 223 fields are displayed individually. The user can begin to type the first detail, e.g. Make 219, and a results list 219*a* appears to enable the selection of the appropriate details using drop down lists and auto-fill 52 features similar to those described above. According to the characters entered in the Make field 219, a make filtered list 219*a* is generated. Once the user chooses a make from the list 219*a*, the cursor focus changes to the model field 220 with the same auto-fill 52 functionality as the make field but displays the models associated with the selected make. FIG. 28 shows the sequential work flow of a seller 14 entering data into the fields. The List an Item process described earlier explains this in greater detail. The system 10 can be configured to add more or fewer auto-fill boxes. In the event that the auto-fill 52 does not match anything in the categorization database 20, as shown in the model field 220 in FIG. 29, the user can continue typing their custom vehicle. Notice that no auto-fill result 100 was available. The system administrator 34 can then store this data and choose to add it to the categorization database 20 as described earlier.

Next, the seller 14 may be prompted to create a headline for their listing by completing a headline field 254 as shown in FIG. 24. An example of a headline is, "1998 Ford F150 Pick-Up—Runs Great—Box Damaged". The seller 14 can then indicate the general or overall condition of the vehicle by choosing a condition from the condition drop down box 246. The system 10 may be configured to create the headline for the seller 14. If the seller wants the system 10 to generate the headline, they may click the Generate Auto-Headline 254*a* link. The system 10 can then generate a headline based on the vehicle, condition and other details added by the seller 14. This is convenient if the seller 14 is not sure what to include in their headline.

The seller 14 can specify if they are willing to sell their multi-item 26, in this example a vehicle, as a complete unit to a buyer 12 by specifying purchase conditions 248 in the required items pane 176*a*. It has been recognized that often buyers 12 that have the intention of buying one or two parts from a vehicle may end up purchasing the complete unit to have access to other parts at a later time. For example, the seller 14 may specify a price of $500 to sell the complete unit as shown in FIG. 30. The purchase conditions 248 in this example are controlled by two radio buttons 252 and 249. By selecting the second radio button 249, buyers 12 can purchase the complete vehicle and the seller 14 may then enter a price in the price field 250 indicating the cost of purchasing the entire vehicle. By selecting the first radio button 252, which is also by default selected, buyers 12 cannot purchase complete vehicle.

Using the radio buttons 252, 249 the seller 14 makes their choice. Indexed with the second radio button 249 is the price field 250 as shown in FIG. 30. The price field 250 can be controlled such that it remains hidden until the seller 14 chooses the second radio button 249. Once the second radio button 249 is chosen, the seller 14 is then prompted to enter a price for their vehicle in the price field 250. If the seller 14 later changes their decision by selecting the first radio button 252, the price field 250 clears and becomes hidden and thus unavailable as shown in FIG. 24.

When the second radio button 249 is selected, the seller 14 is also able to enter their cost of the vehicle being listed by entering a value in a cost field 251 as shown in FIG. 30. The cost field 251 has been found to be particularly useful for a seller's reporting purposes. For example, the system 10 can be configured such that if a seller 14 specifies the cost of the vehicle, the profit is automatically calculated according to the difference between the cost of the vehicle and the sales resulting from it (e.g. the net selling price not including the shipping price). Each time the seller 14 makes a sale from the multi-item, a profitability report may then be recalculated. In various embodiments, to protect privacy, only the seller 14 should be able to access the profit and cost data when viewing the listing and response fauns or when viewing the multi-item 26 through their account, as will be discussed later.

Similar to a single listing, the seller 14 is then prompted to complete a description field 260 as shown in FIG. 24. This enables a seller 14 to enter a detailed description of the vehicle being listed, e.g. the seller 14 can specify details such as: "The vehicle is in good shape except for the box. It's damaged and rusted over the wheel wells. The engine has 200,000 km but still runs great." This provides more information to the buyer 12. The user can then select the method of payment they accept from buyers from the payment method click boxes 202*a*. If the user has preset their selling preferences, in particular their preferred methods of payment, the appropriate click boxes would automatically be selected. If not, the user would be required to choose at least one accepted method of payment.

The Save 172*a*, Preview & Finish 186*a* and Cancel 174*a* buttons work the same as the single item 24 listing process described earlier. As well, the photo picture area 180*a* can display pictures that have been uploaded to that listing to assist the seller 14 in completing the multi-item 26 profile.

Turning now to the Profile tab 189 in the optional details pane 175*a* shown in FIG. 24. In this illustration, the user can add the vehicle's VIN full or partial VIN number by completing a VIN field 256, which may be useful to buyers 12 since the VIN number provides detailed information about the vehicle. For security purposes, the system 10 can be configured to warn sellers 14 not to enter the last 6 digits of the VIN as this may comprise the vehicle's unique identifier. This may be done to inhibit malicious activity such as recreating a VIN number on a stolen vehicle. The seller 14 can also enter SKU or inventory numbers in the inventory fields 258 to keep track of vehicles and/or items being sold, in particular when sold by a business. When a part is requested, the SKU number can be included on the request faith so that the seller 14 can quickly identify which vehicle the request is for. Other details can be added into Item Detail C fields 261 and private notes, as described earlier, can be added into the private notes field 263.

The seller 14 can also specify the damage condition of the multi-item 26 by choosing from a variety of conditions from the list of indicators 259 to give a quick general overview of the damage condition of the vehicle. For example, the seller 14 can specify, "Collision Damage", "Roll Over", "Fire Damage", "Water Damage", "Rusted", "Vandalized", "Front End Damage", "Driver Side Damage", "Rear Damage", "No Damage" etc, from the damage condition click boxes 259. This makes it easy for buyers 12 to limit their searches to these conditions when searching for a multi-item 26. For example, one buyer 12 may not be interested in a multi-item 26, in this example a vehicle, that has front end damage. Such a buyer 12 would therefore filter out "Front End Damage" from their search. The photo preview area 180*a* in the required items pane 176*a* pane is particularly useful for reminding the seller 14 of what the condition may be, at least visually, which can be helpful when listing many multi-items 26.

Turning now to the Vehicle Details tab 190 shown in FIG. 31 which, similar to the single item 24 listing, allows the seller 14 to enter other specific details to more completely describe their multi-item 26. As well, the details here will be made visible to buyers 12 as will be described later. The vehicle details tab 190 displays information in two panes: The Vehicle Information Pane 234 and the Features & Options pane 239. The vehicle information pane 234 allows the seller 14 to enter specific details about the vehicle specified in the Profile tab 189 utilizing, in this example, drop down and text boxes. It also uses the ACES, intermediary and questions databases 40, 42, 23 to gather the details. For example, if Seller A chose a 2008 Honda Accord in the Profile tab 189, the body style drop down box in the vehicle information pane 234 may display '2 Door Coupe' and '4 Door Sedan' as the choices (derived from the ACES database 40). The seller 14 can choose which body style detail pertains to their 2008 Accord. If the ACES database 40 does not have the details, answers can be derived from the intermediary database 42. For example, if a seller 14 from the United Kingdom was creating a listing for their vehicle, the ACES database 40 would likely not have the details since it is a European vehicle. In this case, the intermediary database 42 can provide the details in the drop down box. The questions database 23 can also be used for more general details, for example the colour. The questions database 23 can produce a list of colours in the drop down boxes to allow the seller 14 to quickly choose a colour from the list. In cases where neither the ACES, the Intermediary nor the questions databases 40, 42, 23 can provide details, the system 10 will change the drop down boxes into text boxes to allow the seller 14 to manually enter their information. As this is optional information, the seller 14 can choose not to enter any details.

Details that may be listed in the vehicle information pane 234 include but are not limited to, Trim Package, Body Style, Engine Size, Transmission, Drive Train, Fuel Type, Mileage, Exterior Color, Exterior Paint Code, Interior Color, Interior Trim Code and Production Date. It should be noted that the vehicle-specific details described above are for illustrative purposes only and various other features, details and information can be requested depending on the configuration of the system 10. Use of the interfaces described herein may also minimize the number of repeat questions and requests from buyers 12 for parts not specific to the vehicle that is actually listed. For example, if the seller 14 does not specify they have a 2 Door car, they may receive continuous requests for parts specific to 4 Door cars such as the rear door.

If the seller 14 has not chosen a vehicle from the Profile tab 189, the Vehicle Information pane 234 can be configured to be disabled with a notification instructing the user that they must first choose a vehicle before adding specific details about it.

The Features & Options pane 239 is further organized into tabs 235: Exterior, Interior and Engine & Other. Each tab 235 displays features and options related to each other. For example, the Exterior tab 231 displays vehicle features and options that pertain to the exterior of the vehicle. The seller 14 would not be required to choose any of these options or answer any of the questions presented to the seller, however, the seller 14 can be encouraged to take the time to do so to refine their listing and make it more attractive to buyers 12. FIGS. 32, 33 and 34 display examples of the type of details presented to the seller 14 for each of the tabs 235. It should be noted that these are illustrations only and more or less details may included. The system may also provide a text box to allow the seller 14 to add their own custom details in the event that the seller 14 wants to include more details.

Figure 35:
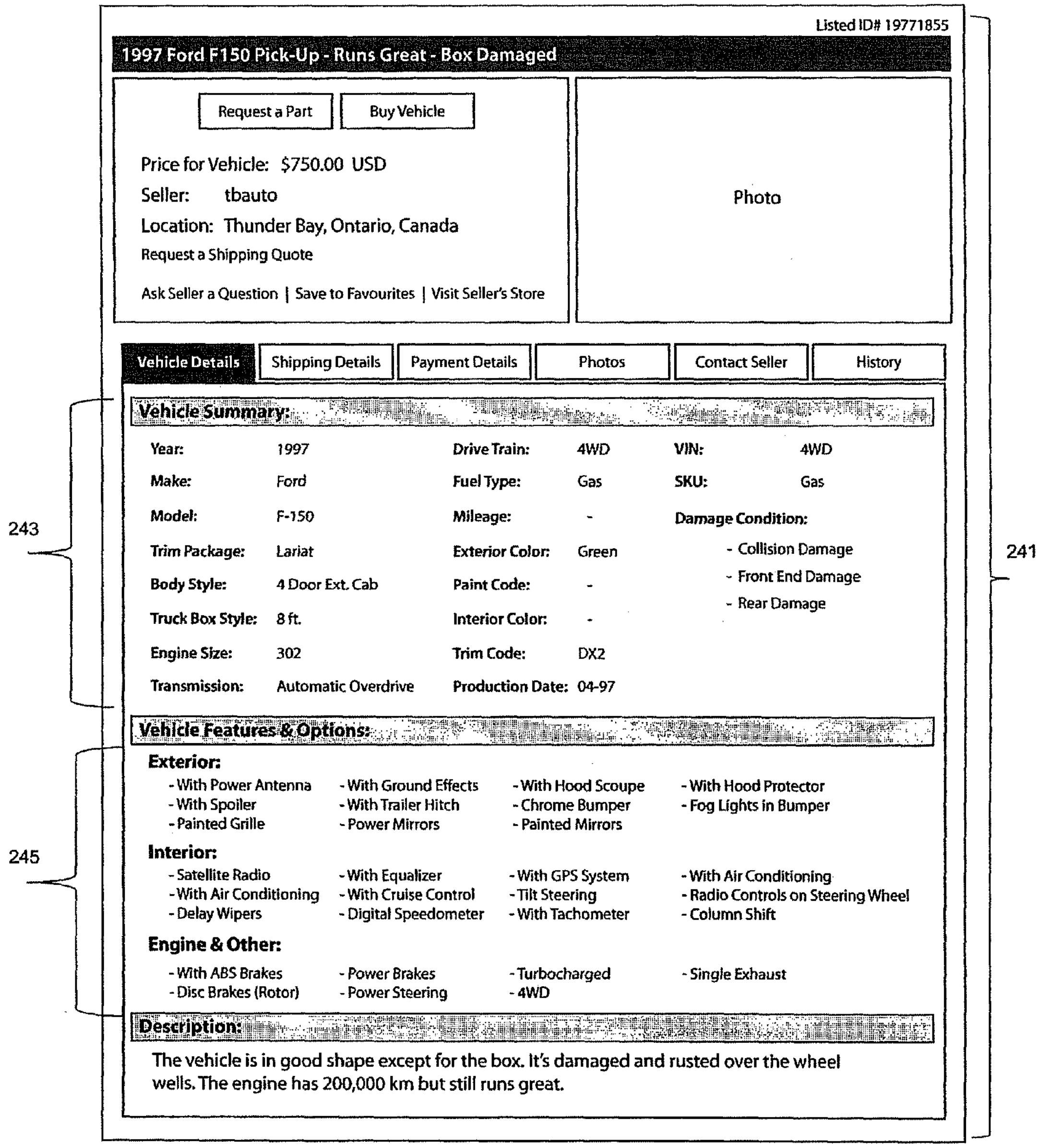
FIG. 35 is a screen shot of the detailed listing for a multi-item accessible by searching for and finding a multi-item.

When sellers 14 choose these options, they are displayed to buyers 12 in the multi-item 26 detailed listing 241 shown in FIG. 35. The details from the Vehicle Information pane 234 are displayed in the Vehicle Summary 243 of the multi-item 26 detailed listing 241. The details from the Features & Options tabs 235, are displayed in the Vehicle Features & Options section 245 of the multi-item 26 detailed listing 241. This allows the buyers to quickly view what features and options the multi-item 26 has.

All details listed by the seller 14 should be searchable and filterable. For example, if a buyer 12 wants to find a multi-item 26 with specific options such as, red (exterior colour), leather seats, power windows, automatic transmission, front wheel drive, 4 door etc. they could use the advanced search filters 111 to find them. The system 10 then searches through the details provided by the seller 14 to find a match.

Question mark hints can be provided to assist sellers 14 in the event that they do not understand a question and/or feature or option. For example, a seller 14 could click on the question mark beside the "Windshield Options" to show a picture of the difference between privacy glass and tinted glass. The use and function of the Question is described later herein.

It should be noted that the vehicle-specific details described above are for illustrative purposes only and various other features, details and information can be requested depending on the nature of the multi-item 26 being sold.

Once the seller 14 is satisfied with their level of detail, they could use the next button 210*a* or click on the Choose Parts tab 191 to proceed to the choose parts stage shown in FIG. 36. If they decide to finish the listing later, their partial listing can be saved by clicking the save button 172*a* so they can continue at a later date. It may be noted that a partial listing would not be available for other users to see as it is not yet listed. The choose parts tab 191 can be configured by the system 10 to be disabled if the seller 14 has not chosen a vehicle from the Profile 189 tab.

The choosing parts tab 191 allows the seller 14 to choose which parts they do and do not want to sell for whatever reason. As shown in FIG. 36, the different areas of the vehicle can be broken down into tabs 266 along the top of a parts selection portion 267, allowing the seller 14 to address different sections of the vehicle at different times for convenience to the seller 14. This also enables the seller 14 to target specific sections, in particular if only certain sections of the vehicle are saleable. For example, if the vehicle has no useable parts except for the interior and driveline, the seller 14 may simply click on the "Interior" and "Engine & Driveline" 266 tabs to display the parts associated with the respective area of the vehicle and disregard the rest. The different sections of the vehicle will hereinafter be referred to as "Groups". The groups shown by way of example in FIG. 36 comprise, without limitation: Exterior Body, Engine & Driveline, Suspension/Steering, Brakes & ABS, Interior and Custom (user defined).

When the Choose Parts tab 191 is loaded, the first group (Exterior Body in this example) is shown by default and the corresponding tab 266 highlighted as shown in FIG. 36. Each group contains smaller sections called sub-groups to make it easy for the seller 14 to select the parts. In this example, each sub-group contains a list of common parts with click boxes beside each, which can be conveniently displayed in a tree structure 270 as shown in FIG. 36. The seller 14 can quickly skim through the different parts and select which ones they want to sell from the vehicle being listed.

Figure 37:
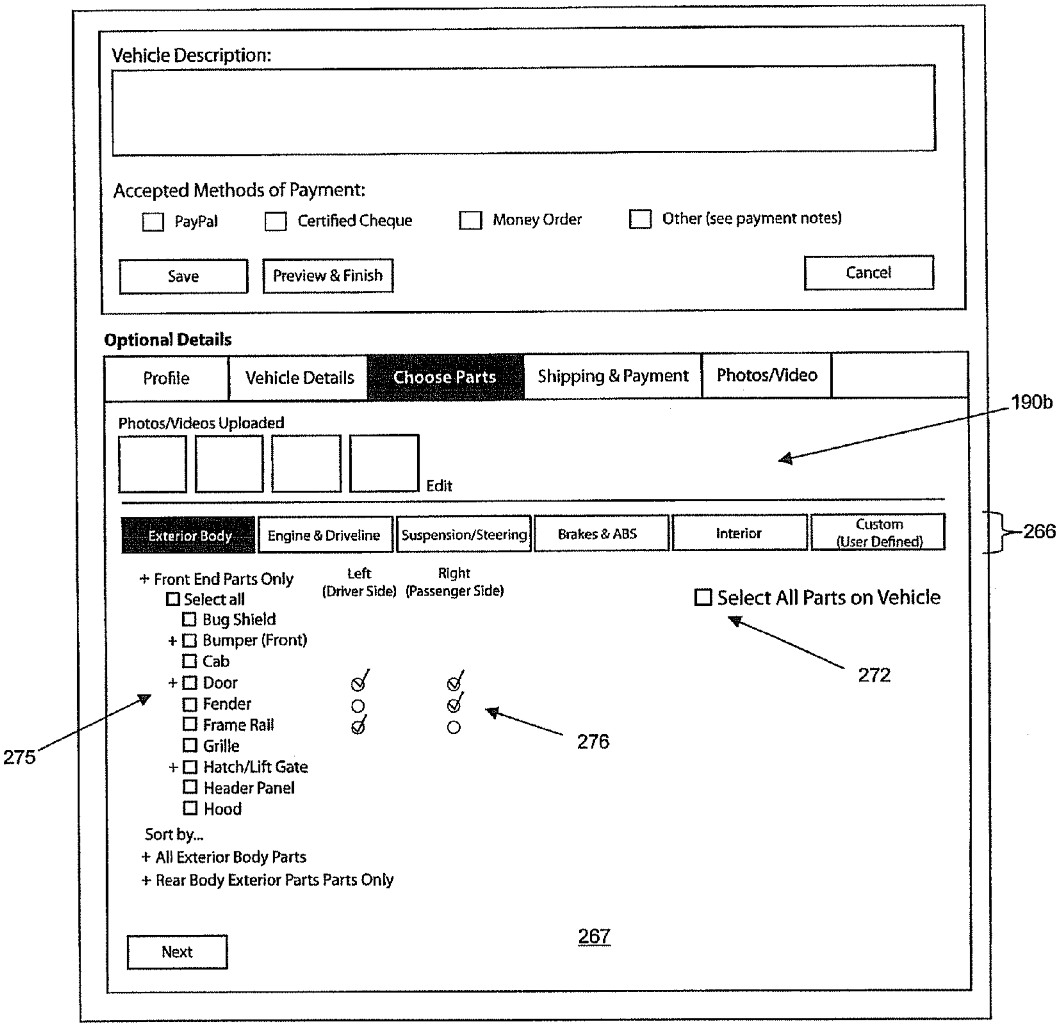

As can also be seen in FIG. 36, photo previews 180*b* can be provided to again assist the seller 14 in remembering which parts are available, which vehicle is being listed etc. Also, a "Select All" box 271 can be provided to allow the seller 14 to select all of the parts within the sub-group, and to deselect this option. If the seller 14 wishes to select every part on their vehicle without navigating through the different sub-groups, they could choose the "Select All Parts on Vehicle" box 272 located in the top right corner of the choose parts portion 267. It can be appreciated that various mechanisms can be used to allow the seller 14 to select and deselect parts, groups or even every available part to provide a representation of what is available for sale. To view the sub-groups, the seller 14 can select the '+' link in the tree structure 270 which reveals a list of parts (e.g. descriptors) linked directly to the main category database 44. For example, the seller 14 may expand the "Front End" sub-group to reveal a sub-tree of parts 275, which in this example includes parts (descriptors) such as: door, fender, grille, header panel and hood; all of which are parts from the front end of their vehicle. An example of this is shown in FIG. 37.

It may be noted that some parts (descriptors) will have different positions or details 276 attached to them such as front, rear, left or right. For example, the descriptor "Fender" may have a "position" attached to it. In this way, when a seller 14 chooses "Fender" from the sub-tree 275, they can specify which side of the vehicle the item is from; the left or the right. Vehicles have (or should have) a left and right fender and a left and right headlight, however, one may be good while the other may be damaged. As such, the positions can be pulled from the ACES, intermediary and/or questions databases 40, 42, 23 linked to a particular descriptor. By default, if the part type/descriptor such as "fender" is selected, all positions 276 can be pre-selected for simplicity allowing the seller 14 to deselect which ever item they are not selling, i.e. "opt-out" for that item. Examples of the use of the positions are shown in FIGS. 37 and 38.

The system 10 can also be configured such that the positions 276 also take into account details entered in the vehicle details tab 190. For example, if the seller 14 specifies their vehicle is a 2 Door, then when they are provided with the opportunity to select the door positions 276, only the options left and right would appear; whereas if they specified their vehicle to be a 4-Door, the available positions 276 would reflect this difference by displaying four options, namely left front, right front, left rear and right rear.

Some descriptors that have multiple positions 276 have the position 276 inherent in the sub-group they belong to. For example, the category "Bumper" is listed in the both sub-groups 'Front End' and 'Rear Body'. Under "Front End" there is only one front bumper so the need for the seller 14 to specify that it is a 'front' bumper is redundant. As such, in these cases, the position is selected by default automatically without requiring input from the seller 14. In the above example, when the seller 14 views the sub-group "Rear Body", the bumper position would only show "Rear" since there is only one possible position 276 for a bumper in the rear and this would be automatically selected.

It may also be noted that another benefit of using the main category database 44 is that the system 10 may refine the descriptor tree list 270 based on the vehicle year, make and model chosen. For example, if a seller 14 was creating a multi-item 26 listing for a 1957 Chevrolet car, the main category database 42 can ascertain that some parts (descriptors) were not available for that vehicle in that year e.g. air bags were not available.

Once the seller 14 has finished selecting their parts, the total number of parts they are listing can be tallied and may appear in brackets beside the group names (not shown). For example: Front End (45), Rear Body (1), Engine & Mechanical (All—75), Steering & Suspension (All—80), Interior (3) conveniently indicates how many parts are available in each group. In the example above, there are 45 front end parts for sale and only 1 rear body part for sale. For sections where the seller 14 has selected all of the parts, an "All" indicator can be provided with the number assigned to the group to indicate that the seller 14 has selected all the parts for sale. This makes it easy for the seller 14 to conveniently recall when they have included every part from their parts vehicle. If "All" is not in the brackets, this would imply that the seller 14 is not selling some parts from their vehicle, at least in that particular group.

FIG. 39 illustrates another example of an interface for the choose parts stage. In this example, the "Interior" tab 266 is displayed. It may be noted from FIG. 39 that the seller 14 is only viewing all the parts for the sub-group "Wiring Harnesses". The seller 14 in this example can further refine their parts list by sorting the interior parts by other interior sub-groups, e.g. dash, seat and seat belts, trim, switches, etc.

Turning now to FIG. 40, the seller 14 can be provided with additional information by incorporating additional information into the database 44. In this example, by selecting, highlighting or clicking on the part name, a dialogue box 277 is launched alongside the particular part name, and provides a description of the item 278 and a picture 279 of the part if available. In this way, if the seller 14 does not know the name of an item or does not know what an item is, the dialogue box 277 can be a quick and convenient way to familiarize the seller 14 with what the part looks and what it is for. For example, if Seller A does not know what a Fuse Box is, Seller A can select the word "Fuse Box" from the parts list whereby a picture 279 of a generic Fuse Box is displayed in a dialogue box 277 with a short description 278 of what it does.

The common list of parts displayed in each group should depend on the vehicle the seller 14 is listing. For example, trucks have parts that cars do not have and vice-versa. For instance, trucks have a pick up box and a cab; whereas cars typically do not. Cars have a trunk or a hatch, whereas trucks usually do not. The admin tool 48 can be used to allow the selection of which parts are considered "common" and for what type of vehicle. For example, vehicles can be categorized into the following types: cars, trucks, vans, SUV and station wagons. Of course, the admin tool 48 should be capable of handling anomalies. For example, an El Camino is a two door car with a truck-like box in the rear. If a seller 14 were to create a multi-item 26 listing for their El Camino they would typically not see "Car Box" in the parts list. However, in this scenario, the seller 14 may enter additional parts in the "Other Parts" field 280.

Turning now to FIG. 41, use of the custom tab 266 is exemplified. In this example, the custom tab 266 is used to display parts that a seller 14 has added themselves. A separate entry box 281 can also be provided to allow sellers 14 to add parts to their custom tab 266 through the "Parts Car Preferences" (not shown) in My Account 118. This can be particularly useful in the event that the system 10 is missing a particular part or category.

The seller 14 can then add their shipping and payment options similar to those in the single item 24 listing process described above. One main difference is that the seller 14 cannot use the calculated shipping or flat fee shipping option since they do not know what they are selling until a buyer 12 requests an item. They could choose, 'No Shipping' and 'Contact Seller' since they cannot provide details as to the cost of the parts. Furthermore, the seller can add pictures and/or video to their multi-item 26 listing as described in the single item 24 listing process. FIGS. 42 and 43 illustrate the Shipping & Payment 192 and Photos/Video 193 tabs respectively. The number of photos a seller 14 can upload free of charge can be controlled by enforcing limits according to a "seller type".

Once the seller 14 is satisfied with their multi-item listing, they can click the Preview & Finish button 186*a* to bring the seller to the preview page as described in the single item listing process. The multi-item 26 listing may offer the same listing enhancements or enhancements specifically for multi-item 26 listings. The page will resemble FIG. 23.

Figure 44:
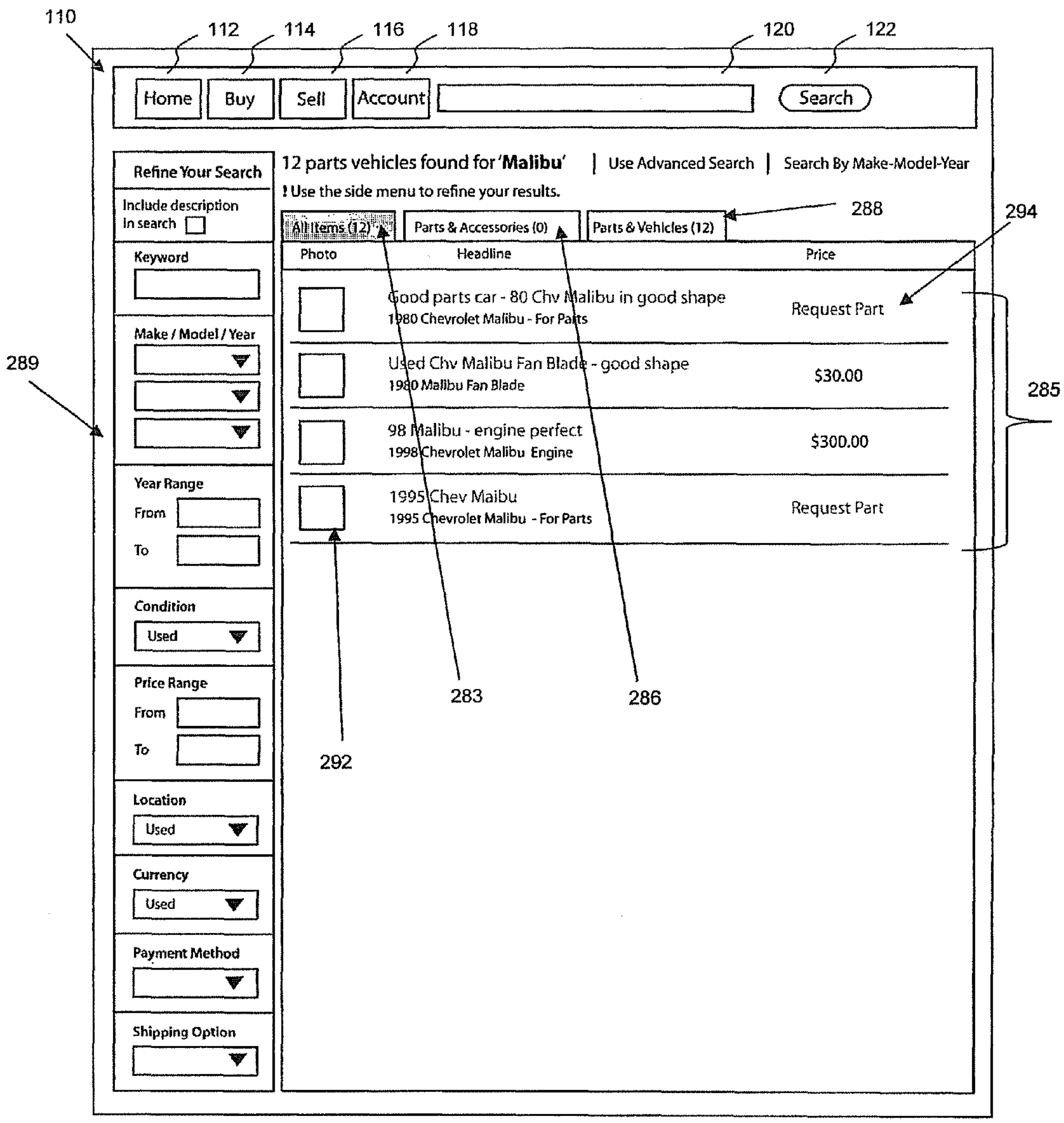
FIG. 44 is a screen shot of a results page comprising a listing of multi-items and single items that have been posted.

For buyers 12, finding an individual item 24 (e.g. part) from a multi-item 26 (e.g. vehicle) can be performed in a manner similar to finding individual items 24. When a buyer 12 searches for an item 24, the system 10 can be configured to display all individual listings along with a list of multi-items 26 that may have the parts the buyer 12 is looking for. Turning now to FIG. 44, a search results page 285 is shown, which in this example is separated into three tabs or portions, namely an all items list 283, an items list 286 and a multi-items list 288 (referred to as "Parts Vehicles" in FIG. 44). As can be seen in FIG. 44, separate panes can be provided for advanced search filters 289 for performing advanced searching options as is known in the art.

It has been found that displaying a certain number of items 24 followed by the multi-items 26 that have that item 24 in the items list 286 enables the system 10 to generate a comprehensive list for the buyer 12. For example, the page 285 can be configured to display 15 items 24 with the any multi-items 26 listed below up to a maximum of 6 multi-items 26 to minimize scrolling. If there are more items 24 and multi-items 26 found in the search, a "See More" link (not shown) can be displayed indicating to the buyer 12 that more choices are available. Selecting such a link would then refresh the page 285 to only display the multi-items 26 or can simply provide further scrolling capabilities. The multi-items list 288 can be provided in a separate tab to allow users to focus a search for just multi-items 26. For example, if the buyer 12 only wishes to view the multi-items 26, they may select the tab for the multi-items list 288 to change views in the page 285. If at a later time the buyer 12 wishes to display individual items 24, they can select the items tab 286, named "Parts & Accessories" in FIG. 44. It should be noted that the page can be expanded to include additional tabs.

In the example shown in FIG. 44, each item 24 or multi-item 26 listed in the search page 285 shows a thumbnail picture 292 (or other multi-media link such as video) typically the first picture of the item 24 or multi-item 26 that was uploaded by the seller 14 with other details 294 such as the year, make and model specified in the listing created by the seller 14. For multi-items 26, the groups in the multi-item 26 that contain individual items 24 can also be shown with the number of items available in each group shown with an identifier for the group in parentheses (not shown), e.g. Exterior (6), Engine (48) etc. This can provide the buyer 12 with a quick glimpse of the number and type of items 24 available for that multi-item 26, which facilitates quick browsing and more user-friendly searching for the buyer 12.

It has also been found that for some multi-items 26, similar models or other multi-items 26 that share common items 24 can also be provided to the buyer 12. Returning to the vehicle parts example, if a buyer 12 searches for a Chrysler New Yorker, a Chrysler Dynasty may also appear with/following a list of all available New Yorkers since the Dynasty is a similar model that uses many of the same parts as the New Yorker. The main category database 44 can thus be further configured to indicate relationships between multi-items 26 and the admin tool 48 can be configured to modify and update such relationships. Also, the advanced search pane 289 can provide the buyer 12 with tools to modify their search, e.g. whether or not to show similar models.

The system 10 can also be configured such that a search uncovers similar vehicles (multi-items 26) within a window of time (e.g. 5 year span on each side of the specified year). For example, if a buyer 12 searches for a 2005 Ford Focus, vehicles from 2000-2010 can be displayed. However, this window can be modified through the advanced search pane 289.

As discussed above, in the choosing parts tab 191 of the listing process, the seller 14 chooses which parts are available and which are not. This makes it very convenient for a buyer 12 when searching for parts using the category/descriptor auto-fill tools 59 (also described above) which uses the auto-fill tool 52. In this way, the system 10 can match the multi-item 26 and then perform a check to see if the seller 14 indicated that they have the specific items 24 available. If so, the multi-item 26 can be selected to appear in the results page 285.

In the vehicle parts example, consider a case where Seller A lists a 2000 Dodge Neon as a multi-item 26 and in doing so lists the left (driver side) fender as being available and omitted the right side since it was damaged. After some time elapses a buyer 12 enters the keyword string: "right fender neon"; into the main search entry box 120. Seller A's multi-item listing may appear in the results page 285 since keyword matches for "fender" and "neon" were successful. However, if the buyer 12 instead uses the advanced search pane 289 and selects the right fender from descriptor auto-fill tool 59 or otherwise specified such a part, the search tool 50 can use the database 44 to perform a filtered query and determine that Seller A is not selling the right fender on the Neon being listed and, as such, the vehicle would not be included in the results.

The system 10 can be configured such that parts that are not selected by the seller 14 in the Choose Parts 269 tab, representing those parts that the seller 14 chooses "not" to sell, when listing the multi-item 26 are "not" searchable within the system 10. For example, if Seller A does not select "hood" and "fender" from the Choose Parts 269 tab for a listing of a 1995 Ford Probe, a buyer 12 searching for a hood or fender for a 1995 Probe would not find Seller A's listing since Seller A has indicated that his hood and fender is not for sale.

Figure 45:
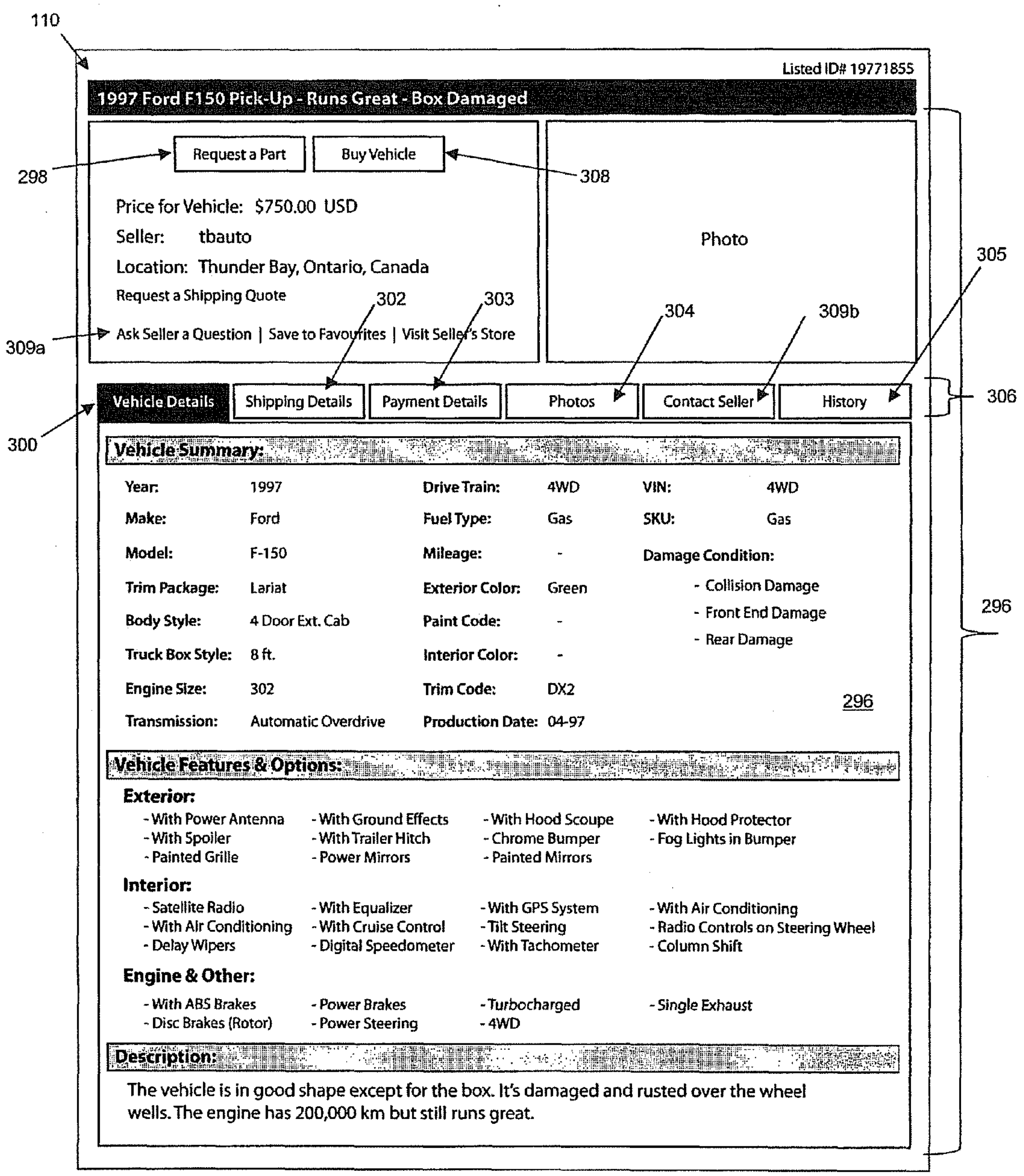
FIG. 45 is a screen shot of a multi-item listing as seen by a buyer.

Turning now to FIG. 45, a multi-item listing page 296 is shown, which is initiated and displayed upon sensing the selection of a multi-item 26 from the search results page 285. The listing page 296 provides the details of the selected multi-item 26 that were specified by the seller 14, e.g. as described and exemplified above. The layout of the listing page 296 for a multi-item 26 is, in this example, similar to the layout of a listing for an item 24, e.g. as shown in FIG. 21. The buyer 12 can browse through the vehicle details 300, view the seller's 14 shipping details 302, view the payment/return policy 303, view the vehicle's multi-media 304 such as pictures and video, view the history 305 etc.; using listing navigation tabs 306. Specifically, the history tab 305 contains all questions and part requests that the seller 14 chooses to make public, testimonials from other users, as well as listings of the parts the seller 14 indicated as available from the choose parts tab 191, allowing buyers 12 to avoid sending requests for items that the seller 14 isn't selling or that have already been sold. For example, a buyer 12 is going to make a part request for a headlight, but upon looking at the history tab 305 the buyer 12 sees that the item is marked sold. Buyers 12 could browse the parts with an interface similar to the choose parts tree view 275 in the choose parts tab 191.

From the detailed listing page 296 shown in FIG. 45, the buyer 12 is able to send the seller 14 an item (part) request by selecting a Request a Part button 298. The purpose of the request is to ask the seller 14 if their vehicle (multi-item 26) has the parts (items 24) the buyer 12 is looking for, how much it costs and how much shipping would be etc. If the seller 14 has chosen to sell the complete vehicle at once, a Purchase Vehicle button 308 can be provided to the buyer 12. When a buyer 12 clicks the Buy Vehicle button 308, a purchase process would then continue similar to that for purchasing a single part. If the buyer 12 has any questions or concerns regarding the listing, the buyer 12 can select an Ask the Seller a Question button 309*a* or click the Contact Seller tab 309*b* and post a question to the seller 14 (not shown).

Figure 46:
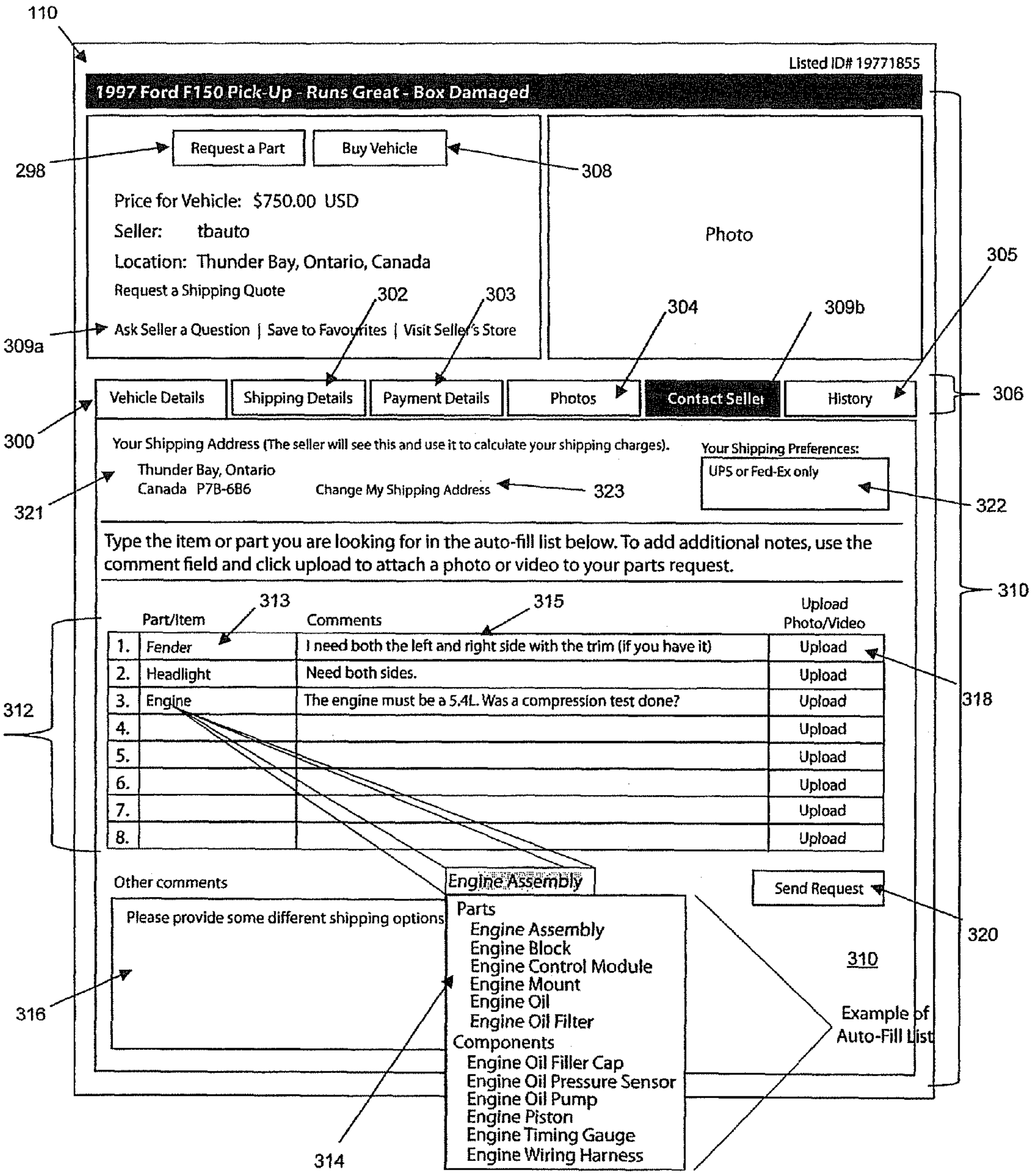
FIG. 46 is a screen shot of a buyer's request form initiated by selecting the Request a Part button in the multi-item listing shown in FIG. 45.

Upon selecting the Request a Part button 298 a Buyer Request page 310 such as that shown in FIG. 46 is displayed. The Request page 310 comprises a request list auto-fill fill form 312, which enables the user to begin typing the name of the part/item 24 that they are interested in a first field 313, which may utilize the auto-fill tool 52 to display an auto-fill result list 314 to assist in selecting the desired part or item 24. The form 312 also comprises a second field 315 for entering comments pertaining to the part or item 24 being requested. A third field 318 is also provided to enable the buyer 12 to upload a photo or video related to the request. An Other Comments field 316 is provided for other general comments, requests etc. and a Send Request button 320 is used to submit the request to the seller 14. The Request page 310 also provides a shipping address portion 321, which can be configured to load the buyer's 12 shipping address as saved in their profile or alternatively allow them to specify a different address by selecting a Change My Shipping Address link 323. A shipping preferences box 322 can also be provided to allow the buyer 12 to specify their preferred shipping method(s). If the buyer wants to add more items than the form 312 provides, they may click the 'request more items' link (not shown) to provide the buyer 12 with more rows in the form.

It has been found that immediately placing focus of the cursor or input mechanism to the first field 313 upon loading the Request page 310 is particularly advantageous as it allows the buyer 12 to immediately begin typing what they are looking for, which then loads the auto-fill results 314 as discussed above. In this way, where many requests are filled out by a buyer 12 time savings can be realized. If the item 24 the buyer 12 is looking for is not in the auto-fill list 314, the buyer 12 may continue typing characters identifying the desired item 24. They buyer 12 may choose a category and sub-category 60*a* to give the seller 14 at least some identifying information about the desired item 24. For example, if a buyer 12 requests a "buster", the seller 14 may not know what the buyer 12 is looking for if there is no such part called a buster. However, if the buyer 12 instead specifies the item to be listed under the "Brakes & ABS>Brake Boosters", the seller 14 may be more likely to interpret the "buster" as a "brake booster". This helps both the buyer 12 and seller 14. In another embodiment, if the item 24 the buyer 12 is looking for is not in the auto-fill list 314, the buyer 12 may type the characters identifying the desired item 24 and their input is accepted by the system 10. This entry is also sent to the administrator 34 for review. If the entry is approved by the administrator 34, then the item 24 is added to the main database 44 and appears when the auto-fill tool 52 is used. For example, if a buyer 12 enters a request for an "ebm box", although this entry is not a descriptor in the main database 44, the system 10 accepts the entry and the request is sent to the seller 14. If the seller 14 does not know what the buyer 12 is asking for, they can contact the buyer 12 directly. The buyer's 12 entry is also sent to the administrator 34 to determine whether the new entry should be added to the main database 44.

It may be noted that depending on which part/item 24 the buyer 12 has specified, the system 10 can be configured to provide one or more suggested questions for the buyer 12 to answer as shown in FIGS. 95 and 96 as will be explained in greater detail below. Such questions can be similar to the questions asked when listing a new item and are intended to help the buyer 12 give important details they may have forgotten. For example, in the example in FIG. 46, the buyer 12 can be prompted to specify if the headlights are "Sealed Beam" or "Composite" as they are two completely different lights. If the buyer 12 does not know what the questions means, they may then be provided with the option of selecting a question to load a help window 277 similar to that explained above, which provides helpful information 278 along with a sample image or video 279 if available. It will be appreciated that providing and answering such additional questions should not be required but can be encouraged to provide the seller 14 with as much information about the buyer's desired item 24 as possible and to minimize the risk of the seller 14 quoting on the wrong parts in their response. As also explained earlier, the questions database 23 can integrate with third party databases to offer more questions.

The second field 315 can then be used to fill in comments associated with the item 24 in the correspondent first field 313 to give more details about the request. In the example in FIG. 46 above, it can be seen that the buyer 12 indicates that they require both the left and right fenders and headlights and specifies that the engine must be a 5.4 L. The other comments field 316 at the bottom of the page 310 allows the buyer 12 to give additional non-part specific details such as "The parts must be in near perfect condition" or "Do you ship to Hawaii?", etc.

The admin tool 48 can be configured to monitor the buyer's 12 requests to inhibit the use of the system 10 to set up an offline sale. For example, the admin tool 48 can determine if phone numbers, email addresses or other information is being provided in the request that could enable the sale to be made outside of the system 10. In this way, the system 10 can maintain control over the transactions to properly reward loyal account holders that support the system 10. Similarly, the system 10 can be configured such that the buyer 12 can browse the webpage 110 prior to registering but then require registration before sending a parts request or before sending a request to a seller's 14 user account. The third field 318 allows the buyer 12 to upload video or photos for the seller 14 and link such multimedia to each individual parts request. For example, in FIG. 46, the buyer 12 could upload a picture of the fender they have to show the seller 14 the type of trim desired. This can be particularly useful for the "hard to explain" parts or the parts the buyer 12 finds difficult in naming or explaining. A multimedia file can be uploaded by selecting the corresponding third field 318 which loads the upload tool 131*a* and 131*b* described above.

The shipping address portion 321 displays the buyer's 12 shipping address and shows the buyer 12 what the seller 14 will see regarding a requested shipping location. The seller 14 can use this address to calculate shipping costs. The buyer 12 can also specify their shipping preferences 322 so that the seller 14 knows which freight company to quote with, if more than one can be used.

Once the buyer 12 has finished filling in their request page 310 and wishes to send the request, they may select the Send Request button 320. Before the buyer 12 can send their request, they can be prompted with a terms and conditions agreement of using the service (not shown) to be read and accepted.

Once the request is successfully processed, the seller 12 can be emailed a message (not shown) notifying them that they have received a parts request. It will be appreciated that the message can instead be posted to the seller's 14 account, both emailed and posted or any other form of communication such that the seller 14 is notified. The message can be structured to indicate various data regarding the request such as the year, make and model of the multi-item 26, the seller's private fields, SKU/Stock number, the buyer's user ID etc. When the message is sent outside of the system 10, a link can also be provided to direct the seller 14 to their account 118 where they can access the actual request.

The request can be provided to the seller 14 along with the ability to respond to the request directly to further the transaction. Turning now to FIG. 47, a request/response page 325 is shown. A first portion 324 of the page 325 can be used to show important information, including that information private to the seller 14, which was entered during the listing process. This information may include without limitation: SKU/Stock number, year, make and model. The buyer's shipping location (city, province/state, country and postal/zip code) is also shown in a shipping portion 327, along with the buyer's user ID, shipping preferences and general comments 328 below. It may be noted that to avoid bypassing the system 10 as discussed above, the system 10 can obfuscate the street address while still providing the city, postal or zip code province/state and country to allow the seller 14 to at least estimate shipping costs. The system 10, can then provide the buyer's 12 full contact information to the seller 14 once the transaction is complete. The shipping details or procedure is determined solely by the seller 14.

The response portion 325 comprises a reply list 330 providing the individual items 24 that have been requested and the ability to respond to each individual request. It can be seen that copies of the information provided by the buyer 12 may be included, such as those referenced by similar numerals with a prime (') for clarity. An availability selector portion 332 is also provided, which allows the seller 14 to quickly specify whether the item is available or not by using radio buttons, click boxes or similar selection mechanisms. It may be noted that completion of the availability portion 332 may be made mandatory to ensure that the response at least notifies the buyer 12 of the availability.

A price field 334 is also provided to enable the seller 14 to specify the desired selling price of the item 24 (excluding shipping costs in this example). This may also be considered a mandatory field since the buyer 12 is almost certainly interested in the price of the item 24. A shipping cost field 336 is also provided, which may be optional, in particular where it is difficult to estimate the cost due to weight, duties and other auxiliary costs. The seller 14 can be prompted with reminders such as to remind them that the price field 334 is only related to the particular line item and not the entire request. The seller 14 can, if desired, specify the shipping price of the item 24 by using the stripped down version of the address and, if the seller does not add a shipping price in the field 336, then the buyer 12 would see an indicator such as "Not Specified" in the shipping field when viewing the response. A response comments field 338 can also be provided to allow the seller 14 to add comments or other details about the item 24. To provide further information and for the benefit of the buyer 12, the seller 14 may also choose to select an upload field 340 to upload photos or video of the item, which loads the upload tool 131*a* or 131*b* as explained earlier. This allows the buyer 12 to see the item 24 before they agree to purchase the item 24.

The response portion 325 can also include a selection mechanism 342 to allow the seller 14 to indicate whether or not to include the response in the history tab 305 in the listing page 296. Including the history of the responses can be useful not only for the seller 14 to minimize the number duplicate questions and requests but also to provide the buyer 12 with more time saving information. For example, the seller 14 in FIG. 47 has selected "Yes" in the history selection mechanism 342 to make their response public. If at a later time, another buyer 12 looking for the headlights views the multi-item listing 296 and views the history tab 305, they would determine that a previous buyer 12 has already requested the headlights and the seller 14 indicated they were damaged. The buyer 12 may then decide not to include the headlights with their request.

The seller 14 may also enter other details, information, comments etc. in a general comments box 344 provided in the response portion 325. Once the seller 14 has completed the response portion 325, the response can be submitted by selecting a Send Response button 346. Once the seller 14 sends their response, the buyer 12 receives an email or other notification (e.g. text message) indicating they have received a response from the seller 14. The message can include information pertaining to the request to identify the response as such, for example, the year, make and model of the vehicle, the seller's user ID etc. A link can be included in the email that, when selected, takes the buyer 12 directly to the response in their user account 118.

Figure 48:
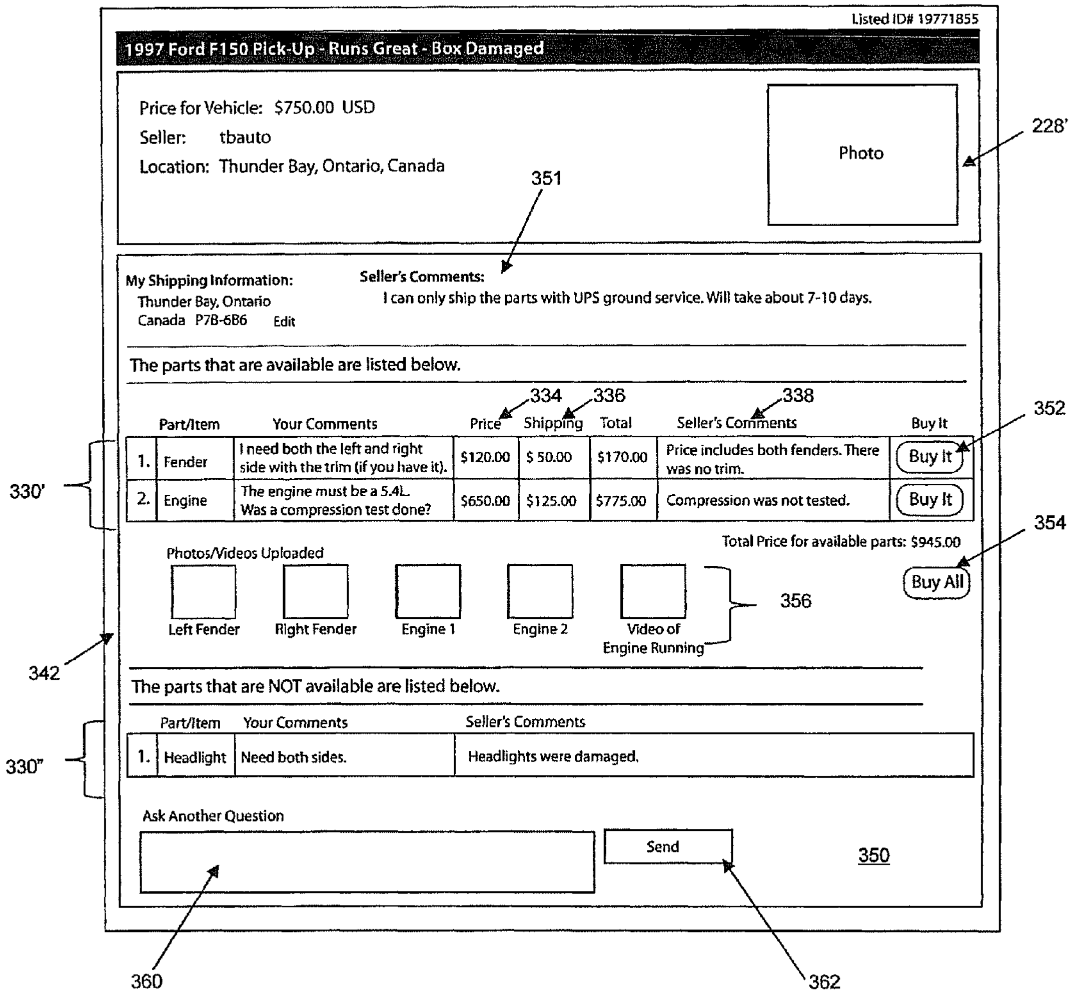
FIG. 48 is a screen shot of a seller's reply form as seen by the buyer generated upon submission of a seller's response form.

A response page 350, as seen by the buyer 12, is shown in FIG. 48. It can be seen that the response page 350 includes the listing details 228' with the response details below. The seller's comments 351 are provided to alert the buyer 12 to any particular information that could be pertinent or general comments that may affect their decision to go ahead with the transaction. Similar to the original request, the buyer 12 can edit their shipping information, however, this may affect the pricing given below. The items that are available are listed in an available parts section 330' and the items that are not available are listed in the unavailable parts section 330", which is a portion of the list generated by the buyer 12 in the request. The price 334 and shipping costs 336 (if specified by the seller 14) are shown along with the seller's comments 338. The system 10 can provide a mechanism to instantly proceed with a purchase by providing next to each individual item that is available, a Buy It button 352 that allows the buyer 12 to purchase the item directly from the response page 350. To enable the buyer 12 to quickly accept all items, a total price can be listed below the items, which represents the cost to buy all of the available parts. A Buy All button 354 may then be selected to accept the price for all items 24. In another embodiment, the buyer 12 can select check boxes (not shown) to select only the items they want to purchase and the total price displayed represents the cost for only the selected items. When the buyer 12 then selects the Buy All button 354, they can purchase the items they selected from the list 330'.

Selecting the Buy All button 354 can cause the system 10 to take the buyer 12 through the normal purchase process, except that the buyer 12 would confirm the purchases of all the items 24 listed in the available parts section 330' at the same time on one page. For example, in FIG. 48, the fenders cost $170 ($120+$50) and the engine costs $775 ($650+$125). When the buyer 12 selects the Buy All button 354, a purchase confirmation page (not shown) would list all of the items 24 and display for the buyer 12, the total price. The buyer 12 may then be prompted to confirm that they agree to pay $945 for the fenders and engine including shipping.

As can be seen in FIG. 48, below the available parts section 330' is a collection 356 of the pictures or videos the seller 14 uploaded in thumbnail size when completing the request. To assist the user in identifying the multimedia in the collection 356, a short description can be provided with each multimedia thumbnail to describe the picture or video. To view the full size picture or to start the video, the buyer 12 can select the desired image or video. If the seller 14 uploaded video, the word "Video" can be displayed under the thumbnail image to distinguish video from pictures.

The items 24 that are not available are shown in an unavailable items section 330", in this example below the collection 356 of multimedia thumbnails. An Ask Another Question entry box 360 can also be provided in the response page 350 to allow the buyer 12 to respond to the response by asking a further question or questions. If the buyer 12 does ask additional questions and sends the message to the seller 14, the seller 14 can be given the opportunity to modify all of the previous entries, as their previous entries have been saved in the system 10. For example, if the buyer 12 responds by saying, "The price is too high. I will purchase it for $20 less"; the price the seller 14 originally sent is displayed so the seller 14 can easily see what they previously sent. This is very useful since the seller 14 may receive many messages from different buyers 12 making it difficult for the seller 14 to remember what they quoted to each buyer 12. The seller 14 can then change their price 334 directly in the response page 350 and send it back to the buyer 12. The buyer 12 can continue negotiating or make the purchase.

When a buyer 12 purchases an item 24, such purchased item 24 is no longer available and thus should be removed from the available parts list 330'. For example, if the seller 14 specified that the engine is available and a buyer 12 purchases it from a parts response page 350, the engine thereafter appears as "sold" an would no longer be searchable. If an item 24 is sold, the history tab's contents can be updated to reflect the sale. For example, if the seller 14 in FIG. 48 sold the fenders (i.e. in this example, the buyer has selected the Buy It button 352 from the response page 350 and confirmed the purchase), upon selecting the history tab 305, this information would be reflected.

It can be appreciated from the above-described process pertaining to listing, searching and buying multi-items 26 that the multi-item process is a quick and convenient way to list an entire multi-item 26 such as a vehicle without having to list each item 24 individually or decide upon a price. The seller 12 is not prompted to specify a price or enter a description for each item 24 they choose in the choosing the parts stage, they simply choose which items 24 they want to be searched or not searched.

Figure 49:
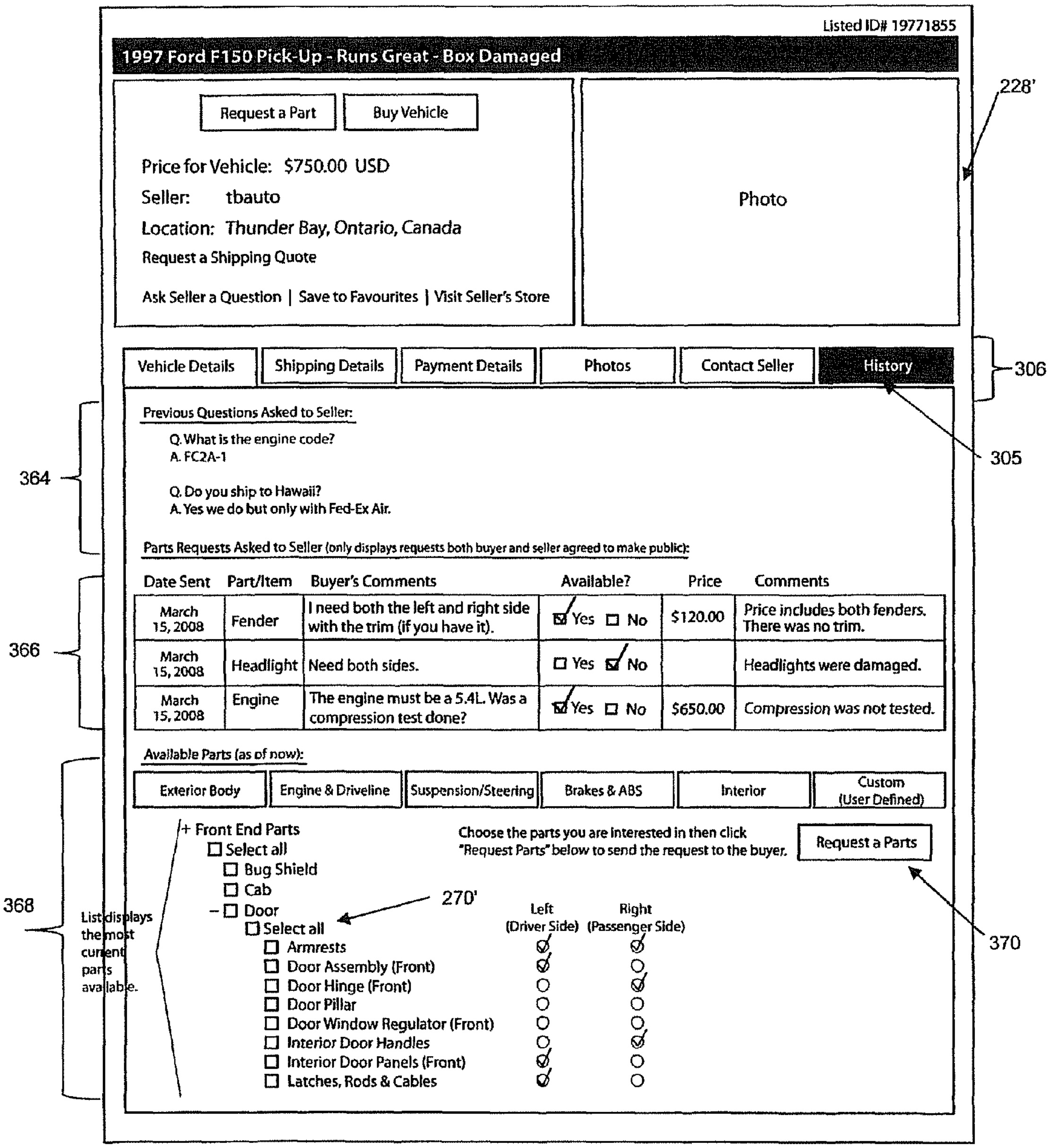
FIG. 49 is a screen shot of the multi-item listing showing the contents of the history tab for the multi-item listing upon selection thereof.

By selecting the history tab 305 when viewing a listing, all of the questions and parts requests the seller 14 has chosen to include in the history tab 305 is provided to potential buyers 12, as exemplified in FIG. 49. The history tab 305 can be selected to enable buyers 12 to keep track of requests and purchases 366 and questions 364 pertaining to the vehicle. Buyers 12 can browse through the questions and corresponding answers 364 as well as browse through the list of available parts 368 using the same tree structure 270' interface as sellers 14 use when choosing their parts etc. From the tree structure 270' shown in FIG. 49, the buyer 12 can quickly and conveniently select parts that are currently available and select a Request Parts button 370 to set up a new request.

Figure 50:
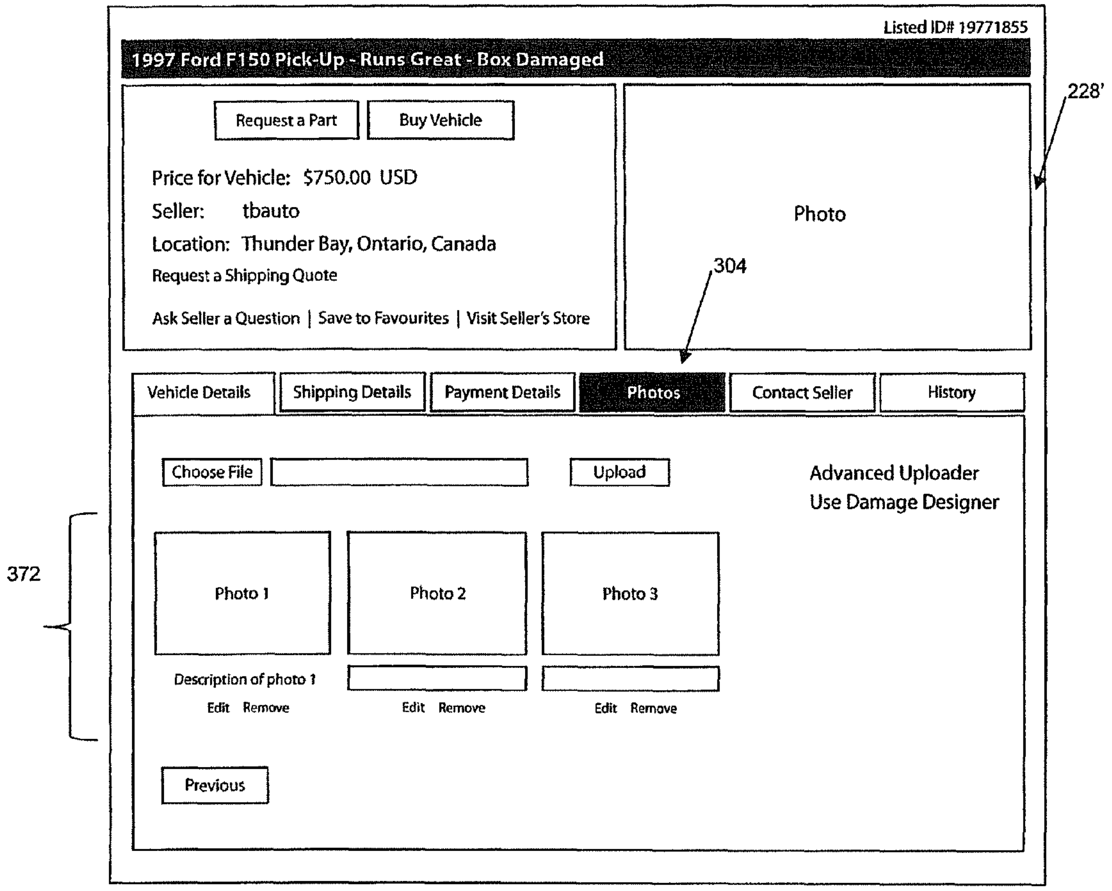
FIG. 50 is a screen shot of the multi-item listing showing the contents of the photos tab upon selection thereof.

An example of the contents displayed when selecting the Photos/Video tab 304 is shown in FIG. 50. In this example, a collection 372 of the pictures and videos that the seller 14 has uploaded can be viewed. Also, in this way, the system 10 can keep track of pictures/videos for that particular multi-item 26 so that the seller 14 does not have to upload these multiple times. Below each picture or video in the collection 372 is a brief description which may be added by the seller 14 to describe the respective photo or video.

Figure 51:
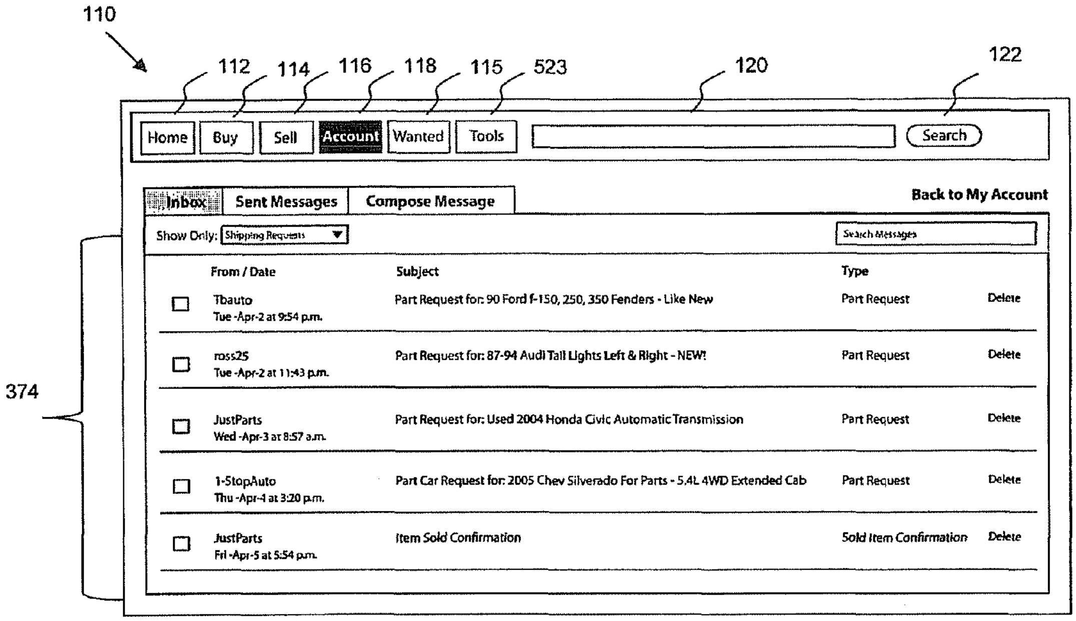
FIG. 51 is a screen shot of a users mailbox that contains the requests and responses described in FIGS. 47 to 48.

Requests and responses for all items 24 (both from single item listings and multi-item listings) can be organized and tracked in both the buyer's and seller's account 118 as shown in FIG. 51. FIG. 51 shows one illustration of the mailbox that handles all of the messaging. The user could filter their messages to display all part requests (for sellers 14) or all part responses (for buyers 12). Selecting anything listed in the mailbox 374 would take the user into the detailed request or response (not shown).

Stores/Store Front

Figure 52:
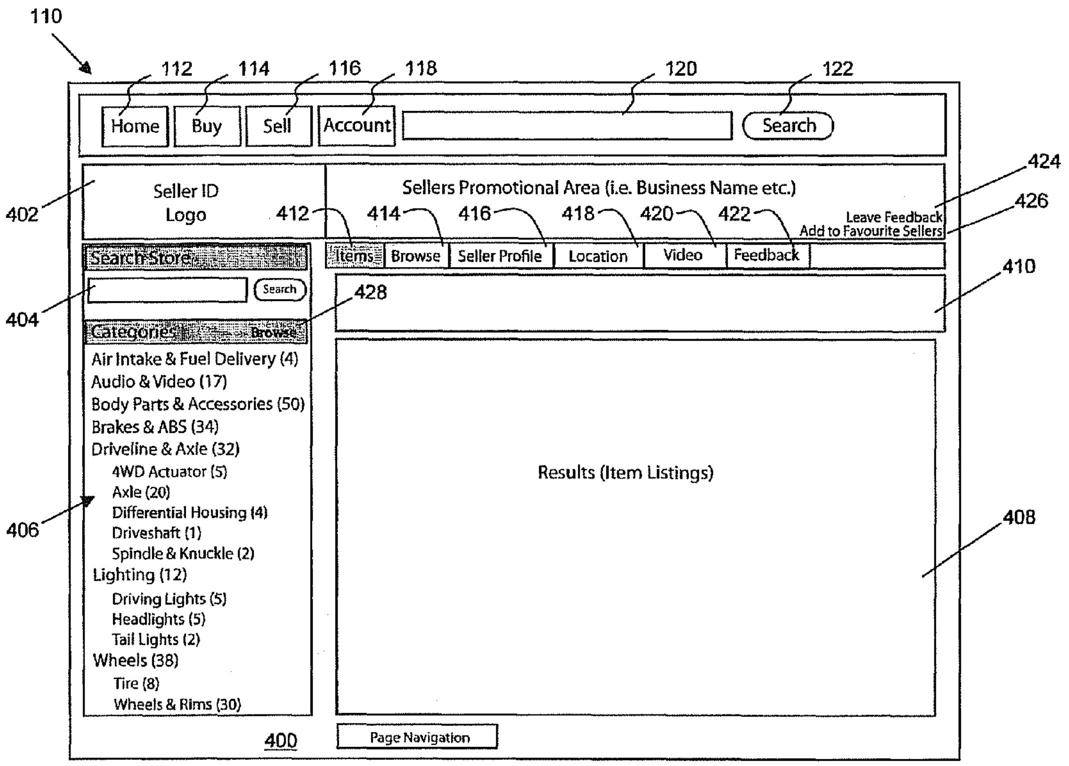
FIG. 52 is a screen shot of an example seller's store front layout.

As discussed above, the intermediary 16 may comprise or have access to the store website database 21 to provide a web domain or "store front" for a seller 14. The store front can be created for a user when they become a seller 14. The store front enables all of the seller's 14 items that have been listed in the items database 22 to be housed in one centrally accessible and organized place that may be considered a virtual store for that seller 14. By providing an individualized web domain or store front for the seller 14, the seller 14 has their own space within the system 10 to enable them to connect with other sellers 14, buyers 12 and to promote their store or business if applicable. Once a user becomes a seller 14, the system 10 can be configured to provide a website address that is associated with the seller's user id. In this way, the seller 14 can provide a link between their identity (personal or corporate) with the system 10. For example, Company X having a user id compX may be given a store address of: "http://compX.intermediary.com". Any number of addressing schemes can be used and the choice of which to use may be dependent on an existing addressing structure for the system 10 or any other application specific parameter. For example, the address may be "compX.intermediary.com" as exemplified above; or "stores.intermediary.com/compX". This can be considerably convenient for buyers 12 to search through the seller's 14 inventory and can be provided as a free value-add feature for sellers 14. By providing a web address for each store, entering a store's web address then directs the user to the seller's store, an example of which is shown in FIG. 52.

When a user registers as a seller 14, the system 10 can provide an option for the newly registered seller 14 to "open" a store through their account and allows the seller 14 to "build and promote" their store by selecting the Build Your Store option 166 from the main selling menu page shown in FIG. 12 to initiate a process to build their store (not shown), advertise their products in optimal places, build a brand image etc. The process can be implemented using a separate page with entry boxes etc., a set-up wizard, or any other suitable mechanism for obtaining information, graphics, video etc. The system 10 can be configured to provide promotional capabilities at an extra cost to the seller 14 or through a premium or upgrade membership to obtain further revenue. Promoting their business allows the seller 14 to associate a corporate logo, a business profile, include video of their physical store or warehouse, integrate parts catalogues and more. Essentially what the seller 14 can do is "plug in" their existing website or business into the intermediary 16 to create a virtual extension of their business and website. For example, Company X has an existing website in which they sell auto parts. Company X wants to reach new markets and grow their business so they "setup" their store on the intermediary 16. (This can be compared to Company X opening another "bricks and mortar" store in a shopping mall. The intermediary 16 in this example would be the shopping mall that houses sellers' 14 stores through the network 18.) Company X's store, on the system 10, may be connected to its website and/or business using an API, XML or other technology. The intermediary 16 stores sellers' 14 data on the system 10 and may organize it based on the categorization database 20 (e.g. descriptors, categories, sub-categories etc.). Users can then access all of the search tools available on the system 10 to find items in seller's 14 stores.

When setting up their store, the seller 14 can setup detailed store profiles indicating details such as, but not limited to: what they specialize in, makes of vehicles they deal with, years in business, location, postal/zip code, awards, company profile etc. Once sellers 14 open and setup their store, their store becomes listed in the store tab 113 for buyers 12 to see. Advanced search tools allow buyers 12 to perform detailed queries. For example, Buyer A may want to find a store that specializes in selling body parts for their old 1957 car while another buyer 12 may want to find a store that specializes in transmission parts for their late model BMW. Once buyers 12 find the store, they can browse through the store's item catalogues, contact the store, purchase items etc. Buyers 12 may also be redirected to the seller's 14 own store (not through the intermediary 16) if the seller 14 subscribed to the Product Advertising 167 feature discussed later.

The intermediary 16 also "localizes" the data, matching buyers 12 and sellers 14 in the same town, city etc. For example, the seller 14, Company X is based in Thunder Bay. Buyer's 12 in Thunder Bay may be presented with Company X's store to search for items, check their inventory stock etc. because they are within close proximity to each other. The buyers 12 can then purchase Company X's items through the intermediary 16 or go to Company X's "bricks and mortar" physical store to make their purchase.

The store feature is also used with service sellers 14, that is, sellers 14 that can provide services related to the categorization database 20. For example, Seller A specializes in manufacturing custom vehicle seats and custom vehicle rims. Buyer A browses stores on the system 10 to find sellers 14 that can manufacturer the rims they are looking for. The buyer 12 finds Seller A on the system 10 and arranges their services to create the custom rims to fit their car. The entire process from contacting the seller 14, ordering the service, paying for the service etc. can be completed through the system 10 (not shown).

It can be seen that the store front can be arranged similar to the other features exemplified above, i.e. with the main navigation pane 110 along the top and the store front page 400 underneath. For the store front page 400, only the seller's items are displayed. The system 10 can be configured to automatically pull in all of the seller's existing listings from the items database 22 and indicate the existing of these listings in the seller's store front page 400. The system 10 can also organize the listings based on the categories and sub-categories 60*a* described above and may utilize menus and separate panes for convenience.

The store front page 400 can be arranged in any suitable manner to provide an organized interface for displaying the seller's 14 listings to potential buyers 12. In the example shown in FIG. 52, a promotional area 402 is provided, which can be dedicated to the seller's 14 business, brand, image etc. The seller's 14 user id can also be associated with or included in the promotional area 402. A side menu of features can also be provided. For example, a search tool 404 can be provided, which is configured to search only within the seller's 14 store (group of listings) and/or seller's 14 item catalogues rather than the entire items database 22. A category tree 406 can also be provided which can be configured by the system 10 to automatically pull in and organize the listings into categories and sub-categories 60*a* (e.g. driveline & axles, 4 WD actuator, shown in FIG. 52). Adjacent to each category name can be a number in parentheses representing the number of items in that category that the seller 14 has listed or available in their catalogue. The system 10 can be configured to recognize "empty" categories and remove category names that do not have any current listings. The system 10 can also be configured to display the seller's 14 items catalogue in the store page 400 to make it seem as if the buyer 12 went directly to the seller's 14 website, not through the intermediary 16 (not shown). For example, the store page 400 may look identical to the seller's 14 website, however, the buyer 12 would be viewing the seller's 14 store through the intermediary 16.

Similar to the tree structures described above, upon selection of the category name, a sub-category can be displayed with the number of parts available within that sub-category. The tree structure can be configured to limit the granularity to accommodate display constraints if desired. Upon selection of a category, listing or by performing a search, a results list can be generated and displayed for the buyer 12 in a results pane 408. A banner 410 may be displayed showing featured items as determined by the seller 14.

As can be seen in FIG. 52, a sub menu comprising elements 412-422 can also be provided, which uses a tabular organization. The tabular organization can provide a convenient way for buyers 12 to navigate through the seller's store. In one embodiment, by default, the items tab 412 is shown which includes the seller's featured listings in the banner 410 and the seller's 14 other listings in the results pane 408, e.g. sorted by newest to oldest. As noted above, when a buyer 12 searches the seller's 14 items from the search tool 404 or selects a category name from the category tree 406, the listings returned from the search or those listings falling under the selected category are displayed in the results pane 408. The tabs can be configured to allow convenient navigation between them. For example, if the buyer 12 is viewing the seller's 14 profile in the seller profile tab 416 and decides to search for a listing, they can enter a search string into the search tool 404 and select the search button which will automatically bring focus to the Items tab 412 to display the results.

Figure 53:
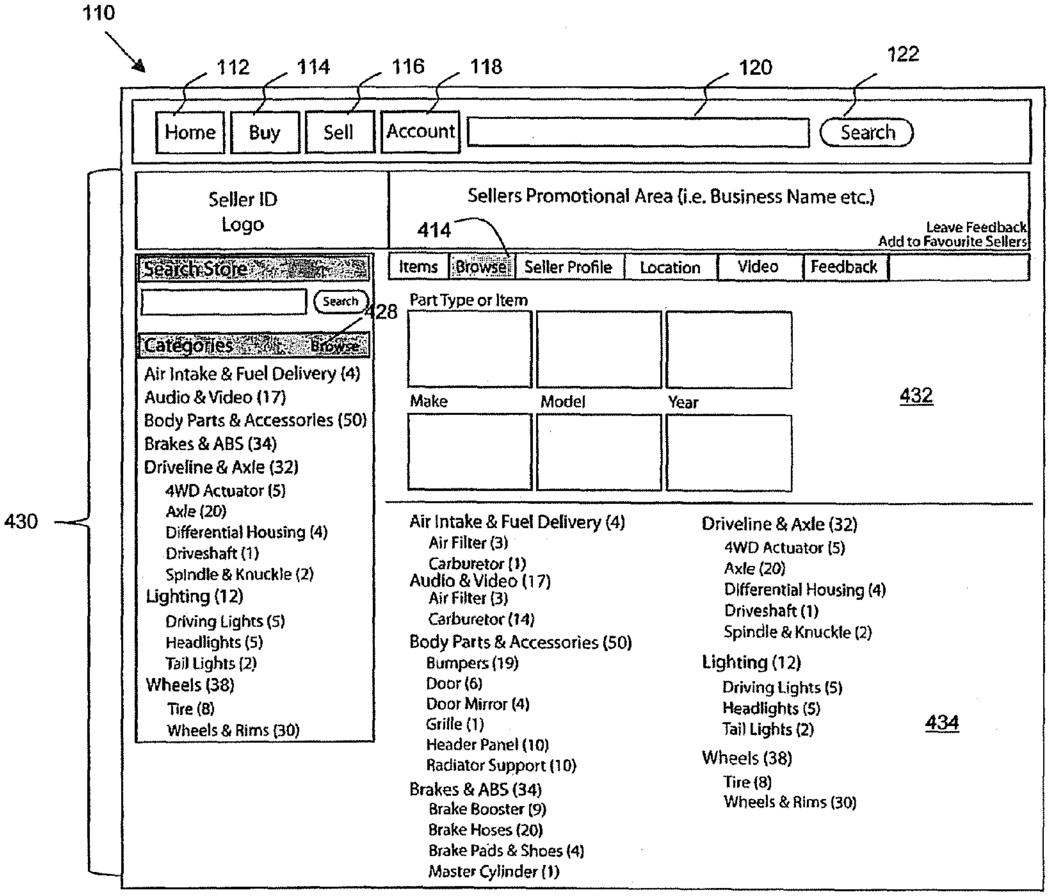
FIG. 53 is a screen shot of the example store front layout in FIG. 52 upon selection of the browse tab.

The browse tab 414 is configured to load a browse page 430, e.g. by selecting the browse tab 414 or by selecting a browse link 428 in the category tree's space. An example of the browse page 430 is shown in FIG. 53. As seen in FIG. 53, the browse page 430 can be divided into a search section 432 containing click boxes 146' to allow the buyer 12 to use advanced search options, similar to the boxes 146 on the main Buy page illustrated in FIG. 9; and an expanded tree portion 434, which shows the third tier 66 categories applicable the seller's 14 inventory of listings. In another embodiment, a browse page may be displayed to blend both the intermediary's 16 search tool layout and the layout of that seller's 14 item catalogue in their own website. For example, if the seller's 14 catalogue requires that buyers 12 specify the make, model, year and engine size of their vehicle, the system 10 may mimic those requirements on the store page in the intermediary 16. That way, buyer's 12 can have a choice: search for items the sellers 14 way, or by using the standard search tools available on the intermediary 16 (e.g. the seller's 14 store may not have tools such as the click boxes 146 to search for items etc.).

Turning back to FIG. 52, the seller profile tab 416 can be configured to show, upon selection thereof, the seller's 14 profile. The profile may include without limitation: how long the seller has been in business, total number of listings, business profile, photos and video about the seller 14 and/or their place of business etc. A location tab 418 can also provide information regarding the location of the seller 14. Where privacy concerns are important, the location can be shown in a map at a high level, e.g. region, city or neighbourhood rather than an exact address. This allows the geographic location to be clearly visible but does not provide enough detail to identity the actual business address. A video tab 420 can be selected to enable the buyer 12 to view video content that has been uploaded by the seller 14. The video content can provide clips of the seller's 14 physical place of business, promotional videos, testimonials etc. As discussed above, buyers 12 can provide feedback to the seller 14. This feedback can be viewed by potential buyers 12 by selecting a feedback tab 422. Any user viewing the store front page 400 can also select a leave feedback link 424 to post additional feedback and commentary about the seller 14 and their store, listings etc. A buyer 12 can also select an "Add to Favourite Sellers" link 426, which can add a link within their account to that particular seller 14 to enable them to quickly access that seller's 14 store at a later time.

Referring back to process of setting up a store, in one embodiment, the first step is to review and modify the store name if desired. For example, the store name may be defaulted to the seller's user id. However, the seller 14 may wish to use another name or trademark and can then have the opportunity to change the store name to whatever they wish and this may be provided at an additional cost. Also, as noted above, the name of the store in this embodiment is used as the seller's 14 own personal web address and thus the seller 14 may wish to have this modified for that reason.

The seller 14 may also be able to personalize their store front by choosing from a pre-made selection of design templates provided by the system 10 (not shown). The templates offer a "design skin" to improve the appearance of their store and to differentiate it from others. Some templates can be offered at no charge while others can be offered for a fee. The seller 14 can also upload a company logo or trademark to create a brand using the system 10. Also, if the seller 14 has appropriate video, they could create a video of their facility and upload it to their store front. Sellers 14 who have registered businesses can also have their business verified by a third party and be given a special distinction or a "stamp of approval" by the system 10. Similarly, the seller 14 can identify special distinctions or awards they received and indicate in which associations they are active etc. The seller 14 may also choose extra features to include in their store. For example, the seller 14 could subscribe to the store manager, a unique program that would make managing their inventory simple. In one embodiment, the store manager program gives the user advanced features to manage items they are selling, similar to the "Modify Catalogue" option 672 illustrated in FIG. 85, or they could subscribe to other supplier's 520 parts catalogues from the Part-a-Log feature into their store, as described later herein.

Sellers 14 can also use their store front to attach advertising pages. In this way, the system 10 can restrict the amount of data that the sellers 14 can add to a listing (such as advertisements) while still providing space to advertise and promote in any way they wish. For example, if the seller 14 is currently running a promotion on certain products, they could upload their flyers or advertisement to the ad page (not shown). As with other value added features, the system 10 can be configured to offer such a feature at an additional cost. It may be noted that the administrator 34 can be used to monitor content that is being uploaded to the seller's 14 store front for appropriateness and to inhibit the use of advertising space to circumvent use of the system 10, i.e. to avoid low cost advertising at the expense of the system 10.

It may be noted that the system 10 provides a virtual community for selling, exchanging and promoting businesses and to allow buyers 12 access to various vendors, wholesalers, recyclers, individuals, distributors etc. The system 10 can use the categorization database 20 to perform a filtered query to determine different types of users (i.e. Recyclers, distributors etc.) This allows any user of the system 10 to reach potential customers and partners in a convenient way. For example, sellers 14 can create and distribute flyers to certain groups or types of users for specific target marketing campaigns.

It can be seen that the store feature is not simply another shopping cart type system that assigns sellers 14 a web domain with e-commerce tools. It is a complete set of unique tools for a seller 14 to integrate their stores within the intermediary 16 to help them sell more items, increase brand awareness etc. It also provides buyers with powerful, focused search tools to find stores and sellers 14 that sell, supply, manufacture etc. items and/or related services they are looking for.

Bin Selling

Turning again to FIG. 12, the system 10 can also provide a option for selling multiple unique parts consecutively without having to perform all steps in a regular listing. The seller 14 can select the Create a Bin icon 163 to create "bins" of items such that the items 22 can be organized like shelves in a physical store. The organization of items 22 into bins allows sellers 14 to post items in much less time than a conventional listing while providing the ability to recreate an existing physical store shelf layout in their virtual store. The layout can provide one or more bins organized into different sections and each bin having a group of similar items 22. For example, a number of belt tensioners can be arranged into bins grouped by engine size (3.1-3.4 L, 3.8 L etc.).

It has been found that many items in an auto parts recyclers' physical location are not necessarily inventoried, i.e. not entered into their computer management systems, mostly because there is no set part number or because the items are small and do not warrant the time to enter them into their computer system. For example, often electrical components such as switches, relays, plugs and sensors may sell for less than $10.00 each and, as such, taking the time to enter them into the computer using their standard industry software, print a tag out and tag each of these items is not considered feasible, let alone desirable. The cost of labour in entering the items 22 is often considered too high and such items are often grouped and stored in non-computer-inventoried bins on shelves. In this situation, when a customer phones the physical store and requests an item 22, the staff would require some knowledge of what is stored where and then would need to go to the appropriate shelf, find the appropriate bin or section and sift through its contents to find the requested item.

To overcome these issues, bin selling through the system 10 can provide sellers 14 with the unique tools they need to quickly and efficiently sell their inventory through the network 18. Sellers 14 are then able to create "virtual shelves" arranged into bins that match the actual physical layout of their physical store. It has also been recognized that many parts recyclers are looking for ways to make more money on the vehicles they dismantle which can be accomplished by selling more parts from a single vehicle. Using the system 10 to organize parts in a convenient and time efficient manner simplifies this task.

Figure 54:
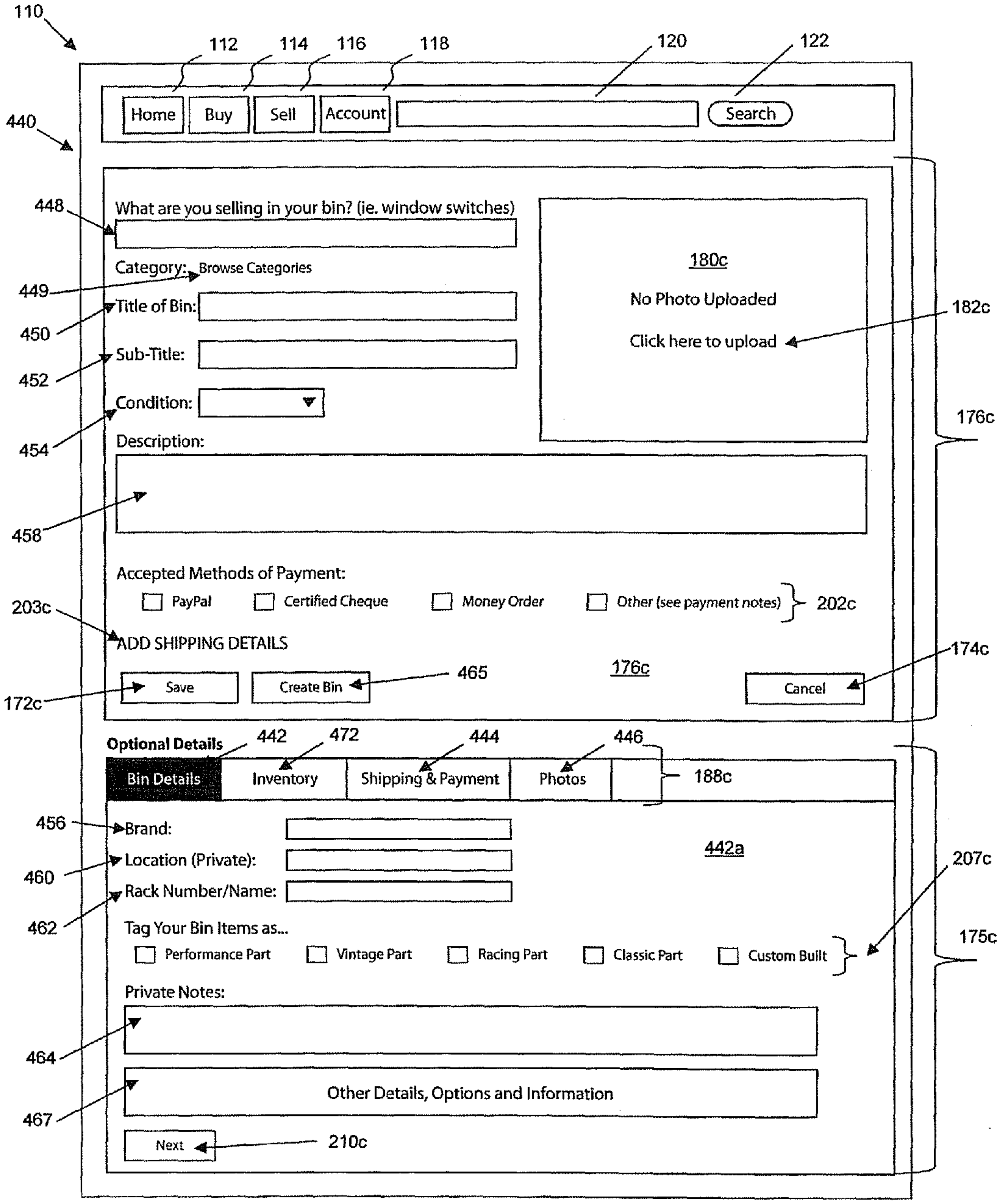
FIG. 54 is a screen shot of an example bin listing page accessed by selecting the Create a Bin option in FIG. 12.

By selecting the Create a Bin icon 163 from the main sell menu page, a main bin selling page 440 is loaded by the system 10 as shown in FIG. 54. The bin selling page 440 is very similar to the single and multi-item selling pages 24, 26 with similar options denoted by the same numerals used in previous figures with a "c" attached to the end of the numerals which may include: a photo preview pane 180*c*, an upload photo link 182*c* to begin the photo upload process as shown earlier, accepted payment methods click boxes 202*c*, a save button 172*c*, a cancel button 174*c*, and an add shipping details link 203*c*. The required details pane 176*c* is configured to allow entry of information pertinent to a bin, and an optional details pane 175*c* for adding optional details to the bin as they are added. The optional details pane 175*c* also shares some similar options that are explained in previous sections; attribute tagging click boxes 207*c*, a next button 210*c* and a previous button 211*c* (not shown) to name a few. The optional details pane 175*c*, in this example, is organized into four tabular sections 188*c*; a bin details tab 442, an inventory tab 472, a shipping and payment tab 444 and a photos/video tab 446.

The bin required details pane 176*c* displays the details the seller 14 needs to add before creating their bin. In the example shown in FIG. 54, an item type entry box 448 enables the seller 14 to choose a descriptor, category and sub-category 60*a* utilizing the same auto-fill features discussed above in the list an item listing process. For example, as the seller 14 begins to type an item name into the entry box 448, the auto-fill tool 52 can access the main category database 44 and display a list of descriptors that match and/or are associated with what has been entered, with such descriptors broken down into a parts list 102, components lists 103 etc. as exemplified in the above examples. If the seller 14 wishes to browse the categories, they can do so by selecting a browse categories link 449 similar to the process explained above. Typically, bins are used to organize items of the same sub-category to not only simplify searching but also to make the listing process more efficient.

A title entry box 450 is also provided which enables the seller 14 to specify a title for the bin that will be visible to all users that browse their inventory. The title can be displayed on front of the visual representation of the bin 466 (see FIG. 55). The name may be limited to a maximum number of characters according to the size of the bin 466 and/or the number of bins 466 that will be displayed. A sub-title entry box 452 can also be provided to allow the seller 14 to further describe the contents. The sub-title can also be made visible to all users and can be located underneath the main title on the front of the bin 466 in smaller text. In the example in FIG. 55, the sub-title for the bin in the lower left corner of the page is, "2005 UP". If the seller 14 has organized items into groups of items in a similar condition, a condition drop down box 454 can be used to choose a default condition that will appear for all items in the bin 466. For example, if the seller chooses "OEM New" as the default condition, all items in the bin 466 are presumed to have that condition unless the seller 14 makes a change accordingly. If the items 22 in the bin 466 are used, the seller 14 can choose a condition that best matches a majority of the items such as, "Used-Good". Alternatively, the seller 14 can create multiple similar bins with items in different conditions. In this way, the seller 14 can avoid having to assess and assign a condition to each and every item 22 in the bin 466. A bin description entry box 458 can be populated to give more details as to the bin's contents. For example a seller 14 may specify that: "All tensioners were inspected for quality. We have 5 year guarantees on all of our items". When the seller 14 is ready to create their bin, they click the create bin button 465 to create the bin and give them access to the Inventory tab 472 which is disabled until a bin is created. That is, if the bin is not created, the user cannot click the inventory tab 472 since they cannot add inventory to a bin that does not yet exist.

Figure 55:
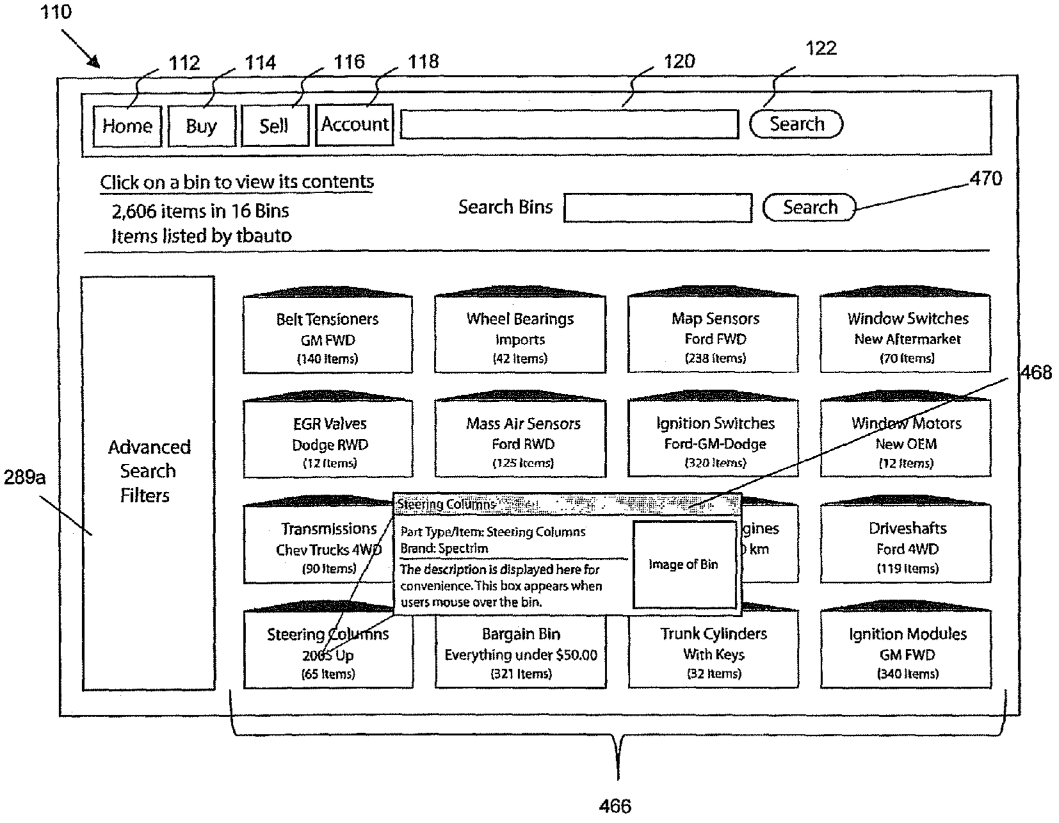
FIG. 55 is a screen shot showing a bin browsing page.

As discussed above in connection with the item-by-item listing process, the seller 14 can review their shipping and payment details in the shipping and payment tab 444. If the seller 14 has created selling preferences, the preferences that were preset will be pre-populated in this tab 444, and if they want to modify them, they can do so on a bin-by-bin basis. The system 10 may also be configured to allow sellers 14 to create selling preferences specifically for bin items. By selecting the photos/video tab 446, the seller 14 can upload pictures and video to be displayed on the front of the bin 466. In this way, when a buyer 12 views the bin, they can select, cursor-over or otherwise highlight or focus on a bin 466 to view more details as shown in FIG. 55. The picture/video can be displayed in a details box 468 that may include the other information associated with the bin 466. In this way, information regarding the bin 466 can be easily accessed without cluttering the appearance. The use of photos and video allows the seller 14 to educate the buyer 12 if they do not know what the item 22 looks like. The seller 14 can select the photo/video tab 446, which loads the photo/video uploading tools described earlier; choose one or more pictures or videos; and select upload as described above. The picture that is displayed on the front of the bin 466 is a thumbnail image and, if the seller 14 uploads multiple images, they can be requested to choose which photo is to be displayed on the bin 466. As also shown in FIG. 55, the bins 466 can be searched using a bin searching tool 470, an advanced search filters option 289*a* can also be provided for the buyer 12 to target specific bins 466 or items within such bins 466 and the page may be also configured to utilize other searching tools and filters mentioned throughout this document.

The bin details pane 442*a* allows sellers 14 to include additional optional details. If the contents of the bin 466 are all of the same brand, the seller 14 can specify a brand by entering one in a brand entry box 456. To provide even further details regarding the contents of the bin 466, the seller 14 can also specify the actual physical location of the bin in their physical store by entering a bin location in Location of Bin 460 which can be made private. Bin location information can be recorded to assist the seller 14 in finding the item 22 once it is sold. For example, if a buyer purchases a relay from a bin located in "Warehouse 1, Rack 2A", when the item 22 is sold, the bin location can be added to the email sent to the seller 14 so they can quickly find it at their physical location for shipping to the buyer 12. A rack entry box 462 can also be provided, which allows a seller 14 to assign a physical bin to a particular shelf or rack. For example, any bins that the seller 14 creates with "27" as the rack number can be automatically grouped and displayed by the system 10 with other bins having the same rack number since they are located on the same rack. This rack number is private and related to the exact position of the bin in the physical store. A private notes entry box 464 can also be provided to the seller 14 to allow them to enter private information about their bin contents. For example, the seller 14 may specify: "Make sure you pack these parts properly because the last time we shipped one of these, the courier dropped the box". This system 10 can then access this information and add the private notes to the email sent to the seller 14 notifying them that an item 22 from their bin has been sold. In this way, the seller 14 can remind themselves of specific information that they do not necessarily want the buyer 12 to see. Other details, options and information 467 may be displayed to further explain the contents of the bin. As mentioned above, the seller 14 can also assign attributes to the contents of the bin using the attribute click boxes 207*c*.

Once a bin 466 has been created by a seller 14, the seller 14 then proceeds to the inventory tab 472 to add items 22 to the bin 466 and can later remove items from the bin 466, e.g. if they are sold offline etc. The inventory tab 472 displays an entry form 474 that resembles a spreadsheet. Various descriptive fields 476 are identified and each data row 478 has a corresponding cell to allow the seller 14 to navigate through the form 474 while adding details along the way, e.g. by "tabbing" through the cells. The entry form 474 can also be configured to allow short-cut keys to be used such as the tab or enter keys. In one embodiment, the enter key can be used to both tab through the entries 478 for all cells except the description cell 480, wherein a carriage return would instead occur.

For the auto parts example described herein, the descriptive fields 476 can be similar to those that would be entered in a regular item listing described above and in this example comprises item number, make/model, year, condition, description, part number, SKU/stock number, price, quantity, private details, more details and fees. As above, the auto-fill tool 52 can be initiated to assist the seller 14 in entering the details. It may be noted that the condition can be different than the representative condition given to the entire bin, e.g. some items can be in a different condition. It may also be noted that, as seen in FIG. 56, for the entry of lengthier details such as for the description field, a larger entry box 480 can be initiated temporarily as shown in FIG. 56. Similar to the bin 466 itself, the seller 14 can add private notes that are specific to the item 22, which are private to them. The more details field can be used to change any of the selling preferences and other details not shown in this view for that individual item. By selecting the more details field, a full listing would then be displayed as shown in FIG. 57. In this way, the complete details do not need to be entered in the same way as for a regular listing but the process for modifying the details can be accessed at any time when accessing the inventory in the bin 466. The fee field can be used to notify the seller 14 of the cost for the listing if there is a fee. A total bin fees tally 481 can be displayed to enable the seller 14 to quickly determine the cost associated with that bin 466. The system 10 can be configured to hide the fee column and/or other columns as well. This figure is used for illustrative purposes only so other columns and details may be included.

To provide further convenience, the entry form 474 can be converted and downloaded to a PDF format by selecting a Download PDF form link 482 so the seller 14 can populate the fields offline. Similar to database and spreadsheet interfaces, tabbing through the end of an entry can cause the next data row 478 to be created by assigning the next sequential item number. It can be seen that the entry form 474 can allow the seller 14 to quickly add items to a bin from one convenient page rather than having to individually list an item using the process described above. Before listing the bin, the seller 14 can select a Save button 487 to save the information without posting it for later completion and, once the bin 466 is to be posted, the seller can select a Post Items button 485. As can also be seen in FIG. 56, helpful hints 484 can be displayed to assist the seller 14 as they are populating the entry form 474.

Once the bins 466 are created and listed by the seller 14, there are various ways that the bins 466 can be viewed by potential buyers 12 or browsers. For example, the items in a bin can be viewed directly by performing a basic search and viewing the individual item's detailed listing (i.e. does not have to be accessed through the bin), by browsing through bins (a bin tab can be provided as described below), by browsing the contents of a bin using standard view, by browsing the contents of a bin using a list view, or by browsing using a "Shelf View" to name a few. Each of these examples will now be described.

Figure 58:
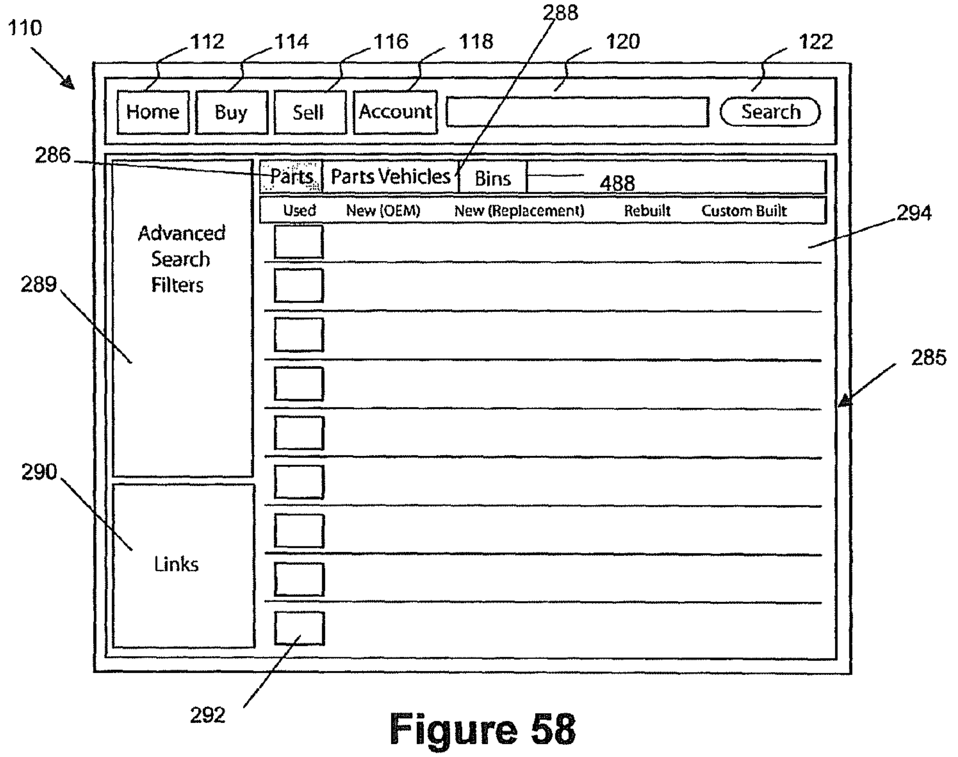
FIG. 58 is a screen shot of an items results page showing inclusion of a bins tab for viewing bins having items associated with a search.

Performing a basic search is one way of looking at all items 22 or multi-items 24 that are posted and match the search criteria. When a buyer 12 performs a search, all of the items 22 (including bin items) appear in the results page shown in FIG. 58. When the search returns bin items, a bin tab 488 can be included. The buyer 12 may then select the bin tab 488 to load the bin results and bin detailed listing 493 as exemplified below and illustrated in FIGS. 59 and 60. FIGS. 18A and 18B are other embodiments of the results page that do not show the bin tab 488.

Figure 59:
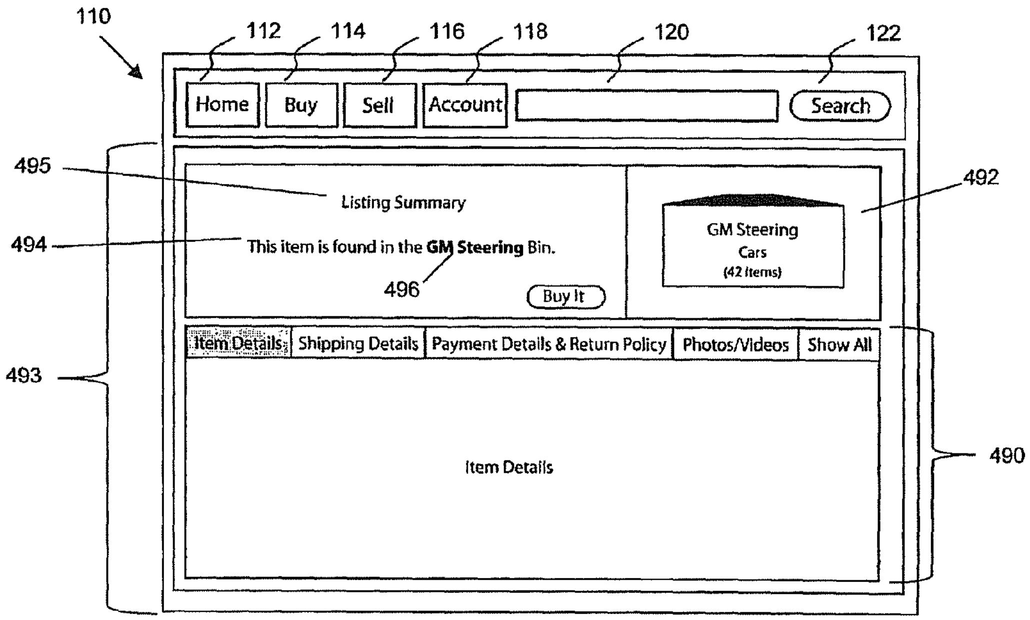
FIG. 59 is a screen shot of a detailed item listing wherein the item is part of a bin.
Figure 60:
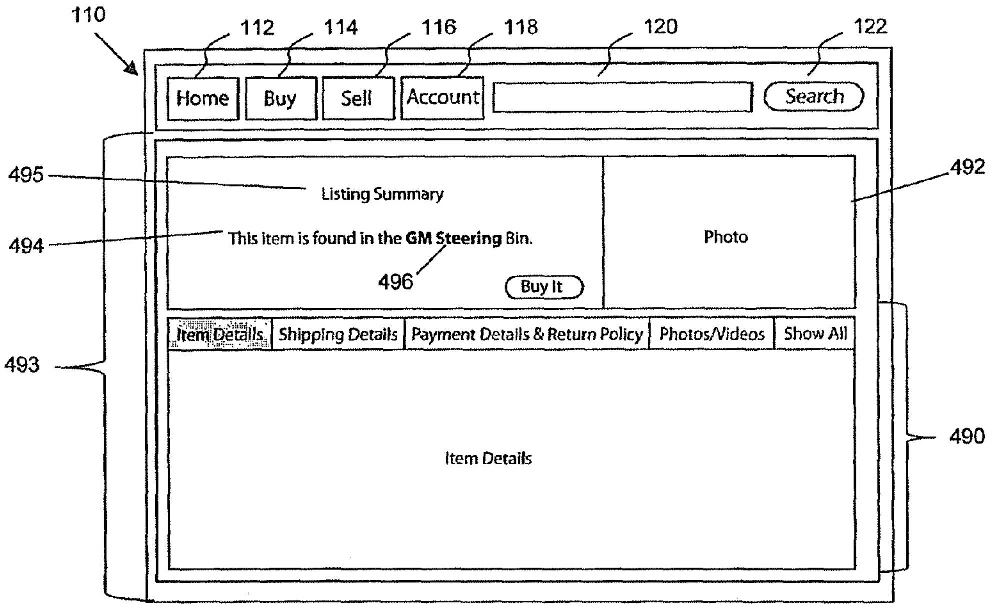
FIG. 60 is a screen shot of another detailed item listing wherein the item is part of a bin and comprises a default photo.

When the detailed listing 493 is loaded for a bin item, as shown in FIG. 59, all of the information for that listing is displayed in a tabular 490 format similar to other listings with the addition of a bin reference portion 494 and a bin picture portion 492. If the seller 14 did not upload a picture with their bin listing, then the picture displayed in the bin detailed listing 493 may display the bin 466, which notifies the buyers 12 that the item is found in a bin 466 as shown in FIG. 59. If the buyer 12 selects the photo portion 492, a new window may then be loaded which then shows the bins contents as will be explained later. If the seller 14 did upload a picture for the listing, then the picture portion 492 can display that picture as shown in FIG. 60. The picture portion 492 can be configured such that only selection of the representation of a bin 466 would take the user to the bin listings. The bin reference 494 is included in the listing summary 495 and indicates the bin 466 that the item is from. As shown in FIGS. 59 and 60, a bin link 496 can be included, which is associated with the bin name. By selecting the bin link 496, the bin 466 contents can then be loaded.

Figure 61:
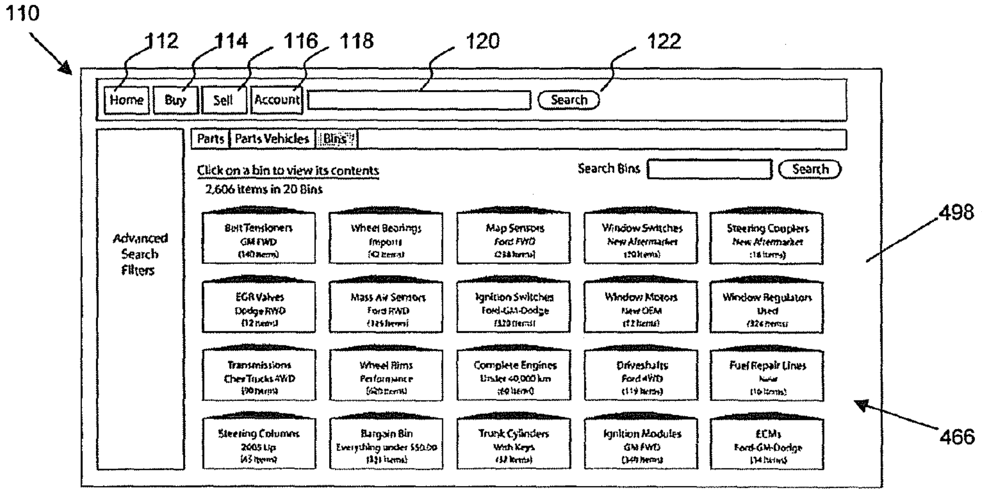
FIG. 61 is a screen shot showing a series of bins the buyer is able to browse through displayed under the bins tab.

As noted above, bin items can also be browsed by browsing through bins. From the main results page shown in FIG. 58, the buyer 12 can select the bin tab 488 and can refine their search from the advanced search menu 289. For example, the buyer 12 could view all bins 466 or view only bins 466 from a particular seller 14. FIG. 61 illustrates an example bin view page 498, which illustrates one embodiment of how the bins 466 can be arranged to make it easy for the buyer 12 to browse through them. If the buyer 12 wishes to see more information without actually clicking the bin 466, they can place their mouse over the bin 466 to bring up a details box 468 as shown in FIG. 55. If the seller 14 wishes to view the bin contents, they can select the desired bin 466.

Figure 62:
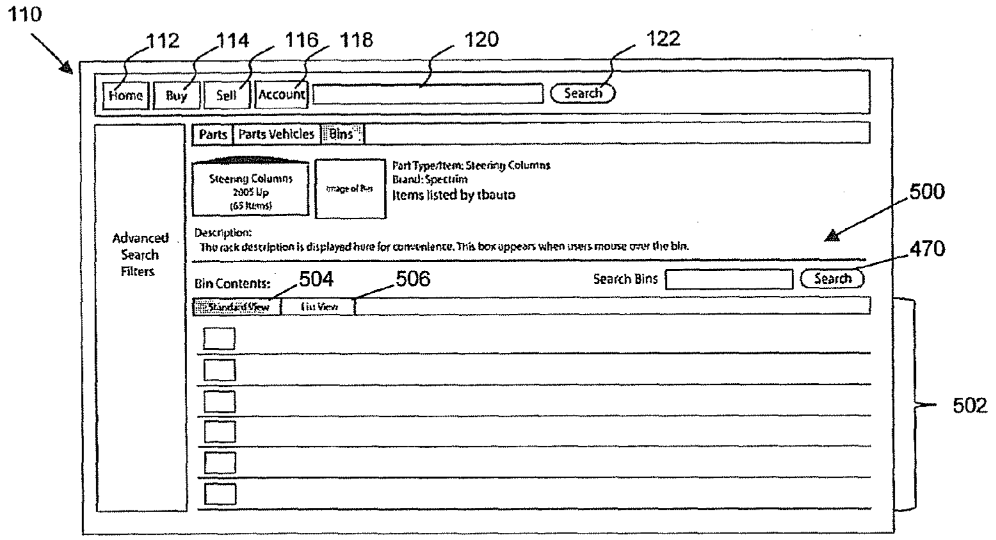
FIG. 62 is a screen shot showing a standard view of an example bin's contents.

When a buyer 12 selects a bin 466, the contents may then be displayed in a "Standard View" 502 by default. A standard view lists all of the bin's 466 items in a manner similar to the way items are displayed in the results page shown in FIG. 58. As seen in FIG. 62, when a bin 466 is selected, the top of the bin listing page 500 can be configured to display the bin's information, the picture of the bin 466, the category, sub-category and descriptor for the items in the bin 466, the brand, the description and the seller's 14 user id. Below is the bin search box 470 that allows the buyer 12 to search only the contents of the bin 466. The buyer 12 may then select a desired item listed in the standard view 502 to display the bin item's detailed listing 493. There may be more search tools than illustrated in these examples.

Figure 63:
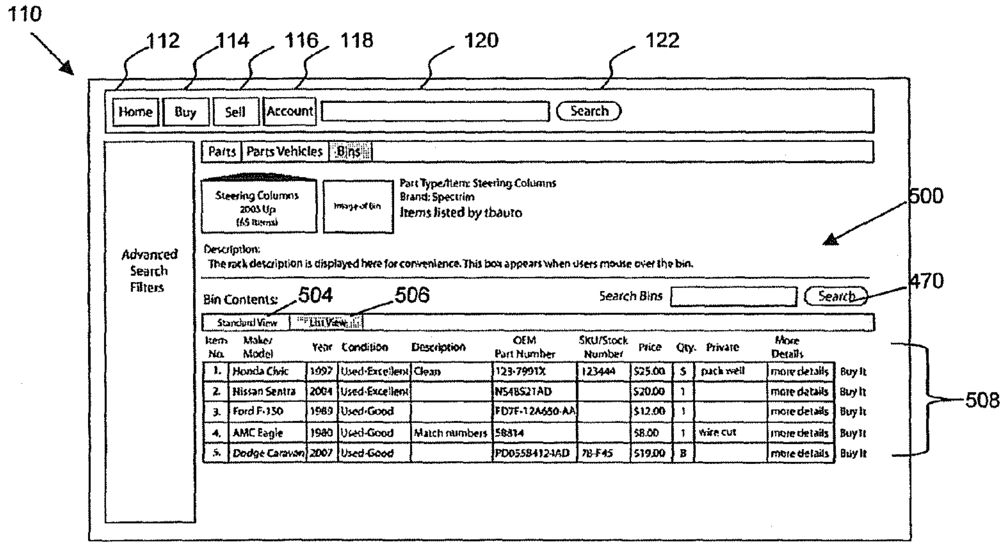
FIG. 63 is a screen shot showing a list view of an example bin's contents.

The contents of a bin 466 can also be browsed using a "List View" 508. The list view 508 is accessed by selecting a List View tab 506 rather than a Standard View tab 504. An example list view 508 is shown in FIG. 63, wherein the information is organized in the same way as displayed to a seller 14 when they enter items into their bin 466 through the entry form 474. The list view 508 is also a convenient way to browse through listings where the items do not have a corresponding picture and can provide more detail at the same time which reduces the need for "clicking" items to view more information. If the buyer 12 wishes to view the bin item's detailed listing 493, they can select any line item, click more details or click the buy it link shown in FIG. 63.

Figure 64:
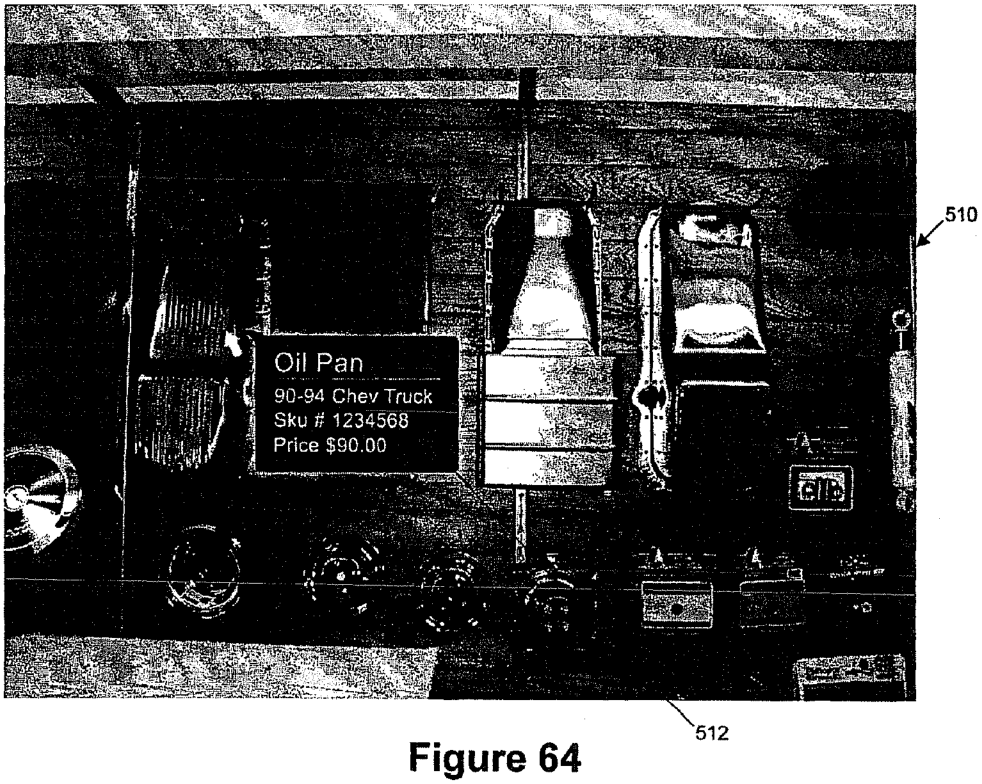
FIG. 64 is a screen shot showing a shelf view comprising a photo of a physical shelf.

The Shelf View allows buyers 12 to view a representation of the actual shelf or rack at a seller's 14 physical location. Shelf View can be used in various ways. For example, if a seller 14 has specified the location and rack number of their items, the system 10 can automatically group the items in the appropriate shelf (based on their location). If the seller 14 allows buyers 12 to use Shelf View, the buyers 12 can browse through the items as if they were in the seller's 14 actual physical store. Turning now to FIG. 64, a photo 510 of an actual shelf can be obtained and uploaded into a suitable interface. Each item 22 in the photo can then be tagged by the seller 14 so that a buyer 12 can highlight an item using their mouse as seen in the photo 510 and a summary box 512 would then be displayed providing the key item details the buyer may want to know such as, but not limited to, price, sku, part numbers, type of item etc. A full bin detailed listing 493 may be displayed upon selecting a link in the box 512 (not shown) or simply by selecting the summary box 512 itself. In this way, the virtual shopping experience can be enhanced by bringing the buyer 12 into the seller's 14 physical store to add a level of reality to their shopping experience.

Shelf View makes it easy for sellers 14 because they can take one picture that includes multiple items reducing both the seller's 14 time needed to take the pictures and the upload time required to send the pictures to the system 10. As shown in FIG. 64 for example, the photo 510 includes 16 different items 22.

The bin 466 may also be auto numbered and assigned a unique "Bin ID". For example, if a user has two bins 466, one can be labelled "Bin 1" and the other can be labelled "Bin 2". This helps the seller 14 keep track of how many bins 466 they have. Sellers 14 can also print their bin contents making it easy to reconcile inventory. As well, an invoice tool (not shown) for sellers 14 can be integrated into the system 10 so that sellers 14 could use the system 10 as their inventory and sales management system. This allows the seller 14 to generate invoices, run end of day reports etc.

The bin tool can also be used with existing inventory catalogues and items to automatically organize the items into bins 466 based on the type of items they are and other related details. For example, a seller 14 that has uploaded their items and/or catalogues to the items database 22 can allow the system 10 to take that inventory and organize it into bins 466 for display purposes. Buyers 12 can then browse through the bins 466 to find items to purchase.

Users may also be able to customize their item entry form (FIG. 56). For example, if a seller 14 feels more comfortable entering the year of vehicle before the make/model, then the seller 14 could move "Year" in front of "Make/Model". DHTML is one suitable technology that may be used for modifying the entry form 474. In another example, if the seller 14 does not enter private information, they could hide the "Private Field" from the entry form 474.

The system 10 can offer certain specialty tags or bin "skins" at an additional cost. The purpose of such specialty tags can be to make the seller's bin 466 stand out and attract more buyers 12. For example, the seller 14 could purchase, "Hot Item", "Limited Edition" or "Great Deal" tags to display in the top right corner of their bin. In another example, a seller 14 with a bin 466 full of chrome racing wheels could purchase a "skin" to make their bin 466 appear to be brilliant shiny chrome to reflect their chrome wheels.

Part-a-Log/Parts Catalogue

Figure 65A:
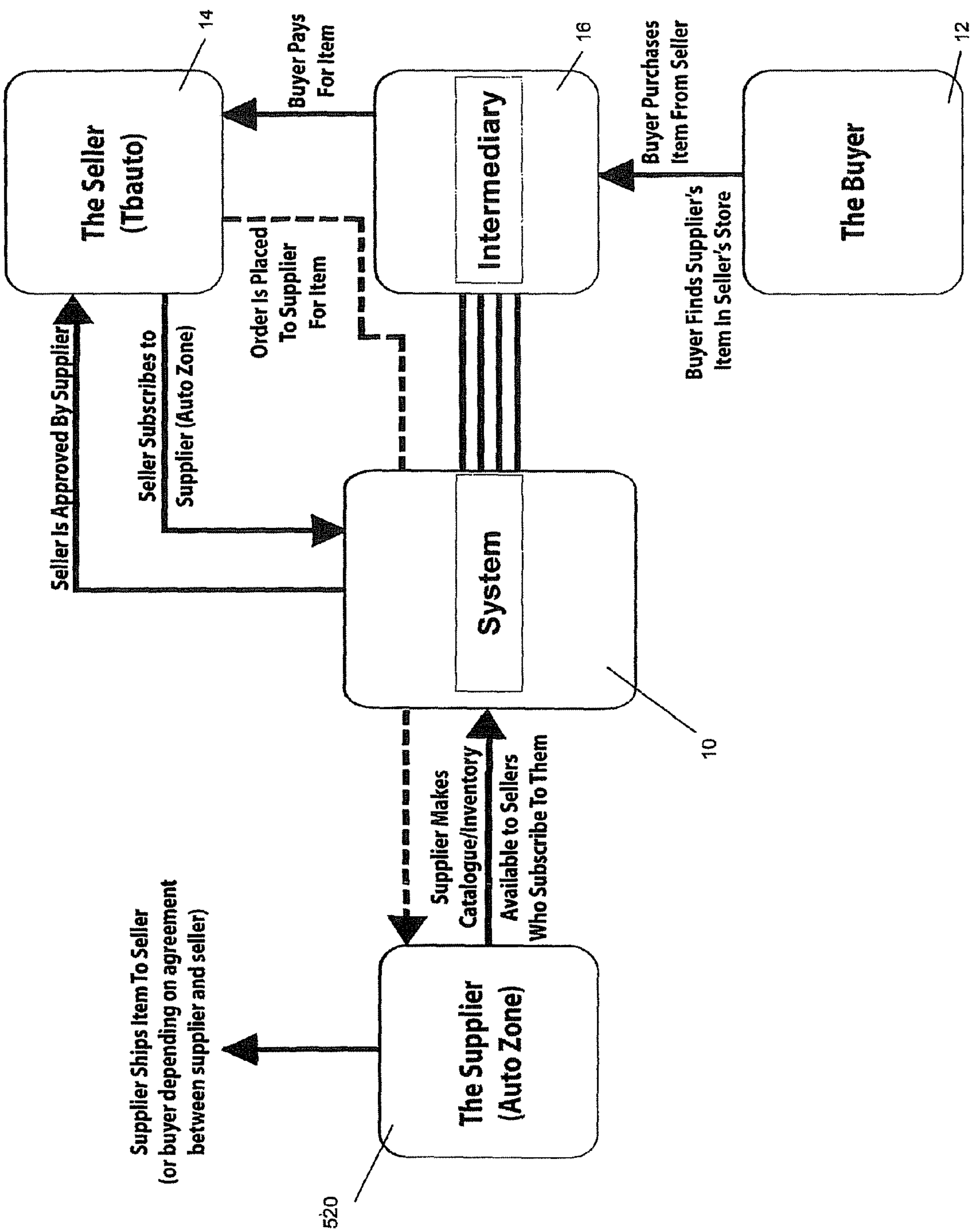
FIG. 65*a* is a block diagram showing one arrangement of the features of the Part-a-Log tool.
Figures 65B, 66:
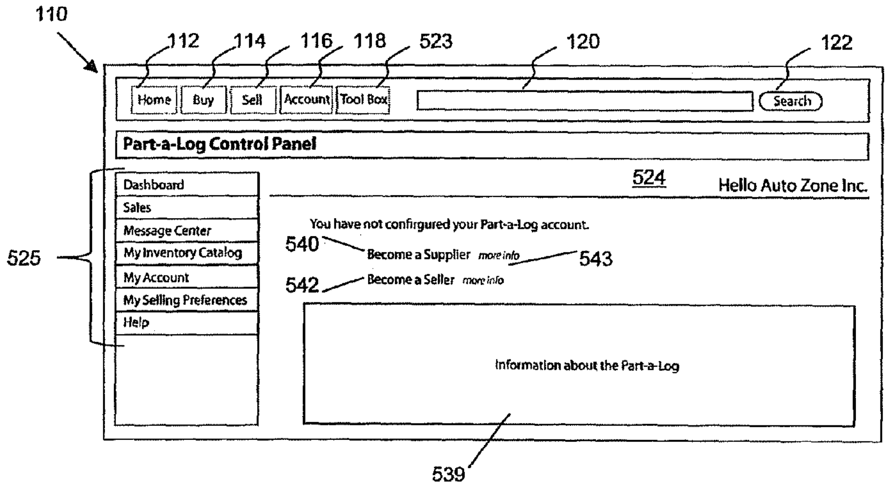
FIG. 65*b* is an example showing the vehicle nomenclature differences between a supplier and seller database entry.
FIG. 66 is a screen shown showing the main Part-a-Log control panel accessible to users before they become a seller or a supplier.

FIG. 65*a* illustrates an overview of the functional outline of the system 10 parts catalogue. The items or parts posted by the seller 14 on the system 10 can be supplied to the seller 14 by a third party group, herein referred to as suppliers 520, wherein a supplier 520 can comprise a manufacturer, wholesaler, distributor, retail store, etc. It may be noted that the suppliers 520 do not require a paper catalog to use the parts catalogue feature, only an inventory list that can either be in constant communication with system 10 or updated on a periodic basis. In order for the relationship between the supplier 520 and the seller 14 to be effective, the seller 14 requires access to said supplier's 520 inventory, as well as a method to translate inventory naming conventions and respond to information updates. The supplier 520 should also be able to translate their inventory nomenclature to match that of the seller 14. This is a challenge known within the industry, as FIG. 65*b* illustrates an example of the naming convention differences between a standard supplier 520 and seller 14. The supplier's 520 vehicle name in their database 521 utilizes a single data field in naming the vehicle make and model;

whereas the seller's 14 vehicle name in their database 522 utilizes two data fields to name the vehicle, separating the make and model into independent data fields. Thus, there is an inconsistency between the inventory listings for a supplier 520 and seller 14, resulting in delays and complications with item searches and orders placed by the seller 14. Therefore, a cohesive media for communication between the said supplier 520 and seller 14 is required.

The system 10 incorporates a mechanism for suppliers 520, sellers 14 and buyers 12 to effectively manage the sale and distribution of items, herein referred to as the "Part-a-Log". The Part-a-Log acts as a master catalogue for all parts contained within the system 10.

Suppliers 520 upload their product catalogues to the system 10, having the intermediary 16 ensure that their data integrates seamlessly with inventory naming conventions used by both buyers 12 and sellers 14. For example, data conforming to ACES, Internet Parts Ordering (IPO), Parts Information Exchange Standard (PIES), Shop Connectivity Standard (i.Shop) or a supplier's 520 custom way of organizing data can be merged into the common standard utilized by the system 10. The supplier 520 has the option of selling items through chosen sellers 14 or directly to buyers 12. A supplier 520 that chooses only to sell through approved sellers 14 can have their inventory catalogue available for viewing to sellers 14, but items can only be purchased through said sellers 14. A seller 14 wanting to sell a supplier's 520 items must apply to and be approved by the said supplier 520. Once approved, a buyer 12 can view and purchase supplier's 520 items through the seller 14. This system eliminates the need for paper catalogues, facilitates making changes to updated pricing and product information and maintains the integrity of the distribution network; a critical requirement in the industry. Also, the Part-a-Log provides buyers 12 with a choice of sellers 14 carrying the same supplier's 520 inventory. Payment to the supplier 520 depends on the relationship between the seller 14 and a supplier 520. If the seller 14 already has an account setup through their physical "bricks and mortar" store, the supplier 520 may charge the seller's 14 "bricks and mortar" charge account. If the supplier 520 and the seller 14 have never done business before, the supplier 520 may require that the seller 14 prepay the items. The choice is ultimately up to the supplier 520 and seller 14, not the administrator 34.

To become a supplier 520 and setup their supplier 520 account, the user would click either the "Part-a-Log" link (not shown) found in the Account link 118 or by selecting the Parts Catalogue option 165 from the main sell menu page shown in FIG. 12, to be brought to the main Part-a-Log Control Panel as shown in FIG. 66. The Part-a-Log application may also have its own web interface and allow the user to go through that interface over the network 18 to also arrive at the Part-a-Log Control Panel. This web interface would be directly connected to the system 10 and may share the categorization database 20.

The left menu shown in FIG. 66 displays the general Part-a-Log control panel tabs 525 that both the supplier 520 and seller 14 have access to. Once the user makes the decision to become a supplier 520 and is approved by the administrator 34, more tabs will be available specifically for suppliers 520, as discussed below. The user sees two links within the Part-a-Log Control Panel workspace 524 the first time they arrive there: a "Become a Supplier" link 540 and a "Become a Seller" link 542. If user wishes to learn more about the different account types they could click the "more info" links 543 to open a new window displaying information on each (not shown). At the bottom of the Control Panel workspace 524 is a Part-a-Log information area 539 which explains what the Part-a-Log is, how it works and what it can do for the user etc.

Figure 67:
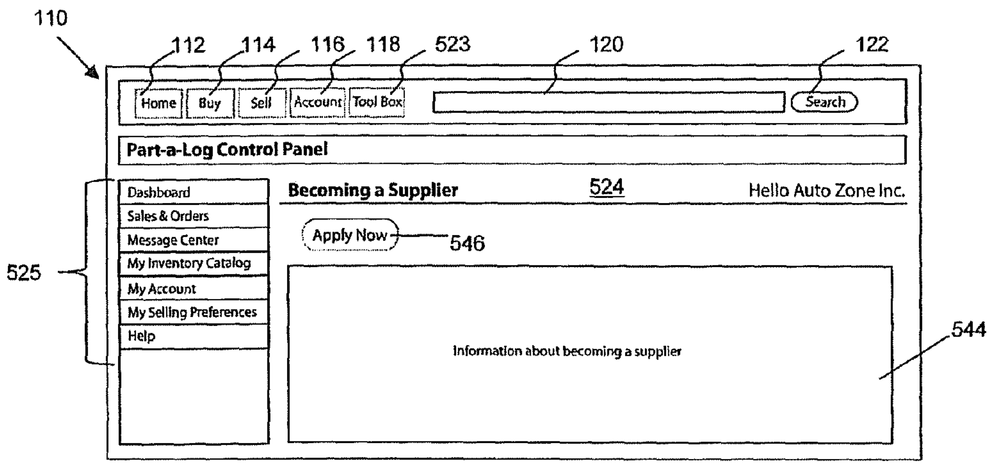
FIG. 67 is a screen shot showing a 'become a supplier' page.
Figure 68:
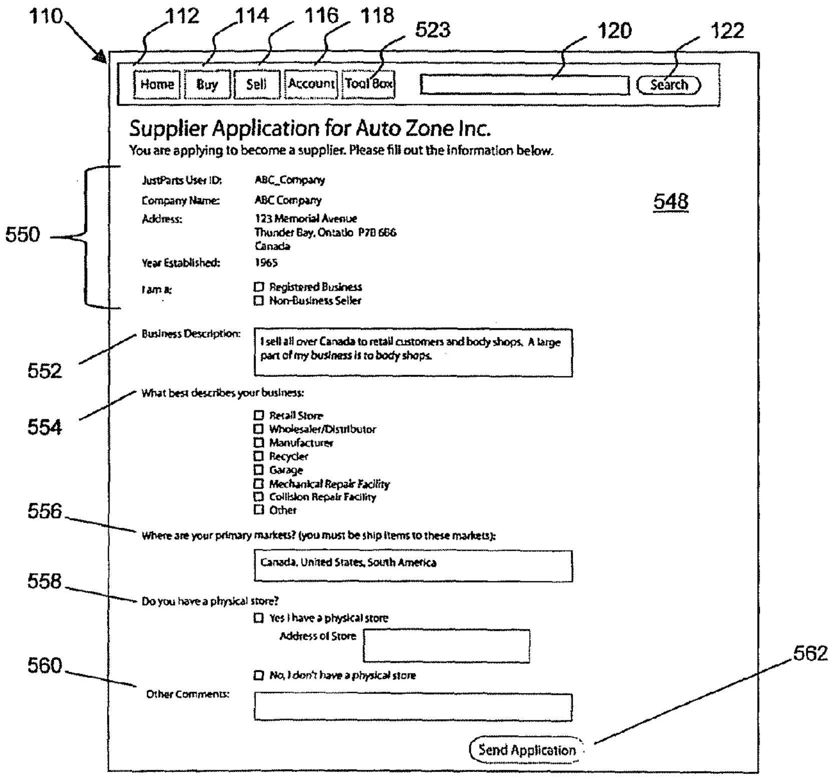
FIG. 68 is a screen shot showing a supplier application foil.

To become a supplier 520, the user would click on the "Become a Supplier" link 540 and be brought to a window featuring a supplier information box 544 containing details about becoming a supplier 520, such as what is a supplier 520, how it works, what is required to become a supplier 520 etc, as shown in FIG. 67. When the user is satisfied and wants to continue, they would click the "Apply Now" button 546 to take them to the supplier application page 548, as illustrated in FIG. 68.

The supplier application page 548 displays the application form that the user is required to fill out. Before the user becomes an active supplier 520, the system 10 and/or the administrator 34 conducts a review to ensure that the supplier 520 is a valid business and follows other security measures to check the user. In some cases, if the supplier 520 wishes to be distinguished as being a "Verified Supplier", the system 10 will work with key third-party companies to review the supplier 520. Some parts of this review are automated while others require the administrator 34.

The supplier application page 548 requires general business information 550. This does not include their contact information, telephone number, email, address etc. as this information is obtained through the registration for the system 10 user account, as previously outlined. The user describes the nature of their business in the Business Description box 552 and selects a Business descriptor 554 most relevant to their business. The supplier application page 548 also requests that the user completes a primary markets field 556 and indicate whether their business has a physical store 558. The user can also include any additional comments 560 pertaining to their business deemed important to the administrator 34. Once the form is complete, they would click the "Send Application" button 562 to send it to the administrator 34 for review.

Figure 69:
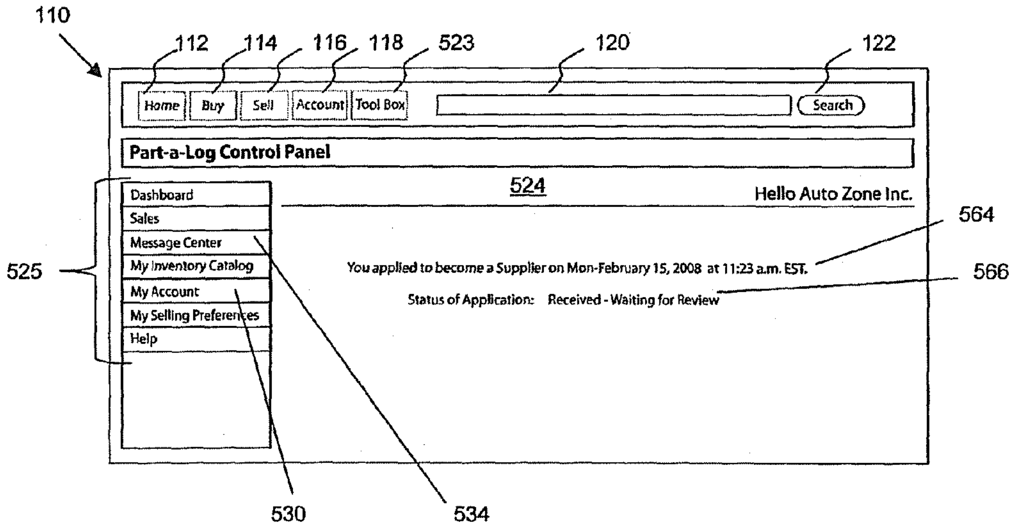
FIG. 69 is a screen shot showing a status page of becoming a supplier.

As demonstrated in FIG. 69, once the application is sent, the date and time 564 they sent the application is displayed as well as the status 566 of their application. The different stages are, but not limited to: "Received—Waiting for Review", "In Review" and either "Unsuccessful" or "Approved". These appear in the main workspace 524 for the users who have applied to become suppliers 520. Once the administrator 34 approves the supplier 520, the user's status changes and they are sent an email welcoming them and giving them instructions on how to upload their inventory (not shown). A copy of the email is also sent to their Inbox 644 in their Message Centre 530, as discussed below. The supplier 520 also gains full access to supplier Part-a-Log control panel tabs 527 displayed along the left hand side of the Part-a-Log Control panel workspace 524 as shown in FIG. 70.

Once the user is a registered supplier 520, they can upload their product data to the system 10. The two most common ways of doing so include uploading their inventory file in an accepted file format such as, but not limited to ".cvs" or ".xls" (not shown); and for larger suppliers 520 or suppliers 520 with advanced integrated systems such as EDI, the system 10 can link to their data network to receive constant updates on products by API's provided by the administrator 34 and/or supplier 520 or by using another technology. No uploading is required in this example.

As discussed earlier, each supplier 520 may store their data differently. The system 10 and the administrator 34 will work with each supplier 520 to ensure their data integrates seamlessly into the system 10 platform and categorization database 20. If the supplier 520 chooses to upload their inventory by a single file, they would do so through the "My Inventory Catalog" tab 532 on the supplier Part-a-Log control panel tabs 527.

Figure 70:
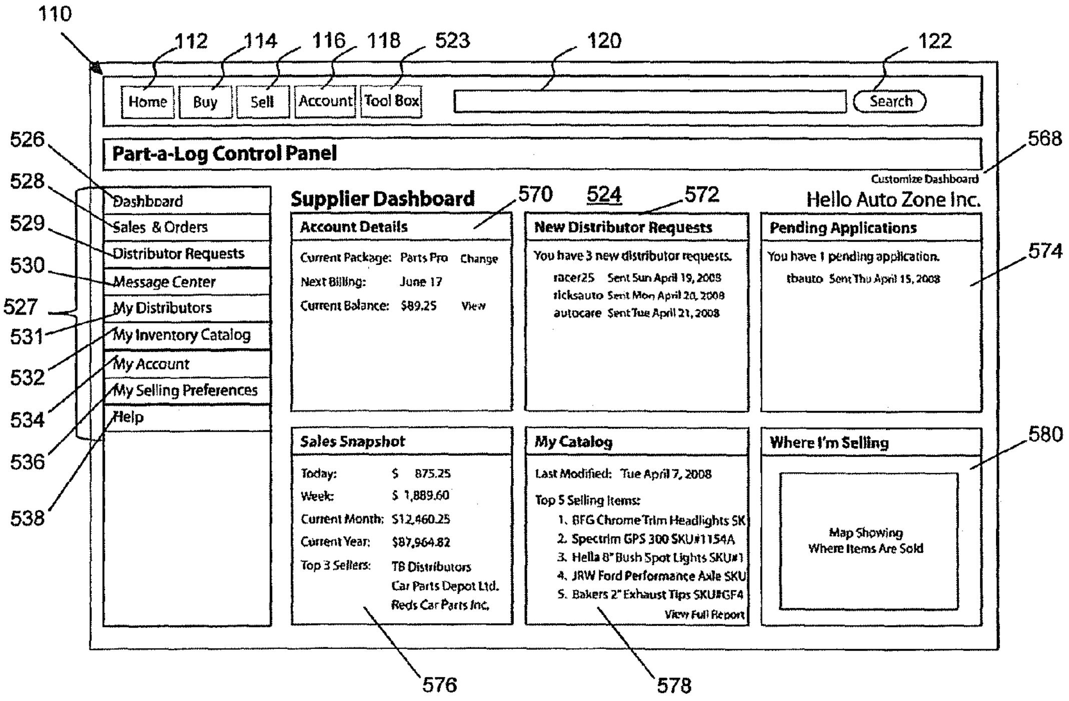
FIG. 70 is a screen shot showing a main supplier page and supplier windows.

Referring to FIG. 70, along the left hand side of the screen is the supplier Part-a-Log control panel tabs 527 which the user can select to navigate through the various supplier's 520 functions. This includes the Dashboard 526, Sales & Orders 528, Distributor Requests 529, Message Centre 530, My Distributors 531, My Inventory Catalog 532, My Account 534, My Selling Preferences 536, and Help 538 tabs. The Distributor Requests 529 and My Distributors 531 tabs are specific to suppliers 520 and are added to the general Part-a-Log control panel tabs 525 once the user becomes a registered supplier 520. Each of the supplier Part-a-Log control panel tabs 527 will be discussed herein.

FIG. 70 illustrates the user has selected the Dashboard tab 526, and in this example the Part-a-Log control panel workspace 524 contains 6 windows displaying information particular to the supplier's 520 account. The Account Details window 570 shows the supplier's 520 account related details such as: what seller package they are enrolled in, their next billing date, their current account balance etc. The New Distributor Requests window 572 gives the supplier 520 a summary of their distributor requests from sellers 14. A distributor request is a request from a seller 14 wanting to subscribe to the supplier's 520 inventory items catalogue to sell the supplier's 520 inventory to buyers 12. The seller's 14 user ID may be displayed along with the date the supplier 520 received the request for convenience. To view any of the requests from the dashboard 526, the supplier 520 would click on any one of the requests. The Pending Applications window 574 shows the supplier 520 which seller's 14 requests are pending. When the supplier 520 views a seller 14 request, they either accept, decline or decide later. If the supplier 520 has not either accepted or declined the request, the request is considered pending. The Sales Snapshot window 576 shows the supplier 520 the dollar value of their sales orders they generated through the system 10. The sales orders may be broken down by: today, week, current month and current year. As well, the supplier's 520 top 3 sellers may be displayed. The My Catalog window 578 may show the supplier 520 the last time they updated or synced their catalog with the system 10 and may display the top five selling items in their catalog. The Where I'm Selling window 580 shows the supplier 520 a map depicting the locations of where they are selling their items. The system 10 can be configured to display more or less details than shown in the Figures.

The user has the ability to customize the display of the Dashboard tab 526 Part-a-Log control panel workspace 524 by clicking the "Customize Dashboard" link 568 in the top right corner of the page.

The "Sales & Orders" tab 528 is where all of the sales and order information are located and organized. When a seller 14 sells an item to a buyer 12 through the system 10, an order is automatically placed by the seller 14 to the supplier 520 for that sold item. The best way to illustrate this is by the following example. The seller 14 had applied to a supplier 520 to sell their products and was approved by the supplier 520. The next day, a buyer 12 searches the system 10 and finds an air filter they wish to purchase from the seller 14. The air filter is a product from the supplier 520 that the seller 14 doesn't actually physically have in stock. They have it in their "virtual inventory" meaning that if the seller 14 sells it, they will need to buy it from the supplier 520 before sending it to the buyer 12. So the buyer 12 decides to purchase the air filter and pays the seller 14. The seller 14 then receives confirmation of the payment from the buyer 12 and an order is then automatically sent to the supplier 520 for the air filter by the seller 14. Depending on what arrangement the seller 14 and the supplier 520 have, the seller 14 may or may not have prepaid the item. Some suppliers 520 offer credit to their sellers 14 meaning that the sellers 14 don't have to pay for every item individually before ordering it. For the purposes of this example, we will assume that the seller 14 had to prepay the air cleaner. Once the seller 14 pays the supplier 520 for the air cleaner, the supplier 520 either sends it to the seller 14 or ships it directly to the buyer 12 (depending on the way the seller 14 and supplier 520 have setup their account).

Figure 71:
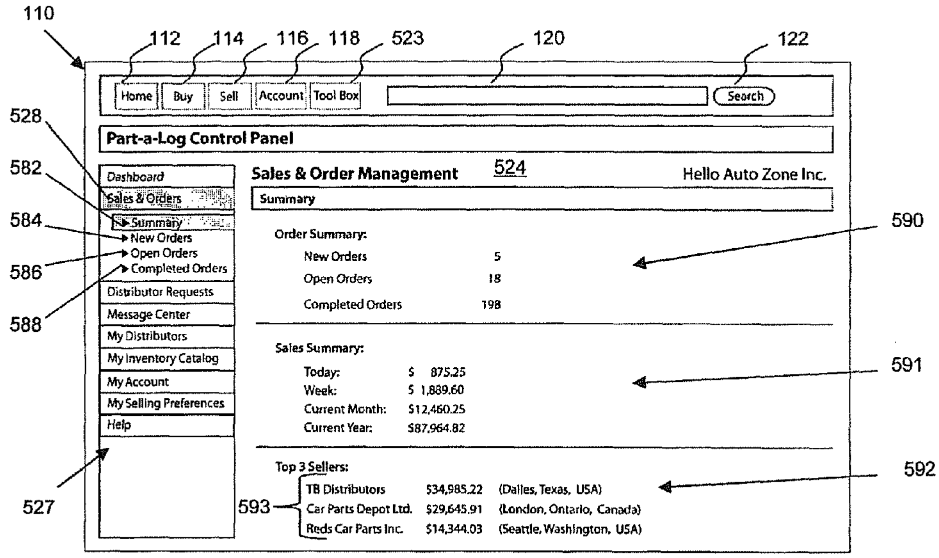
FIG. 71 is a screen shot showing a sales and orders summary page for a supplier.

As shown in FIG. 71, there are four separate sections in the "Sales & Orders" tab 528: Summary 582, New Orders 584, Open Orders 586 and Completed Orders 588.

When the user selects the Summary tab 582, a snapshot of the supplier's 520 performance is displayed in the Part-a-Log control panel workspace 524. The top of the page, as shown in FIG. 71, features an order summary section 590 which displays the number of new orders, open orders and completed orders the supplier 520 has received from sellers 14. Also, the page features a sales summary section 591 that translates their orders into dollar figures so the supplier 520 could see hard dollar values of their performance. The sales summary 591 also shows the supplier their sales by current day, week, current month, and current year. The Top 3 Sellers section 592 features the supplier's 520 top three sellers 14. The seller's 14 business names are displayed along with their dollar sales figures and their location. If the supplier wants to view the seller's 14 account, they would click the business name 593 to view the seller's 14 profile in greater detail.

Figure 72:
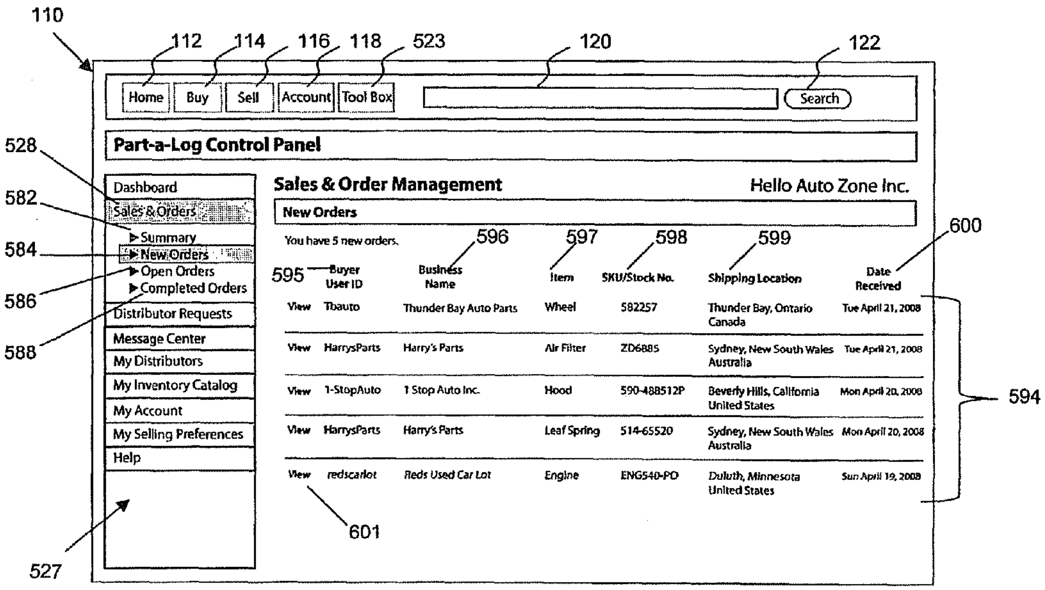
FIG. 72 is a screen shot showing a sales and orders page for suppliers to view new order listings.

When user selects the New Orders tab 584 listed under the Sales & Orders tab 528, the order details for when the supplier 520 receives orders for their products are displayed, illustrated by FIG. 72. The new orders list 594 are displayed in order of when they were received with the newest order at the top. The supplier can change the way the orders are sorted to oldest to newest if they wish by clicking the "Date Received" title 600. The orders shown on this page are in summary farm showing only the buyer's user ID 595, business name 596, item descriptor 597, SKU/Stock number 598, shipping location 599 of the buyer and the date 600 the order was received. To view the full order details, the supplier would click the "View" link 601 beside the order to bring up the full order details.

Figure 73:
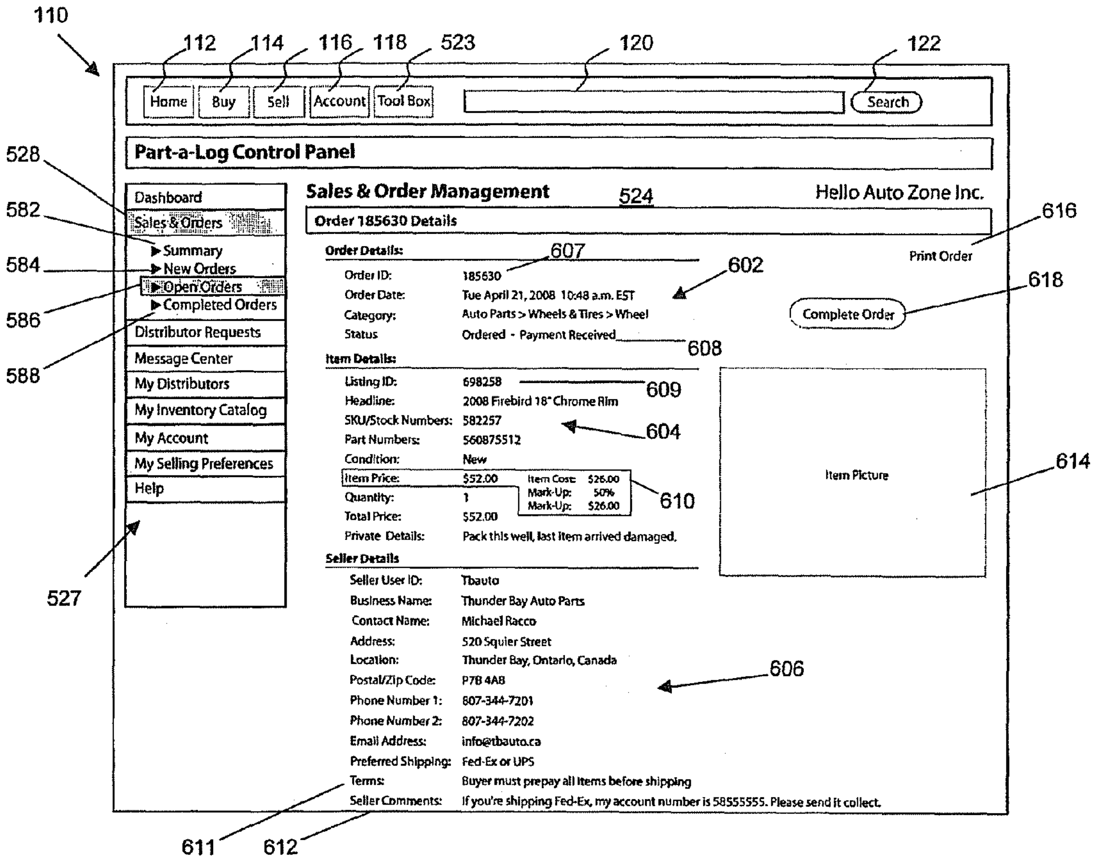
FIG. 73 is a screen shot showing a sales and orders page for suppliers to view an order detail.

The full order details, depicted in FIG. 73, provide all the information for a particular order. For example, in one embodiment the Part-a-Log control panel workspace 524, displays information for the Order Details 602, Item Details 604, and Seller Details 606. Additional information may be added for display.

The Order Details 602 section states the Order ID number 607 generated by the system 10. This number cannot be changed and is used for tracking and reporting within the system 10. Also, the Order Date & Time, in the format of "day of week-month-day-year-time (EST)" and the category path the item was listed in (i.e. Auto Parts>Body Parts>Hood) is shown. Under the Status heading 608 within the Order Details 602 section, the status is set to "Ordered" when the item is ordered and the method of payment is also indicated. If the supplier 520 requires that the seller 14 prepays all items, the status 608 will show "Payment Received" indicating when the seller 14 has paid the supplier 520. If the supplier 520 allows the seller 14 to charge items, then the status will indicate "Charged on Account" once the supplier 520 has filled the order. This is explained in greater detail below.

The Items Details 604 section provides information relating specifically to the item order by the seller 14, such as the headline, stock numbers, and condition of item. The listing ID 609 is generated when the supplier 520 listed the item in their inventory and is used for tracking the listing. This is different than the order ID 607 as there can only be one unique order ID 607 (every order is considered unique) but there can be multiple orders with the same listing ID 609 (different orders with the same items sold). For example, a fuel tank for a '90 Chev Blazer is listing ID #123456. Six different sellers 14 order the same fuel tank so although the listing ID #123456 is the same for all six orders (they ordered the same item), each order is different so they will have different order IDs 607. The item cost 610 is an optional field that displays the cost of the item for the supplier. Due to constantly changing prices, the item cost 610 is displayed for convenience for the supplier in reviewing their selling prices. For example, let's assume that the cost of the supplier's item increased to $50. If the supplier sees that the selling price is $49.00, they will know immediately that a $1.00 gross profit is impractical. This is very helpful with items whose cost changes frequently. The system 10 also uses this field to calculate the mark-up for the item based on the price charged to sellers 14.

The Seller Details section 606 displays business information regarding the seller 14 of the item. The account terms 611 determined by the supplier 520 at the time they approved the seller 14 are also displayed. Some suppliers 520 deal with sellers 14 that already have accounts setup through their "bricks and mortar" stores. In these cases, most of the time the suppliers 520 don't require the seller 14 to prepay each item individually since they will charge their "brick and mortar store" charge account. If the supplier 520 and seller 14 have never done business before, then the supplier will likely require the seller 14 to prepay all items before they are shipped. Whichever option the supplier 520 chooses, they must specify it in the terms 611. The example in FIG. 73 shows that under the terms heading 611, the supplier requires the seller 14 to prepay all items. This is later explained in more detail. Seller comments 612 allow the seller 14 to enter comments that appear on every order form. The example in FIG. 73 shows that the seller's comments 612 were, "If you're shipping Fed-Ex, my account number is 58555555. Please send it collect." This makes it easy for the seller 14 to communicate special information pertaining to their orders. The seller 14 can update this any time and the changes will appear on all new orders immediately. Also displayed within the Part-a-Log control panel workspace 524 is an item picture 614. The item picture 614 shows the default picture displayed in the item's detailed listing 228. If no photos are available, the outline of the photo will remain in place with the words "No Photo Available". Clicking this item picture area 614 will load up the actual detailed listing 228 in a new window allowing the supplier 520 to view the full listing as the buyer 12 and seller 14 see it.

The supplier can click the "Print Order" link 616 in the top right corner of the page to print out a copy of the order details. Another embodiment of the order details incorporates an "Email Order" link that will allow the supplier 520 to email the order (not shown). This is useful for larger companies.

Once the item is packaged and ready to be shipped, the supplier 520 can click the "Complete Order" button 618. This will bring the supplier to a new page that allows them to enter in the tracking information if they wish (not shown). Some suppliers 520 will not do this if they are shipping multiple items to the seller 14. For example, assume the seller 14 has had an account with a supplier for over 20 years. The seller 14 subscribed to the supplier's 520 inventory to make it easier to sell. The seller 14 places regular stock orders through their "bricks and mortar" store with the supplier 520 on a weekly basis, thus forcing the supplier 520 to enter in detailed tracking information every time they sell an item through the system 10 would be too time consuming and unnecessary. In this instance, simply by clicking the "Complete Order" button 618, the seller 14 will know that the order has been processed (that is, the supplier has charged the item to the seller's 14 account) and the item has been packaged and shipped, or, will be shipped once their regular stock order is shipped. Clicking the "Complete Order" button 618 will also move the order from the "Open Orders" section 586 to the "Completed Orders" 588.

Figure 74:
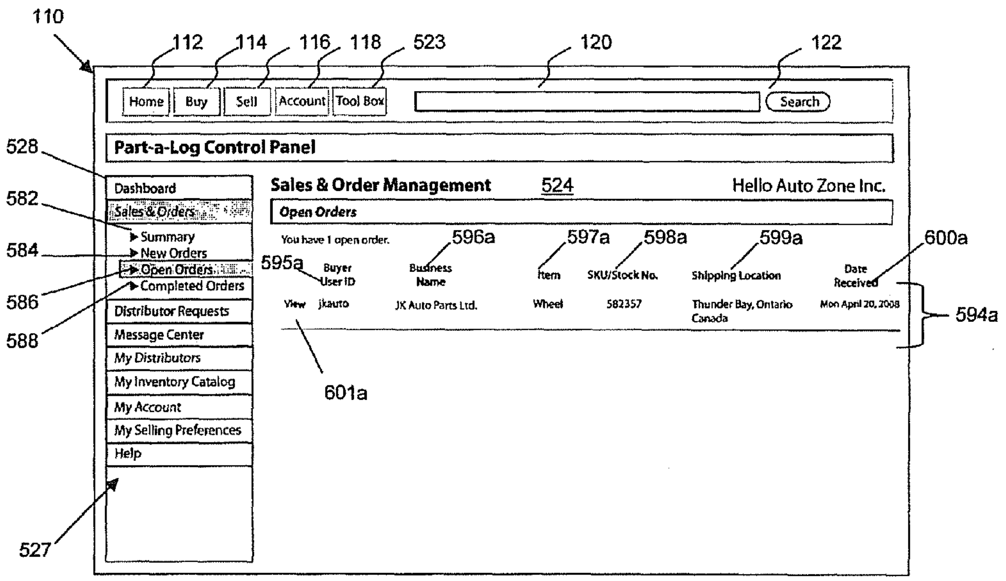
FIG. 74 is a screen shot showing a sales and orders page for suppliers to view a list of open orders.

Once the supplier 520 views the new order, as shown in FIG. 73, the order is moved to the "Open Orders" section 584 as they are no longer considered new and not yet completed. To close out an order, the supplier must click the "Complete Order" button 618 to move it into the "Completed Orders" section 588. The "Open Orders" 586 view is similar to the new orders 584 view, showing a new order list 594*a*. This is illustrated in FIG. 74, where like elements to those shown in FIG. 72, are given like numerals with the suffix "a" for clarity. The "Completed Orders" tab view (not shown) lists completed orders for the supplier's 520 reference. Completed orders remain in the system for 6 months after which time they are cleared out. Suppliers 520 are therefore encouraged to print out hard copies of their order details (FIG. 73) for their records.

Figure 75:
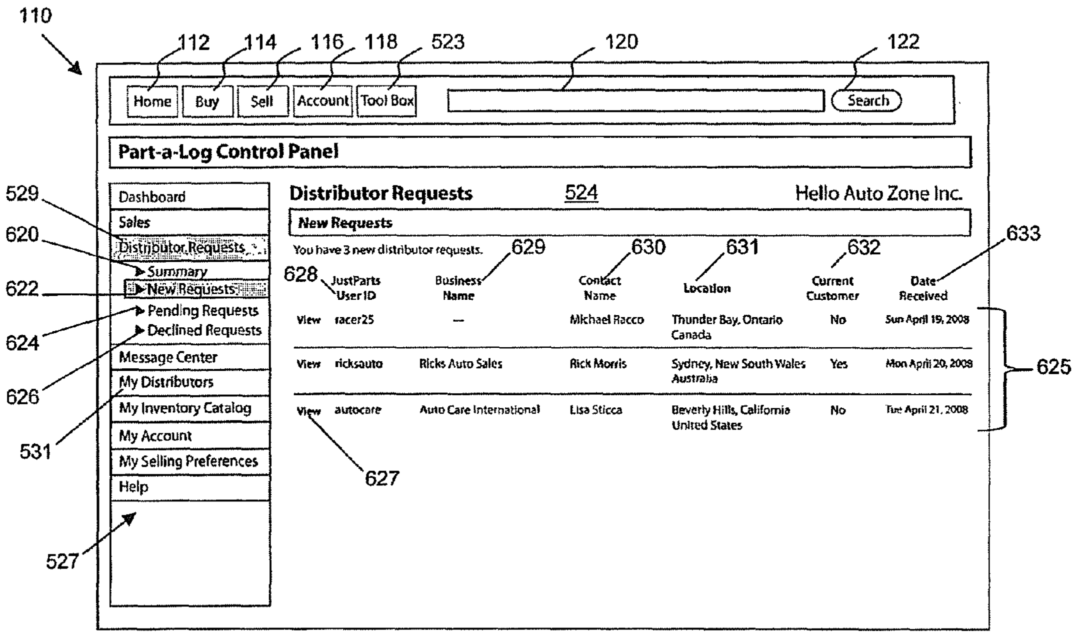
FIG. 75 is a screen shot showing a distributor request page listing the supplier's new seller requests.

As shown in FIG. 75, distributor requests are sent to the supplier 520 by sellers 14 wanting to sell the supplier's 520 products. The Distributor Requests section 529 manages the supplier's distributor requests and is broken up into four sections. The summary tab 620 gives the supplier a quick overview of how many distributor requests, pending requests and declined requests the supplier 520 has. When the Distributor Requests tab 529 is clicked, the summary page (not shown) is displayed by default. The New Requests tab 622 displays all of the new requests 623 sent to the supplier 520. When a seller 14 applies to a supplier 520, the seller 14 is listed on this page for supplier 520 to review. The page displays the seller's 14 user ID 628, business name 629 (only if they are a business), the contact name 630, location of the seller 631, if they are a current customer 632 of the supplier 520 and the date 633 the supplier received the request.

FIG. 75 shows that the supplier (e.g. Auto Zone) has received three seller requests 623. To view the application, the supplier would click the "View" link 627 beside the appropriate seller 14 to load up the seller 14 application as shown in FIG. 76.

Figure 76:
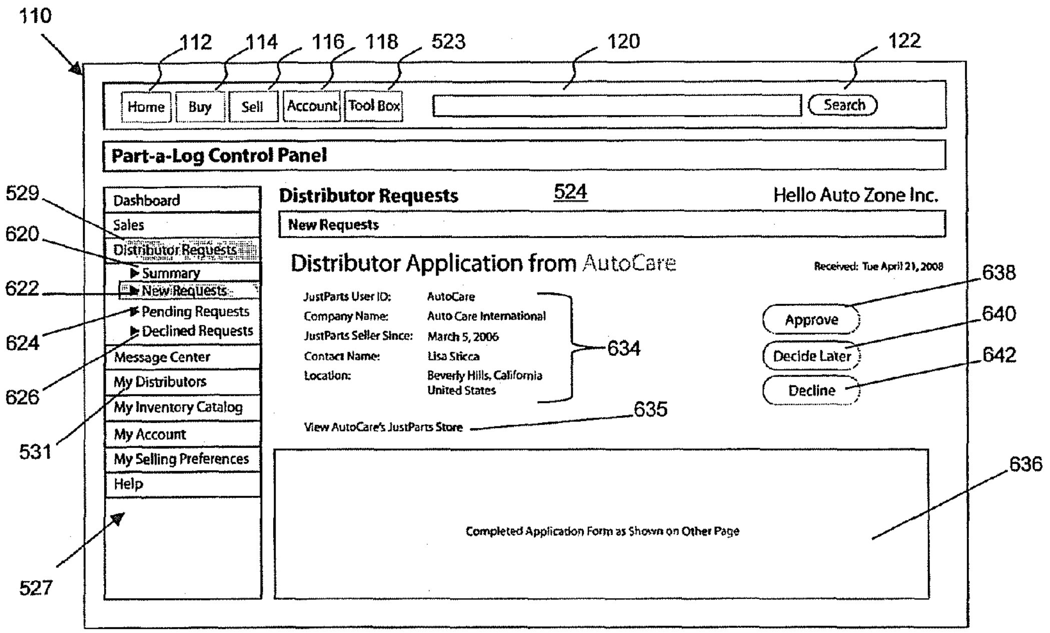
FIG. 76 is a screen shot showing a distributor request page for suppliers to view the details of a seller's request.

FIG. 76 shows the summary information 634 at the top of the page and displays all the details listed in the seller's completed application form 636 below. The supplier 520 can select either the Approve button 638, Decide Later button 640 or Decline button 642 to address the seller's 14 request. If the supplier 520 approves the seller 14, the application would move into the "My Distributors" tab 531 and the seller 14 would be able to sell the supplier's 520 items 22. Buyers 12 would be able to purchase items from the supplier 520 through the newly approved seller 14. If the supplier 520 chooses the Decide Later button 640, the application would move into the "Pending Requests" tab 624 and if the supplier chooses the Decline button 642, the application would move into the "Declined Requests" tab 626. The supplier can also view the seller's 14 store by selecting the "View Seller's JustParts Store" link 635. At the bottom of the Part-a-Log control panel workspace 524, the seller's 14 distributor application form (shown later in FIG. 89) is displayed.

The Pending Requests tab 624 displays all of the seller 14 applications for which the supplier 520 clicked the Decide Later button 640. This allows the supplier 520 to review the applications at their convenience. The sellers 14 are organized exactly as shown within the New Requests tab 622. Once the supplier 520 is ready to make a decision, they would click the "View" link 627 beside the appropriate seller 14 application. They would have the same three buttons available: Approve 638, Decide Later 640 and Decline 642 (not shown).

The Declined Requests tab 626 displays all of the applications that the supplier 520 declined (not shown). The sellers 14 are organized exactly as shown within the New Requests 622 and Pending Requests 624 tabs. If the supplier 520 changes their mind and decides they want to approve one of their declined sellers 14, they would click the "View" link 627 beside the appropriate seller application. An "Approve" button would be displayed on the page allowing the supplier 520 to change their mind. If they click this, a notification would be displayed telling the supplier 520 that they are about to approve a declined seller 14. Once they confirm, the seller 14 information and application is moved into the "My Distributors" tab 531 (not shown).

Figure 77:
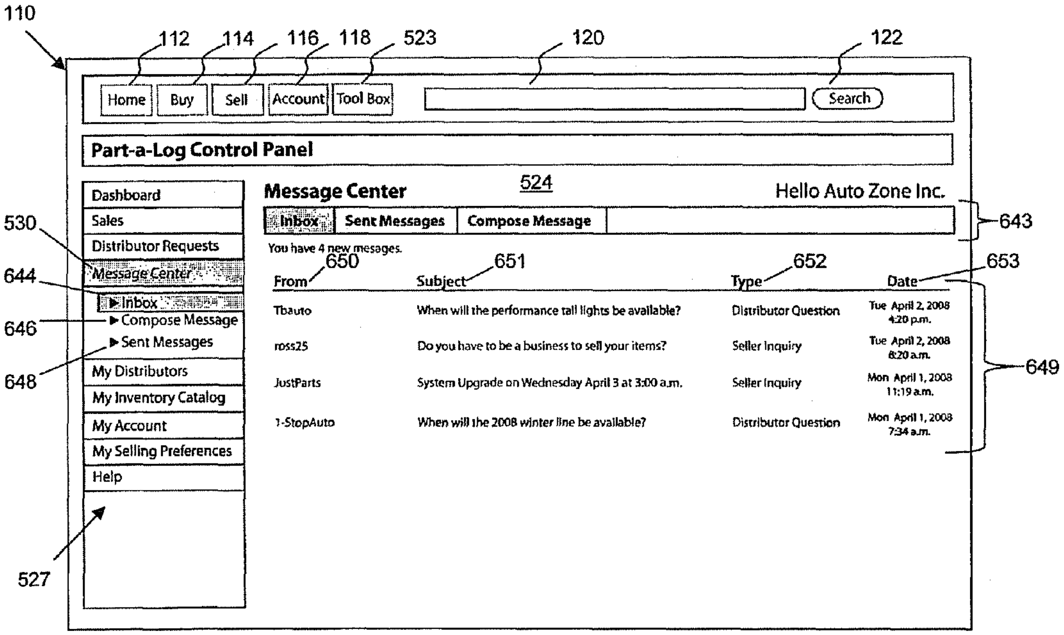
FIG. 77 is a screen shot showing a message centre inbox listing a user's messages.

Continuing with FIG. 77, the Message Center tab 530 is the central location where all correspondence from sellers 14, potential sellers 14 and the system 10 is organized and where the supplier 520 can create and send messages from. Three links appear on the side menu under messages: Inbox 644, Compose Message 646 and Sent Messages 648. For convenience, the same links are also organized into Message Centre headings 643 in the message area of the Part-a-Log control panel workspace 524.

As soon as the supplier clicks on the "Message Center" tab 530, they are defaulted into the Inbox 644 to read messages immediately. When the supplier 520 has new, unread mail, the words "New Messages" appear in the top right corner of their screen (not shown). Clicking this also takes them into their inbox 644. The message list 649 is organized by: From 650, Subject 651, Type 652 and Date 653. The From heading 650 displays the user ID (i.e. the seller 14 name). If the message is from the administrator 34, "JustParts" would appear in the "From" 650 field. The subject 651 line displays the subject specified by the message sender. The Type field 652 displays the type of message it is. Examples of different message types are, System Message, Seller Inquiry, Order Confirmation etc. This makes it easy and convenient for the supplier to sort the message list 649 when there are many messages. For example, the supplier may want to read only their Order Confirmations instead of filtering through all of their mail. The date 653 shows the day of the week, month, day, year and time in EST. To view the full message, the supplier would click the subject 651 of the message they wish to read. The page then refreshes and shows the message (not shown).

Other embodiments of this feature include a notification system allowing the administrator 34 to send automated system messages. For example, if a supplier 520 hasn't paid their system 10 invoice, the system 10 can send an automated reminder message to the user.

The Compose Message tab 646 or selecting "Compose Message" from the Message Centre headings 643 will bring the supplier 520 to the application where they could compose a message (not shown). To compose a message, the supplier would enter the name of the recipient. The name would automatically appear by the auto-fill tool 52 if the recipient is one of the supplier's sellers 14. For example, the seller 14, Tbauto is one of the supplier's sellers 14 so by typing, "Tb" in the "To" field, Tbauto would appear in the results as a suggestion. The supplier could arrow down to select it. The auto-fill tool 52 works by user ID, business name and contact name. Typing in any of those three in the auto-fill 52 would pull up a suggested match. This is convenient for the supplier 520 as most messages they compose will be to users in their address book. When a message is sent, a copy is placed under the "Sent Messages" tab 648. If the supplier wants to view the messages they sent, they could view them by clicking the "Sent Messages" tab 648.

The "My Distributors" tab 531 is where the supplier 520 can view all of their seller's 14 details and information. Under the My Distributors tab 531, the user can select the Summary 654, Distributor Details 656, or Suspended 658 tabs.

Figure 78:
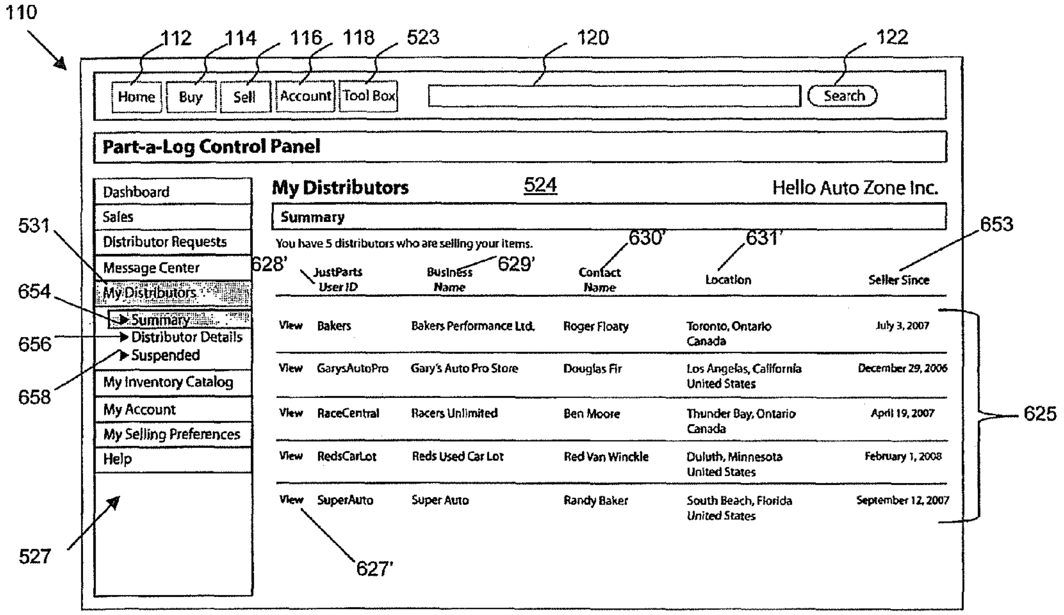
FIG. 78 is a screen shot showing a summary page listing a supplier's approved distributors.

When a supplier clicks on the My Distributors tab 531, the Summary tab 654 is shown immediately, as illustrated in FIG. 78. The summary tab 654 displays a list of the supplier's sellers 14 similar to the listing provided under the Distributor Requests tab 529 illustrated in FIG. 75. For clarity like elements are given like numerals with the suffix "'". The list 625 of the suppliers' sellers 14 are organized by user ID 628', business name 629', contact name 630', location 631' and seller since date 653. To view the details about individual sellers 14, the supplier 520 would click the "View" link 627' beside the seller's 14 user ID 628'. This will show seller's 14 details and the supplier Part-a-Log control panel tabs 527 changes to the Distributor Details tab 656.

Figure 79:
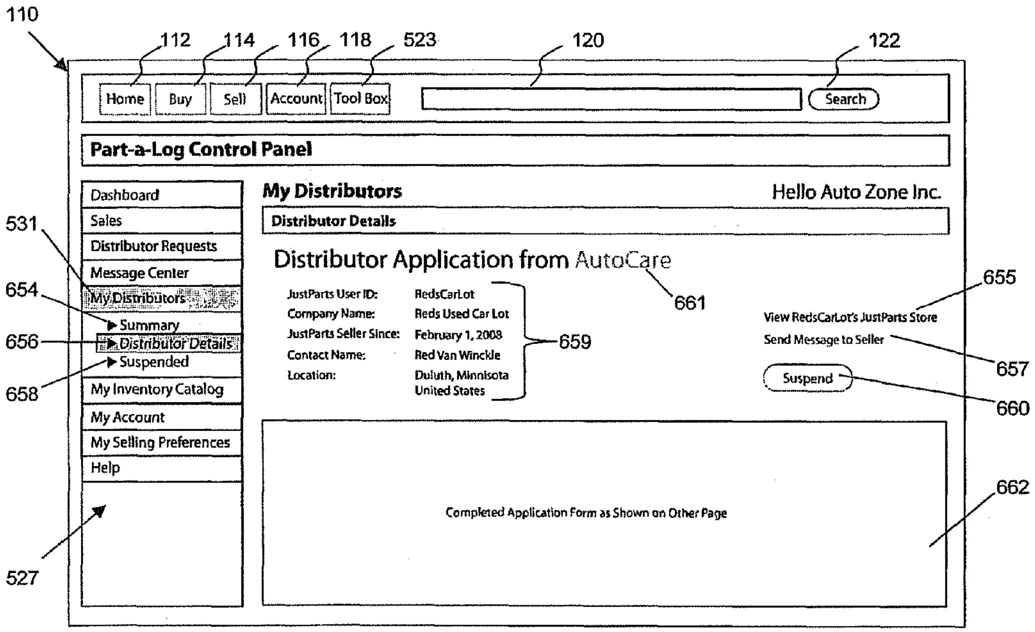
FIG. 79 is a screen shot showing a detail page describing an active distributor.

As demonstrated in FIG. 79, under the Distributor Details tab 656, a supplier can view the details of a seller 14; all details from their application form are displayed in the form window 662. The top details section 659 displays all the information that was available in the summary tab 654 along with two links: a "View Seller's JustParts Store" link 655 which would direct the supplier 520 to the seller's 14 store and a "Send Message to Seller" link 657 that when clicked would open the compose message page 646 in the message center 530. Another embodiment of this feature can include a link "Sales Info" which would allow the supplier to click the link to view the sales activity of the seller 14 (not shown).

If the supplier 520 does not wish the seller 14 to sell their inventory, the supplier 520 would click the Suspend button 660. When a seller 14 is suspended, they no longer have access to the supplier's 520 inventory and all listings containing their inventory are suspended (that is, not visible to buyers 12). When a seller 14 is suspended, an email is sent to both the supplier 520 and seller 14 confirming the suspension. At the bottom of the Part-a-Log control panel workspace 524, a display box 662 shows all of the details found on the seller's 14 original application (see subsequent FIG. 89). A search tool (not shown) would allow the supplier 520 to search for a particular seller 14. Also clicking the seller name 661 would open their seller 14 profile on the system 10.

Figure 80:
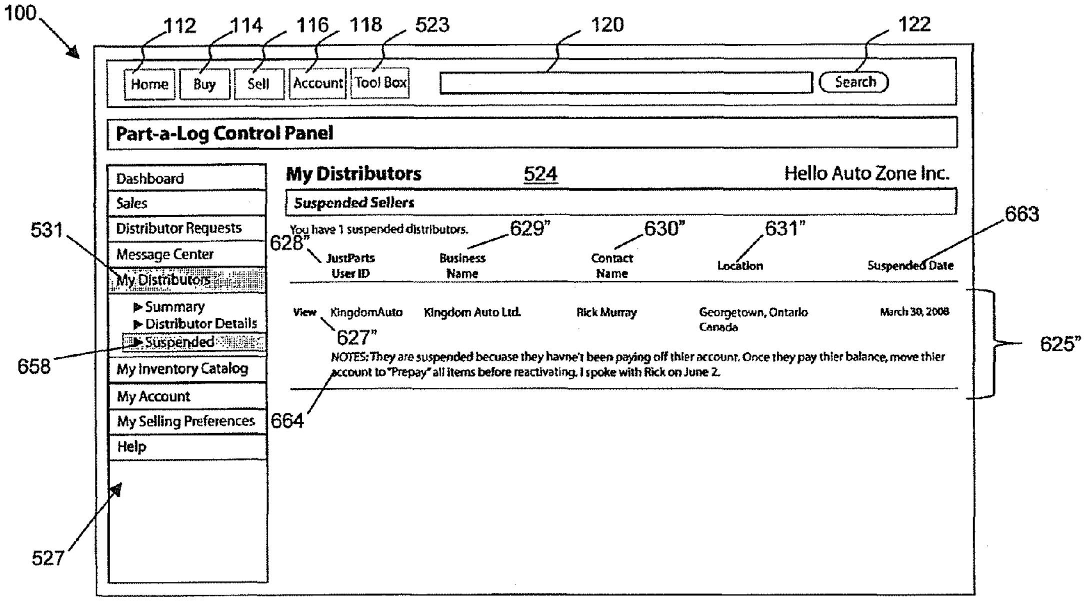
FIG. 80 is a screen shot showing a distributor page listing a supplier's set of suspended distributors.
Figure 81:
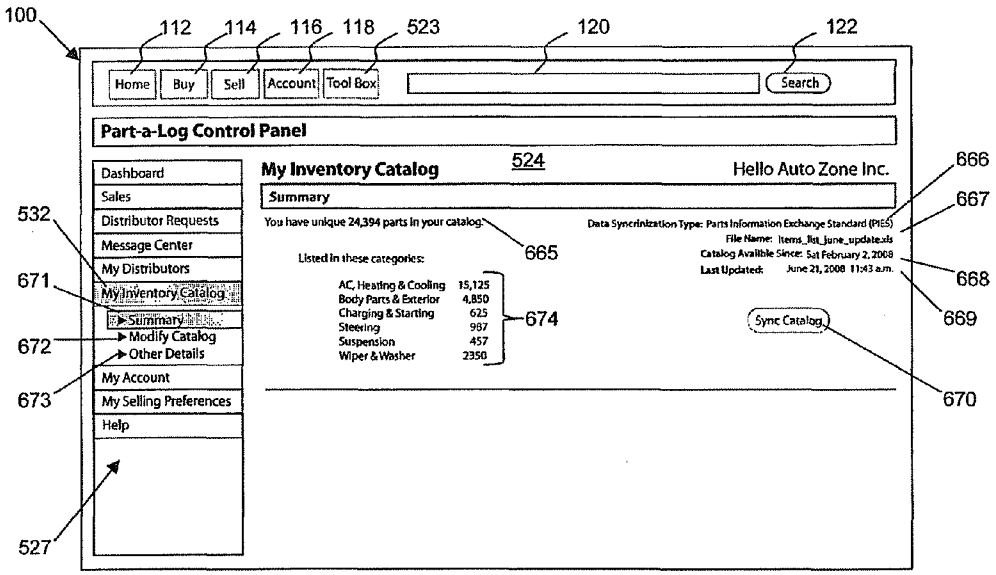
FIG. 81 is a screen shot showing a summary page for a supplier's inventory catalogue.

The Suspended tab 658 provides a seller list 625" of all the sellers 14 the supplier 520 has suspended, as shown in FIG. 80. The sellers 14 are listed in a similar format as the Distributor Requests tab 529 and the My Distributors 531 Summary tab 654; therefore, like elements are given like numerals with the suffix """ for clarity. Also, the seller's 14 suspended date 663 is displayed. To view the seller's 14 full details, the supplier 520 would click the "View" link 627" beside the seller's user ID 628". Clicking the View link 627" would open up the seller details page that is identical to the "Distributor Details" 656 shown in FIG. 79 with one difference; the "Suspend" button 660 is now a "Reactivate Seller" button (not shown). Clicking this will re-enable the seller 14 to sell the supplier's 520 inventory. They will be moved from the "Suspended" tab 658 to the Summary 654 and My Distributors tab 531. A notes field 664 at the bottom of the Part-a-Log control panel workspace 524 will allow the supplier 520 to add comments about the seller 14, adding convenience for suppliers 520 that have many associated sellers 14. For example, if a supplier 520 reviews their suspended sellers 14 after 6 months, they may not remember the reason why they suspended them in the first place. FIG. 80 illustrates how a supplier can add a comment for a suspended seller 14 because they did not pay their account for items they purchased. After 12 months, the suspended sellers 14 are cleared out of the system 10 automatically if they haven't been reactivated.

The My Inventory Catalog tab 532 is where all of the supplier's 520 items they are selling are located. There are three main sections within the Inventory Catalog tab 532. They are: "Summary" 671, "Modify Catalog" 672 and "Other Details" 673.

When the user Clicks the "My Inventory Catalog" tab 532, the system 10 defaults to the summary section 671, which gives the supplier 520 a summary of their inventory. The summary section 671, depicted in FIG. 81, states the total number of items 665 the supplier 520 has in their catalogue at the top of the Part-a-Log control panel workspace 524. Below that, the an item list 674 breaks down the item total 665 into major category headings such as "AC, Heating & Cooling" or "Body Parts & Exterior", giving the supplier 520 a good indication of the types of items they have listed on the system 10.

As explained earlier, there are many different standards that are used in the auto industry to ensure that suppliers' 520 and sellers' 14 data are linked properly. Some of the more widely adopted standards known to one skilled in the industry include the ACES, IPO, PIES, and i.Shop. The method that the supplier uses to sync their data into the system 10 is stated under the Data Synchronization Type heading 666.

If the supplier 520 manually uploads a file of their inventory to sync with the system 10, the name of the file last uploaded is displayed under the File Name heading 667. If the method used for syncing data between the system 10 and the supplier doesn't require manually uploading files, the name of the method will be in place of the file name 667. For example, some suppliers will sync their data automatically through different means such as EDI or through an API. In these instances, either "EDI" or "API" would be displayed in the file name field 667. Also stated is the Catalog Available Since data 668, showing the date when their catalog first became available to sellers 14 on the system 10. Under the Last Updated heading 669, the date of the last time the supplier synced their catalog with the system 10 is stated. If the supplier 520 uses automated data syncing such as EDI, "Automated Data Syncing Enabled" would be shown under Last Updated 669. If there was a problem with the communication between the system 10 and the supplier's 520 data, the date and time of the last full sync would be displayed. If the supplier 520 uploads files to update their catalog, they can upload a new inventory file by clicking the Sync Catalog button 670. This will open up an upload window (not shown) where they can choose their new file and upload it to the system 10 to be synced.

Figure 82:
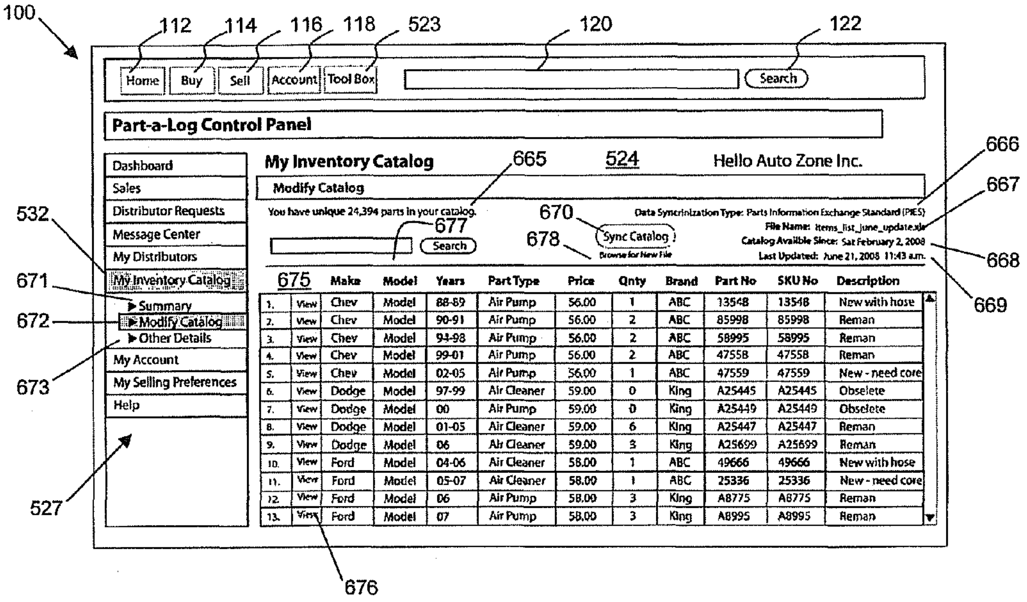

If the supplier 520 wants to modify an item in their catalog they can do so without having to re-upload another file and sync it. The benefit of uploading a file and syncing is that it is easy and convenient especially when a supplier 520 has many changes. However, if there are minimal changes, a supplier 520 may choose to make those changes directly to their catalog on the system 10. To edit items within the system 10, the supplier 520 would click on the "Modify Catalog" tab 672 from the supplier Part-a-Log control panel tabs 527. As shown in FIG. 82, the top of the Part-a Log control panel workspace 524 features the same information found in top of the summary tab 671 page. Underneath is the supplier's 520 inventory organized exactly as it was uploaded and synced and displayed in a spreadsheet style called "Edit View" 675. The first column is a sequential list that matches the item line. For example, the first line is row 1, the tenth line is row 10 and so on. This makes it easy for the supplier when referring back to their spreadsheet file such as excel; if they need to change something on row 120 in their excel/spreadsheet file, then they can quickly navigate to row 120 in their inventory file on the system 10. This makes modifying data very convenient. Furthermore, every second line is a different shade to make it easy for the supplier to read.

Editing listings in the Edit View 675 is a fast and easy way as opposed to going through My Account 534 to make the changes because the supplier can immediately change the contents of an individual cell. FIG. 83 demonstrates a workflow example of the Edit View 675 for changing inventory details for a supplier 520. In first section block 680, it is assumed that the supplier 520 wants to change the price of their '94-98 Chev Model air pump from $56.00 to $62.00. They would simply click the price cell 681 in row 3 and type in "62", as shown in second section block 682. That cell 681 would be highlighted in yellow indicating it was modified. The Supplier 520 can do the same in all fields. For the make, model and year fields 685 in this example, the same features explained earlier in the Vehicle Details tab 182 would be available to the supplier 520. In those fields the Supplier 520 may use the auto-fill tool 52 or type their own details not found in the categorization database 20.

Returning to FIG. 82, if the Supplier 520 wants to edit the return policy or other information that isn't displayed in this view for a particular item, they would click the "View" link 676 in column 2 beside the item to open the full edit view as shown in FIG. 84. It may be noted that when a supplier 520 changes item details, it affects every seller 14 that has subscribed to the supplier's 520 catalog as the changes will take effect immediately once the supplier 520 saves their changes. It is the supplier's responsibility for maintaining their inventory and ensuring that it is correct. For example, if the supplier 520 removes an item from their catalogue, buyers 12 will no longer be able to purchase that item; therefore, the seller 14 will not be able to sell that item from the supplier 520. Also, the system 10 may be configured to give the seller 14 tools to automatically adjust their pricing based on the suppliers cost. For example, if a supplier 520 increases the price of an item, the seller 14 will likely not know about it and thus not change their selling price. Therefore, the seller 14 may use these tools to set their selling price to automatically adjust so the seller 14, for example, makes a minimum of 20% profit on each sale. If the supplier 520 increases the cost of an item, then the system 10 can automatically increase the seller's 14 selling price for that item to compensate for the higher cost.

Figure 85:
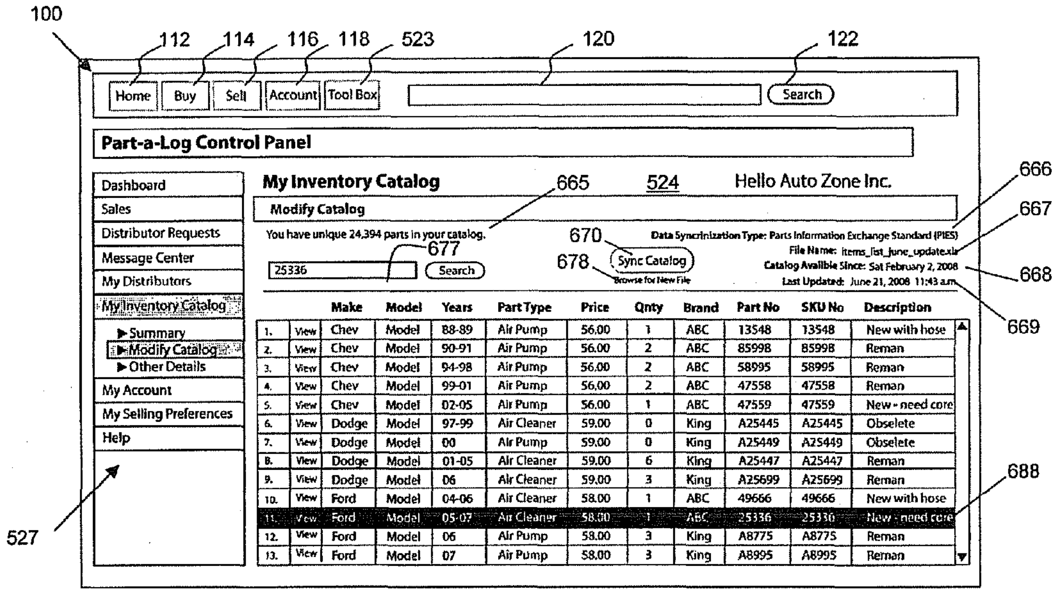

If the Supplier 520 wants to search for a particular item, they can do so using the search tool 677 at the top of their Edit View 675 pane. The search returns matching results by highlighting the row or rows in yellow. For example, FIG. 85 shows the supplier 520 searched for part number "25336" so row "11" 688 is highlighted because it matched the search criteria. Other search tools explained earlier can also be used by the supplier 520 but not shown in the Figure.

Business accounts will have special features that will allow the user who registered to be the account administrator that can give permissions to other users within their business to modify their system 10 catalogue etc. For example, the supplier's 520 manager or owner may want to only be able to change their catalogue information. A further embodiment of this feature is to add the ability for the user to track changes to their catalog. For example, if the user wants to see who changed the price of an item from $100 to $10, they could do so. When the supplier 520 has finished making their changes and tries to navigate away from the Modify Catalogue page 672, they are prompted to save the catalogue (not shown). If the changes are saved, they take effect immediately and the "Last Updated" field 669 is updated to reflect the new date and time.

If the supplier 520 wants to re-upload a file instead of modifying it within the system, they would click the "Browse For New File" link 678 found under the "Sync Catalog" button 670. A file uploading tool (not shown) would appear allowing the supplier 520 to search for their file. The supplier 520 would then select the file and click the "Upload File" button to upload it to their "Modify Catalog" page 672 in the system 10. Once it's uploaded, the supplier 520 could preview the file before syncing. The "Last Updated" field 669 displays "New File. Catalog Not Synced" while the "Sync Catalog" button 670 is red reminding the Supplier 520 that they have not synced their file. Clicking the Sync Catalog button 670 will sync the catalog. The changes take effect immediately and all sellers 14 will have the updated version of their catalog.

Further embodiments of the Modify Catalog 672 tab incorporate the option of adding and removing items from the "Edit View" 675 so the Supplier 520 can customize the columns. For example, if the supplier 520 only wants to see the make, model, year, price and sku/stock number columns in the Edit View 675, they can hide all the other columns (part numbers, description etc). They can always unhide them later at any time. Another embodiment involves adding "Enable/Disable Quick Entry" links (not shown) so the supplier 520 can choose whether to modify their data by clicking in and changing the contents of a cell. Some suppliers 520 would rather open the full listing before changing anything, shown in FIG. 84. For example, the supplier 520 may find it too easy to change a cell accidentally by simply clicking in the cell so they may want to disable this feature making it impossible to change any cell unless they open the item in the full edit view, shown in FIG. 84. This is similar to locking a worksheet in a Microsoft Excel application preventing unauthorized changes from happening accidentally.

The Other Details tab 673 under the Inventory Catalog 532 display other features related to the supplier's catalog (not shown).

The "My Account" tab 534 under the Supplier 520 Part-a-Log control panel tabs 527 lists all information pertaining to the Supplier 520 such as contact information, business information, account type, billing and invoice information and other information from their original supplier 520 application form. Any changes the supplier 520 wishes to make would be done through this tab 534.

The supplier's selling preferences are all listed in the "My Selling Preferences" tab 536. Selling preferences include information but is not limited to: Ship To Locations, Accepted Methods of Payment, Return Policy, Warranty, Currency and other Shipping details. The supplier 520 can make any global changes to these preferences directly from here. Selling preferences allow the supplier 520 to preset all of their standard information that, in most cases, doesn't change from item to item like a supplier's warranty and return policy. Another embodiment includes a feature that will allow the supplier 520 to create different selling preferences for different part types. For example, the supplier 520 may want separate warranty and return policies for engines and power window motors. This selling preferences page is similar to the page explained earlier in the item listing process.

The Help tab 538 features videos, and help documentation to assist suppliers 520 with using the parts catalog application.

Sellers 14, in the context of the part catalogue application, are defined as any user who applies to a particular supplier 520 to sell their products. For example, if the company Tbauto applied to sell a supplier's 520 inventory and was approved, Tbauto would be considered a seller 14 of that said supplier 520. Typically, the supplier 520 determines if a seller 14 is approved or declined, not the system 10 or the administrator 34.

Figure 86:
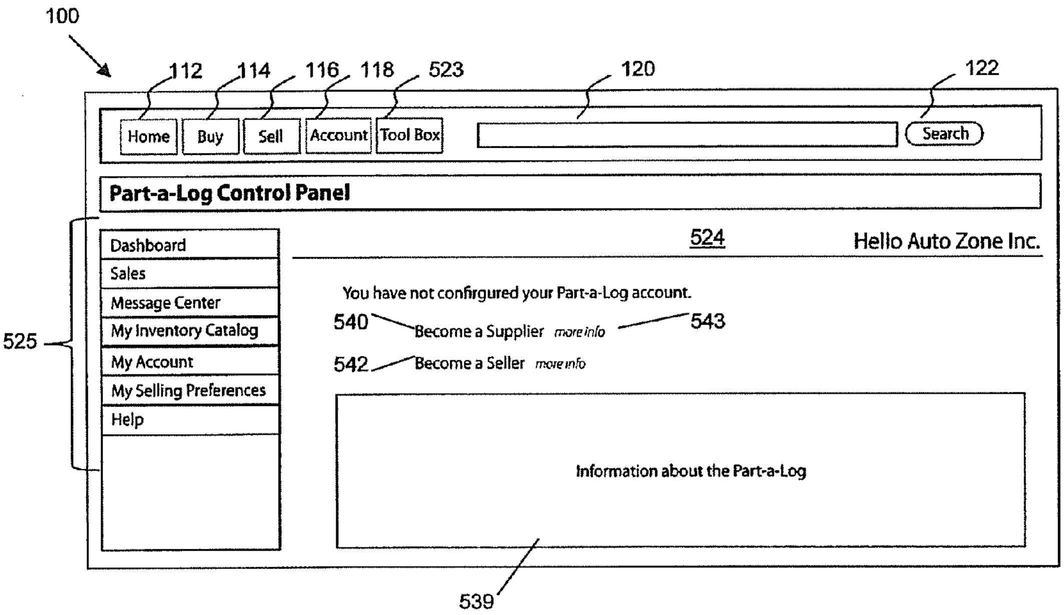
FIG. 86 is a screen shot showing the Part-a-Log main control panel, as illustrated in FIG. 66.

To become a seller 14, the user would click either the "Part-a-Log" link found in their My Account 534 or in the Sell 116 menu to be brought to the main Part-a-Log Control Panel, as shown in FIG. 86. In contrast to becoming a supplier 520, as discussed previously, the user would click on the "Become a Seller" link 542 and be brought to a page (not shown) which would feature more detailed information about becoming a seller 14 (what is a seller, how it works, what is required to become a seller etc). There will be a "Don't Show Me This Again" link that will allow the seller 14 to bypass this information page the next time they return (not shown). When the user is satisfied and wants to continue, they would click the "Search For Suppliers" link (not shown) to take them to the main Search Suppliers page, shown in FIG. 87.

Once the user has selected the "Become a Seller" link 542, the seller 14 Part-a-Log control panel tabs 690 will appear. The seller Part-a-Log control panel tabs 690 are similar to the Supplier 520 Part-a-Log control panel tabs 527, including a Dashboard tab 691, a Sales & Orders tab 692, a Search Suppliers tab 693, a Message Centre tab 694, a My Suppliers tab 695, a My Inventory Catalogs tab 696, a My Account tab 697, a My Selling Preferences tab 698, and a Help tab 699.

Figure 87:
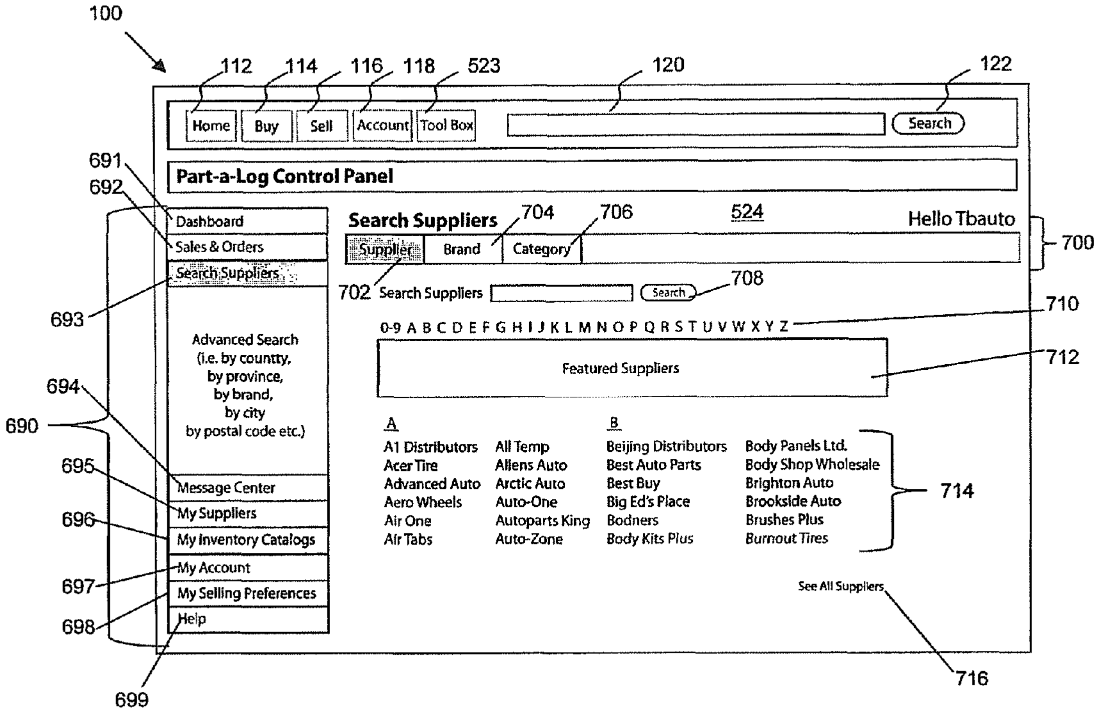
FIG. 87 is a screen shot showing a search page for a seller to find a supplier.

The "Search Suppliers" tab 693, illustrated in FIG. 87, allows the user to find a desired supplier 520 from all the available suppliers 520 on the system 10. The top of the search page offers a sub-menu 700 that allows the user to search for suppliers 520 by supplier name 702, brand 704 and category 706 to name a few. By default, the "Supplier" item 702 is highlighted. The seller 14 has four ways to find and view a supplier 520:

The user could click on any of the suppliers 520 from the supplier list section 714 shown on the page. They are listed in alphabetical order. For example, FIG. 87 shows a supplier list 714 containing suppliers whose name starts with A and B. The user could click on any of the names displayed such as "Acer Tire" to bring up their Supplier 520 profile. As well the user could select the "See All Suppliers" link 716 to view a list of all suppliers 520 in the system 10.

The user could search for a Supplier 520 using the "Search Suppliers" tool 708 at the top of the page. Other search tools explained earlier can be used as well although not shown in the Figure. For example, using the click boxes 146, the user can locate suppliers 520 that sell Honda fenders by choosing "Auto Parts & Accessories>Body Parts & Exterior Accessories>Fenders" and "Honda" from the click boxes.

The user could click on a featured supplier 712 which appears under the alphabetical list near the top of the Part-a-Log control panel workspace 524.

The user could click on a letter from the alphabet selector tool 710 to display all suppliers 520 whose business name starts with the letter they chose. If the supplier's business name starts with a number such as "1-Stop Auto", the user would click the "0-9" link to show all suppliers 520 whose business name starts with a number.

The "Brand" tab 704 from the sub-menu 700 loads a page (not shown) that resembles the "Supplier" page 702 to display suppliers by brand. If the user clicks on a letter such as "M", all suppliers 520 that sell brands that begin with "M" are displayed. Similarly, when the user clicks the "Category" tab 706 a page (not shown) loads which allows the seller 14 to browse different categories and sub-categories 60*a* and view all suppliers 520 that sell products in that category/sub-category. For example, the seller 14 may want to find a supplier 520 that sells Blower Motors so they would click the "Blower Motor" sub-category.

Figure 88:
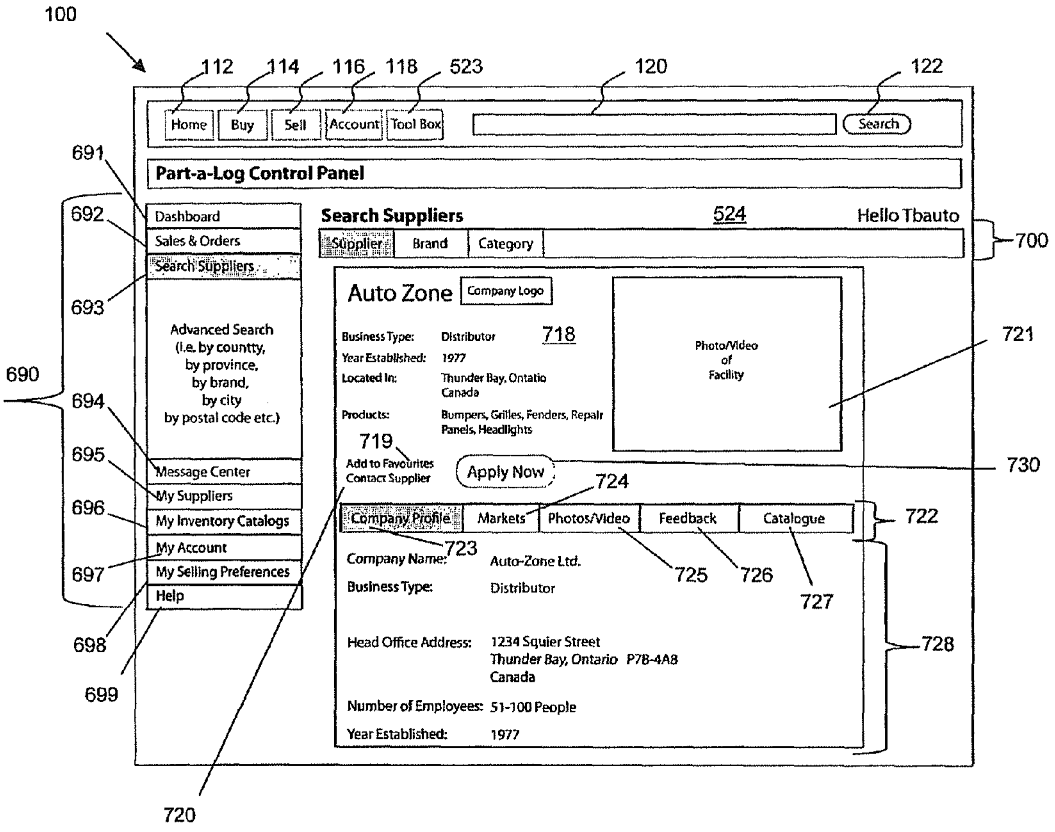
FIG. 88 is a screen shot showing a details page displaying information about a single supplier.

When the seller 14 finds a supplier 520 they are interested in and clicks on them, they are bought to a display of the supplier's 520 profile as illustrated in FIG. 88. The top section 718 of the Part-a-Log control panel workspace 524 displays summary information about the supplier's business. An Add to Favourites link 719 allows the user to add the supplier 520 to their favourite sellers list (not shown). A Contact Supplier link 720 takes the seller 14 to the message center 530 where they can ask the supplier 520 a question. The top section 718 also displays a multimedia application 721, such as picture or video, showing the seller 14 the supplier's 520 facility location.

The lower section 728 of the Part-a-Log control panel workspace 524 is separated into heading tabs 722. The "Company Profile" tab 723 shows the entire company profile including all public (non-private) information listed on the supplier 520 application form. The "Markets" tab 724 displays information about the major markets the supplier 520 targets and ships to. For example, the markets tabs may show that a supplier's 520 products cater to the European market. A North American seller 14 who has no intention of shipping to Europe would disregard this supplier 520. The "Photos/Video" tab 725 displays uploaded videos and photos by the supplier 520. The "Feedback" tab 726 allows the seller 14 to view the feedback score and comments other sellers 14 have given the supplier 520. An example of a comment is, "Auto Zone is a great company to deal with. Their products are great quality and their customer service is second to none!" The "Catalogue" tab 727 displays the supplier's 520 up-to-date catalog for the seller 14 to browse through and see the items they have for sale.

Figure 89:
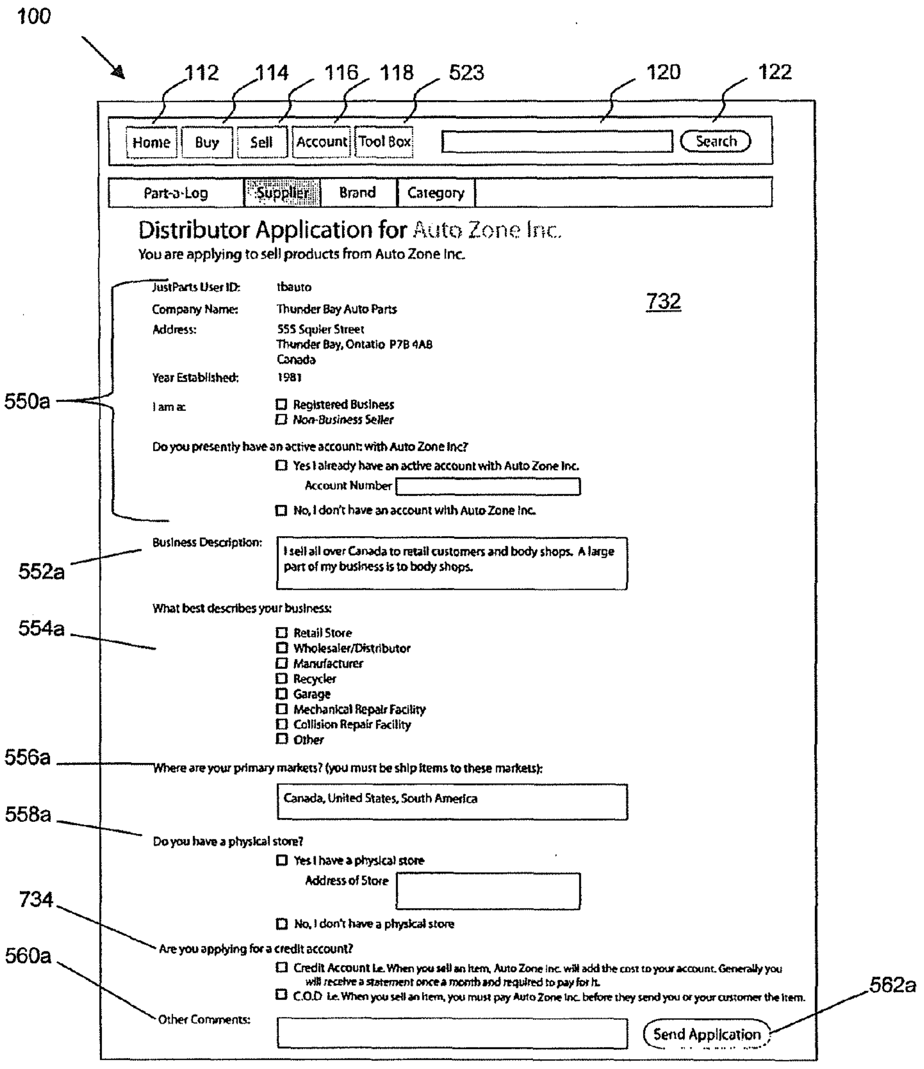
FIG. 89 is a screen shot showing a distributor application page.

At the bottom of the top section 718, there is an Apply Now button 730 that, when selected, loads the seller application page 732, illustrated in FIG. 89. This is an example of an application form the seller 14 needs to fill out and send to the supplier 520 if they want to subscribe to a supplier's catalogue and order from the supplier 520.

The seller application page 732 requires the seller 14 to give their company information, similar to that required in the Supplier Application page 548; therefore, like elements are given like numerals with the suffix "a" for clarity. The seller application page 732 contains fields for general business information 550*a*, a business description box 552*a*, a business descriptor 554*a* section, a primary markets 556*a* section, a physical store inquiry 558*a*, and an area for the seller 14 to add any additional comments 560*a* for the supplier 520. The seller application page 732 also requires the seller to complete a credit account field 734 to verify the sellers 14 payment method. As explained earlier, some sellers 14 may already have a business relationship with the supplier 520 and therefore already have a charge account setup through their bricks and mortar store. Other sellers 14 will be new to the supplier 520 and therefore may need to pre-pay all items before they are shipped. These are two examples of payment methods although there can be more. Once the seller application page 732 is complete, the seller 14 would click the "Send Application" button 562*a* to submit it to the Supplier 520 they are applying to. Once the seller application 732 is sent to the supplier 520, the seller 14 can track the status of the application through their "Message Centre" 530 in the Account 118 and in the seller Part-a-Log control panel tabs 690.

Similar to the submission of a supplier 520 application page 548 discussed previously, the user is brought to a status page (not shown), similar to that illustrated in FIG. 69. The date and time the seller 14 sent the application to the supplier 520 is displayed as well as the status of their application. The different stages are but not limited to: "Received—Waiting for Review", "In Review", "Approved" and "Not Approved". If the supplier 520 approves the seller 14, the status changes to "Approved" and if the supplier 520 declines the seller's request, "Not Approved" is displayed. Once the seller 14 is approved, they are sent an email welcoming them and giving them an overview of how being a seller 14 works. A copy of the email is also sent to their Message Centre 530. The seller 14 immediately gains full access to supplier's 520 catalogue once they are approved by the supplier 520. If the seller 14 applied to more than one supplier 520, the page may be configured to show all of the suppliers 520 the seller 14 applied to with the status beside each of the suppliers 520 (not shown).

Figure 90:
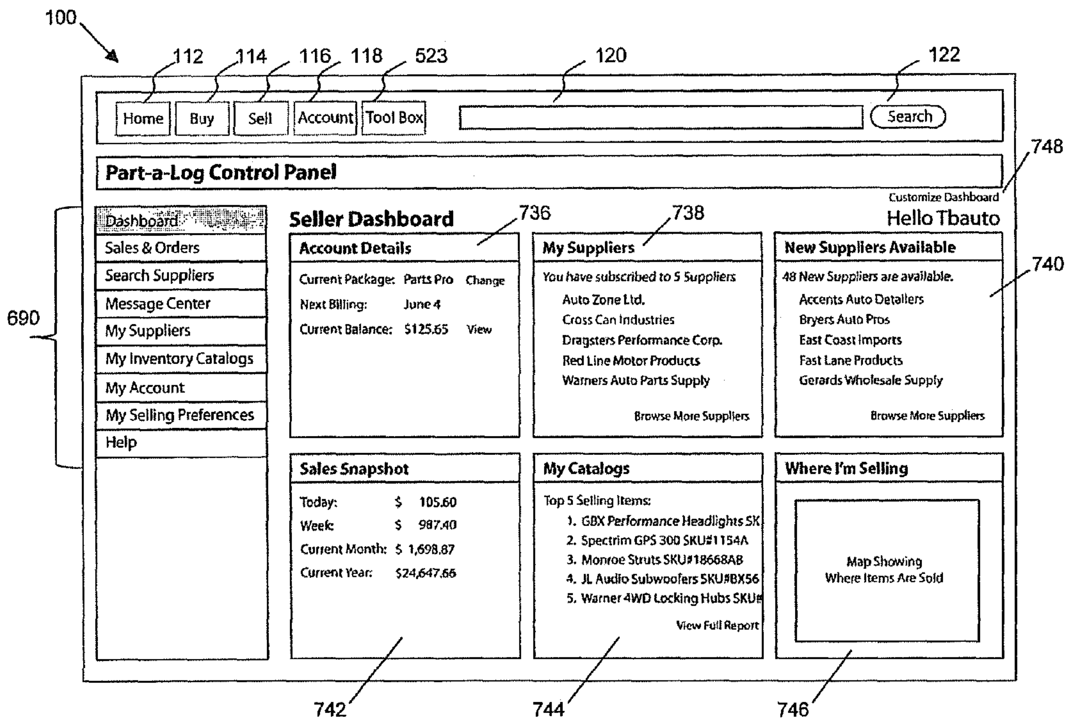
FIG. 90 is a screen shot showing a main seller's page and seller windows.

As stated above, once a seller 14 clicks on Become a Seller link 542, they have access to the seller Part-a-Log control panel tabs 690. The seller Dashboard tab 691, illustrated in FIG. 90, provides the seller 14 with a convenient overview of the important information and activity in their account. It is similar to the dashboard tab 526 of the supplier 520 except that the information displayed applies to sellers 14, not suppliers. There are 6 windows displaying different information. The Account Details window 736 shows the seller 14 what seller package they are enrolled in, their next billing date, their current account balance and other account related details. The My Suppliers window 738 gives the seller 14 a summary of the suppliers 520 they have subscribed to. The suppliers' business names are shown. The New Suppliers Available window 740 shows the seller 14 new suppliers 520 that are available on the system 10. The user can click the business name of a supplier 520 from the New Suppliers Available window 740 to display the supplier's 520 profile. The Sales Snapshot window 742 shows the seller 14 the dollar value of their sales they generated through the Part-a-Log application. The sales are broken down by: today, week, current month and current year. As well, the seller's 14 top 3 suppliers are displayed based on sales. The My Catalogs window 744 may show the seller's 14 top 5 selling items. The Where I'm Selling window 746 shows the seller a map of where they are selling their items. If the seller 14 wishes to customize their Dashboard tab 691, they can do so by clicking the "Customize Dashboard" link 748 in the top right corner of the Part-a-Log control panel workspace 524. This arrangement is one example of the workspace panel 524 layout and other embodiments can display other information in a variety of layouts.

The seller 14 Sales & Orders tab 692 is similar to the Sales & Orders tab 528 described in the supplier 520 section. The difference is that the seller 14 is purchasing the item from the supplier 520 then selling it to the buyer 12 therefore the Sales & Order information section is broken up into two parts: a) the buyer's 12 orders and b) the purchase orders (from the supplier 520). The Sales & Orders pages will house all of the information regarding the sale of the item as outlined in the supplier 520 section. For example, the New Orders page (not shown) will not only show the seller 14 the buyer 12 information (e.g. what they sold, who they sold to, where the item will be shipped, if the buyer paid for the item etc.) but it will show purchase order details for the sale (e.g. which supplier 520 the item they sold is purchased from, the purchase price, if the supplier 520 is shipping direct to the buyer 12, if the item has been pre-paid or charged etc.) The Sales & Orders pages for sellers 14 will therefore contain all of the buyer 12 and supplier 520 details for each sale. All information in the new orders, open orders and completed orders tabs (not shown) are similar to the supplier 520 tabs described in earlier sections.

The seller 14 Message Centre tab 694 is the same as described for the supplier 520 Message Centre 530 in the prior sections however, it is designed for the seller 14, not the supplier 520.

The My Suppliers tab 695 is similar to the My Distributors tab 531 in the Supplier 520 section; however, the seller's 14 suppliers 520 are listed, rather than the supplier's sellers 14. This tab allows the seller 14 to view their suppliers' 520 profiles, contact the suppliers 520, view their catalogues etc.

The My Inventory tab 696 will load the seller's 14 catalogs they have subscribed to and organize them based on supplier, brand, category, sub-category, descriptor etc. The seller 14 can view the catalogs similar to the process illustrated in the supplier 520 section shown in FIG. 82; however, the seller 14 cannot modify the catalogue items. They can send questions to the supplier 520 about the catalog or about a certain product in the catalogue and they can set pricing rules that allows them to set min and max profit percentages etc. The rules can be added globally, that is for all items, or they can be set by category, sub-category or descriptor. For example, a seller 14 may set their minimum gross profit percentage for each item sold in the "Electrical" category at 20% and for the "Engine" category at 35%. Therefore, all item prices will be set accordingly.

The My Account 694, My Selling Preferences 698, and Help 699 tabs under the seller Part-a-Log control panel tabs 690 are the same as those listed under the supplier Part-a-Log control panel tabs 527 stated previously.

AlsoFits Application

Another embodiment of the system 10 described herein may incorporate an application that allows users to indicate what other items their products will fit or interchange with. For example, a fender from a 1987 Ford F-150 Pick Up truck will "also fit" a 1988, 1989, 1990 and 1991 Ford F-150 Pick Up truck. This application is referred to herein as "AlsoFits". The said AlsoFits application functions to facilitate the seller's 14 entry of additional compatibility/fitment information to their listing for the purpose of increasing the probability of a buyer 12 finding their listing and thereby selling the item. It does this by offering the seller 14 a variety of suggestions from other sellers 14 to choose, herein referred to as AlsoFits Suggestions. It includes ratings and comments by other users. To further enhance this feature and make it truly powerful, AlsoFits is built to be "user generated" allowing users to help build the AlsoFits database 19 within the system 10. This Web 2.0 functionality will make it easy for others to share their knowledge.

In one embodiment, the AlsoFits application is integrated into the system 10, defined herein. In another embodiment, the said AlsoFits application could be its own free standing website (www.alsofits.com). Users can use AlsoFits.com as a reference to determine what other applications their items fit or are compatible with and/or add their own knowledge to the platform. In turn, the information is shared on the system 10 so that when a seller 14 lists an item, AlsoFits suggests other uses/compatibility that the seller 14 may want to "add" to their listing to make it easier for buyers 12 to find the item.

It is noted that although the AlsoFits application can be used in numerous industries, for the purposes of this disclosure, all examples and explanations will involve the automotive industry.

For example a user of the AlsoFits application adds that a fender from a 1990 Pontiac Bonneville will also fit a 1991, 1992, 1993 and 1994 providing that it is from a "4 door" model. The user may have done this through the system 10 or through the free standing website (www.AlsoFits.com). The next day a seller 14 goes to the system 10 to sell a fender from his 1994 Bonneville. The system 10 asks the seller 14 if he wants to include the information that AlsoFits user added the day before. The seller 14 can choose to include it or not. The seller 14 in this example adds the information since he didn't know his fender was compatible with the other model years and finishes the listing. The following day a buyer 12 searches for a fender for his 1992 Bonneville and the seller's 14 listing appears and so he purchases it. Although the seller 14 previously did not know that his 1990 Bonneville fender was the same as a 1990-1993 Pontiac Bonneville, the seller 14 sold his item because of the data that the AlsoFits user provided.

Figure 91:
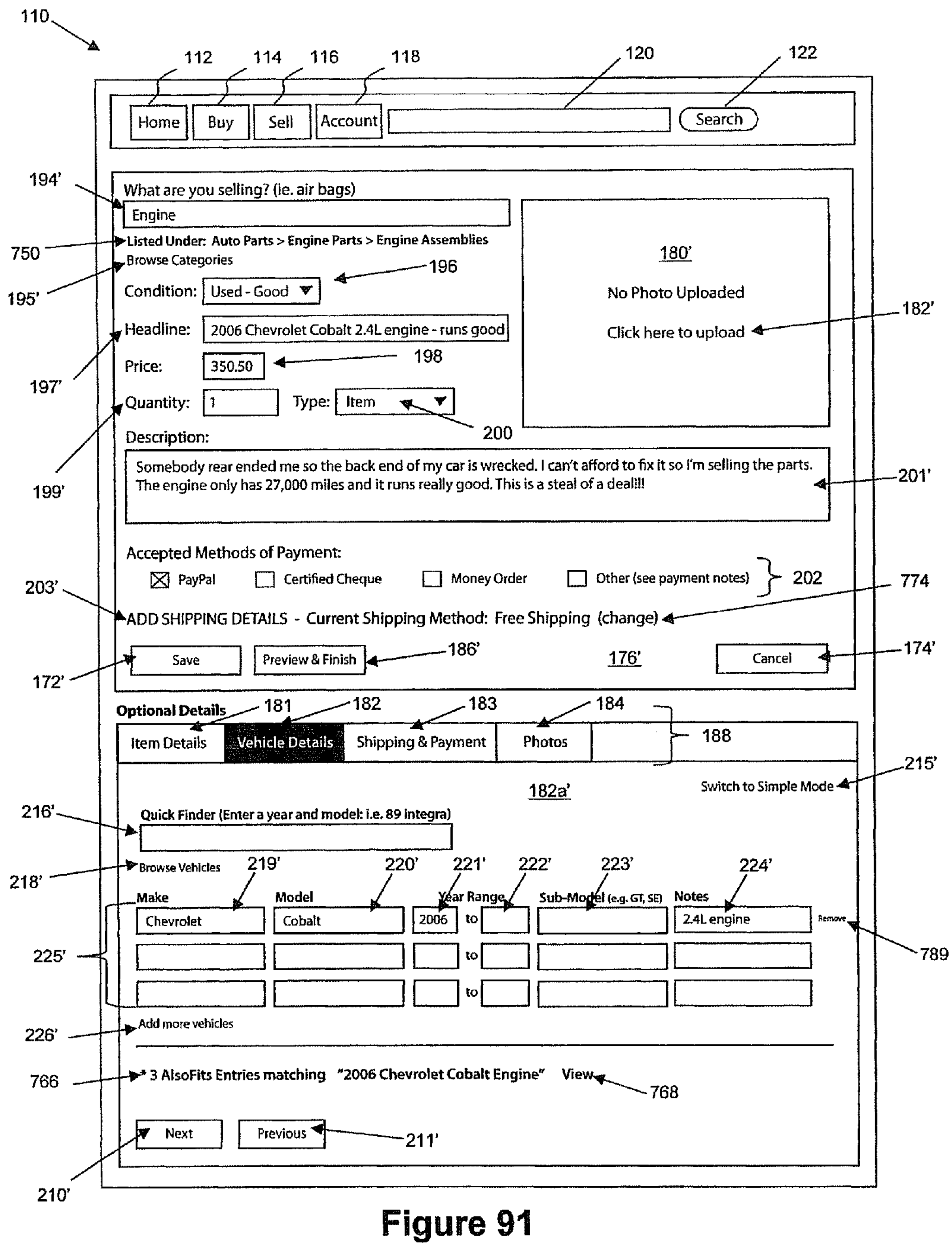

The AlsoFits application is available through the Sell tab 116, as illustrated in FIG. 91. When a user lists an item using the Sell feature 116, as previously explained through FIGS. 12 to 43, the system 10 takes a unique approach by giving the seller 14 the opportunity to add general or specific information about their item. The AlsoFits application is integrated into the vehicle details 182 tab in the single item 24 selling process as described in FIGS. 12 to 17; therefore, like elements are given like numerals with the suffix "'" for clarity. FIG. 91 illustrates an example of a seller 14 creating a listing for 2006 Chevrolet Cobalt engine. The category path 750 for the descriptor 'engine' is shown below the 'what are you selling' field 194. In this example, the system 10 automatically selected the "Auto Parts>Engine Parts>Engine Assemblies" category and sub-category 60a. As well, the seller 14 in this example preset their shipping methods in their selling preferences to "free shipping" so they system 10 shows the seller 14 their current shipping method 774. To change the shipping method, the seller 14 would click the 'change' 774 link beside 'free shipping' to bring the seller 14 to the shipping and payment tab 183 where they can modify their details.

The AlsoFits feature plugs into vehicle details tab 182 below the data fields 225. As depicted in FIG. 91, an AlsoFits indicator 766 notifies the seller 14 that there is compatibility data that matches information entered into their data fields 225 and the 'what are you selling' field 194. When there are AlsoFits suggestions from other users, an "X AlsoFits Entries Matching" note 766 appears in the AlsoFits window with the "X" representing the total number of suggestions available. The example shown in FIG. 91 indicates that there are three alsofits entries that match the '2006 Chevrolet Cobalt engine'. The system 10 uses the information added by the seller 14 (e.g. descriptor, make, model and year etc.) and cross references the alsofits database 19 to determine the suggestions. If the seller 14 wants to see the matching alsofits suggestions 786, they would click the View link 768 to display them as shown in FIG. 92. An AlsoFits suggestion pane 772 appears. If the seller 14 wishes to hide the AlsoFits suggestion pane 772 they would select the "Hide" link 784 to hide the alsofits pane as shown in FIG. 91, or select the "Close AlsoFits Window" link 783.

The AlsoFits suggestions from other users are displayed in a list 786 divided into different columns. The list 786 is organized, in this example, according to Rating 787, Make/Model 790, Year Range 792, and Notes and Conditions 794.

The rating 787 is a number or value based on set criteria. One example would be for users to rate the suggestions based on their level of confidence that the information is correct. For example, if an AlsoFits entry has a rating 788 of 10 (with 10 being the highest possible rating), that would mean that all users who rated the information believe that the information is accurate. If the rating 788 received a lower value, it would indicate to the seller 14 that some users do not agree with this information or think differently. For the purposes of this document, rating 788 is shown only as another embodiment of the system 10 described herein.

If the seller 14 wants to view more information about a particular AlsoFits suggestion or its rating 788, they would click the individual suggestion from the AlsoFits suggestion list 786 to display supplementary details that lists all of the threads 798, or comments, attached to the AlsoFits suggestion for the seller 14 to review. For example, in FIG. 93, the seller 14 would see that thread 800 states that user 'Jackson21' added that a 2006 to 2007 Chevrolet Cobolt with specific conditions (shown in the Figure) would also fit the seller's 14 2006 Chevrolet Cobalt (meaning that the item he is selling is considered the same as one found on a 2006-07 Chevrolet Cobalt providing the conditions specified in the Notes and Conditions 794 are the same). He would also see in thread 802 that user 'racer55' agreed with 'Jackson21' and added his own comments.

Figure 94:
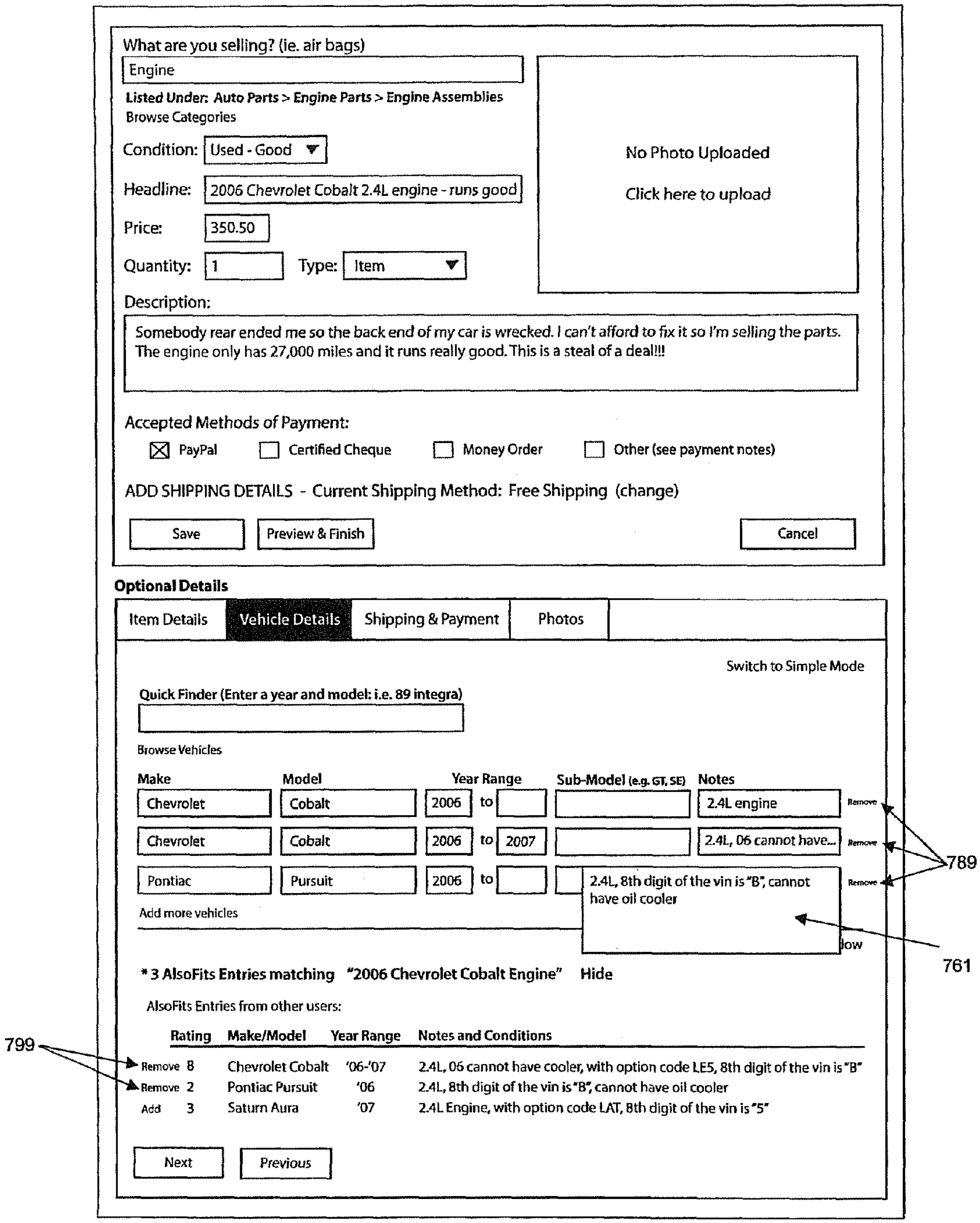

This is a very powerful way for users to interact and share information about their items/parts while allowing these users to apply the information to an item listing. If the seller 14 wants to close the supplementary details, they would click the Close link 801 beside the suggestion. If the seller 14 decides to add the AlsoFits suggestion to their listing, they would simply click the "Add" link 787 beside the entry shown in FIGS. 91-94. Once added, the information found in the suggestion is added to the data fields 225 as shown in FIG. 94. Once the listing is posted, the alsofits compatibility data becomes searchable. FIG. 94 shows that the seller's 14 listing will be searchable by the 2007-08 Saturn Aura and 2006-07 Chevrolet Cobalt information. Note that the first two suggestions added to the seller's 14 listing. appear in the data fields 225. Notice that the 'add' link 786 beside the alsofits suggestions changes from an 'add' link to a 'remove' link 799 indicating to the seller 14 that the suggestion has been added to their listing. If the seller 14 wants to remove a suggestion from their listing, they can click the remove link 799 beside the suggestion they wish to remove in the alsofits list 786, or they can click the remove link 789 beside the suggestion they want to remove in the data fields 225.

In another embodiment, the AlsoFits information and tool will also be accessible as a standalone application through the "Tool Box" link 523 in the main navigation tabs. This allows users to add information into the system 10 without having to sell an item or go through the sell process, as described.

The administrator 34 has a tool (not shown) to review all AlsoFits suggestions to ensure that users abide by the system 10 policies (i.e. no profanity, information is relevant and not caused by a spam server etc.) The AlsoFits.com website owned by the system 10 will utilize the same functionality as described herein for the system 10.

Further to the alsofits details described above and described in the single item selling process, the following will provide more details and examples regarding the ability for a user to add compatibility details to a listing.

The tools in the vehicle details pane 182*a* allows the seller 14 to enter compatibility details that will match the item they are selling. For example, a user may be selling an item that fits "all" Honda vehicles. In that case, the seller 14 can easily type in Honda in the make field 219. If the seller 14 does not enter any other information (such as model, year, sub-model etc.) in the data fields 225, the system 10 will know the item will fit all Honda's. For example, if the seller 14 only entered Chevrolet in the Make field 219, the seller 14 is specifying that their item will fit all 'Chevrolet' vehicles regardless of model, sub-model, and year range. If the seller 14 adds a make 219, model 220, and sub-model 223, (but no year) then the system 10 will assume that the item will fit all years of the specified make, model and sub-model.

As mentioned earlier, if the seller 14 types in a make 219 that is not found in main category database 44, the entry is still accepted but flagged and sent to the administrator 34. The administrator 34 can then review the entry and determine if it should be added to the main category database 44. This adds "user generated Web 2.0" functionality to the platform allowing users to help populate the main category database 44. For example, if the seller 14 types "Holden" in the make field 219, the make will not appear in the Make list 219*a* since the system does not have the Australian made vehicle in its main category database 44. The seller 14 is allowed to finish their listing. The administrator 34 is then notified of the new make and conducts a review of the Holden make to ensure it is legitimate and not made up by the seller 14. The administrator 34 then adds it to the main category database 44 so the next time a user types in "Hol" in the make field 219, Holden will be available by auto fill tool 52 for selecting in the Make list 219*a* generated.

Furthermore, once a user has entered compatibility data, such as a make in this example, it becomes searchable. In the example in FIG. 91, the seller 14 chose "Chevrolet" as the make. If a buyer 12 searches for "Chevrolet" using top search menu 120, the seller's 14 listing would appear in the search results because the word Chevrolet appears in the listing. If the buyers 12 uses the advanced search filters 111 and selects a particular model and year of Chevrolet, the listing would again appear in the search results because the seller 14 has specified that their item would fit all Chevrolet vehicles for all years.

The user can enter data for the item model within the model field 220, similar to the function of the make field 219 explained above. It is important to note that the model field 220 can be used independently of the make field 219. For example, if the seller 14 chooses a model 220 from the Model list 220*a* without entering a make in the Make field 219 first, the system 10 may be configured to automatically fill in the make field 219 using the auto-fill tool 52 if it found a match in the main category database 44. For example, if the seller 14 entered Cobalt in the model field 220 without entering the make, the system 10 would automatically know that the Cobalt make is Chevrolet.

It is important to note that the administrator 34 can change the display of the model and sub-model fields 220, 223 by combining them into a single model field for convenience and searching. Some vehicles only use a model name while others have a model and sub-model name. For example, "Saturn Aura" is a make and model while "Chevrolet C15 Suburban" is another make and model 'Chevrolet C15' with the sub-model 'Suburban' attached to it. Most people in the industry would refer to this vehicle as a Suburban, not a C15. Combining the two together makes searching better for both the buyer 12 and seller 14.

The Year Range field 758 allows the seller 14 to further refine their compatibility data by allowing the seller 14 to add a year or year range to their criteria. For example, in FIG. 91, if the seller 14 added 2008 in the 'to year' field 222, it would mean that the seller 14 is indicating the item will also fit a 2007 to 2008 Chevrolet Cobalt with a 2.4 L engine. If a buyer 12 searches for items for either a 2007 or a 2008 Cobalt, the seller's 14 listings would appear because it matches the buyer's 12 search criteria. However, if the buyer 12 searched for items for a 2009 Cobalt, the listing would not appear because the seller 14 indicated that the item would not fit.

As noted earlier, if the make and model names specified by the seller 14 match a vehicle in the main category database 44, the auto-fill tool 52 would be able to display the year lists 221*a*, 222*a* shown in FIG. 16D for that make and model. However, if the make and model do not match a vehicle in the main category database 44, the years will be unknown and so the 'from year' 221*a* and 'to year' 222*a* results lists would not be displayed and the user could enter their own year in the fields 221, 222. In that case, the system 10 would accept the custom year and send it to the administrator 34 to determine if they should be added to the main category database 44.

Questions/Help Database

There are a variety of other unique features that are part of the system 10. Although these features can be used in numerous industries, for the purposes of this document all examples and explanations will involve the automotive industry.

Custom Questions when Selling to Assist Users

When a user is selling both an item 24 and/or multi-item 26, the system 10 provides a question window 804 displaying a list of recommended questions 806 to better describe the item. This is done to help the seller 14 provide all of the important item details to ultimately increase the chances of selling the item by helping the buyer 12 with their purchase decision. The system 10 includes a questions/help database 23 with custom question/option libraries for auto and truck parts. A question/option library is a list of options 806 users can quickly add to their listing usually by using click boxes 808. FIGS. 95 and 96 illustrate the system 10 providing a list of possible item options 806, the user can select a click box 808 or select from a question/option list 810 to add to their listing instead of manually typing them into the description.

Consider the following example. A user is selling an outside rear view mirror for their car. Without the assistance from the system 10, the user posts the item describing it as "in great shape" since they didn't know what else they should say about the item. A buyer 12 finds the item, but is looking for the model with the power option and heated glass. The buyer 12 realizes that the listing says nothing about those options so the buyer 12 does not purchase the item or is forced to contact the seller 14 and wait for a reply. Contacting the seller 14 slows the purchase process as human intervention is required. These questions 806 are designed to reduce the human intervention required to make the sale and works especially well for helping sellers 14 record answers to commonly asked questions. These questions relate to the "item" the user is selling and have been designed by the administrator 34. Answering the questions is completely optional. FIGS. 95 and 96 show two examples of questions 806 that the seller 14 can use to post additional details about the item they are selling; one for a door mirror and one for a steering column respectively.

Figure 97:
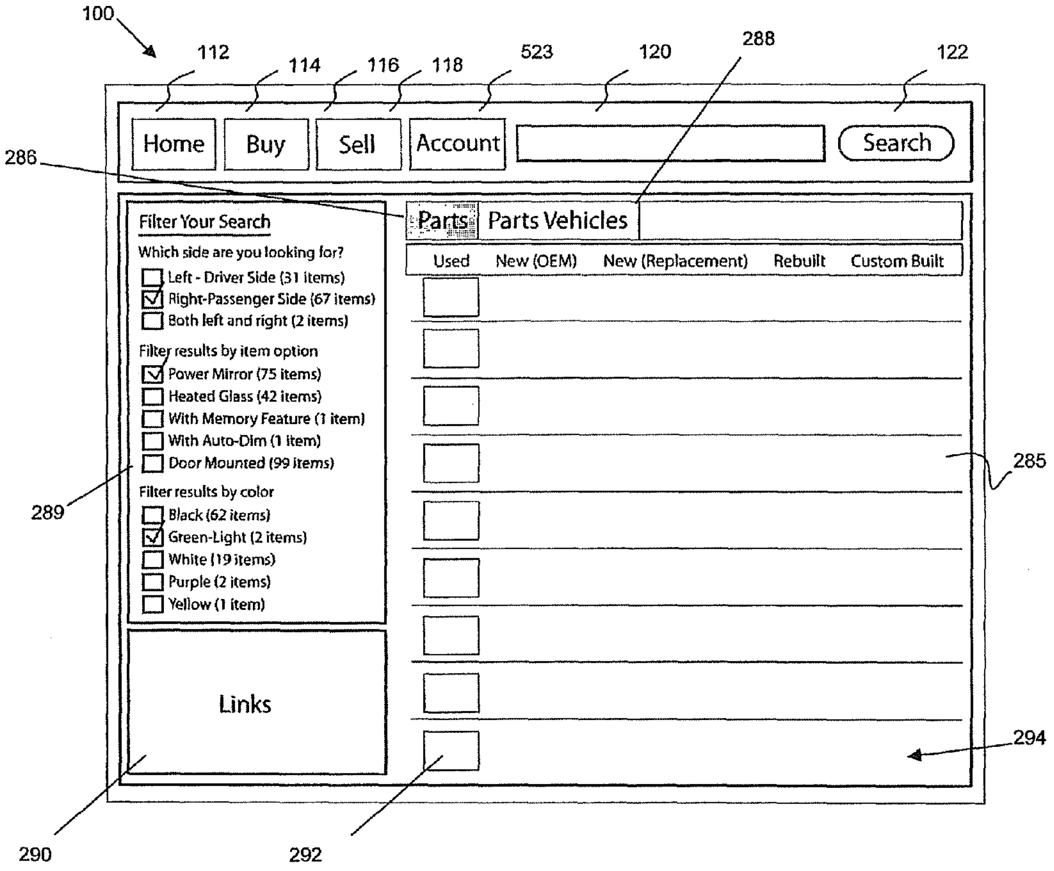
FIG. 97 is a screen shot showing a further embodiment to a main buy page shown in FIG. 9, displaying an arrangement of the advanced search tool features.

Once the seller 14 answers the questions 806, the answers are then made searchable so the buyer 12 can refine their search based on the questions 806, as illustrated in FIG. 97. FIG. 97 displays the search results page 295 previously described in FIG. 19. For example, a buyer 12 searches in the search results page 295 for a mirror for their vehicle and the system 10 returns over 100 results. To refine their search, the buyer 12 uses an advanced search feature 290, as described previously herein. This feature 290 shows the buyer 12 the same questions 806 the sellers 14 were asked when listing the items, and allows the buyer 12 to filter their search based on those questions 806. For example, as illustrated in FIG. 97, the buyer 12 selects "Right (Passenger Side)" from options in the Advanced Search Filters 289 and immediately the results filter to show only listings 294 that contain right mirrors based on the seller's 14 answers. The search is dynamic meaning that the list 294 is automatically updated to reflect the options selected by the user in the advanced search feature pane 290. If the user clicks "Heated Glass" option, the list 294 refines further to show only heated, right side mirrors.

Keywords for Categories & Models & Custom Incorrect Spelling Database

The system 10 has a custom list (not shown) of keywords for both categories/items and vehicles that includes different names for each of them. It is very common in the auto industry to have many different names or short forms that refer to the same part. For example, a "transmission" is commonly referred to as a "tranny", or an "ECM" is commonly referred to as a "brain box" or "computer" and a "Catalytic Converter" is called a "cat". The system 10 may obtain this name database from research and input from those in the industry. Another example is a "Heater Motor" which is commonly referred to as a "Blower Motor", "Blower Fan" or "Heater Fan" and the plastic "Wheel" that pushes the air is known as the "Squirrel Cage". Although these examples are very simple, the database (not shown) is used for more than simple name replacements. For example, if a user sells an "engine wiring harness connector" (a descriptor) for their vehicle, the system 10 knows that buyers 12 may search for a "pigtail" or more specifically an "engine pigtail". If a buyer 12 searches for these terms, the seller's 14 item (engine wiring harness connector) would appear in the search results 289 because an engine pigtail is a slang term that relates to a wiring connector.

The same applies to vehicle names. For example, a "Ford F-150 Pickup Truck" is commonly referred to as a "Ford Half ton" or an "F150" (notice it does not have a '-' after the F). Another example is a "Ford Thunderbird" which is usually called a "T-Bird", or "TBird". Without this custom database, a buyer 12 that searches "F150 rims" in the top search bar 120 would find no results (unless the seller 14 purposely typed in F150 in their listing). With the custom database included in the system 10, when the buyer 12 types "F150" in the search bar 120, the system 10 would automatically know to look for all listings with items relating to an "F-150 Pickup Truck". Although these are very simple examples, this custom list is much more complex. Briefly, users commonly look for, or sell items, that fit multiple vehicles of the same "class" or "series". For example, a Mercedes-Benz E300, E320, E420, E430, E500 and E550 are all considered to be in the "E-Class" series. Because the system's 10 custom intermediary database 42 knows this, a seller 14 using the AlsoFits feature, described previously herein, can type "E-Class" (or "EClass" or "E Class") in the model field 220. This way, when a buyer 12 searches for a particular model in any E-Class series, say an E320 CDI, the seller's 14 listing will appear in the search results 289 even though the seller 14 did not specifically choose that particular model.

The third part of this feature is the custom incorrect spelling database (see FIG. 1). The system 10 currently has more than 163,000 spelling variations for both categories, subcategories, descriptors, vehicle names etc. This makes it easy for both the buyer 12 and seller 14 because they can make a spelling mistake and the system 10 would still know what they meant. For example, if a user types "fodr" or "hiunday", the system 10 will know the user actually means "Ford" or "Hyundai".

Everything typed in by users is tracked and monitored by the administrator 34 so that the incorrect spelling database can be constantly updated. If the administrator 34 notices a term not found in their database, it can be added. This can be performed manually or through an automated process.

Listing with No Pictures & the Custom Image Database

The system 10 has, and continuously adds, preset pictures for categories/items so that when a user sells an item without a picture, the user will have the opportunity to use the standard "generic" picture that resembles their item. For example, if a user is selling a fender but does not have a picture of it, the seller 14 can use the preset picture prepared by the system 10. This helps the buyer 12 to identify the item if they don't recognize the name of it. For example, many buyers 12 will not know what an "EGR" is so a picture would help them identify it as the correct item they are looking for. Although items will vary across years and models, the pictures will serve a reference point only. The picture database will be custom to the system 10 for categories, sub-categories, descriptors and vehicles. This would also be very useful for sellers 14 that use the bin feature, described previously herein, to sell their items. Since most sellers 14 creating a bin will not take individual pictures of each item within the bin, using a standard picture to display on the front of their bin would be very convenient.

Similar functionality applies to vehicles. The system 10 stores pictures when vehicles are posted to build a detailed picture library (see FIG. 1) of vehicles that can be filtered down to, but not limited to, the year, make, model/submodel and trim package. This is subsequently described below. The system 10 may also use some vehicle pictures from the ACES database 40 or third party database so if a seller 14 list a vehicle and does not have a picture of the vehicle, they could use a standard photo that resembles the vehicle. For example, a seller 14 lists a 1995 Ford Mustang GT but does not have a picture of it. The seller 14 could use a picture from the main category database 44, or the system 10 picture database instead.

An advanced look up tool (not shown) will utilize the database to create a unique search tool for users allowing them to look up an item and/or vehicle from a particular year, make and model/submodel for reference purposes. For example, a buyer 12 is told by his mechanic that he needs an "EGR" for his 1990 Volkswagen Jetta. The buyer 12 has no idea what it looks like or what it is so he can use this tool on the system 10 to search for the item. The system 10 will search its library for both current and past listings for a "1990 Volkswagen Jetta EGR". Once found, the buyer 12 could review the different pictures from current and past sellers 14 to show the buyer 12 what the EGR looks like. As well, the system 10 can add a short description beside the pictures explaining what the item is and what it does. This is an extremely powerful tool for anyone in the automotive industry. In yet another example, if a user does not know what a 1985 Ford Mustang GT looks like they can use this tool in the system 10 to view the car. The system 10 would search pictures and video files from all current and previous listings to find a match.

Shipping Features

If a seller 14 chooses the "Contact Seller" shipping method (not shown), he receives shipping requests from buyers 12 for the item he is selling. For example, choosing 'Contact Seller' for the Canada 157 region, the item would appear in the listing with no shipping price as shown in FIG. 21. FIG. 21 illustrates one example of what buyers 12 would see when they view an item's details. In another embodiment, the message center 150 can allow the buyer 12 to request a shipping quote from the seller 14. Once the seller 14 receives the shipping quote from the buyer 12, he could enter the shipping information into a request form (not shown) similar to that shown in FIG. 20 for the flat fee shipping method shown by numerals 156*a* and 156*b*. The seller 14 can see the country, city, province/state and postal/zip code to calculate the shipping price. Once the seller 14 finishes and sends the quote to the buyer 12, the buyer 12 will then have total item price (shipping and item price combined). A "Buy This Item" link (not shown) will be found in the message 150 so the buyer 12 could purchase the item from that message. When the buyer 12 clicks it, the purchase confirmation page (not shown) is updated to show the total price and the buyer 12 is then able to complete the purchase. The message centre 150 therefore allows buyers 12 and sellers 14 to purchase and sell parts through messages. It may be noted that the messages can be configured to keep the buying and selling process within the system 10 to make sure that users do not circumvent the system 10. In this case, emails can be sent to the user, but they are brought back to the system 10 such that responses are made within the system 10.

Sellers 14 can use these features with all messages. For example, a buyer 12 contacts the seller 14 and asks an item related question along with a shipping question such as, "Do you still have this item available? Can you ship overnight?" Regardless of whether the seller 14 had shipping details attached to the listing or not, they can respond with another shipping quotation similar to the Contact Shipping example explained above. In this example, the seller 14 had posted the item with a flat shipping price of $5.00 via UPS Ground. The seller 14 can respond to the buyers 12 message and click the Add Shipping Quote link in the message (not shown) to send a custom quotation to the buyer 12 for overnight shipping. The seller 14 can then add another shipping option, UPS Next Day Air for $25.00 and send it to the buyer 12. When the buyer 12 receives the message, they can purchase the item from the message with either the UPS Ground $5.00 shipping or choose the UPS Next Day Air $25.00 option. It can be seen that sellers 14 have many options when communicating with sellers 14. The system 10 is designed to be flexible and allow the seller 14 to operate as they would in their bricks and mortar business.

Another embodiment of this feature allows a seller 14 to find an item he is selling and create a manual shipping quote to send to a buyer 12. For example, Seller A receives a phone call from a buyer 12 asking if he has Product A available. The seller 14 does have it and although the seller 14 did not receive a shipping quote or message through the system 10 from the buyer 12, the seller 14 is able to view his Product A listing and a Send Quote link (not shown) would appear, only visible to the seller 14 as that is his listing. Clicking that link would allow the seller to enter details about a shipping price, review the item price and send it to a buyer's 12 email. When the buyer 12 receives this email, they are able to purchase the item from the quote message through the system 10. In this way, seller's 14 can send buyer's 12 quotations directly attached to their listings on the system 10 without waiting for buyer's 12 to contact them. This is very convenient when seller's 14 receive phone calls or email messages from outside the system 10 for items the seller 14 is selling on the system 10. Sellers 14 can quickly send a quote and let the buyer 12 purchase the item through the system 10. Another embodiment of this feature allows the seller 14 to create a quote for an item they do not have listed on the system 10 by allowing them to quickly list it. For example, Seller A is contacted by a buyer 12 who is looking for Product B. Although the seller 14 has the item available in his bricks and mortar store, it is not listed on the system 10. The seller 14 can then can quickly create a listing on the system 10 for Product B and send the buyer 12 a quote with the item price and shipping to the buyer's 12 email. They buyer 12 can them purchase the item through the system 10.

Custom Vehicle Database

Although the system 10 uses the ACES vehicle database 40 for vehicle information, the system 10 has their own custom intermediary database 42 (not shown). To reiterate, the ACES database 40 provides vehicle information such as make, model and sub-model names and years for vehicles marketed in North America. However, ACES 40 may not include vehicle information from other markets such as Australia, China and the United Kingdom. The system 10 is building a master vehicle database (not shown) that includes vehicles from all over the world. Using the AlsoFits tool, as described previously herein, if sellers 14 add vehicles to their listing that are not found in the main category database 44, the system 10 accepts the vehicles and reviews them. The administrator 34 will then research each vehicle to determine that it is a legitimate vehicle and then adds it to the custom database so other users can find it later in the auto-fill tool 52. For example, a seller 14 lists an item for a 2008 Holden Barina, an Australian vehicle not found in the ACES database 40. The system 10 allows the seller 14 to complete the listing and the administrator 34 is informed of the new model. The administrator 34 then reviews the 2008 Holden Barina and decides to add it to the main category database 44. The next time a buyer 12 or seller 14 uses the auto-fill tool 52 to lookup a vehicle, the 2008 Holden Barina would be appear. This allows the system 10 to let the "users" help populate the main database 44.

Damage Designer

The "Damage Designer" feature allows the seller 14 to highlight specific areas of an item within a picture and assign a damage type and/or comment to the buyer 12. For example, a user lists a fender with a few dents in it; however, due to the glossy paint finish and the camera flash, the dents do not appear in the picture. This is a common problem in the auto industry. The Damage Designer was created to allow the seller 14 to clearly indicate where a part has been damaged.

Figure 98:
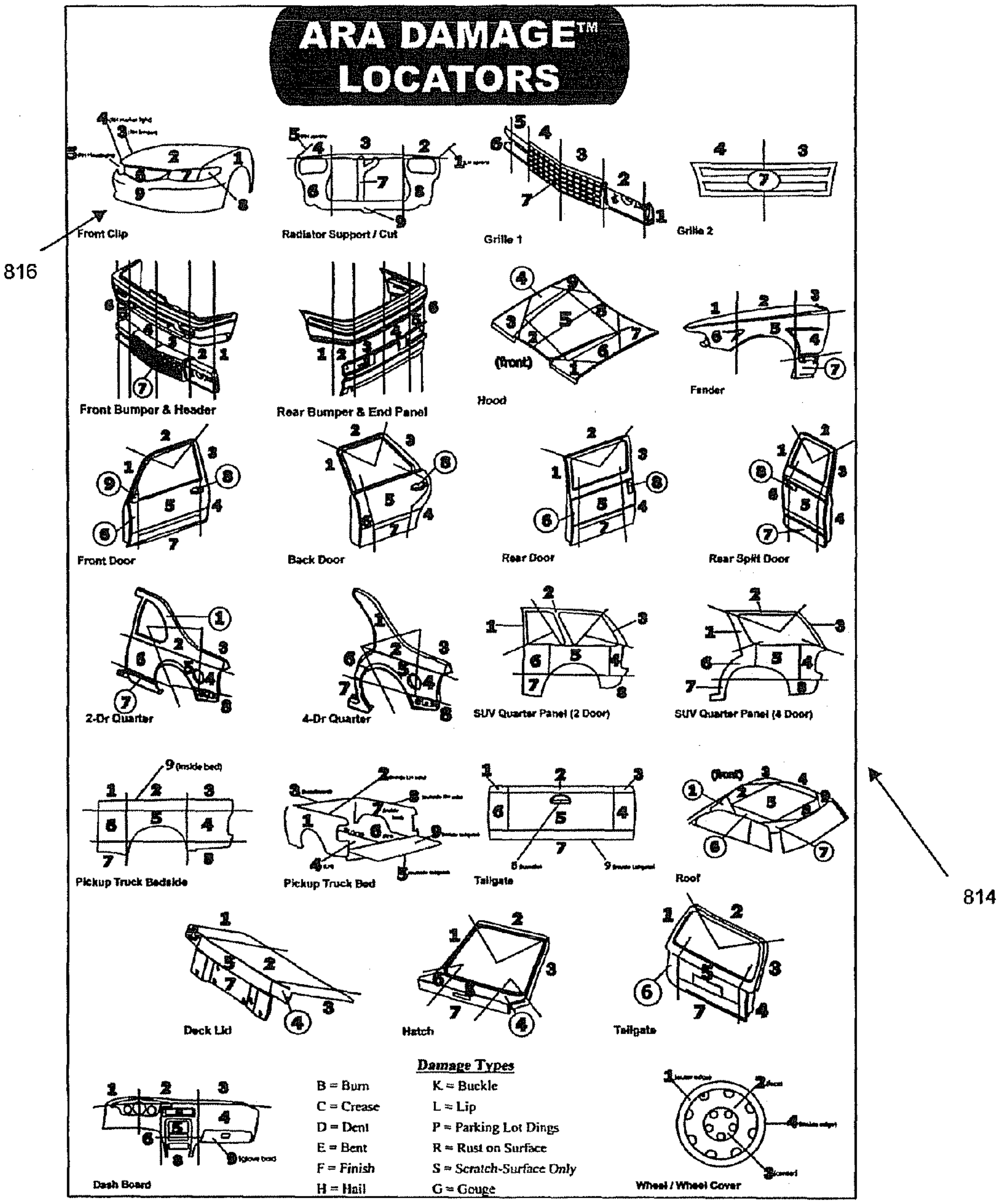
FIG. 98 is a diagram showing a legend for ARA. Damage Description Codes describing types of damages that could occur to vehicle parts.

Currently, a standard has been developed by the Automotive Recyclers Association (ARA) which lists 14 different damage types to describe items including, burn, dent, bent, hail, rip or crack, buckle, lip, parking lot dings etc and developing damage codes. The ARA Damage Description Codes are three characters long representing the location, damage, and units of damage to the part. For example, 2D1 represents a one unit dent in location 2. There may be a primary and secondary code for each part, as in 2D1,4S2. If there is no damage on a part the code is 000. Although this method is supposed to be the standard in the used auto parts industry, converting an item's damage and/or condition into "codes" makes it very difficult for a buyer 12 to understand where it is damaged. The buyer 12 would have to spend time looking at a legend 814, as illustrated in FIG. 98, to understand what the codes mean. Furthermore, the codes only give general areas of damage and do not give the buyer 12 the "exact" location on the part. For example, look at the first "Front Clip" item 816 in the legend 814, the damage area "2" is for the entire hood. The buyer 12 would not know where the damage on the hood is using the ARA Damage Codes.

Figure 99:
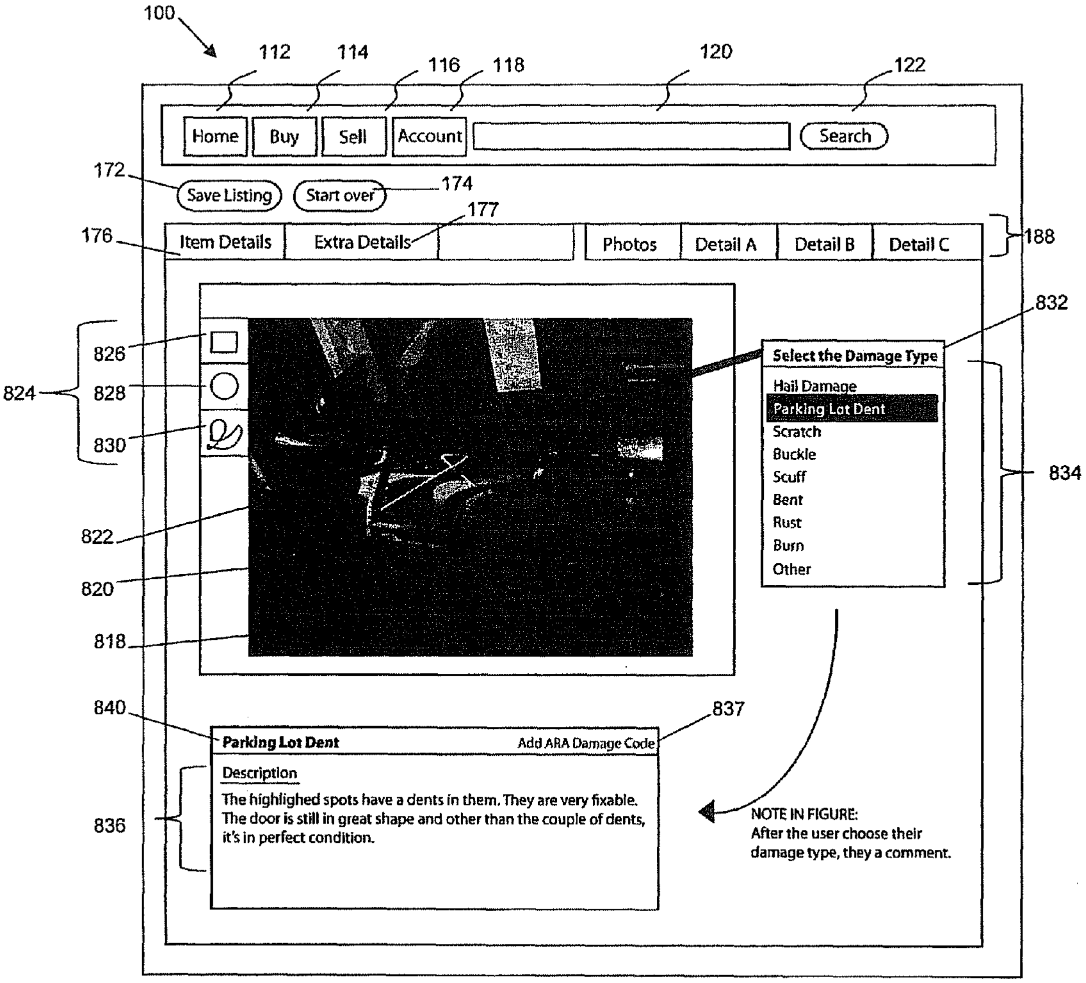
FIG. 99 is a screen shot showing a further embodiment of the Photos tab in a single item listing page utilizing the Damage Designer tool to mark up areas of damage.

Therefore, the Damage Designer feature allows users to quickly highlight damaged or imperfect, referred to herein as damaged, areas by allowing the user to outline the "exact" damaged area proportional to the image. For example, FIG. 99 shows an embodiment of the Damage Designer page after the seller 14 clicked the Use Damage Designer link 831*a* from the photos 184*a* tab pane displayed in FIG. 22. A picture 818 of a red glossy fender a seller 14 is posting has been uploaded. The picture 818 clearly illustrates where the damage is on the fender because of the dark black marks 820 and 822 on the picture 818 and how extensive the damage is by the size of the outline proportional to the picture. The smaller circles 822 reflect smaller damaged areas. The user has many drawing tools 824 available such as but not limited to a rectangle tool 826, to draw a rectangular box, a circle tool 828, to draw a circle, and a free form tool 830, to draw a custom outline around the exact damaged areas. The user can change the colour and thickness of the lines so they stand out against different coloured pictures 818.

Figure 100:
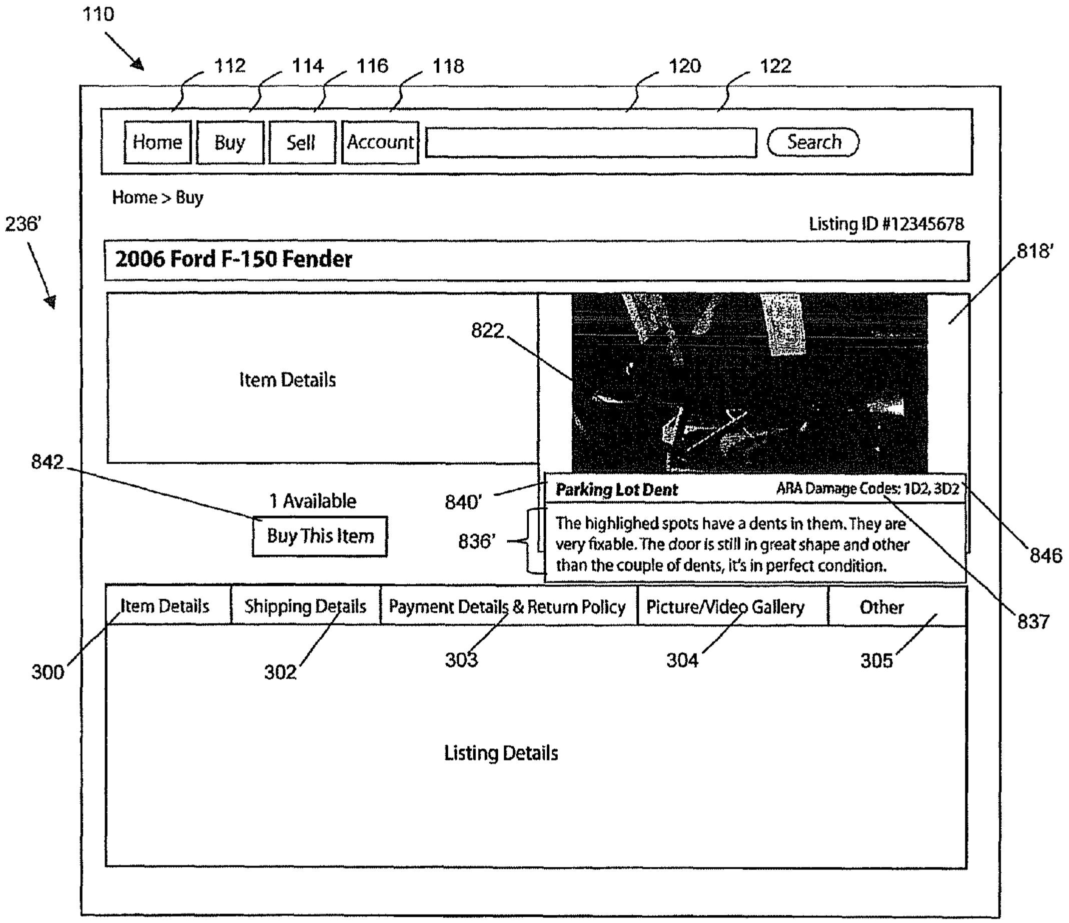
FIG. 100 is a screen shot showing another embodiment of a single item detailed listing page with an image displaying damage areas on an item.
Figure 101:
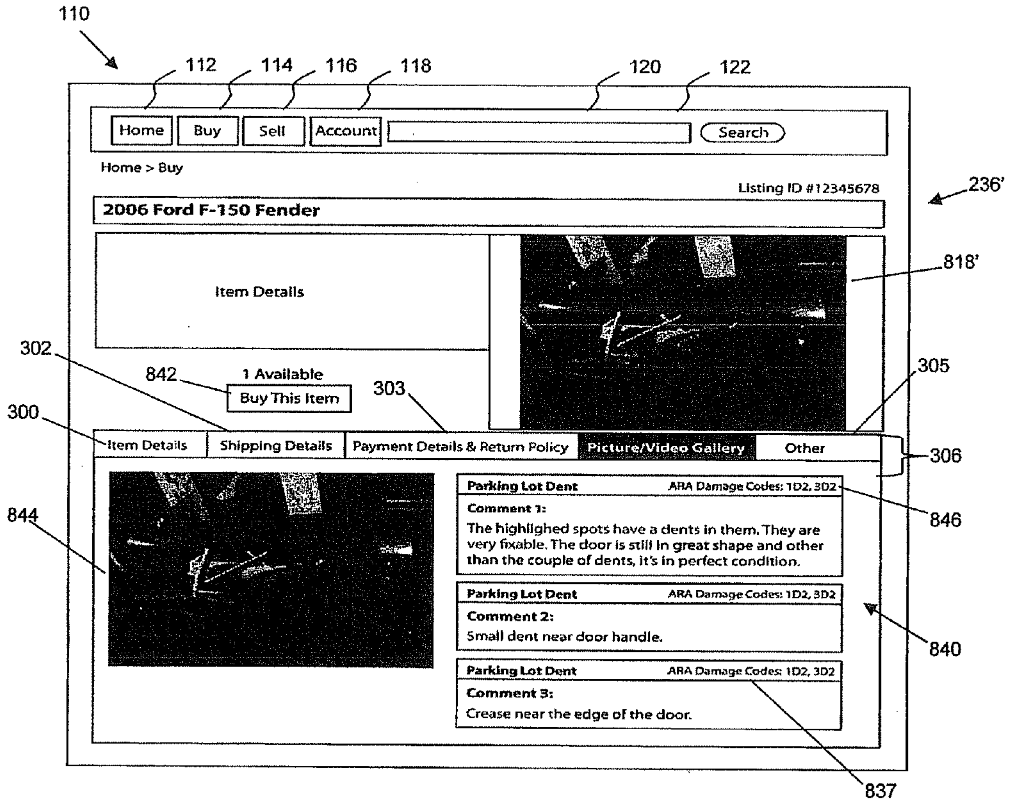
FIG. 101 is a screen shot showing a single item sell page with the photo gallery tab selected to display an image and comments pertaining to a damaged item for sale.

FIG. 99 also shows the damage menu 832 that appears each time the user finishes highlighting an area, allowing the user to choose the damage type 834. For convenience, the menu 832 offers similar damage types 834 as those suggested by the ARA and also includes custom damage types 834. FIG. 100 also presents a comment field 840, that the user completes after they choose the damage type. The user can then attach comments 836 to give buyers 12 a better description of the damage. To accommodate users accustomed to using the ARA damage codes, the seller 14 will have the option of entering the damage codes by selecting the "Add ARA Damage Code" link 837 in the top right corner of the comment box 840. Clicking this will open the damage code entry tool (not shown). FIG. 101 shows another embodiment of the single item detailed listing 236 page previously illustrated in FIG. 22. FIG. 101 displays the edited image 818' in the listing details page 236' buyers 12 see once the seller 14 has posted the item. FIG. 101 shows the user has placed their mouse over the first damage area 822 causing the first comment box 840' to open with the comment 836' the user wrote. FIG. 101 shows what a buyer 12 would see if they clicked the Picture/Video Gallery tab 304 in the item's detailed listing page 236'. In this view, all of the comments 836' entered by the seller 14 are displayed with an indicator (not shown) showing which comment 840 belongs to which damaged area on the image 844 displayed beside the comment boxes 840. In FIGS. 100 and 101, if the seller 14 added ARA damage codes, the damage codes 846 appear to buyers 12. These codes 846 are shown in the top right hand side of the comment boxes 840.

The Damage Designer feature is integrated into all of the selling and photo upload features. Once the photo is uploaded, the seller 14 only has to click the "Use Damage Designer" button 831*a* (not shown) to open the tool. This tool can also be used to highlight anything in a picture the seller 14 wants to show buyers 12. For example, one user selling a performance engine may want to emphasize and point out a special feature of the item. The user could highlight this special feature in the picture, choose a special option from the damage types menu 834 and add a comment such as "This is the performance distributor that will increase your performance by 15%." This is a great way for sellers 14 to emphasize special items in their pictures. The example given herein is specific to the use of auto parts; however, the use of this tool can extend to a variety of other applications.

Repair Quote & Service Tendering/Supplier Locator System

The repair quote and service tendering system allows buyers 12 to request repair quotes and/or quotes for any type of service related to the system 10 from sellers/service providers 14 who registered to receive these quotes. Service providers 14 include but are not limited to, body shops, mechanical repair shops, tire shops, custom detailers, fabrication shops etc. For example, a buyer 12 may wish to send out a request to determine the price to get his car repainted. Another user may want to send out a request to all custom designers to create a head rest.

The method of the feature is that the seller 14 would register for an account on the system 10 and configure their account by choosing which notifications from buyers 12 they wish to receive. The seller/service provider 14 would be presented with a list of notifications based on the type of account they registered with. For example, if a seller 14 registers as a body shop, the settings for the account would pertain to body shop services such as, "Receive requests for paint jobs", "Receive requests for body work" etc. If the seller 14 registered as a mechanic, the notifications would pertain to mechanic services such as, "Receive requests for tune-ups" or "Receive requests for "engine installations". Other advanced settings allow the seller 14 to filter their notifications. For example, a seller/service provider 14 may only want to receive requests from buyers 12 within 10 kilometres from their business. Once the service provider 14 has configured their account, they are ready to accept service quotes and tenders. These configuration settings are determined and created by the system 10.

Next, a buyer 12 could submit a service request to all sellers 14 who have subscribed to receive the notifications requesting the price for service, how long it would it take etc. The request appears in the seller's 14 inbox 644 (see FIG. 77) in their message centre 530 and they receive an email notification (not shown) directing them to their inbox 644. The request lists information such as, but not limited to, user id of buyer, date and time, comments, buyer vehicle information (year, make model/sub-model), and any pictures and/or video the buyer 12 attached to the request. As example of a comment in a request may be, "How much would it cost to repaint my car?"

The seller 14 then reviews the requests and uses the pictures and/or video to help them determine the quote. It is extremely difficult to price out a service through pictures as the buyer 12 may not have included all of the pertinent information so the seller 14 does not respond with a fixed price. Instead, they send the buyer 12 a price range. For example, the seller 14 would respond to the buyer 12 by saying, "To repaint your car, the price would be between $500.00 and $600.00 dollars for paint and labour." The seller 14 would respond to the request in a standard response form similar to the parts car seller response form 325 shown in FIG. 47. The seller 14 could include more estimates for different services. For example, the seller 14 may say, "If you want to change the colour, the price range would increase to $650.00 to $750.00. The seller 14 responds directly from the request in their inbox 644.

Once the seller 14 sends the quote to the buyer 12, the request is organized into folders in the buyers "My Account" 697 (not shown) making it easy to manage and keep track of all of their quotes. For example, one folder may be named by the buyer 12 as "Quote to paint car", while another may be named "Quote to fix the squeaky brakes". Another example would be for the buyers 12 to create folders based on the different vehicles they are sending the requests for (e.g. Fix the 98 Caravan, or Paint the Tahoe etc). The buyer 12 could then review the request, research the seller 14 by viewing their system 10 profile and feedback and then make the decision of who to use. Or, at the very least, the buyer 12 could narrow down their choices to two or three sellers 14 and then visit them in person outside the system 10.

The service will also be accessible from both the search results page (not shown) and through the Tool Box tab 523. When a buyer 12 searches for an item that is related to a service, the system 10 provides the buyer 12 with a list of sellers 14 or service providers 14 the buyer 12 may be interested in, located at the bottom of the search results. For example, a buyer 12 searches for a hood for his vehicle and finds one that they want to buy. The system 10 gives the buyer 12 a list of body shop sellers/service providers 14 close to the buyer's 12 location. That way, if the buyer 12 is looking for someone to install the item they are about to purchase, they can find both the item and service facility to install it through the system 10. The buyer 12 can then click on a seller/service provider 14 to view their profile that includes video, pictures and the description of their facility etc.

The buyer 12 can also send requests directly from the Tool Box 523 so they don't have to search for an item to find a list of service providers 14 but rather, search for one by service type. For example, a buyer 12 may search for all custom designers to make a special item for their car or search for a transmission repair shop, located in the Toronto area that specializes in BMW transmissions. The page would be similar to the Search Suppliers 693 page shown in FIG. 87. The buyer 12 has access to advanced filters 111, 289 similar to that of the seller 14. In this case, the buyer 12 only wants to find sellers 14 within 100 kilometres of his house. The buyer 12 would then send his request to the service provider 14. The system 10 matches the service providers to the main category database 44 to associate their services with descriptors, categories, sub-categories, vehicle make, models and years etc.

Both the buyer 12 and service provider 14 can add pictures or video when sending requests.

Similar to the tendering system, a user may search specifically for a supplier 520 using the sourcing tool. Suppliers 520, as described in the Part-a-Log tool above, can setup detailed profiles and allow sellers 14 to subscribe to their item catalogues. The sourcing tool can be used to perform detailed searches and find suppliers 520 for specific items. For example, a seller 14 may want to find a supplier 520 that sells parts for automatic transmissions (broad supplier 520 search), or they may want to find a supplier 520 that specifically sells rubber body mounts for Ford Trucks. Having such a sourcing tool gives the seller 14 the ability to locate suppliers 520 they may want to do business with. Once they are interested in a supplier 520, they can view the supplier's 520 detailed profile (company videos, brochures, background information etc.).

Auto-Part-It

The "Auto-Part-It" tool is a further embodiment to the List a Multi-Item option 162 (see FIG. 12), as described herein and illustrated in FIGS. 24 to 41. However, when the seller 14 reaches the "Choose Parts" 191 tab, they choose the items they wish to create individual listings for, and then the Auto-Part-It tool creates individual listings for each of those items. To reiterate using an auto parts example, the Multi-Item listing 162 makes one entry for the complete vehicle so that buyers 12 can request parts from that single listing. In this embodiment, the system 10 would use its Auto-Part-It tool to create separate entries for every item the user selected in the Choose Parts tab 191 in addition to creating a vehicle multi-item 26 listing.

Figure 102:
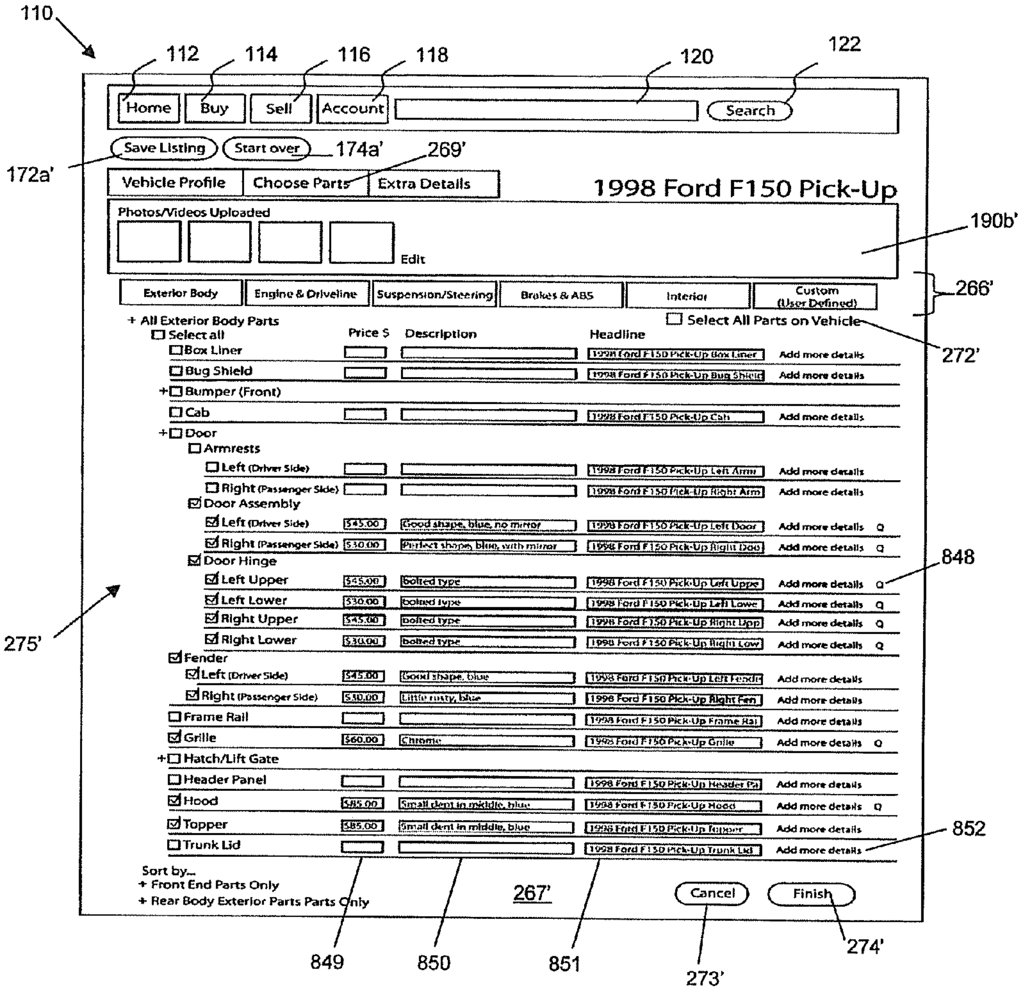
FIG. 102 is a screen shot showing a further embodiment to the choose part page in FIG. 38 listing items that a user is selling during the creation of an exemplary multi-item listing.

The main difference between the Auto-Part-It tool and the List Multi-Item 162 tool is that the user may be required to add a price to each item. The system 10 may be configured to allow the seller 14 to add the items without adding a price and allowing buyers 12 to request the shipping and 'item' price for the items. The system can also auto generate the headline for each of the items so the seller 14 doesn't have to manually type it for every one of their items, thus reducing the time required to make an entry. The auto-generated headline is very convenient as it takes the year, make, model and the selected item (descriptor) to create the headline, a required field. If the seller 14 wants to change the headline, they can do so at any time. FIG. 102 shows one example of the modified choose parts tab 191 shown herein in FIG. 36, and like elements are given like numerals with the suffix "'" for clarity. Each item in the tree 270', in this example, has a listing for its price 849, a description 850, and an auto-generated headline 851. If an item/descriptor in the tree structure 270' has questions from the questions database 23 attached to it, a "Q" 848 will appear at the end of the listing beside the "Add more details" link 852. Selecting this link 852 will open the questions window (not shown) to show questions similar to those illustrated in FIGS. 95 and 96 related to that item, so the seller 14 can add more details to the item listing.

Figure 103:
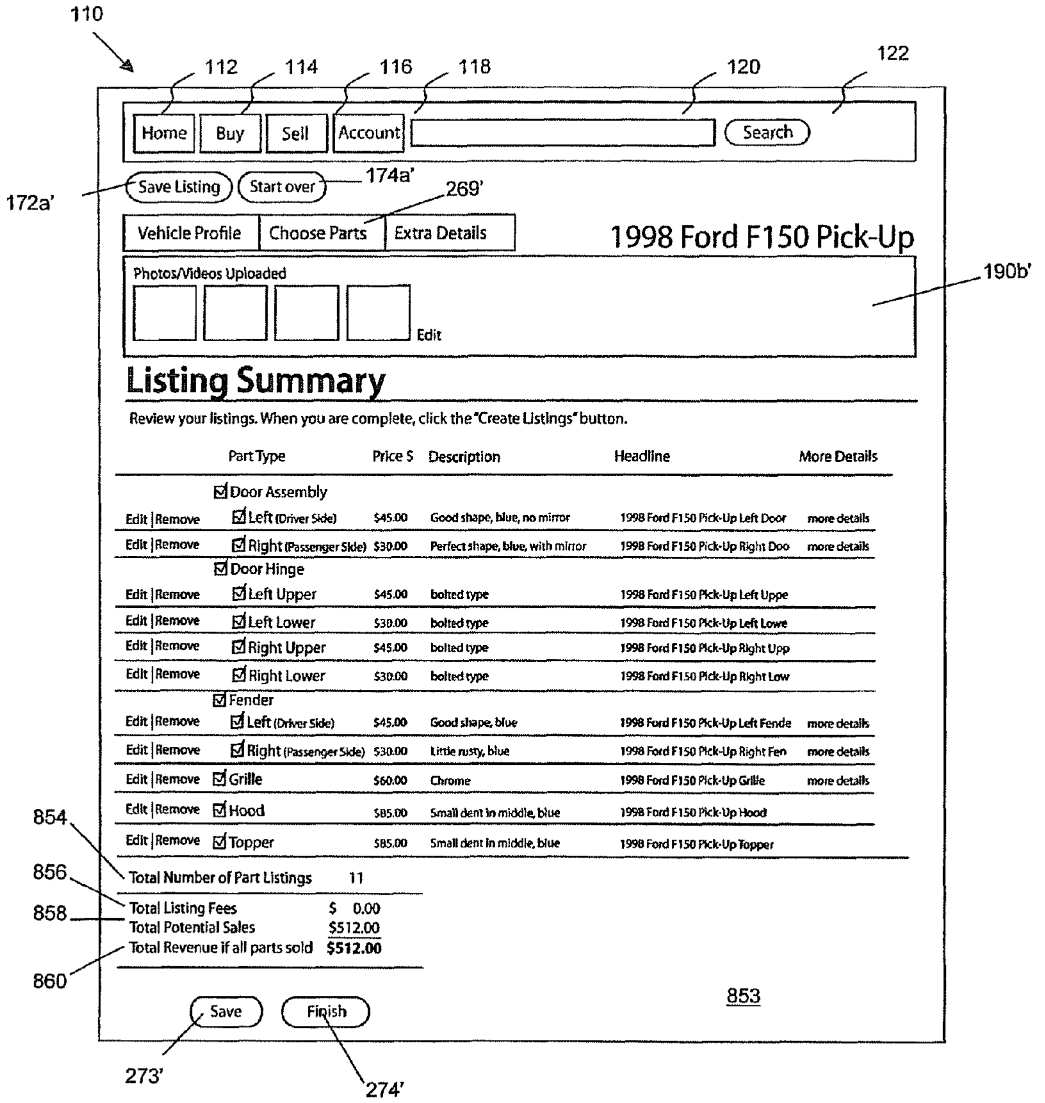
FIG. 103 is a screen shot showing a summary page listing all items a user is selling and providing sales and item totals during the creation of an exemplary multi-item listing.

When the seller 14 is finished choosing their items, they are presented with a summary page 853 shown in FIG. 103. The summary page 853 shows the seller 14 the total number of part listings 854 that will be generated from the multi-item listing 26 and shows the total fees 856, if fees apply, for the listing, the potential sales revenue 858 if they sold all of the items, which represents the sum of all item prices, and the total revenue if all parts sold 860. This is calculated by taking the vehicle cost 251, as entered in the required details pane 176*a*, and subtracting it from the total revenues 860.

Clicking the "Finish" button 274' would create individual listings for all of the items/parts the seller 14 chose to list from the choose parts tab 191. The individual listed parts would appear in the "Parts" tab 286 shown in FIGS. 18 and 97 in the search results page and the multi-item listing would appear, in this example, in the "Parts Vehicles" tab 288 shown in FIGS. 18 and 97. Buyers 12 can still send parts request to the seller 14 even if they used the "Auto-Part-It" feature. A link (not shown) to the part car listing would appear in every item listing from that vehicle. For example, if a user viewed the individual hood listing created by the system 10 they could click the "View Parts Car" button (not shown) to take them directly to the parts car (multi-item 26) listing.

The benefit of using the Auto-Part-It tool would be to let the system 10 generate individual listings from a single, multi-item 26. For example, from one vehicle, the system 10 can generate in this example, over 1,700 individual listings. The administrator 34 has a database containing a list of items/descriptors as they relate to multi-items 26. For example, the database contains a list of different parts found on cars, trucks, vans, SUV's etc. so the system 10 knows what to generate. Consider this example: Seller A lists a truck and uses the Auto-Part-It feature. The system 10 then creates individual part listings for all parts on that truck (right fender, left fender, right headlight, left headlight, engine, transmission, truck box, truck cab etc.) using the main category database 44 descriptors, positions etc. explained earlier. If the seller 14 wanted to create individual listings for all the parts on that vehicle, it would take him days to create listings for the thousands of parts on that vehicle. The Auto-Part-It tool makes it quick and simple. The system 10 would know that different parts are available on different vehicle types (cars, trucks, etc.), vehicle makes (Ford, Chevrolet etc.), vehicle years (e.g. air bags are not available on vehicles in the 1950's) etc.

The system 10 can use and/or integrate with third party databases to assist in creating the individual item listings. For example, if a the system 10 offers the Auto-Part-It tool for heavy equipment machine such as backhoes, bull dozers etc. the system 10 may integrate databases with known parts for those machines so that the system 10 can properly create the individual listings.

As mentioned earlier, the Auto-Part-It is an additional feature that can be added as a further embodiment to the List a Multi-Item option 162 to offer a different service based on the needs and wants of the seller 14.

Other 'Websites' Integration

When users list a "Parts Vehicle" and specify they are willing to sell the complete vehicle or its parts, an option the seller 14 chooses when listing their parts vehicle, the vehicle listings become available on websites related to the system as a value added benefit of using the system 10. These other websites are similar to the system 10; however, they can include other applications, such as forestry equipment, mining equipment, construction equipment, cars and trucks and more. If the vehicle is sold through the system 10 or any of the other system's 10 sites, the listing is taken down from all sites. All three sites will share similar functionality to the system 10 as fully described herein.

Knowledge Database Tool

The system 10 includes a detailed knowledge based video and blogging platform (not shown) specific to the niche parts industry. This tool will allow users to share their knowledge on an international platform. For example, users can watch "how-to" videos on how to change their oil, repair dents or remove and replace parts. The videos will feature both professional and non-professional videos so users can watch how the experts do things. Organizations such as the Collision Repair Association of America can feature their own training videos for their registered members or a user can post a question about a car problem they cannot fix to receive advice from other users. Users can link these videos and/or blogs to a category/item and/or make, model and year for searching purposes. For example, a buyer 12 searches for a heater motor for their 2000 Dodge Neon. In the search results page there will be a link (not shown) to the knowledge base tool if there are entries related to that item. In this example the user clicks the link to read about problems other users encountered with the heater motor.

Parts Alert & The Wanted Board

This is a unique search method that will appeal to users who cannot find their parts listed on the system 10 and do not want to continuously check to see if they become available. A user will search for an item and if no item is found they will have the option of posting it to the wanted board (not shown) by clicking, "Post to Wanted Board" (not shown). The wanted board features a page dedicated to items that people are looking for accessible by clicking the "Wanted Board" tab (not shown) beside Tool Box 523 in the main menu. The item is then stored in the buyer's My Account 697 using the Parts Alert tool (not shown) so that if that item becomes available, the user will receive an email notifying them that their item is now available with a link to the listing. The system 10 will continue to search for that item until the user removes it from their settings under My Profile.

Sellers 14 can review the Wanted Board to find items they have to sell. For example, a buyer 12 looks for a rare tail lamp for his 1948 Chevrolet Truck. The search does not return any results, so the item is posted to the Wanted Board and is then stored in the buyer's 12 account using Parts Alert. Later, another user decides to sell a 1948 Chevrolet Truck tail lamp and lists it on the system. As soon as this listing becomes active, the buyer 12 receives an email from the system 10, providing notification that someone is selling the tail lamp they requested. Three days later, another seller 14 reviews the Wanted Board and notices a request for a tail lamp that they have. Clicking on the listing will take the seller 14 into the sell page and pre-fills the item information based on the buyer's 12 request. The seller 14 lists his item and the buyer 12 receives a message telling him that a seller 14 responded to his request on the Wanted Board with a link to the listing. This makes it very convenient for buyers 12 and sellers 14 and prevents lost sales for sellers 14.

An extension of this feature is to allow users to add vehicle profiles to their My Account so that when the user needs to find parts for that vehicle, they can go to it in My Account and the system 10 would automatically pull in all parts and parts cars listed on the system 10, including from the Part-a-Log as described previously herein, for that vehicle and organize them into first tier categories, similar to the way items are organized in a seller's Store Front as described previously herein. This allows for the buyer 12 to find all items and parts cars available for their vehicle rather than having to "search" for items or parts cars.

Using the searching tools in the Buy 114 and Sell 116 tabs allows the users to find items or vehicles very easily by offering a wide array of lookup combinations. Users can type in these different combinations to find the vehicles dynamically in the auto-fill list 52. For example, if a user types "de", the list will display all makes, models, and sub-models that begin with "de". If the user types "84" the list filters to show only vehicles available in 1984. If the user types in "84 Mustang", the system will automatically choose a 1984 Ford Mustang even though the user only selected the partial year "84" and the model. This is one example of a user's search parameters; however, there are many more complex combinations that the system 10 can use to find a user's desired vehicle and/or items from a particular vehicle.

Some of the combinations may include:

Year, Make and Model/Sub-model

Year Model

Make

Make Model/Sub-Model

Model, or year and model

Year sub-model

Sub-Model, or year and sub-model

Year Trim Package (i.e. "02 GT" pulls up a 2002 Ford Mustang GT)

Trim Package

The year field accepts 1, 2 and 4 characters. For example, typing "84" pulls up all vehicles made in 1884 and 1984 and typing "1984" pulls up all vehicles made in the 1984.

This is a very powerful way of searching based on research from auto parts professionals.

Watch us Race

Another feature that allows users from all over the world to "race" each other using satellite and GPS tracking is the "Watch Us race" tool. For example, a user creates and posts his vehicle profile outlining the type of vehicle he has (e.g. Honda Civic), its engine size and other vehicle specific details etc. Then, using his mobile phone with internet and GPS tracking enabled, or, using a GPS device, or using his notebook computer with an available wireless signal to allow him to connect to the internet and a GPS unit, he logs into the system's 10 sister website. Once connected, he races on any road or terrain and the satellite tracks his course and speed. Then his time and course layout gets posted on the system's 10 sister website beside his vehicle profile. Other users from anywhere in the world can then create their own vehicle profile and race the user to beat his time on a similar course (i.e. straight road). The user can choose to receive email notifications if other users beat his time. The user can setup the race again directly from that email. Further options will organize the racers into different groups and classes based on such criteria as vehicle type, country, province/state etc. This can also be used with both motorized and non-motorized vehicles or methods of transportation.

Product Advertising

As described above, A Product Advertising option 167 can be selected from the main sell menu as shown in FIG. 12 to allow sellers 14 or administrators of other websites or systems to integrate and/or promote their item listings from their website into the items database 22 and the system 10. For example, ABC Company may have their own website but may want to use the intermediary 16 to promote their items and generate more sales by listing all of their items in the intermediary's 16 items database 22. The system 10 can be configured to generate revenue from sending referrals from the intermediary 16 to the seller's own website or store and/or charge a commission fee for sales generated from buyers 12 who found the seller's 14 item on the items database 22 and purchased the item from the seller 14 on the seller's 14 own website.

This tool allows other part sellers 14 and websites to integrate with the system 10. What makes this tool very different is that the system 10 organizes the all of the integrated data into the categorization database 20 making the data searchable using the system's extensive search tools. The result is that the system 10 becomes the one central portal to the items databases and item catalogues and integrates, buyers 12, sellers 14 and supplier 520 into an e-commence platform. Furthermore, the system 10 allows sellers 12 and suppliers 520 to utilize the system's 10 selling tools to list and sell their items within the system 10, or, sell their items on their own e-commerce systems using the Product Advertising tool giving them unparalleled flexibility in how they want to do business.

Although the invention has been described with reference to certain specific embodiments, various modifications thereof will be apparent to those skilled in the art without departing from the spirit and scope of the invention as outlined in the claims appended hereto.

The invention claimed is:

1. A method for listing an item on a website, said method comprising:

providing a website on a server device, said website being connectable to a network to enable user devices to access said website;

providing on said website, a first user interface for generating a new listing for said item, said item comprising a plurality of component parts that can be sold individually, said first user interface for entering information identifying said item to enable said item to be located in search queries, at least some of said information identifying said item being also associated with at least one component part of said item such that search queries including said at least some of said information returns both said new listing and any available listings for said at least one component part of said item;

providing on said website, a second user interface for enabling said plurality of components of said item to be identified in said new listing as being available for individual purchase;

storing said new listing for said item in a database accessible to said website;

providing on said website, a third user interface enabling searches to be conducted;

receiving from said third user interface, a search query related to a desired component part, said search query providing said at least some of said information identifying said item;

returning a set of results comprising at least said new listing for said item; and enabling a request to be made for said desired component part to be purchased individually from said item.

2. The method according to claim 1 further comprising:

receiving a request to purchase said desired component part either individually or by purchasing said item as a whole;

enabling said purchase to be completed; and updating said database based on said purchase.

3. The method according to claim 1 wherein said information identifying said item comprises features and options for said item.

4. The method according to claim 1 further comprising enabling a dialogue box to be loaded for at least one of said component parts to facilitate recognition of the corresponding component part.

5. The method according to claim 4 wherein said dialogue box comprises a multimedia object pertaining to said component part and a description of said component part.

6. The method according to claim 1 further comprising providing a pane in said first user interface for entering additional or optional information pertaining to said item.

7. The method according to claim 1 further comprising upon detecting selection of said identifying information, associating said information with said item and storing an entry for said item in said database.

8. The method according to claim 5 wherein said multimedia object comprise pictures, video or audio or any combination of such objects.

9. The method according to claim 1 wherein detecting entry of one or more characters in a field in said first user interface comprises identifying said item, searching a database of item identifiers and displaying organized lists of possible choices for said item information in said first user interface to enable selection of said information; wherein said database of item identifiers comprises a tiered structure comprising a main category in a first tier and at least one additional tier further describing said main category, said organized lists utilizing said tiered structure.

10. The method according to claim 9 further comprising enabling an auto-complete function to be applied upon detecting entry of said information to filter said lists.

11. The method according to claim 9 further comprising enabling a plurality of features to be selected for said item by displaying said lists upon entry of one or more identifiers for each feature.

12. The method according to claim 1 further comprising providing in said first user interface, an upload tool for enabling one or more multimedia objects related to said item to be uploaded to facilitate said entering information pertaining to said item.

13. The method according to claim 12 wherein said upload tool is provided upon initiating said first user interface to enable said multimedia objects to be uploaded and displayed in said user interface to assist during entry of said information.

14. The method according to claim 1 further comprising integrating advertising content with said item and storing said advertising content with said item.

15. The method according to claim 1 further comprising enabling selection of a feature for automatically listing said components; and upon detecting selection of said feature, generating an individual listing for each of said components and storing said individual listings to enable searching of said individual listings independent of said item.

16. The method according to claim 1 further comprising enabling selling preferences to be pre-set.

17. The method according to claim 1 further comprising enabling multimedia objects to be edited to indicate attributes of said item.

18. The method according to claim 17 wherein said item is an automotive item and said attributes relate to damage to said item.

19. The method according to claim 1 further comprising obtaining fitment data associating said item with one or more other items having compatibility with said item.

20. The method according to claim 1 further comprising providing a reply to a request for a component part by determining if the requested component part is available for the item.

21. A non-transitory computer readable storage medium comprising computer executable instructions for listing an item online, said computer executable instructions comprising instructions for:

providing a website on a server device, said website being connectable to a network to enable user devices to access said website;

providing on said website, a first user interface for generating a new listing for said item, said item comprising a plurality of component parts that can be sold individually, said first user interface for entering information identifying said item to enable said item to be located in search queries, at least some of said information identifying said item being also associated with at least one component part of said item such that search queries including said at least some of said information returns both said new listing and any available listings for said at least one component part of said item;

providing on said website, a second user interface for enabling said plurality of components of said item to be identified in said new listing as being available for individual purchase;

storing said new listing for said item in a database accessible to said website;

providing on said website, a third user interface enabling searches to be conducted;

receiving from said third user interface, a search query related to a desired component part, said search query providing said at least some of said information identifying said item;

returning a set of results comprising at least said new listing for said item; and enabling a request to be made for said desired component part to be purchased individually from said item.

22. The non-transitory computer readable medium according to claim 21 further comprising instructions for:

receiving a request to purchase said desired component part either individually or by purchasing said item as a whole;

enabling said purchase to be completed; and updating said database based on said purchase.

23. The non-transitory computer readable medium according to claim 21 wherein said information identifying said item comprises features and options for said item.

24. The non-transitory computer readable medium according to claim 21 further comprising instructions for enabling a dialogue box to be loaded for at least one of said ms component parts to facilitate recognition of the corresponding component part.

* * * * *